United States Patent [19]

Carroll et al.

[11] 4,322,846
[45] Mar. 30, 1982

[54] SELF-EVALUATION SYSTEM FOR DETERMINING THE OPERATIONAL INTEGRITY OF A DATA PROCESSING SYSTEM

[75] Inventors: Elmer W. Carroll, Wilmington; Virendra S. Negi, Pepperell; Arthur Peters, Sudbury, all of Mass.

[73] Assignee: Honeywell Information Systems Inc., Waltham, Mass.

[21] Appl. No.: 140,621

[22] Filed: Apr. 15, 1980

[51] Int. Cl.³ .............................................. G06F 11/00
[52] U.S. Cl. ..................................... 371/16; 364/200; 371/29
[58] Field of Search ..................... 371/16, 29; 364/200, 364/900

[56] References Cited

U.S. PATENT DOCUMENTS

| | | | |
|---|---|---|---|
| 3,576,541 | 4/1971 | Kwan et al. | 364/200 |
| 3,838,260 | 9/1974 | Nelson | 371/16 |
| 3,905,023 | 9/1975 | Perpiglia | 364/200 |
| 4,063,311 | 12/1977 | Jeremiah et al. | 364/900 |
| 4,176,394 | 11/1979 | Kaminski et al. | 364/200 |

Primary Examiner—Charles E. Atkinson
Attorney, Agent, or Firm—John S. Solakian; Nicholas Prasinos

[57] ABSTRACT

In a data processing system, a self-diagnosing system selectively initiates the operation of subprocessing units in the data processing system in a predetermined sequence to determine whether the subprocessing units are operating correctly. A control store stores a plurality of sequences of control data which are selectively accessed to control the operation of the subprocessing units to perform self-diagnosing error tests. A display unit displays an indication of which of the sequences of control data is currently controlling the operation of the subprocessing units in order to aid error diagnosis should an error be discovered during the operation of the self-diagnosing system.

10 Claims, 93 Drawing Figures

|    | LOWER BANK | UPPER BANK |
|----|------------|------------|
| X0 | NA(1-10)   | NA(1-9),NA(A) |
| X1 | NA(1-10)   | NA(1-9),NA($\overline{A}$) |
| XA | NA(1-10)   | NA(1,2),XA PROMS(5)(3-10) |
| XB | NA(1-10)   | NA(1,2),110,F(12),XB PROM(1)(7-10) |
| XR | NA(1-10)   | NA(1,2),000,CF=(KOP),XR PROM(1)(7-10) |
| XE | NA(1-10)   | NA(1,2),KOP,F(0),#=0,F(4-8)(6-10) |
| XW | NA(1-10)   | NA(1,2),0,OD SIZ PROM(1)(4-6), 1,OD/ADDR. PROM(8),XW PROM(9,10) |
| XL | NA(1-10)   | NA(1-6), LINK(7-10) |

FIG. 6

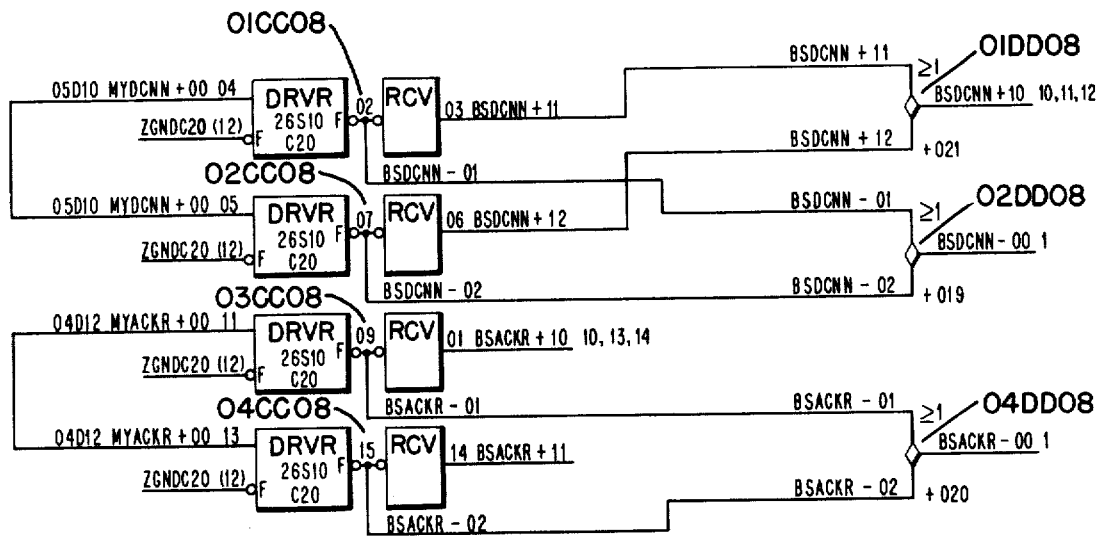
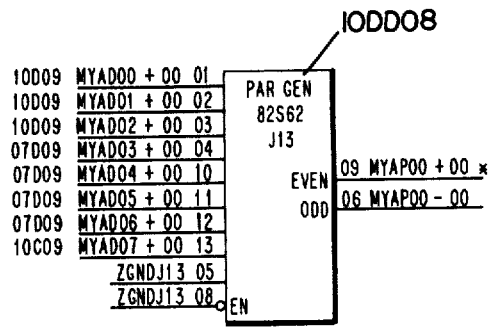
FIG. 36B

FIG. 47

| 8 | 16 | 31 |
|---|---|---|
| SE | D0 | |
| SE | D1 | |
| SE | D2 | |
| SE | D3 | |
| SE | D4 | |
| SE | D5 | |
| SE | D6 | |
| SE | D7 | |
| SE | K0 | |
| SE | K1 | |
| SE | K2 | |
| SE | K3 | |
| SE | K4 | |
| SE | K5 | |
| SE | K6 | |
| SE | K7 | |
| | E0 | |
| | E1 | |
| | E2 | |
| STKA = | E3 | |
| STKP = | E4 | |
| IV = | E5 | |
| PSIP = | E6 | |
| PCIP = | E7 | |
| | L0 | |
| | L1 | |
| | L2 | |
| | L3 | |
| | L4 | |
| | L5 | |
| | L6 | |
| | L7 | |

DRAM

| | |
|---|---|
| | B0 |
| | B1 |
| | B2 |
| | B3 |
| | B4 |
| | B5 |
| | B6 |
| | B7 |
| | A0 |
| | A1 |
| ZSAV = | A2 |
| RDDR = | A3 |
| STKT = | A4 |
| STKB = | A5 |
| PCPU = | A6 |
| | A7 |

BRAM

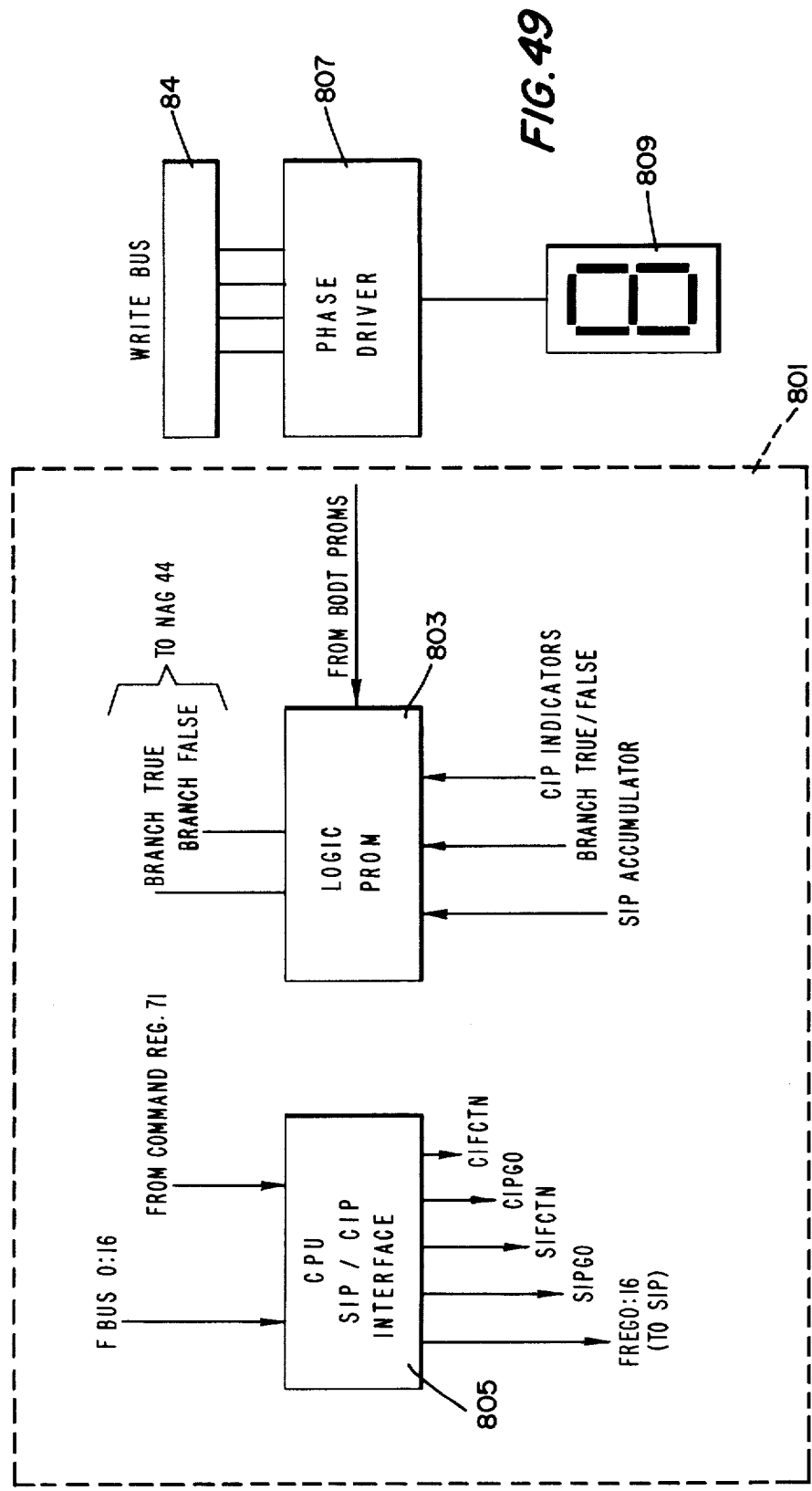

ial processing unit having a plurality of subprocessing units;

SELF-EVALUATION SYSTEM FOR DETERMINING THE OPERATIONAL INTEGRITY OF A DATA PROCESSING SYSTEM

FIELD OF THE INVENTION

This invention relates with particularity to a data processing system including a self-diagnosing apparatus for automatically performing selected tests on individual elements in the system and on the interfaces between system elements to detect and indicate the occurrence of malfunctions in the units and the interfaces.

BACKGROUND OF THE INVENTION

Within the data processing industry, there has been much effort directed to increasing the reliability of a computer system and to providing, within each system, a self-diagnosing ability to permit the accurate detection and correction of malfunctions. The increased use of standardized integrated circuits and circuit modules has enabled the construction of an entire computer system on fewer than 50 circuit boards, and common procedure for servicing data processing systems in the field is to identify the circuit board or boards wherein a malfunction occurs and simply swap or replace the identified boards with substitute boards. The replaced boards are not tested and repaired in the field but are sent back to a centralized testing facility for in-depth evaluation and necessary repair.

Although this manner of field service has substantially decreased the amount of time necessary to correct a malfunction in a computer system, it has given rise to a significant hidden cost of repair. This cost resides in the cumulative value of the circuit boards constantly in transit between the field locations and the central testing facility and in the inventory of the circuit boards at the testing facility waiting for diagnosis and repair. It has been found that many of the prior art devices and procedures for diagnosing the sources of a computer malfunctions in the field have provided indefinite or incomplete information with regard to the source of the errors resulting in the replacing of many properly functioning circuit boards in addition to circuit boards that are indeed malfunctioning. These "good" boards are also transferred to the central testing facility and the end result is a significant increase in the cost of repairing computer systems arising from the expense of transferring the properly functioning circuit boards to and from the central testing facility, the wasted expense arising from testing a properly functioning circuit board, and the need to have in service a significantly greater number of additional circuit boards because of the inefficiencies and inaccuracies in the diagnosing and repair operations.

Thus, a significant need has arisen for a quality logic test (QLT) apparatus and procedure for completely testing the individual units or elements in the computer system as well as for testing the interfaces between the units. Such a QLT apparatus should give an operator a quick confidence test of effective, the confidence check should include not only the registers, data paths, etc. in the system elements themselves, i.e. the individual processors, system memory, and I/O controllers, but should also evaluate the functioning of the interfaces between the system elements. Further, the QLT apparatus should function in a modular manner wherein selected portions of the entire computer system are tested in sequence with some means of communication being provided to indicate whether or not a tested portion is malfunctioning. Finally, the QLT apparatus should identify with the highest degree of specificity possible the particular circuit board wherein a diagnosed error occurs.

OBJECTS AND SUMMARY OF THE INVENTION

It is accordingly an object of the present invention to increase the efficiency with which malfunctions in a computer system can be diagnosed and corrected.

A further object of this invention is to provide a quality logic test system within a computer system to automatically test the system elements and interfaces for identifiable malfunctions.

Another object of this invention is to provide a quality logic test system which performs a plurality of subtests of elements and interfaces within a computer system and visually reports the results of each of the subtests.

Yet another object of this invention is to provide a quality logic test system which is activated in response to a system CLEAR command.

It is yet another object of this invention to provide a quality logic apparatus and method of operation which permits the specific identification of malfunctioning elements in a computer system.

Additional objects and advantages of the present invention will be set forth in part in the description which follows, and in part will be apparent from the description or may be learned from the practice of the invention. The objects and advantages of the invention may be realized and obtained by means of the instrumentalities and combinations particularly pointed out in the appended claims.

To achieve the foregoing objects in accordance with the invention, as embodied and broadly described herein, a self-diagnosing system for detecting malfunctions in a data processing system comprises a central processor unit having a plurality of subprocessing units; a control store for addressably storing a plurality of sequences of control data; means for selectively accessing the control data stored in the control store; means for controlling the subprocessing units in response to the accessed control data to perform self-diagnosing error detecting operations in accordance with the most recently accessed control data to determine whether the subprocessing unit is malfunctioning; means for storing an indication of the most recently accessed sequence of control data; and means for displaying a visual representation of the indication stored in the storing means whenever a malfunction is detected in a subprocessing unit.

BRIEF DESCRIPTION OF THE DRAWINGS

The manner in which the apparatus of the present invention is constructed and its mode of operation can best be understood in light of the following detailed description, together with the accompanying drawings, in which:

FIG. 6 is a table illustrating the signals used for addressing the control store and for responding to various branch conditions;

FIG. 47 is a schematic diagram of the registers within the DRAM and BRAM of the central processor illustrated in FIG. 2.

FIG. 48 is a block diagram illustrating the CPU/SIP and CPU/CIP private interfaces tested by the QLT system of the present invention.

FIG. 49 is a block diagram illustrating the phase register and hexadecimal display employed by the QLT system of the present invention.

DETAILED DESCRIPTION OF THE PREFERRED EMBODIMENTS

1. System Overview

Figure 1:
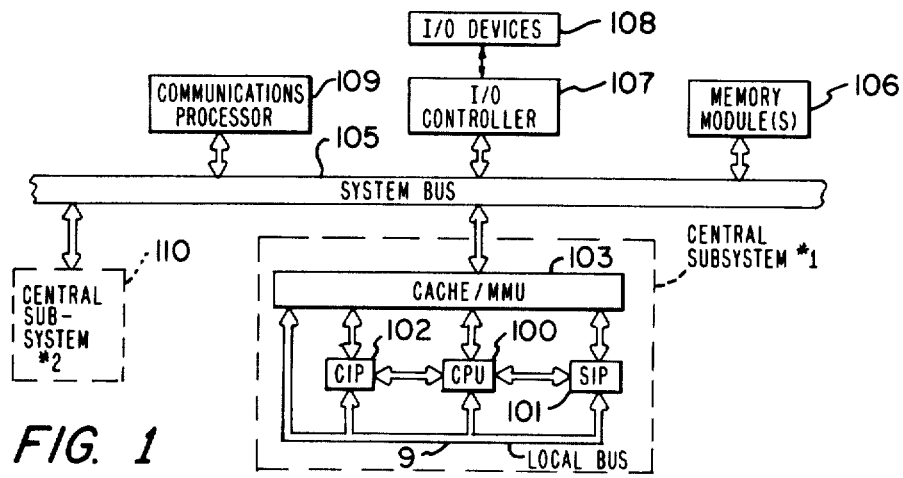
FIG. 1 is a general block diagram of the system in which the apparatus of the present invention is included.

FIG. 1 is a general block diagram of the configuration of the system in which the CPU to be described may be included. Such a system includes a central processor (CPU) 100, and optional processors which may include a scientific instruction processor (SIP) 101 and a commercial instruction processor (CIP) 102. These optional processors may be used to extend the range of the basic processor 100 for special applications. The system may also include a Cache/MMU (Cache memory/memory management unit) unit 103, an electrical system bus 105, memory modules (main memory) 106, input/output (I/O) controllers 107 coupled to I/O devices 108, and a multiline communications controller or processor (MLCP) 109. The system may also include a multiprocessor configuration in which there is a second central subsystem 110 which includes all or a portion of the above-described system.

The central subsystem processors are connected to each other by way of a local bus 9 and they are connected to the rest of the system by way of the Cache/MMU unit 103. The function of the Cache/MMU unit in the central subsystem is to provide a buffer storage for the portion of main memory 106 that is currently being used by the processors, and to provide for translation of the main memory address. The function of the local bus 9 is to provide an interconnection among the three processors and the Cache/MMU unit 103. The one physical local bus 9 organized into numerous interfaces. As shown in FIG. 1, there are private interfaces between the CPU 100 and the other two processors. There is also a private interface from each processor to the Cache/MMU. The local bus is a time-shared or public interface, that is, shared by all three processors and the Cache/MMU. In addition, the Cache/MMU 103 provides an interface via the system bus 105 to the rest of the system, primarily the memory 106 and the I/O devices 108 via controllers 107.

The CPU block diagram of FIG. 2 will now be discussed. More particularly, the various electrical buses and functional units and their interrelationships will be discussed. The primary elements of the CPU are shown within the dotted lines. A first such element is the local bus interface 10 which includes a data buffer 31, a round robin procedure storage buffer 36, and various procedure/data word and address multiplexers (muxes) coupled with a source bus 33 as well as other devices to be discussed. The first element 10 is utilized for the purpose of receiving data from the system bus 105.

A second element 16 is the arithmetic element and includes several devices including two sets of register arrays (RAMS) called the DRAM 11 and the BRAM 12, and the RAM or R Bus 13, to which RAMS 11 and 12 are connected. It also includes the Input or Inner Bus (IBUS) 14 to which the BRAM 12, as well as other devices, connects. The second element also includes the DALU 15, i.e., the arithmetic logic unit, which is coupled to drive the DRAM 11.

A third element 22 of the CPU includes the Outer Bus 17 and the Write Bus 84, the shifters 19-1 and 19-2 which connect them, and the selectors which drive them. These selectors include the DALU/R Bus selector 20 and the Y register/P register (YP) selector 21.

A fourth primary element 27 is the address section of the CPU and includes the procedure address register (P) 23 and the data address register (Y) 24. It also includes the address multiplexer 25 and the Prefetch address register 26. Also included in element 27 are the write data register (W) 28, and the write data selector (WS) 29. This portion of the CPU is utilized for the purpose of transferring data to the local bus 9.

Figure 5:
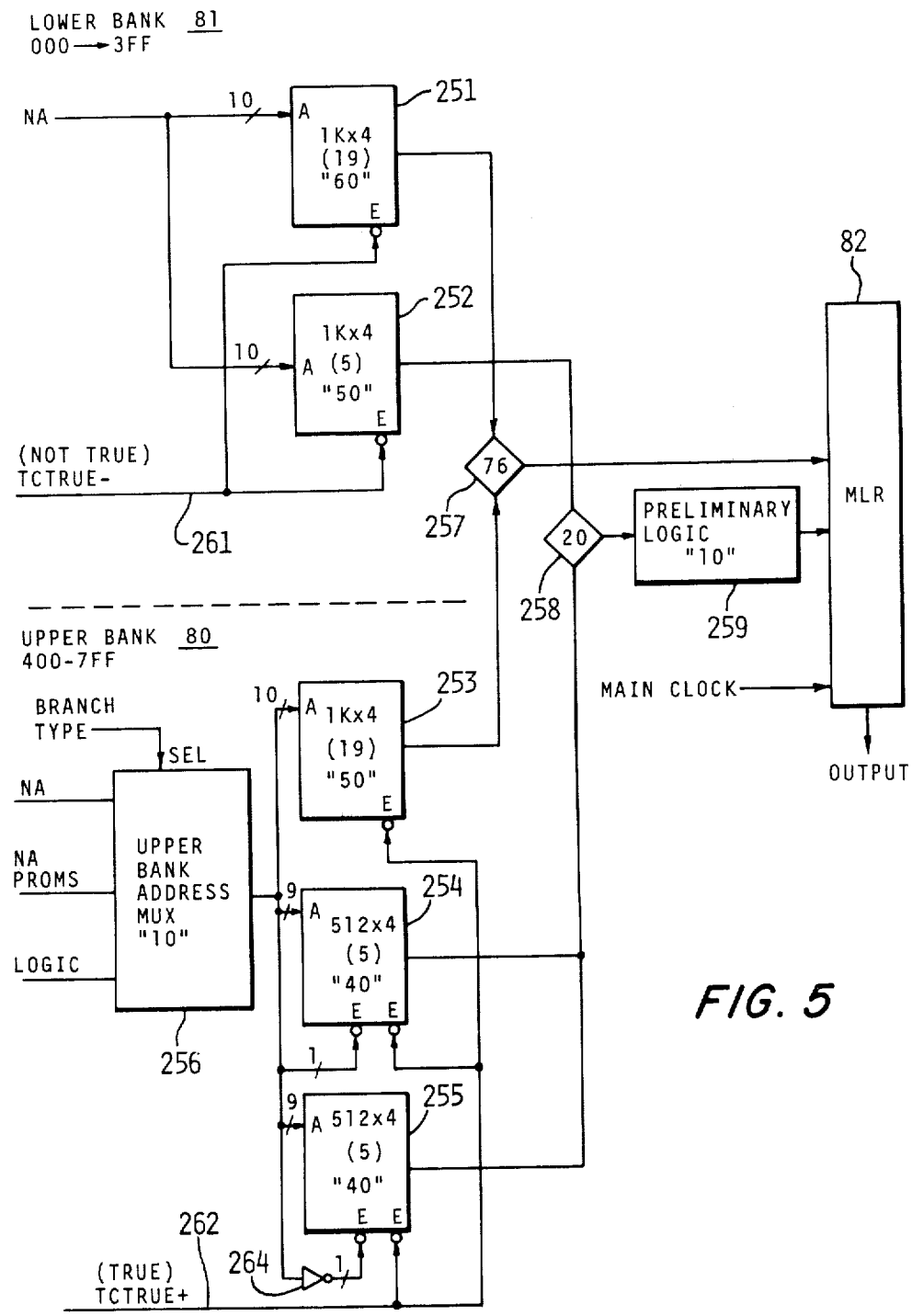
FIG. 5 is a detailed block diagram of the control store and associated logic included in the central processing unit of the present invention.
Figure 7:
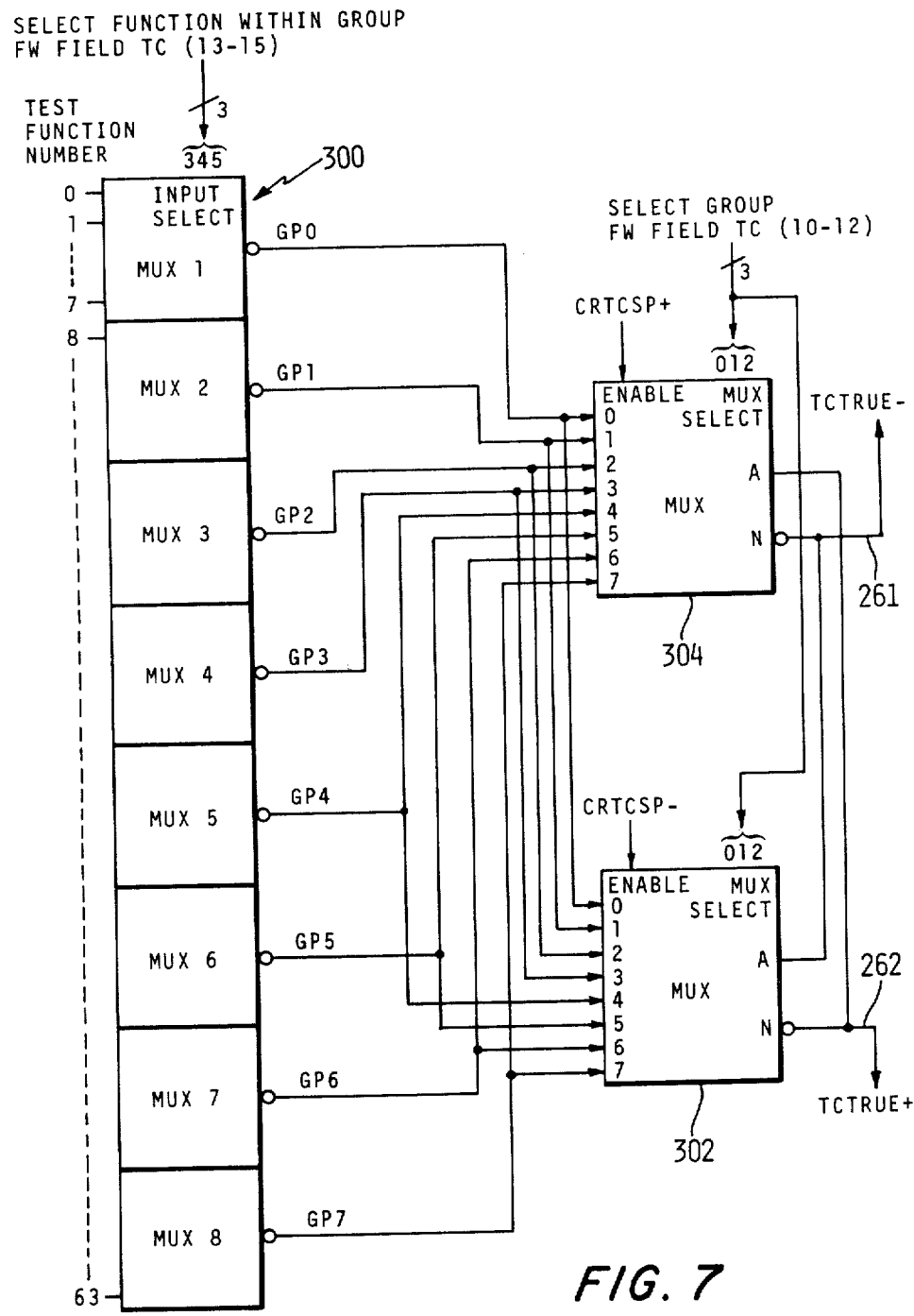
FIG. 7 is a detailed block diagram illustrating test logic used to enable the control store of the central processing unit of the present invention.

Device 30 is the test logic of the CPU, which is shown in FIG. 7, and includes a set of eight-to-one multiplexers which in turn drive a second set of at least two eight-to-one multiplexers which generate a single binary signal called "Test True" or "Test False", which is then used to control branching in the firmware. The Test True and False signals are coupled to the PROMS included in the control store banks 80 and 81 as shown in FIG. 5.

The next address generator 44 (FIG. 2) is coupled to the F register 38 and the F Bus 37. The next address generator is primarily concerned with generating addresses for use in the CPU.

The function of element 10, which is the local bus data input area, is to receive data which is returning from the Cache/MMU 103 or from other devices on the local bus 9, to select data from the bootstrap PROMs 41 if a bootstrap procedure execution is requested, and to direct such data to the appropriate data buffer. If an instructional fetch is called for, for example the data is placed in the function register. More particularly, the primary data buffer 31 receives 16 or 32 bit data words from the local bus 9. The output of the data buffer 31 is connected to the L bus 32. The L bus is used both to drive the source bus 33 by use of a pair of selectors DA 34 and DW 35 and to drive the four word procedure buffer 36. Non-procedural data enters the CPU via the source bus 33 which is driven from the data selectors from the L bus 32.

Procedural data enters the CPU via a different set of selectors, PA 39 and PW 40, coming from the procedure buffer 36. The procedure buffer has the responsibility of containing the the next two or three words of the procedure to be executed, so that when they are required, time will now have to be spent fetching them. It is automatically reloaded from the Cache/MMU 103 via the local bus 9 as it is emptied by the CPU.

The F bus 37 is a special bus which is used for gating information for the F register 38, i.e., the four areas labeled FOP, FM, FN and Link. The F register is the primary instruction register of the CPU. The function of the F bus 37 is to take data from the F register 38 and provide data to the F register from various sources. There is also a multiplexer 43 which allows the loading of either constants or data from element AS' 42 into either the Link or the FN location of the F register 38.

Also in the element 10, which is the data input area, the set of bootstrap PROMs 41 can be used to provide instructions, in place of instructions from memory if, operating in the boostrap mode.

The storage device (procedure store) 36 having locations A, B, C, and D, is a round robin four-word procedure store. Whenever it has room for two words of procedure, i.e., it is at least half empty, then it automatically initiates a memory read of procedure via the local bus 9, from the Cache/MMU. The returning data is dropped into the next two locations which are available in this round robin store. As the CPU uses procedures by either emitting it to the source bus 33 for use inside the processing elements of the CPU, or by sending it to the F register 38 because it is part of an instruction, then the two pointers 36-1 and 36-2, which represent in effect cursors in the round robin store, advance to the next location available by use of a conductor included in device 36 which successively enables the four locations to the outputs of device 36. The left-hand cursor or pointer 36-2 indicates the next word of procedure to be fetched; the right-hand cursor 36-1 represents the word following that. Sometimes one word of procedure is used up in which case the word indicated by the left-hand cursor would be used to generate the information, passing through the PW multiplexer 40. Sometimes there is a requirement for two words of procedure (as when pulling a large address form (LAF) address). Then the words indicated by both the left-hand and the right-hand cursors are combined in the PA multiplexer 39 of the procedure selector. This will be described more fully when this logic is described.

Thus, element 10 is the area concerned with bringing data into the CPU through the source bus 33, via either data selectors 34 and 35, or the procedure selectors 39 and 40, or bringing data directly into the instruction (F) register 38 via the procedure buffer (round robin procedure store) 36 and the F bus 37. Device (F') 76 is used to hold selected bits from auxiliary address information or syllables. The address syllable is actually part of a 16-bit data descriptor. Certain bits in the descriptor have to be retained for subsequent analysis. The operand-size bit in the CIP descriptor and the operand size and signed versus unsigned bits in the K register descriptor have to be retained. These are retained in the five-bit F' register 76.

The second element 16 contains the arithmetic/logic unit (DALU) 15, the BRAM 12 and the DRAM 11, containing all of the programmer visible registers, plus a number of non-programmer visible work registers. These data storage elements are organized as follows: The DRAM 11, which is one of the two sources which can drive the RAM bus 13, contains 32 locations, each of which is 24 bits wide. These locations are used to hold so-called D registers, two halves (K & L) of the so-called K registers which are 32 bits long, a number of internal pointers, and seven so-called M registers. The BRAM 12, which contains 16 words, each 24 bits wide, contains the seven base registers plus a number of programmer visible and programmer invisible pointers of various types.

Figure 3:
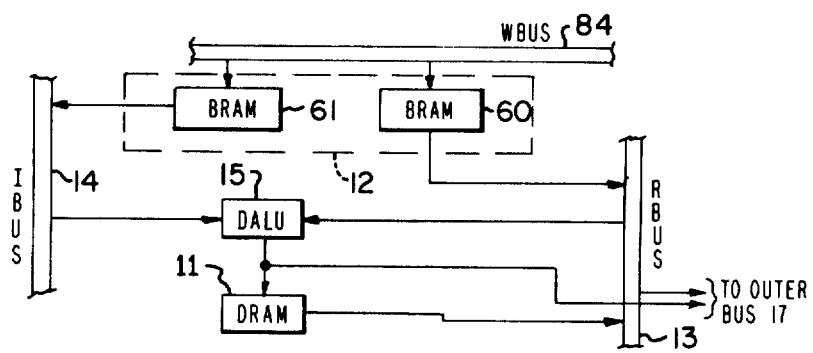
FIG. 3 illustrates details of the connections to the arithmetic logic unit of the central processing unit of the present invention.

FIG. 3 shows in more detail the relationship between the RAMs, the buses, and the DALU 15. The DRAM 11 and BRAM 12 can each be sources to the RAM bus 13. The BRAM 12 is actually a dual structure; that is, there are two parallel BRAMs 60 and 61 in the CPU. The two elements of the BRAM 12 are loaded identically. One such element which drives (or transfers data to) the R bus is element 60, and the other which drives the I bus 14 is the BRAM element 61. The important aspect of the two identical BRAMs is that the system speed is increased.

The R bus can be driven either by the BRAM 60, or by the DRAM 11. Other sources, as will be seen, also drive the I bus 14. The DALU 15 uses the I bus and the R bus as its inputs and the output of the DALU is then recycled to the DRAM and/or used elsewhere in the CPU.

Element 16 includes two buses of major interest. The so-called input or Inner bus (I) 14 is the primary source of original input within the processor, that is, data from memory comes into this bus as does the output of the Q register 50 via driver 54, and also the output of the BRAM 12. The second bus, the so-called R or RAM bus is the point at which the outputs of the two different RAMs, the BRAM 12 and the DRAM 11, are coupled. The outputs of these two buses are the inputs to the DALU 15, which generates data which can either be returned into the DRAM 11 or sent to the Outer bus 17 for further processing in the system.

Both the Inner and the RAM buses employ a hardware element referred to as "batlatch" (BL) which is a gate whose input and output are tied together for coupling signals onto the bus. This batlatch is intended to take over control of that signal after the driving source is required to go off the bus for timing and sequencing reasons. When this happens, the batlatch then supports that signal at the same level as it was when the driving sources were present, until the batlatch is turned off at which time the bus signal can relax (go to a predetermined level such as zero volts).

The RAM bus 13 is the interface for the transfer of data between the control panel 90 and the central processing unit, and is connected to it via 16 bidirectional signal lines. Memory data couples to the Inner bus 14 via a set of drivers called the data latches (DL) 51. The data latches are paralleled by a second series of latches called SE or sign extension latches 52. These SE latches are used either to sign or zero extend the data latches when they are only providing a sixteen bit quantity to the 24 bit bus. Similarly, the SE logic 52 is used to take either 7 or 8 bits of the current instruction, and sign extend it to 24 bits for use by the branch and value instructions which get their displacement and their operand, respectively, from the right-hand portion of the instruction word.

There is also associated with the BRAM 12 and DRAM 11 logic called the select/modify logic 53, which allows the DRAM and the BRAM to be addressed in blocks of eight registers, using various fields in the instruction to control the individual register selection within that block.

Constants generator (KON) 70 is also included in element 16, the primary ALU area, and is another source to the Inner bus 14, that is, it is the source that can be used to generate 24 bit constants onto the inner bus for use by the arithmetic unit under control of the firmware.

Thus, element 16 is the primary arithmetic operation area in the CPU; that is, it is concerned with operand manipulation and with the generation of operands for insertion into the data RAM 11, or operands which are intended to be sent to the Outer bus 17, either to be returned to the BRAM 12, or to be sent to various address and data registers for output to the local bus 9.

Element 22 is concerned primarily with the section of the CPU referred to as the Outer bus 17, and the Write bus 84. The Outer bus is the bus upon which various data paths are collected, i.e., the Y register 24, the P register 23, the output of the DALU 15 and the RAM bus 13. The Write bus 84 is the bus which is used to transfer operands to the BRAM 12, to the write data registers, and to the BALU 55 which is the ALU primarily responsible for address manipulation.

Between the Outer bus 17 and the Write bus 84, is a set of twenty-four multiplexing shifters 19, which allow the shifts of 1, 2 or 4 bits in either direction on Outer bus 17 operands. In addition, there is also a set of sixteen multiplexing shifters 56 which are used to load operands into the Q register 50.

Two of the four different types of operands which are sourced to the Outer bus 17 originate at the DALU 15 and at the RAM bus 13 and are selected through a two-to-one multiplexer 20 coupled to the Outer bus. Two other sources for the Outer bus 17 are the Y register 24, which is the data address register, and the procedure address (P) register 23. The outputs of these two units are coupled via the two-to-one multiplexer (Y/P selector) 21 and sourced onto the Outer bus 17. Also coupled to the Outer bus 17 is the I register 57, the indicator register for the central processing subsystem. The contents of the Outer bus 17 can be transferred either directly or shifted to the Write bus 84 for further processing in the CPU. They can also be loaded into the Q register 50 directly so that the Q register can be used for double precision shift operations.

All shifting which takes place within the CPU takes place by manipulation of operands between the Outer bus 17 and the Write bus 84. The twenty-four shifters 19 are used to shift 24 bit operands, the size of the operands on the O bus 17 and W bus 84, left or right under the control of the control store word. They can shift by either 1, 2, or 4 positions, transfer the operand straight through, or transfer the operand through with the two right-hand bytes of the operand interchanged. The operation of these shifters is controlled by a special field in the control store word. This section of the CPU is used for 24 bit operands shifts. When 32 bit (double register) operands, are shifted, the right-hand operand is loaded into the Q register 50 via the Outer bus 17, and then a shift is performed in which not only the W bus shifter 19, but also the sixteen Q register shifters 56 are operated. The Q register contents are thereby treated as a 16 bit extension on the right-hand end of the 24 bit operand which is being shifted onto the W bus 84; the ends of these two shifters are coupled together, thus allowing a 40 bit shift to occur. In such double register shifts, the operands of interest are the 16 bits which are returned to the Q register 50 and the 16 bits which are transferred to the right-hand two bytes of the Outer bus 17, while the left-hand eight bits of the data of the W bus 84 are usually discarded.

Element 75 represents the collection of the status bits in the CPU for emission to the W bus via driver 93 under certain conditions. The W bus has two sources, the primary one being the shifter 19 from the Outer bus 17. This shifter 19 can be disabled as an input to bus 88 and instead the status bits (S/Z) in element 75 can be placed on the Write bus 84 for subsequent analysis by the firmware.

One unit of hardware which is associated with the Q register 50 which has not been previously discussed in the XB register 58 and the decoder 59 coupled thereto. The XB register 58 is used during index shifting to capture those bits of the index which are shifted right for sub-word operands and which are lost because they move to the right of the single word bit in the address. They are captured in the XB register 58, one bit for half-word shifts, two bits for digit shifts, and four bits for bit-sized operand shifts. The XB register contents are subsequently used to directly control left versus right half selection when dealing with half-word operands, when generating a parameter to be sent to the commercial instruction processor for digit operands, and to generate a mask of 15 binary zeros and a single binary one, in conjunction with the decoder 59, when operating on bit operands. That is, for a bit operand, a word is read, a mask is used to set or clear the selected bit in the word, and then the word is written back into the memory. The mask is generated from decoder 59 and is an input to the Q register 50. That is, one of the items that can be loaded into the Q register is the decoder mask generated from the contents of the SB register 58.

The fourth major element in the CPU is area 27, the element which is concerned with the generation of addresses, commands and operands for transmittal to the local bus 9, and via the local bus to either the CIP 102, the SIP 101, or the Cache/MMU 103 and hence, to memory or to Input/Output (I/O) devices 108. This major element can be broken down into approximately three areas, the first being the write data register (W) 28 and the write selector (WS) 29. Register 28 is a 32 bit register with a partitioned load capability, that is, either the right half or the left half, or both halves of this register can be loaded. The right half is always loaded from 16 bits of the Write bus 84 via drivers 74. The left half is written with data which comes from the write selector 29. This write selector has as its 16 inputs either the 16 bits of the right half of the Write bus 84 or the eight left-hand bits of the Write bus plus either sign or zero extension. The Write bus is the primary path by which data can be sent to the W register 28 in order to subsequently write such data to any other device coupled on the local bus 9.

The next area in the local bus output interface 27 is the command driver 71. The command driver 71 drives a series of command lines which accompany all transfers by the CPU 100 on the local bus and indicates the Cache/MMU 103 either a memory reference cycle, an I/O reference cycle, or a local bus reference cycle to the Cache/MMU or one of the local bus processing units. The information which is tranferred onto the command lines is derived from the F and FK fields of the control store or firmware (FW) word shown in FIG. 4, which also at other times the functioning of the F register 38 of element 10.

The third portion of element 27 includes the two primary address registers, i.e., the Y register 24, for non-procedural memory addresses and for addresses to other devices on the local and system buses, and the P register 23 (the program counter), and the prefetch register 26.

The P counter 23 keeps track of the last word which the firmware has used, which word has been taken from the round robin buffer 36 and input to the CPU 100 for operations thereon. The prefetch register 26 keeps track of which word is to be next fetched from memory; that is, the P and PF registers may differ by any number in memory address from one to four words, depending on how full the round robin buffer is and how recently the central processing system has taken data from the buffer. If the central processing system has taken all the data from the buffer, it takes a finite amount of time for the Cache/MMU 103 to respond with new data in response to a request, and fill buffer 36 again. Under those circumstances, the prefetch register 26 and the address of the P counter or register 23 would be close together or the same in address content. When the buffer 36 is full, and the CPU 100 has not taken any data recently, then the P register will be two to four words behind the prefetch register because it is indicating the last word taken from the prefetch register indicates the next word to be sent forth from memory as soon as there is room for it in the prefetch register.

The contents of the P register 23 are never admitted to the local bus 9 as a memory address source. The two sources for data which can go to the local bus via the virtual address multiplexer 25 are the Y register 24, which is used for all non-procedural fetches, and the prefetch register 26, which is used automatically by the prefetch logic to go to memory and request words for use in subsequent firmware steps.

The arrows on devices 23, 24 and 26 are indicative of the incrementing capability of those particular registers. That is, the P register can increment by either one or two words depending on the number of words which are taken out of the prefetch buffer 36 at a time. That is, pulling one word from the prefetch 36 buffer automatically increments the P register by one; pulling two words from the prefetch buffer 36 automatically increments the P register by two. The prefetch register 26 always increments by two, because prefetches are always performed on a pair of words. The Y register can increment by either one or two under the control of the firmware as it is used, or in preparation for future use. There is a bus control field in the firmware word which allows control of such incrementing and the various cycle requests to the local bus.

The inputs to the W register 28 are two 16-bit data paths which are exercised in various ways. If it is desired to write a 24-bit address, then the drivers 74 are turned on enabling the right-hand 16 bits of the Write bus to be transferred to the right-hand 16 bits of the W register. The multiplexer 29 is conditioned such that the left-hand eight bits of the Write bus and the eight binary zeros are emitted to the left-hand half of the W register 28. This loads a two-word, 24-bit, address into the W register for subsequently writing into memory. If it is desired to write a single word into memory, then the right half of the W register is not clocked (i.e., enabled), and does not change; and the multiplexer 29 is conditioned to enable the 16 right-hand bits of the Write bus to the 16 left-hand bits of the W register where they are clocked in. For single word writes, the left half of the W register is the data that is written into memory.

The logic heretofore described is used to request and accept data from other entities on the local bus 9, such as the Cache/MMU 107 or the CIP 102 or the SIP 101, to operate on it and store it internally in various registers via the two ALUs which are contained in the system, to create new operands which are subsequently modified and sent out to the local bus to one of the entities thereon with an address of which entity (computed internally in the CPU and used to control the local bus). All of these operations are performed under the control of control firmware which is stored in a 2,048-word by 96 bits-per-word control store 80 and 81 which is included in the CPU.

Figure 4:
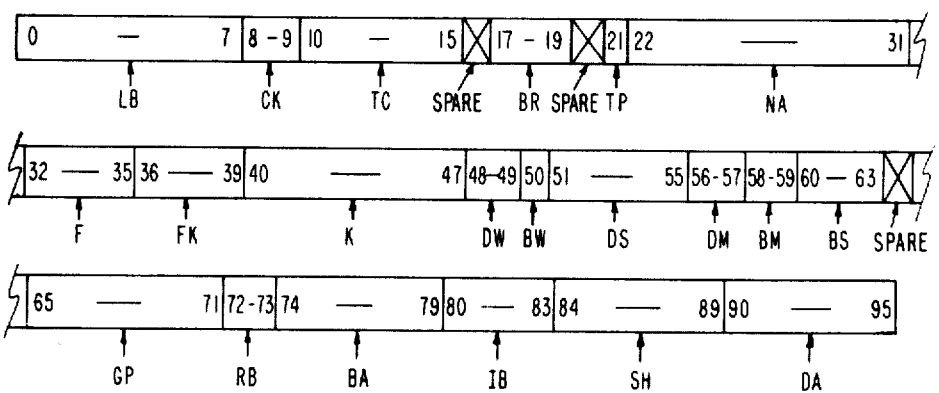
FIG. 4 illustrates details of the composition of locations of the control store included in the central processing unit of the present invention.

The control store is partitioned into a number of individual fields, each of which controls some aspect of the internal performance of the CPU. FIG. 4 illustrates the firmware word and the various fields of interest therein. The first of these fields is the local bus (LB) field, bits 0 through 7 of the control store. The LB field is concerned with the requesting of various cycles from the local bus 9 and the responses thereto. It is also responsible for the emission of virtual addresses via the prefetch register 26 or the Y register 24, and it controls the various incrementing of the Y and P registers. The local bus field also controls the successive reading of data from the round robin procedure buffer 36, and the enabling of the data and procedure multiplexers 34, 35, 39 and 40 respectively, onto the source bus 33 for subsequent use by the Inner bus 14.

The next field, the clock (CK) field, bits 8 and 9 of the control store, is used to control the CPU clock speed, i.e., the interval between successive clock pulses in the CPU. Each firmware step has assigned to it the clock speed which is appropriate to its complexity. In the system of the present invention, there are four possible intervals between successive clock pulses: 96 nanoseconds, 105 nanoseconds, 130 nanoseconds, or 170 nanoseconds. Which of these is used for a firmware step is controlled by the CK filed for that firmware step.

The next field is the TC field, bits 10 through 15 in the control store. This is a 6-bit field and selects one of 64 possible logic functions within the CPU for testing and control of firmware sequences.

The next field is the BR field, bits 17 through 19, and is used to control the type of action which is taken as a result of a test condition, that is, what type of branch occurred, whether the branch simply selects between two firmware steps, or whether it selects between a firmware step and a so-called control store splatter (the generation of one of a multiplicity of control store next addresses based on the state of one or more logic elements in the CPU in which the next address is controlled by some function of the F register 38 contents).

The next field of interest, the TP field, bit 21 is the Test Plarity field. It controls whether the test condition is tested to determine whether it is true or false.

The NA field, bits 22 through 31 is a ten-bit field which is used to generate at least one of the two addresses which are selected by all branches. The other address is either also derived from the same NA field or from the control store splatters previously mentioned.

The next field, bits 32 through 39, is the F register control field, partitioned into a four-bit part called F and a second four-bit part called FK. The F and FK fields are used to control the loading and strobing of various elements in the F register and in the area of the F bus; that is, it is used to control the strobing of F' and AS' devices, the subparts of the F register 38 and the multiplexer 43. Which of these devices are loaded and what sources they have for their loading are all controlled by the F and FK fields.

The next field, bits 40–47, is the K (i.e., constant) field, and is used to drive the I bus 14. It is an 8-bit field which provides the right-hand eight bits for all constants which are admitted to the I bus. The left-hand 16 bits of the constant are controlled by the I bus field which will be discussed hereinafter. The K field is directly related to the KON device 70.

The next fields in the control store, bits 48–63, are concerned primarily with the addressing and control of the DRAM 11 and the BRAM 12. The two-bit field, DW, is used to control writing into the DRAM with one bit controlling write operations into the left most (the most significant) 8 bits of the DRAM, and the other bit controlling write operations into the second right most (the least significant) 16 bits. The next bit, bit 50, (field BW), is used to control write operations into both parts of the BRAM, which are always written into together. The next field DS is five bits in length and provides the selection of one of 32 registers in the DRAM 11. The DM field, bits 56 and 57, is the select-modify field associated with the DRAM and allows the selection of either the DRAM directly or any of three different functions of the F register 38 for qualifying the addressing of the DRAM.

The next field of interest is the B select field (BS), bits 60 through 63, which is used for the selection of one of the 16 registers in the BRAM. The two-bit field comprising bits 58 and 59, is the select-modify field (BM) for BRAM addressing. It performs similarly to that for the BRAM addressing except that it is separate so that independent select and modify functions can be specified for both the BRAM and DRAM.

The next field of interest is the GP field, which is seven bits in length (bits 65–71), and is used to control a large number of general purpose micro operations within the processor, such as the clocking of various bistable flip-flops and the enabling of various control functions. It is also used to control access to the control panel 90 from the CPU, to input and output data to the control panel, and to control various flip-flops therein.

The next field, the RB field, bits 72 and 73, is used to control the sourcing of data onto the R bus 13 with one bit controlling the BRAM and the other bit controlling the DRAM.

The BA field, bits 74 through 79, is used to control the functions of the BALU 55, the arithmetic/logic unit which has as its inputs the I bus and the W bus and which can be used to drive the Y register 24. These six bits are used as follows: one as a carry inject to the BALU, one for logic/arithmetic control, and the other four to select particular functions.

The next field of interest is the IB field, bits 80 through 83, and is used to control which data source is enabled to the Inner bus 14. This field can enable the data latches, sign extend the F register or select a constant, or the BRAM in various combinations to the I bus. The next field, the SH field, bits 84 through 89, is used to control both the shifters and the W bus sourcing which was discussed earlier. These six bits enable the system to have a large amount of autonomous control over what registers are enabled to the W bus and whether or not the Q register loads and in what direction the shifters shift the operand as it passes through.

The final field, the DA Field, bits 90 through 95, is the function control for the DALU 15 with six bits having analogous functions to those in the BA field, i.e., one bit is a carry inject, one bit selects logic versus arithmetic and the other four bits are to select particular functions.

The control store for the CPU (FIG. 5) is actually two control stores: an upper bank 80 and a lower bank 81. The upper bank is addressed by the next address generator 44 and the lower bank is addressed directly by a portion of the contents of the then current control store word. In the case of the more common types of branches, both use the NA field of the control store word as the basic source of the next address, and modify it in some way so that the two addresses which go to the upper and lower bank are essentially identical. In the case of the other branches, those which select between a next address and a PROM generator splatter, the lower bank receives the next address field unchanged from the current control store word, while the upper bank receives the splatter address from the current control store word. The control store is partitioned in this way so that the system can be doing a simultaneous access of both possible next address control store words and can postpone the decision of which one is going to be used until almost the very end of the current control store step, just prior to clocking the data in the control register 82. The details of the control store shall be discussed hereinafter.

The manner in which the CPU and firmware interact to perform certain typical central processor operations, such as (a) reading a word from memory; (b) computing a next address for reading another word from memory; (c) writing a word into memory and (d) performing some type of iterative algorithm in which the operations are entirely internal to the CPU, will now be discussed. The situations given will be typical and representative operations will be described.

In the case of reading a word from memory, during a control store step, the control store word will enable the virtual memory address of the word from the BRAM 12 onto the RAM bus 13 via the RB, BS, and BM fields. Then the SH field will condition the Outer bus and the W bus sourcing such that the RAM bus is enabled through the selector 20 to the Outer bus 17, and then unaltered through the shifter 19 onto the W bus 84. The W bus is an input to the BALU 55, which is conditioned by the BA field to enable its W bus input directly to its output. At the same time, the LB field will cause the Y register 24 to load, thus transferring the address into the Y register.

In the next firmware step, the LB field then causes a request to be directed to the local bus indicating tht a memory request is required and that the address provided to the local bus should be used to make such request. The command lines 71 are conditioned by the F and FK fields (shown as box 72 in FIG. 2) to indicate the memory read request is required. The address multiplexer 25 is conditioned to enable the contents of the Y register onto the local bus via the 24 address lines. The Cache/MMU memory, which monitors and controls all activity on the local bus, acknowledges the request, while the CPU proceeds to the next firmware step. In the next firmware step, the local bus field will then specify a stall, indicating that the CPU should not leave this firmware step until the end of the local bus cycle has been detected returning the data from the Cache/MMU via the local bus into the CPU data buffer. As soon as this return cycle is detected, then the stall ends, and the CPU will then enter the fourth step of this read cycle.

The fourth step will be one in which the firmware wil specity an LB field which uses the data that is in the data buffer, and sources it onto the Inner bus for use by the CPU. The LB field will thus enable either the DA driver 34, or the DW driver 35, depending on whether a word, 16 bits in length, or an address, 24 bits in length, is required onto the source bus. In turn, the I bus field will specify that the source bus, either all 24 bits of it, or 16 bits sign extended to 24, will be enabled onto the Inner bus. In the Inner bus, assuming that there is a 16-bit word that is being received back from the data buffer, the DA field would be used to enable the DALU to read the Inner bus, and then the DW, D select and DM fields would be controlled to address and write into one of the 32 registers in the DRAM. This would complete the fourth step of this control sequence, the first of which loaded the Y register, the second of which made the read request, the third of which waited for data to come back, and the fourth of which took the data and enabled it into one of the registers in the CPU.

A second typical sequence of operations which may be performed by the system is the manipulation of operands in an arithmetic operation, such as adding an operand which has been fetched from memory to one of the data registers and then, after the addition, returning to the data register and also placing it into the write data buffer so that it can be subsequently written back into memory. This sequence of operations would begin following the stall referred to in the previous operation. This step would be one which enabled the data, which in the case of a word operand would be a word, from the data buffer 31, via the L bus and the data multiplexers 35, onto the source bus. Then, the I bus field would specify that the source bus, sign extended via the sign extension device 52 and the data latches 51 be enabled onto the inner bus. At the same time, the R bus control field would specify that the particular data register of interest be enabled to the R bus 13 from the DRAM 11. The DA field, i.e., the DALU control field, would then specify that the DALU be conditioned to add the 24 bits on the R bus 13 to the 24 bits on the I bus 14. This logic 15 would have as its output 24 bits representing the sum. The DW bit would indicate that the output of the DALU was to be written back into the DRAM 11.

At the same time, the output of the DALU would be enabled to the W bus via the SH field. This field would indicate that the selector 20 would be enabled to the Outer bus and would be conditioned to select the DALU output instead of the R bus output for that purpose. Also at the same time, the shifter 19-1 would be conditioned to pass the Outer bus contents through without change to the Write bus 84. The same LB field which specified DW 35, to the source bus 33, would also have specified that the Write bus would be enabled to the left half of the W register 28 via the selector 29. This would all take place in a single firmware step. Since this is an add operation, presumably the overflow from the add would be tested by a test specified by the test logic 30. The next address logic would generate one address which would indicate a particular entry to go to if the operand is to be written back into memory immediately. The other address, which would be to the lower bank, would be generated to take the next step which would then set the overflow indicator in the I register 57. If there was no overflow, the I register would have been automatically cleared.

The third operation would consist of writing an operand into memory. This would take three firmware steps to perform. The first would be a step in which the address in which the operand is to be written is loaded into the Y register 24. The second step would be to put the operand to be written into the W register 28. The third step would be one in which the LB field would specify that a local bus request, specifying a memory write, be addressed to the local bus for the Cache/MMU to receive and execute.

The first step, that which loads the Y register 24, would get the address presumably from one of the 16 locations in the BRAM random access store. This would be performed by conditioning the I bus field so that the I bus would look at the output of the BRAM. The B select field would indicate which of the 16 BRAM registers was addressed for this purpose. The BALU 55, which is controlled by the BA field, would be conditioned to pass the contents (24 bits) of the Inner bus to its output. The LB field would be one which specified load the Y register. Since input to the Y register is the output of the BALU, this would transfer the contents of the selected BRAM into the Y register. The next control store step would take the operand from its origin, wherever that might be, in this case, for example, one of the 32 DRAM locations. The DS field would select which of the 32 DRAMS would be enabled. The RB field would enable the DRAM onto the R bus. The SH field would select the RAM bus to the Outer bus 17 via selector 20, and the Outer bus to the Write bus 84 via shifter 19 with no shifting taking place. The LB field would specify load the W register, left half. This would be performed by conditioning the W selector 29 to enable the right two-thirds of the Write bus to the left half of the W register, and the W register would be enabled to load its left half.

Finally, the third firmware step would be performed. In this firmware step, the only essential operation is that the local bus field, the LB field, should specify a local bus write to memory. This would use the F and FK bits as command lines going to the local bus to indicate to the Cache/MMU that this is a memory write operation. The address would be enabled to the local bus via the virtual address selector 25 from the Y register 24. The data would be enabled to the local bus from the W register 28. The Cache/MMU memory arbitrating all local bus transfers would recognize this as a memory write cycle, and would take the address, map it, send it to memory accompanied by the data, and indicate on the system to the memory that this is a memory write operation.

The fourth sequence of a typical operation which the CPU could perform is that in which a double precision operand is shifted some number of bits to the left or right. Presuming that the operands are both in the BRAM, that is, the two operands of interest are in the BRAM, the first firmware step would initiate the transfer of the right-hand of these two operands to the Q register. This would proceed as follows. The BS field would be conditioned to address one of the 16 locations that contains this operand in the BRAM 12. The R bus field, controlling the RAM bus 13, would be conditioned to take the BRAM output instead of the DRAM output. The SH field would be conditioned to transfer the R bus to the Outer bus via the selector 20, by enabling it to the Outer bus and selecting its input from the R bus, and would also specify that the Q register and the W bus both receive the contents of the Outer bus and would clock the Q register to load it. This would cause the operand addressed in the BRAM to be transferred to the Q register.

The next step, or steps, would be those in which the shifts are actually performed. In this step, the other of the two registers containing the second operand in the BRAM is addressed by the B select field and the BRAM 50 is enabled onto the RAM bus 13, via the RB field. Then the RAM bus would be enabled to the Outer bus via the selector 20. The SH field would take any of a number of values depending on which direction and for how many bits the shift is to be performed. The SH field is capable of selecting a left or right shift of either one, two or four bits. In any of these cases, the Q register is considered to be connected as an extension of the Outer bus, creating a 32-bit operand. Actually, it is a 40-bit operand, but the left-hand eight bits of the Outer bus are ignored. This 32-bit operand is shifted either left or right as indicated by the particular SH field. The 16 right-hand bits are returned to the Q register and the 16 left-hand bits together with the eight bits which were ignored are transferred onto the W bus. This is controlled by the SH field which has exclusive control over the shift distance.

The operand having been shifted from the Outer bus to the W bus and from the Q register back to the Q register, the SH field causes the Q register to reload the shifted operand while at the same time the BW field causes the W bus to be written into the addressed BRAM location. Thus, the contents of the B and Q registers have been shifted and returned back to the B and Q registers. The particular end effects associated with this shift, whether this is an open, circular, or arithmetic shift, are a function of the control flip-flops in the CPU. This type of step, in which the actual shifting is performed, is performed some number of times in various combinations, that is, if it were desired to shift left by five bits, then a step which resulted in a shift left by one bit would be succeeded by a step which shifted left by four bits. To shift right by three would require a shift right by two and then by one, for example.

Then, after the final shift has been performed, i.e., after the operands are now correctly aligned in the addressed BRAM location and the Q register, the final step does not cause a shift, but instead returns the Q register contents back to the BRAM location from which it was originally loaded. This would be performed as follows. The I bus field would specify that the I bus is driven by the Q register (16 bits of Q extended by eight bits of binary zeros). The DALU 15 would be controlled by the DA field so that it passed through the I bus unchanged. The SH field would be selected so that it enabled the DALU, unchanged via the selector 20, to the Outer bus 17, and again unchanged, via the shifter 19 to the W bus 84. The BW bit 50 in the firmware word would then be set to condition the loading of the BRAM from the W bus, and the BS (B select) bits would be conditioned to specify which of the 16 locations in the BRAM were to receive the shifted operand. This would all take place in some number of firmware steps, for example, three or more. One step would be used to load the Q register creating a 40 bit operand, one or more to perform the shifting of that operand as required, and then one to return the Q register contents (the right-hand 16 bits) to the BRAM to complete the operation.

FIG. 5 illustrates the organization of the upper and lower bank control store PROMs 80 and 81 respectively, and more particularly the manner in which they are coupled or paired for maximum speed. Each of the banks of the control store includes one or more PROMs, each of which PROMs include a plurality of electronic chips. By way of example, the storage capacity of each bank may be 1024 (1 K) addressable locations, each containing 96 bits, i.e., twenty-four chips of 1 K each, each location having four bits of storage. To increase the speed of operation, each bank has at least two PROMs, with one PROM faster (lower address propagation time) than the other in each bank in order to compensate for propagation time in other elements included in the control store. Two banks are utilized primarily for efficiently accommodating branch decisions derived from the current firmware word and the next address generator 44. One bank is organized to be addressed directly by the firmware word whereas the other bank (for example, the upper bank) is organized to be addressed by the firmware word and/or a derivative function of the firmware word and various logic elements included in the CPU 100. Accordingly, the upper bank requires a multiplexed input and as shall be discussed, one of the two PROMs in the upper bank is provided with a faster address propagation time than any of the other PROMs in either bank. This is done as a practical matter by utilizing two PROMs, each with an increased speed of operation, i.e., lower address propagation time.

The purpose for pairing of the control store PROMs is to reduce the amount of time necessary in order to generate the next control store address, to select data appropriate to that address, and to enable it to the input of the main control store data register, the so-called MLR 82, which is the output register of the control store. This has been done in the past by using a single set of control store PROMs and selecting the address supplied to them. In such cases, the time required to propagate data through the control store logic is the address select time, i.e., the time from the change of the address input to the PROM to the time at which the output is stable. For typical control store PROMs, this is much longer than the s0-called "enable time". Control store PROMs which have an enable input can typically be turned on and off much faster (the "enable time") then addressed outputs can be provided. Therefore, the basic approach here is to separate the control store PROMs into two groups or banks so that the respective addresses for each group, for example, one of two branch addresses, can be propagating through the control store chips simultaneously, and so that the decision as to which address to utilize can be postponed until the very last moment when the decision is implemented by enabling the output of one or the other of the two groups or banks.

In the described CPU, as with some other computers, all so-called branch operations have a selection of one of a pair of addresses, one of which addresses is explicitly provided by the control store word in the current step, and the other of which is more or less indirectly generated from data available in the current step. In the instant CPU, this pair of addresses is constrained in such a way that all branches consist of selecting between two addresses, one of which is for the lower bank and the other of which is for the upper bank. The lower bank may utilize addresses in the range from 000 through 3 FF (hexadecimal), and the upper bank control store addresses from 400 to 7 FF (hexadecimal).

The structure used to implement this method of control store partitioning is shown in the block diagram of FIG. 5. As can be seen, the control store is partitioned into five sets of control store elements or PROMs 251 through 255. Elements 251 and 252, which, as indicated in the drawing in parentheses, include a total of 24 control store chips (19 in element 251 and 5 in element 252) are those that contain the data for the lower bank of the control store. Elements 253, 254 and 255 (which include a total of 29 chips) are those that contain the data for the upper bank. Three types of integrated circuits are used to implement these elements. Element 251 is made up of 19 1K (1024)×4 bit control store chips with a typical address propagation time of 60 nanoseconds. Elements 252 and 253 are made up of specifically selected 1K×4 bit control store chips with a typical address propagation time of 50 nanoseconds. Elements 254 and 255 are made up of selected 512×4 bit control store chips with a typical address propagation time of 40 nanoseconds.

There are two reasons why chips or circuits with different propagation times are used in this logic. The selected parts in elements 253, 254 and 255 are selected to be faster than their counterparts in elements 251 and 252 in order to compensate for the propagation time through the upper bank address multiplexer 256. In addition, elements 252, 254 and 255 are selected to be faster than elements 251 and 253, respectively, because of the propagation delay required in the preliminary logic 259 that is in series with their output to the MLR 82.

The upper bank address multiplexer 256, which is included in next address generator 44, is used to provide one of the two addresses that are being selected among any firmware branch. The lower bank address (the address used by the lower bank control store PROMs) is more or less directly related to the next address which is in the control store word (the NA field) and is the address which is explicitly selected in that control store word. The other address which is used for a branch, that which is used in the upper bank, is some logical derivative of the NA field or is a logically generated address from PROMs or other logic in the CPU as shown by the three inputs to MUX 256, which are selected in accordance with the branch type. This other logic, i.e., the PROMs, and the other logic, and the upper bank address multiplexer which selects it, takes additional propagation time which is not present in the address path in the lower bank. The difference between these two address paths is compensated for by the difference in the speeds of the control store chips in series with it. By utilizisng one bank (i.e., the lower bank) which has a direct address path, only some of the PROMs need to have increased speed whereas if a MUX, such as MUX 256, were used for both banks, all PROMs would have to have increased speed in order to provide the same propagation time.

As has been noted the propagation delay up to and through the upper bank address MUX 256, which is generating address bits which are recieved by the faster PROMs of the upper bank, are uniformly faster than their lower bank counterparts. Thus, the data at the output of each PROM is stable at approximately the same time.

The preliminary logic 259 which is connected to the output of the fastest PROMs in each bank, that is elements 252, 254 and 255, is used to perform some preliminary logic decode of the next control store word prior to latching it in MLR 82. That is, this may include the select/modify logic 53 which is used to generate the address inputs for the DRAM 11 and the BRAM 12, and which address inputs have to be available early in the control store cycle. More particularly, the address inputs cannot wait to be generated after the main clock has enabled the data into the MLR, but must be generated at the input to the MLR so as to be available as soon as the clock transition has taken place.

The source for the two addresses which are used for selecting a control stored word in the lower bank and the upper bank are as follows. The lower bank address, NA, comes directly from the control store word for the current firmware step. Thus, it is available as soon as that control store word has been clocked into the MLR 82. The address NA is an input to both elements 251 and 252. The upper bank address, at the output of multiplexer 256, i.e., the address inputs to elements 253, 254 and 255, is a logical derivative of a number of logic functions included in the CPU. The address multiplexer may be the present embodiment generate eight different functional addresses which can be used by the upper bank. These are the result of the eight possible branch types which can be specified in the control store word.

These branch types are known as XO and XI, XA, XB, XR, XE, XW and XL as shown in the table of FIG. 6. Branch types XO and XI, which are the most common types of branches, are basically a direct logical function of the NA field. Such branch types use the NA field, with the low order bit NA10 or NA(Ā) unchanged NA(A) or complemented NA(Ā). The other six branches are used for specific purposes. The XA branch is used for selecting the appropriate starting address to initiate the decode of a new instruction's opcode. The XB branch is used to perform the initial decoding of some of the address syllables which are possible in the CPU. The XR branch is used to select the starting address for the execution of the routine to read the operand in most cases, or for the execution of certain instructions which are capable of execution immediately. The XE branch is used to select among the starting addresses of the firmware routines which are used to execute the individual instruction algorithms. The XW branch is used to go to select one of a number of routines which are used to store the operand. The XL branch is used to allow a simplified firmware splatter under the control of the firmware. This branch uses the contents of the link register, which can be loaded under firmware control to control four bits of the upper bank address.

All of the major branches, XA, XB, XR, XE, XW and XL use the two high order bits (NAS 1, 2) of the NA field as their high order bits, but generate the remaining eight bits for their particular address in a different manner.

The XA splatter uses the output of five (5) XA PROMs to generate bits 3 through 10 of the XA next address.

The XB splatter uses three constant signals, two binary ones (11) and a binary zero (0), then one bit which is the output of one of the bit locations of the F register 38, and four outputs from a PROM which is driven by the F register to generate bits 7 through 10 of its NA field.

The XR splatter jams three bits with three binary zeros (000), generates the next bit with the contents of a control flop (KOP) whose state relates to instruction types, and generates the last four bits, bits 7 through 10, from an XR PROM.

The third bit of the XE splatter is the aforesaid instruction type signal. The next bit indicates whether or not bit O of the F register is zero, the next whether bits 1 through 3 of the F register 38 are all zeros or not, and bits 4 through 8 of the F register are utilized as bits 6–10 of the NA field.

The XW splatter gives a combination of signals: a constant zero and three outputs of a PROM which decodes and classifies operand size type for bits 4 through 6. Bit 7 is a logic one, bit 8 is an output of the PROM which classifies operands as either addresses or non-addresses, and, finally two bits which are the output of an XW PROM, for bits 9 and 10 of the NA which identifies whether the result is to go to memory, to a base or data register or to a so-called K register (not shown).

The address lines for the XL branch use bits 1 through 6 of the NA field for the first six bits, and then use four bits of link register to generate the four last bits (bits 7 through 10).

These various inputs are selected by the set of eight-to-one multiplexers which are the upper bank address MUX 256. The particular address which is selected through this MUX is selected by use of the current control store word. In the current control store word, branching is performed by selecting one test condition and testing it for either being satisfied or not being satisfied. The output of this logic is two signals, one TCTRUE− or NOT TRUE, the other TCTRUE+ or TRUE. TCTRUE− is the signal on line 261 in the block diagram of FIG. 5 and TCTRUE+ is the signal on line 262. These signals are connected to the enable inputs of the respective control store PROMs.

At the beginning of a given firmware step, the NA field becomes stable and that address immediately begins propagating through the control store elements 251 and 252. As fast as the logic operates thereafter, the output of the upper bank address MUX 256 becomes stable, and that address begins propagating through control store elements 253, 254 and 255. Note that one of the address bits at the output of the MUX 256 selects between element 254 and element 255. This is because these elements are implemented with higher speed PROMs having a smaller word storage capacity. Accordingly, what is an address line for a 1K word (4 bits/word) PROM, becomes a selective enable line for two 512 word PROMs, with one enable input of PROM 255 coupled via inverter 264. More particularly, in elements 254 and 255, which are the selected 512×4 bit control store PROMs, the address bits are partitioned slightly differently. The reason for this is that a 512 word PROM only requires nine bits of address. The tenth address bit, which is an address bit to all the other control store PROMs, is instead used as a second enable on the 512×4 control store PROMs. That is, element 254 would be enabled for addresses 400 through 5 FF, and since the inverse of that same address line is coupled to element 255, it would be enabled for addresses 600 through 7 FF.

Thus, as fast as the address are available, they are propagated through the control store PROMs. Meanwhile, in parallel, the TC (test condition) logic 30, as shown in detail in FIG. 7, is deciding whether the test condition is satisfied or not satisfied, with the outputs TCTRUE− and TCTRUE+ becoming stable thereafter. If the test condition in the polarity indicated was satisfied, then the low state TCTRUE+ will enable PROMs 253, 254 and 255, while TCTRUE−, being in a high state, will disable PROMs 251 and 252. Thus, the outputs of the wired OR connections as shown by symbols 257 and 258 (76 and 20 lines coupled respectively) will be the contents of the addressed upper bank control store location. However, if the condition was not satisfied, then TCTRUE− (not TRUE) will have the other polarity or state and will enable control store elements 251 and 252, while TCTRUE+ will disable elements 253, 254 and 255. In such case, the outputs of the wired OR connections 257 and 258 will be the contents of the addressed lower bank location.

The enable time for the control store PROMs is typically 15 to 20 nanoseconds. This is significantly faster than the address propagation time for a PROM which, as noted on FIG. 5, may be, for example, 60 nanoseconds, for PROM 251. Thus, the "delay" from the time when the test condition results are known has been enhanced so that the enable propagation time of the PROMs is controlling rather than the address propagation time through the PROMs. The reason that these particular concerns have been taken with the timing through this chain of logic, i.e., the propagation time through the upper bank address generation and selection, the timing through the control store PROMs, and the timing through the preliminary logic, is that the worst case time at which the data at the input to the MLR 82 must be stable, is the time at which the main clock is triggered. It is one of the major functions controlling the cycle time, and thus the speed of the CPU.

If each of the control store PROMs had a 60 nanosecond propagation time, then in the worst case, if one were selecting an upper bank address, it would take 80 nanoseconds altogether from some preliminary starting point before the input to the MLR 82 became stable. Thus, to increase the speed, the use of PROMs having three different propagation times is desirable. PROM 252 compensates for the reduced speed or slow down caused by the preliminary or select/modify logic 259. PROM 253 compensates for the increased delay in addressing due to the upper bank address MUX 256. PROM 254 and 255 compensate for both the MUX 256 and the logic 259. Thus, the worst case time through this network is almost the same no matter which bank, upper or lower, is being used, and no matter which output is generated, one that goes directly to the MLR 82 or one that goes to the logic 259, before going to the MLR. If elements 253, 254 and 255 were not faster than elements 251 and 252, the clock period would have to be longer for any firmware step in which the upper bank was the one selected. Thus, the cycle time for that control store step would be longer because there would have to be allowance for the extra time for the next address PROMs and the upper bank address MUX to generate a stable address for the control store PROMs.

The basic principle involved in the logic shown in FIG. 5 is summarized as follows. Since the address path through the control store PROMs is so much slower than the enable path, the address path is always left open, that is, the next address is trickling through the lower bank control store and the output of the address MUX 256 is trickling through the upper bank of the control store, while the decision is being made as to which bank is finally going to be used. The timing of that decision becomes critical only when it becomes time to enable the outputs of these control store PROMs, in which case the test condition generated, true or false, will enable either the lower bank or the upper bank PROMs, depending upon which way the branch is going. The enable path is a much shorter time, 60 nanoseconds for the address propagation as compared to 15 manoseconds for the enable propagation, thus allowing the decision for bank selection to be postponed for as much as 45 nanoseconds in a typical control store step, and thereby allowing each control store step to be significantly faster.

Now referring to FIG. 7, details of the test logic 30 for generating the TCTRUE+ and TCTRUE− signals is shown. The TCTRUE+ signal is generated at the negation output of multiplexer (MUX) 302 on line 262, and the TCTRUE− signal is generated at the negation output of MUX 304 on line 261. The lines 261 and 262 are coupled to the PROMs as shown in FIG. 5. The multiplexers 302 and 304 each have eight inputs (0-7), with each like numbered input coupled to receive the same input. Such inputs are received from the eight outputs of multiplexer 300 which actually includes eight multiplexers MUX 1-MUX 8, each having eight inputs and one output. The sixty-four inputs to multiplexer 300 are each coupled to receive a test condition from various functions included in the central processing unit 100 as indicated by test logic 30. Depending upon the condition of the function tested, either the upper bank or the lower bank of the control store will be enabled and accordingly addressed. The inputs to the multiplexers which are selected and/or enabled are determined by control bits received from the current control word, i.e., firmware word from the control store.

Thus, it is desirable to branch on a variety of different signals, which may, by way of example, be sixty-four in number, such that only one signal represents the selected one of the sixty-four inputs. The logic of FIG. 7 provides this capability with minimal propagation time by use of two levels of multiplexers, one level comprising multiplexer 300 and the other level comprising multiplexers 302 and 304. The logic of FIG. 7 also enables such branching based on either of two polarities of the same signal.

The operation of the logic of FIG. 7 is as follows. One input of each of the eight multiplexers included in multiplexer 300 is selected for propagation to the negation outputs, GP0 through GP7 respectively by the three bits received at select inputs 3, 4 and 5 of each of such eight multiplexers. These three bits are received from the TC field (bits 13-15) of the firmware word. The outputs GP0-GP7 are respectively coupled to the 0-7 numbered inputs of each of the multiplexers 302 and 304. The multiplexers 302 and 304 are also coupled to receive at their enable inputs the signals CRTCSP− and CRTCSP+, respectively. The CRTCSP signals (assertion and negation) are also received from the current firmware word, and more particularly, the TP field in the firmware word, transferred via the register 82. For bit 21 (the TP field), the element at the bit 21 location in the register 82 is actually a bistable element (flip-flop) having both a negation and an assertion output. Depending on the logic level required for other bits of the firmware word, either or both the assertion and negation outputs are used.

The multiplexers 302 and 304, which may be purchased from a semiconductor vendor such as Texas Instruments Inc. under part number SN74S251, will allow switching of the assertion and negation outputs of the multiplexer if the signal on the enable input is low or a binary zero. If such signal on the enable input is high, the outputs are floating and accordingly, as configured, such multiplexer having a high enable input will be effectively removed from the logic of FIG. 7. Thus, as can be seen, only one of the multiplexers 302 and 304 will be enabled at any given time. The outputs of the multiplexers 302 and 304 are coupled so that the assertion output of each multiplexer is coupled to the negation output of the other multiplexer to produce a so-called wired-OR circuit connection. Thus, with either of the multiplexers 302 and 304 enabled, the TCTRUE signals are obtained with the proper polarity. The TCTRUE signal which is low or a binary zero, will enable the bank to which it is coupled. That is, if TCTRUE− is low, the lower bank will be enabled.

Thus, as can be seen from the operation of the logic of FIG. 7, if the CRTCCSP− signal is high and accordingly the CRTCSP+ signal is low, then MUX 304 is active or enabled and the signal TCTRUE− reflects the level (high or low) of the one of sixty-four conditions being tested and TCTRUE+ reflects the inverse of such level. If the CRTCSP− signal is low and accordingly the CRTCSP+ signal is high, then MUX 302 is active or enabled and the signal TCTRUE+ reflects the level of the condition being tested and TCTRUE − reflects the inverse of such level. Whether the upper or lower bank of the control store is enabled depends upon which of the signals TCTRUE− or TCTRUE+ is low.

It can be seen that the opcode of an instruction read from memory 106 may be utilized to select one of several test conditions, which test conditions may be different from those received by MUX 300. In such case, the opcode bits could be utilized to select the test condition inputs to a first MUX similar to MUX 300 or a subportion thereof, and two multiplexers similar to multiplexers 302 and 304 could also be used in an arrangement similar to that shown in FIG. 7. It can also be seen that the use of the opcode to so select a test condition could be used independent of or in parallel with the logic of FIG. 7. If used in parallel, then the multiplexers 302 and 304 controlled by the firmware bits would have to be disabled when the multiplexers controlled by the opcode are enabled and vice versa.

Figure 8:
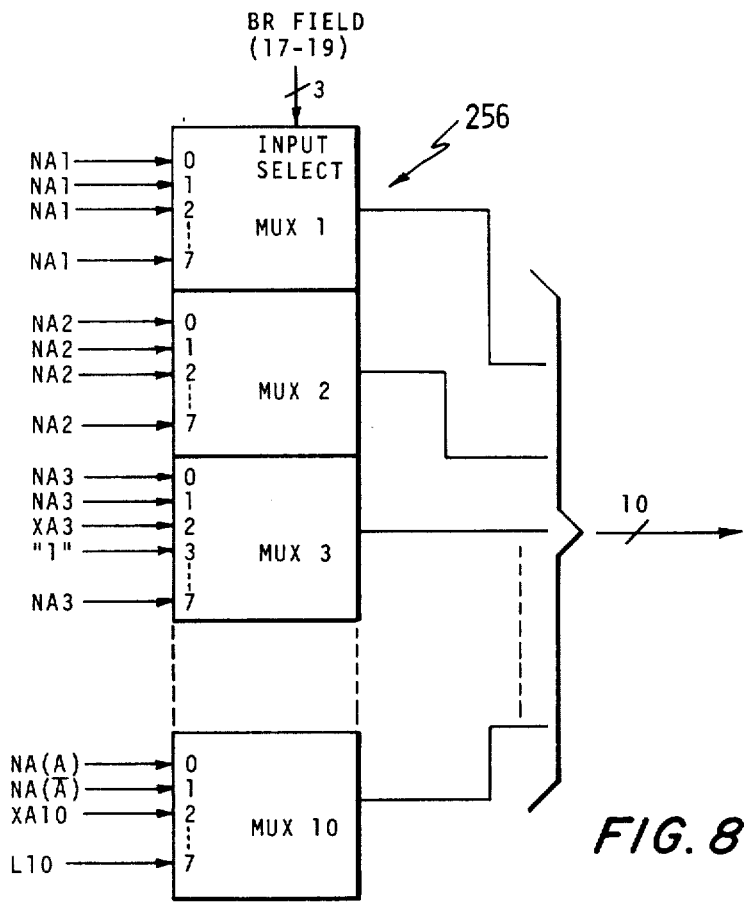
FIG. 8 illustrates the details of a multiplexer used in addressing the control store included in the central processing unit of the present invention.

Details of the MUX 256 and the connections thereto are shown in FIG. 8. More particularly, the MUX 256 is shown to include ten multiplexers each with eight inputs. The inputs to these ten multiplexers correspond to the signals identified in the table of FIG. 6. These signals are coupled for the eight branch types depicted in FIG. 6, such that the first signal for each of the branch types is received at the corresponding eight inputs of MUX 1 included in multiplexer 256. Thus, MUX 1 has coupled to each of its eight inputs the signal NA1. MUX 2 also has the same signal (NA2) coupled to each of its inputs. For each of the other multiplexers of MUX 256, except for the first two inputs, the signals coupled to the input are, for the most part, different. For example, MUX 3 has coupled to its number three input, the signal XA3 which, as shown in FIG. 6, is the third bit of the upper bank address for the XA branch, such third bit being a bit from position 3 of a so-called XA PROM which is not shown, but which may simply be a decoder coupled to receive its primary inputs from the F register 38 and whose output is coupled for receipt by MUX 3 of multiplexer 256.

The other inputs of the remaining multiplexers of MUX 256 also receive the inputs as depicted in FIG. 6. The first two inputs of MuX 10, NA(A) and NA (Ā) are of further interest. More particularly, the use of these two bits, one of the complement of the other, allows more flexible and efficient pairing of control store (PROM) locations for branch operations. In the prior art, it has been known to branch on a branch hit condition to an odd PROM location and to branch on a branch no-hit condition to an even location, or vice versa. However, such prior art technique has limitations. For example, assuming four consecutive locations whose addresses are XXX000, XXX01, XXX10 and XXX11 (where X is either a binary 1 or a binary 0), a sequence which is branching can go to address XXX00 or XXX01 depending on a no-hit or hit condition, or another sequence can go to address XXX10 or XXX11. However, even if locations XXX11 and XXX01 contain exactly the same information, they cannot be shared, i.e., two locations have to be used even for the same contents. This is because both addresses are odd and the only pairing allowed is for odd/even addresses. In another prior art technique, a no-hit condition could be made to cause the addressing of the location specified by the control store word and a hit condition could cause the addressing of a location specified by the higher order address bits with the two lowest order bits, for example, both being binary ones. In this manner, an address whose two lowest order bits were both binary ones, could be paired with addresses whose two lowest ordered bits were either two binary zeros or a binary one and a binary zero (in either order). However this restricted the common address to an address which had its two lowest ordered bits binary ones (or vice versa, i.e., two binary zeros with appropriate change of the other paired addresses to one whose two lowest ordered bits are either both binary ones or a binary one and a binary zero).

In a data processing unit which allows a variety of sources to generate or form the next address for the control store, the use of the arrangement as shown in the Figures, more specifically FIGS. 5 and 8, is desirable. More particularly, the logic shown in such Figures allows a reduction in the total number of firmware or control store locations by allowing all locations to be used as alternates to an increased number of selected locations. In order to accomplish this, the least significant bit position (NA10) is coupled so that for the X0 branch, NA10 is in fact the same as the NA10 bit, NA(a), received from register 82 for the current control store word, whereas, for the XI branch, the complement of such bit NA(A), is used.

Figure 9:
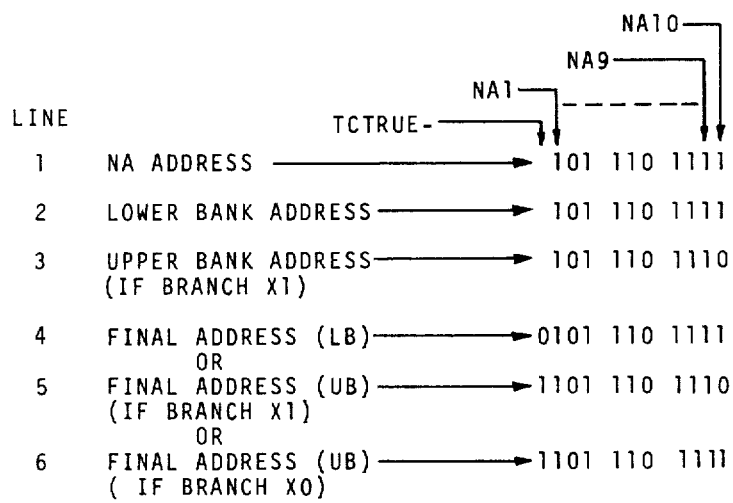
FIG. 9 illustrates an example of the operation of pairing locations in the control store included in the central processing unit of the present invention.

By way of example, FIG. 9 should be referenced. If the NA address is as shown on the first line, then the lower bank address is, as shown, the same. The upper bank address is however dependent upon whether there is an X0 or X1 branch. If an X1 branch, then the upper bank address is shown in the third line. The final address depends upon whether the signal TCTRUE— is a binary zero or one. If a binary zero, then the lower bank PROMs will be enabled. Thus, as shown in the fourth line, the final address will be for the lower bank if TCTRUE— is a binary zero. If TCTRUE— is a binary one, then the final address will be for the upper bank and depending upon whether the branch is X1 or X0, the final address will be as shown in lines 5 and 6 respectively of FIG. 9. More particularly, it can be seen that the lower bank address on line 4 may be paired with either of the addresses for the upper bank as shown on lines 5 and 6.

In this manner, more efficient pairing of locations may be obtained. Variations of the example shown in FIG. 9 will illustrate that an even address location of the lower bank may be paired with an even or odd address location of the upper bank, and that an odd address location of the lower bank may also be paired with either an even or odd address location in the upper bank.

It can be seen that the above described pairing could be accomplished by setting the binary value of the NA10 bit independent of the binary value of the NA10 bit of the current firmware word. For example, the NA10 bit for the X0 branch may have been set to a binary one instead of NA(A), so long as the NA10 bit for the X1 branch is its complement, in this case, a binary zero.

2. Overview of Information Transfer

Of particular interest in the instant application is the transfer of information within a central subsystem and between a central subsystem and the system elements such as communications processor 109, I/O controller 107 and I/O devices 108, and the memory modules 106 by means of the system or megabus 105. The information includes control signals, data, and addresses flowing bidirectionally between both the elements within a central subsystem and between a central subsystem and other system elements. The megabus 105 and the local bus 9 provide the capability for transmitting in parallel two data words, i.e, 32 bits plus parity bits, 24 address bits plus parity bits, and a plurality of bits of control signals all on different signal lines or conductors.

Within a central subsystem, each of the cache/MMU 103, CPU 100, SIP 101, and CIP 102 includes circuitry elements for receiving and transmitting bits of information from and to the other elements connected to the local bus 9 within the central subsystem. The cache/MMU 103 additionally interfaces with the megabus 105 and, therefore, includes along with the other circuit elements connected to the megabus, circuitry elements for similarly receiving and transmitting information transmitted along the megabus.

The operating characteristics of the megabus and the local bus are quite similar in that they each permit any two units connected thereto to communicate with each other at a given time via both dedicated and common signal paths transmitting the bits of data, addresses, and control signals. Also, communications along the megabus and the local bus are asynchronous. Any unit wishing to communicate to another unit, requests a bus cycle. When that bus cycle is granted, the initiating unit becomes the master, and may address any other unit in the system as the slave whether that unit is within a central subsystem or connected to the megabus.

Most transfers are in the direction of master to slave. In cases where a response cycle is required, the initiating or requesting unit assumes the role of master, secures a bus cycle, and transmits an operational request to a destination or slave unit. Within the request is an identification, in the form of a channel number, of the source of the operational request to enable the slave unit to subsequently direct a response to the master unit. When the slave unit has performed a requested operation and must transmit a response to the requesting unit, the slave assumes the role of master and, during a second bus cycle, initiates a transfer to the initiating unit which will then assume the role of a slave. These two bus cycles may complete the interchange between the units. Intervening time on the bus between the two cycles (the request cycle and the response cycle) may be used by other system elements for requests unrelated to the two elements.

A master may address any other unit on either the local bus or megabus as a slave. It does this by placing the slave address on the address leads of the bus. Thus, the CPU 100 would couple a slave address on the address leads of the local bus 9 whereas the communications processor, for example, would place the slave address on the address lines in the megabus 105. As stated above, there may be 24 address leads which can have either of two interpretations depending on the state of an accompanying control lead, called the memory reference signal, MREF. If the memory reference signal is TRUE (binary ZERO), the requesting unit is addressing a location in the memory modules 106. If, however, the memory reference signal is FALSE (binary ONE) then the address leads contain a ten-bit channel number and a six-bit function code. When a channel number and function code are being transmitted along the address leads, the source and destination units, i.e., master and slave, respectively, are passing control information, data, or interrupts. Each of the system units both within and without a central subsystem is identified by a ten-bit channel number uniquely set by switches within the particular units.

When a master requires a response cycle from a slave, it indicates this to the slave by the state of a binary control lead designated WRIT. In one state, WRIT indicates to the slave unit that a response cycle is required as, for example, in a read command, and when WRIT has its other binary state it indicates to the slave unit that no response is required.

When MREF indicates that a non-memory reference cycle is being requested, the data lines of the local bus or megabus contain the channel number of the requestor unit whenever a response is required from the slave to the master. The response cycle is then directed to the requestor by a non-memory reference transfer and a control lead SHBC, designated as the second-half bus cycle lead, is enabled to designate to the requestor unit that the information transferred thereto is a response by the slave unit to a previously issued request by the master unit.

As stated above, a channel number will exist for every end point in a particular system with the exception of the memory-type processing elements which are identified by the memory addresses. A channel number is assigned for each such device and full duplex devices as well as half-duplex devices utilize two channel numbers. Output only or input only devices use only one channel number each. Channel numbers are easily variable and accordingly one or more hexadecimal rotary switches (e.g., thumb wheel switches) may be utilized for each unit connected to the local bus or the megabus to indicate or set that particular unit's address. Thus when a system is configured, the channel number may be designated for each particular unit connected to the bus as may be appropriate for that particular system. Units with multiple input/output (I/O) ports generally will require a block of consecutive channel numbers. By way of example, a four-port unit may use rotary switches to assign the upper seven bits of a channel number and may use the lower order three bits thereof to define the port number to distinguish input ports from output ports.

The channel number of the slave unit will appear on the address bus for all non-memory transfers and each unit compares that number with its own internally stored number (internally stored by means of the rotary switches). The unit which achieves a compare is, by definition, the slave and must respond to the current bus cycle. Generally, no two end points in a single system will be assigned the same channel number.

A specific bus or I/O function is indicated by lines 18–23 of bus address leads during a non-memory reference cycle. Function codes designate either input or output operations and, for example, all output function codes could designate output transfers (writes) while all even function codes may designate input transfer requests (reads).

There are various output and input functions. One of the output functions is a command whereby a data quantity, for example, 32 bits is loaded from the data leads of the megabus or the local bus into the system unit designated by the channel number in the channel number field of the address lines. The meanings of the individual data bits are component specific, but the term "data quantity" is taken to mean the data to be stored, sent, transmitted, etc. depending upon the specific component functionality. Another such output function is a command whereby for example a 24-bit quantity is loaded into a channel address register. The address is a memory byte address and refers to the starting location in memory where the channel will commence input or output of data. Various other output functions include an output range command which defines the size of the memory buffer assigned to the channel for a specific transfer, an output control command which by its individual bits causes specific responses, output task functions such as PRINT commands, and output configurations indicating functions such as terminal speed, card reader mode, etc.

The input functions include functions similar to the output functions except in this case the data is transferred from the unit to the bus. Thus, the input function include the input data, input address, and input range commands as well as the task configuration and input interrupt commands. In addition, there is included the device identification command whereby the channel places its device identification number on the bus. Also included are various status signals indicating, for example, that a specific device is operational PRZT, whether it is ready to accept information from the bus BUSY, whether there is a non-correctable memory error REDL, REDR, whether there has been a corrected memory error YELO, whether there is a request for a non-existent device or resource UARL.

In addition to memory writes and reads and I/O input and output commands, a unit connected to the megabus or the local bus can request an interrupt of the CPU 100 or the performance of a particular action by CPU 100.

A unit wishing to interrupt the CPU requests a bus cycle and when the bus cycle is granted, the unit places its interrupt vector on the bus, the interrupt vector including the channel number of the CPU and its, i.e., the transferring unit's own, interrupt level number. If the channel number is the CPU's channel number, the CPU will accept the interrupt if the level presented is numerically smaller than the current interrupt CPU level and if the CPU has not just accepted another interrupt. Acceptance of an interrupt is indicated by a bus ACK signal and nonacceptance of an interrupt is indicated by a NAK signal. Devices receiving a NAK will rerequest an interrupt when a signal indicating resumption of normal interrupting is received from the CPU, i.e., PRINT (resume interrupts) is true. The CPU issues this signal when it has completed a level change and, therefore, may be capable of accepting interrupts once again. The channel number of the master is supplied in the vector for use since more than one channel may be at the same interrupt level. Interrupt level ZERO is of a special significance since it is defined to mean that the unit shall not interrupt.

Figure 10:
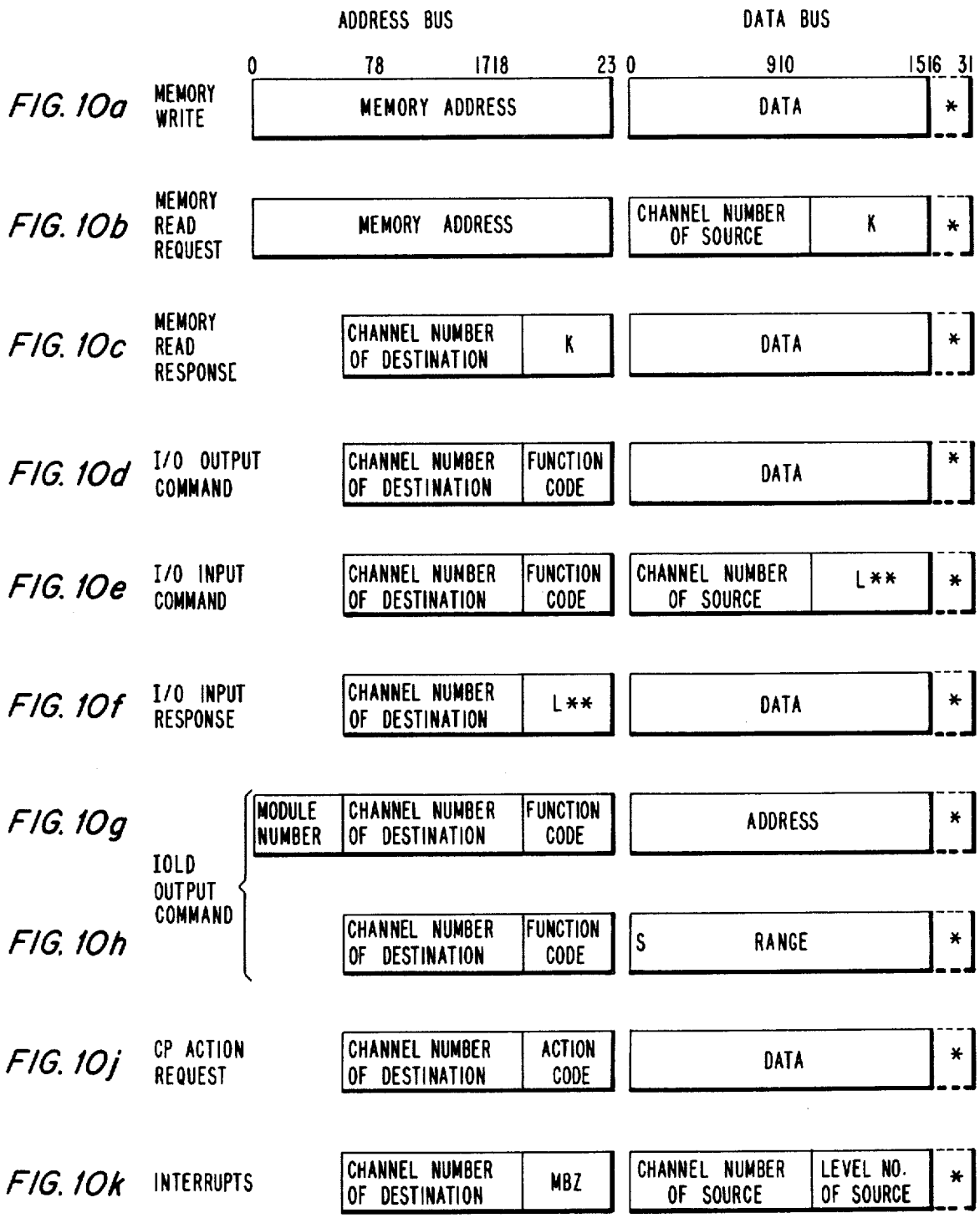
FIGS. 10a–10k illustrate formats for transferring information in the address and data fields of the local bus and megabus connecting the processing units employed by the QLT system of the present invention.

FIGS. 10*a*-10*k* illustrate the data and address bus formats for the above-described bus operations. FIG. 10*a* illustrates the format for a memory write and it can be seen that the 24 address bits (0–23) designate a particular memory address and the data bus transfers either a single word (bits 0–15) or a double word (bits 0–31) of data to be transferred to the designated memory address. A memory read request is illustrated in FIG. 10*b* and, once again, address bits 0–23 designate the memory address to be read from and data bus bits 0–9 designate the channel number of the source of the memory read request.

A slave unit, in response to a memory read request, transmits information according to the formats of FIG. 10*c*. Bits 8–17 of the address field contain the channel number of the destination unit (the requesting unit) of the 1 or 2 words contained in bits 0–15 or bits 0–31 of the data bus, respectively.

FIGS. 10*d* and 10*e* illustrate the formats for an I/O output command and an I/O input command, respectively. In the output command bits 8–17 of the address bus contain the channel number of the destination unit and a function code is specified in bits 18–23. The data bus contains either 16 or 32 bits of data to be operated upon according to the specified function code. The input command has a similar address bus format and contains, in bits 0–9 of the data bus, the channel number of the source of the command. Thus, the data bus in the I/O input command specifies to the slave or response device the identification of the source of the input command.

FIG. 10*f* illustrates the response of a slave to an I/O input command. Bits 8–17 of the address bus contain the channel number of the destination unit as specified in bits 0–9 of the data bus for the I/O input command. The data bus contains either 16 or 32 bits of data retrieved as a result of the input command.

FIGS. 10*g* and 10*h* specify an input/output load (IOLD) output command wherein bits 0–7 of the address bus specify the module number of the beginning address of the data and the device is designated by the channel number set forth in bits 8–17. Bits 18–23 of the address bus specify the function code and the data bus set forth in bits 0–15 the beginning address of the data to be loaded. The format set forth in FIG. 10*h* specifies the destination channel number in bits 8–17 and a function code in bits 18–23. The bus specifies in bits 0–15 the range of addresses to be loaded.

FIGS. 10*j* and 10*k* illustrate bus formats for CPU related actions. Bits 8–17 of the address bus in each case specify the destination channel number and, in a CPU action request, an action code is specified in bits 18–23 whereas these bits of the interrupt request are constrained to be zero. The data bus of a CPU action request contains either 16 or 31 bits of data associated with the designated action. The data bus during an interrupt request contains the channel number of the source of the interrupt request in bits 0–9 and the priority level number of the source in bits 10–15.

Figure 11:
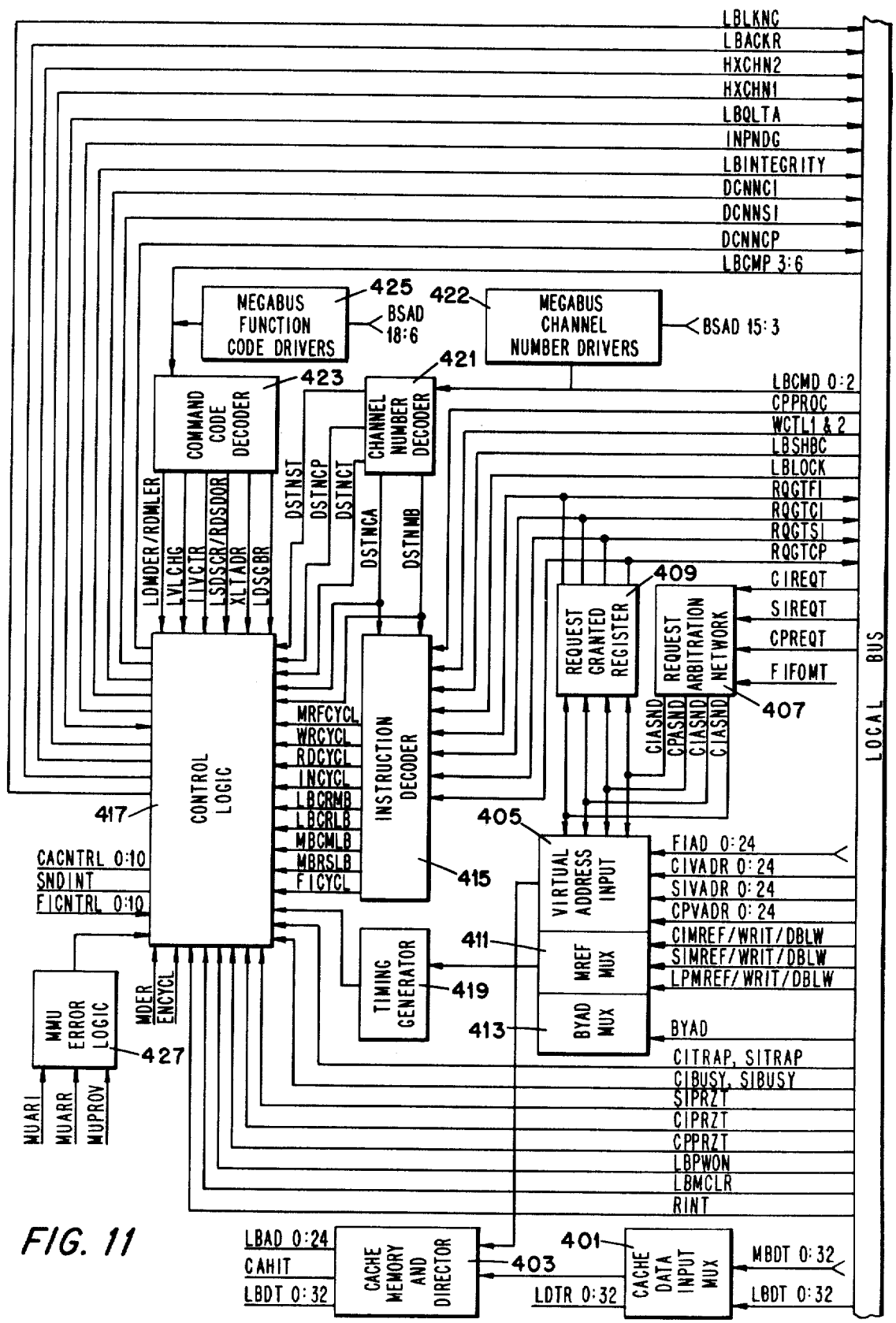
FIG. 11 is a detailed block diagram illustrating the local bus adapter for controlling the transfer of information between the processors and cache/MMU in a central subsystem tested by the QLT system of the present invention.
Figure 12:
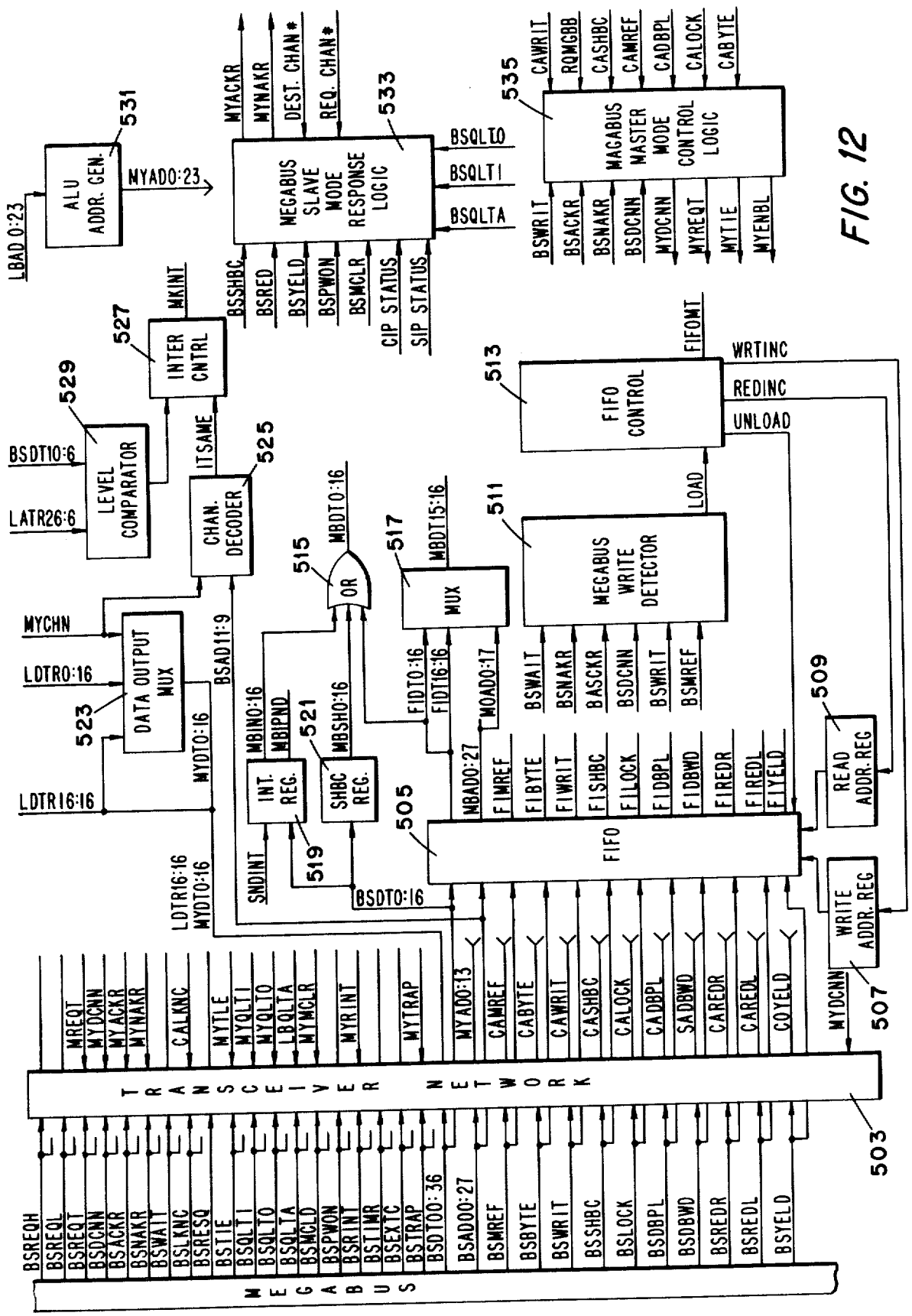
FIG. 12 is a detailed block diagram illustrating the megabus adapter for controlling the transfer of information between a central subsystem and the megabus employed by the QLT system of the present invention.

The specifics of the cache/MMU 103 pertinent to the transfer of information between the CPU 100, SIP 101, CIP 102 and the cache memory in the cache/MMU 103 are set forth in block diagram form in FIG. 11. This is also referred to as the local bus adapter. FIG. 12 shows in block diagram form the apparatus within the cache/MMU 103 for interfacing the system or megabus 105 within the central subsystem and for controlling the transfers of information along the megabus. This is sometimes referred to as the megabus adapter.

Considering now FIG. 11, the signals which comprise the local bus are set forth as having the local bus as their source or destination.

Cache data input multiplexer 401 selectively provides 32 bits of data (2 words of 2 bytes each) for storing in the cache memory 403. Cache data input multiplexer 401 selects either the 32 data bits (plus the 4 parity bits for a total of 36 bits) currently residing on the data lines of the local bus (LBDT 0.32) or the 32 data bits (plus parity bits) currently being supplied from the megabus adapter (MBDT 0:32). The local bus data LBDT has as its source either the CPU 100, SIP 101, CIP 102, Cache/MMU 107 or whereas the source of megabus data MBDT could be the memory modules 106, I/O devices 108, communications processor 109 or other units connected to the megabus. The megabus data is normally supplied as a response to an I/O command or a memory read.

The cache memory and directory 403 is a very high-speed, limited capacity memory for storing duplicates of a selected group of data words also stored in the memory modules 106. As an example, the cache memory could have a capacity of 4,096 words with an equal number of entries in the cache directory. An example of a suitable cache memory is found in U.S. Patent Application Ser. No. 863,091 entitled FIRST IN FIRST OUT ACTIVITY QUEUE FOR A CACHE STORE invented by Thomas Joyce, filed Dec. 22, 1977 and assigned to the assignee of the instant application.

A detailed description of the function and operation of the cache memory and directory 403 is not necessary for an understanding of the instant application. Commonly, the cache memory stores the most recently rquested information and will have an entry written into it at the same time that an entry is written into a memory module 106. It is, however, important to understand that the integrity of a cache memory must be maintained at all times and, therefore, if a unit outside of a particular central subsystem performs a memory update on a location in the memory module 106 that is also stored in cache memory 403, that entry in the cache memory must also be updated. As will be hereinafter described, the megabus adapter performs such integrity updates.

The purpose of a cache memory is to reduce the time necessary to supply data addressed by one of the processors, CPU 100, SIP 101, or CIP 102. Thus, whenever a memory read is requested by one of these processors, an inquiry will be made into the directory of the cache memory to see whether that particular data is stored therein. If it is, then the information will be transmitted from the cache memory 403 as local bus data LBDT. Similarly, the output, CAHIT, signals that the requested data is either resident or nonresident in cache 403.

If one of the processors CIP 100, SIP 101 or CIP 102 performs an update on a memory location represented in cache 403, a memory write to perform a similar update will be issued to the affected location in memory module 106 in order to insure the integrity of data stored therein.

The directory within cache memory 403 stores designations of the addresses associated with the data stored therein. These addresses are supplied by virtual address input multiplexer 405. Multiplexer 405 selects from a virtual address supplied from the CPU (CPVADR), the SIP (SIVADR), the CIP (CIVADR) or from the megabus FIAD. These addresses are 24 bits long with appropriate parity bits. The output of virtual address multiplexer 405 is VAIN 0:24 supplied as an input to the directory of the cache memory 403.

As stated above, communication along both the megabus and the local bus is performed on an asynchronous basis. Thus, the CPU 100, SIP 101, and CIP 102 must request a local bus cycle before they can transfer information to another unit within the central subsystem, the cache/MMU, or a unit on the megabus. A fourth source of request for a local bus cycle is a first-in first-out (FIFO) memory resident within cache/MMU 103 and containing a limited number of "snapshots" of information transfers along the megabus 105. The information transfers stored in the FIFO memory are commonly main memory writes performed by a processing unit coupled to the megabus.

The request signals CPREQT, SIREQT, CIREQT, and FIFOMT are supplied to request arbitration network 407 which, when there is an available local bus cycle, will assign the bus cycle to one of the requestors.

Such an assignment is reflected in the enable signals CIASND, CPASND, SIASND, and FIASND provided to request granted register 409, virtual address input multiplexer 405, memory reference multiplier 411, and BYAD multiplexer 413.

Request granted register 409 generates an enable signal to be transmitted to the requesting unit that was granted a local bus cycle. Thus, the signals RQGTCP, RQGTSI, RQGTCI, and RQGTFI take on values which indicate the granting of a local bus cycle to the CPU, SIP, CIP, and FIFO, respectively. The outputs of the request granted register are also supplied as inputs to instruction decoder 415.

Additional control signals are transferred over the local bus between the cache/MMU and the local bus processors. The signal PRINT (resume interrupts) is generated by the CPU to indicate that the CPU will accept an interrupt from either the CIP, SIP, or a non-central subsystem unit, i.e., a unit coupled to the megabus.

The signal LBMCLR is normally false and becomes true when the MASTER CLEAR button on the CPU maintenance panel is depressed. When LMBCLR is true, units on the bus will be initialized and the units capable of doing so will perform quality logic test (QLT) routines. The signal LBQLTA shown as an output of control logic 417 indicates that such a quality logic test cycle is being performed or that an error has been detected during the course of a QLT cycle.

LBPWON is true when all power supplies in the system are operating correctly; on power failure LBPWON goes false at least two milliseconds before the loss of +5 vdc to the logic. Controllers on the bus must perform an initialize at this point and cease all bus traffic to enable the CPU software to perform any cleanup operations which may be necessary especially in conjunction with the memory. On the return of power, +5 vdc will be stable at the logic before LBPWON goes true. Controllers on the bus will initialize upon the return of 35 vdc.

The processor present signals, CPPRZT, CIPRZT, and SIPRZT, indicate that the associated processors are installed and operating within the central subsystem. The processor busy signals, CIBUSY and SIBUSY, are transmitted along the local bus by dedicated lines and are responses generated by the CIP and SIP, respectively, indicating that the processors are not able to accept certain requests or data transfers because they are performing other operations.

Similarly, CITRAP and SITRAP are dedicated lines in the local bus originating at the CIP and SIP, respectively, and indicating when that one or more units on the bus have detected a processing condition that requires a trap which is often implemented by a forced branch to a particular firmware location.

BYAD multiplexer 413 receives the input signals collectively referred to as BYAD. These are address bit 23 of the addresses supplied by the CPU, CIP, SIP, and FIFO. The output of the multiplexer is supplied to control logic unit 417. BYAD is a signal which indicates reference to a particular byte within a data word. As embodied herein each data word is 16 bits long and comprises two eight-bit bytes. As stated above the local bus is able to transfer in parallel two words of data although as little as one byte of data may be transferred at one time.

MREF multiplexer 411 receives the enable signal from request arbitration network 407 indicating which of the subsystem processors or the FIFO has been assigned a local bus cycle. MREF multiplexer 411 selects inputs from either the CPU, SIP, CIP or FIFO (FIG. 12) and supplies the selected signals to the timing generator 419. The input signals to MREF multiplexer 411 are MREF, WRIT, and DBLW with the two-letter, prefix, e.g., CP, SI, CI, and FI designating the source of the signals. This convention is implemented throughout this detailed description.

As stated above, the signal WRIT, indicates, when true, that no response is expected as a result of the accompanying transfer is from a master to a slave. When this signal is false and accompanies a transfer, it indicates that response by the slave to the master is expected. MREF identifies whether the information on the address bus is a memory address or an I/O address (channel number and function code). DBLW indicates the number of words in the data field of the local bus during a write operation or a response to a read request.

The signals DBLW, BYAD, WCTL1 and WCTL2 are used in combination to control which bytes are to be written into the cache/MMU or the system memory in a write cycle. These are four binary signals and thus can give rise to 16 possible combinations not all of which are used. Since the local bus is capable of transferring two words for four bytes of data simultaneously, they can be considered to be byte 0 and byte 1 of word n and byte 0 and byte 1 of word n+1. When WCTL1, DBLW, and WCTL2, are all equal to ZERO then the cache/MMU or the system memory interprets a write request to write byte 0 and byte 1 of word n regardless of the value of BYAD. When BYAD, DBLW, and WCTL2 are ZERO and WCTL1 is equal to ONE, then only byte 0 of word n is written. If BYAD and WCTL1 are both equal to ONE and DBLW and WCTL2 are both equal to ZERO then byte 1 of word n is written. Bytes 0 and 1 of word n and byte zero of word n+1 are written when WCTL1 and WCTL2 are equal to ZERO, DBLW equals ONE and BYAD equals either ZERO or ONE. When BYAD, WCTL1, and DBLW are all equal to ONE and WCTL2 is equal to ZERO then byte 1 of word n and byte 0 of word n+1 are written. Bytes 0 and 1 of both word n and word n+1 are written whenever both DBLW and WCTL2 are equal to ONE, WCTL2 equals ZERO, and BYAD equals ZERO or ONE. Finally, byte 1 of word n and bytes 0 and 1 of word n+1 are written when all four control signals are equal to ONE.

Timing generator 419 receives the selected outputs from MREF multiplexer 411 and supplies appropriate timing control signals to control logic unit 417 depending upon whether a memory reference or an I/O reference is currently being received from the local bus 9 and whether it is an initial request or a response to a request.

The signals LBLOCK and LBSHBC both have independent meanings as well as a combinational interpretation. When LBSHBC equal to ONE is transmitted over the local bus to the processors in the central subsystem, it identifies that the accompanying data is transferred in response to an input command previously transmitted by one of the central subsystem processors to the cache/MMU. When generated by the processors in the central subsystem with MREF inactive (equal to ZERO), LBSHBC identifies a processor's response to an input command previously transmitted to the responding processor during a previous local bus cycle. In essence, LBSHBC when considered independently defines in one state that the accompanying data is a response bus cycle to a previously received request bus cycle.

LBLOCK when equal to ONE indicates that a read, modify, write (RMW) has been requested by the CPU. A lock is, in effect, a means for inhibiting a memory reference to a particular address in the cache/MMU and the system memory once that location is currently being accessed by a unit connected to the megabus, e.g., the CIP, CPU, or SIP. The concept of locking a particular memory location to prevent access by another requesting unit under certain conditions is well-known and is used to insure the integrity of the information stored within the locked memory location. In the instant invention, LBLOCK is true for both lock and unlock types of RMWs and is used in conjunction with LBSHBC to specify the lock/unlock function during a RMW cycle. LBSHBC is false (equal to ZERO) for the lock RMW operation and true (equal to ONE) for the unlock RMW operation. MREF must also be true for both lock and unlock RMW requests since a memory reference is being performed. LBWRIT specifies whether a given RMW operation will read or write memory as described above since LBWRIT specifies the direction of the transfer being performed, e.g., from master to slave or from slave to master.

As a further explanation, the lock referred to is implemented by a flip-flop within the memory, the condition of which is determined by the bus cycles which set or reset the lock. The lock may be set as part of a write cycle or a read request and may be reset in a similar manner. Once a lock is set, a unit attempting a WRITE, TEST and SET LOCK, or a READ, TEST and SET LOCK will be given a NAK response from that unit. Units which do normal write or read cycles will be unaware of the condition of the lock and will receive ACK, NAK, or WAIT responses as will be discussed below.

The signal CPPROC when true (H) indicates to cache/MMU that the current memory request must be checked for execute protection validation. This relates to the previously discussed concept of ring numbers and involves an access hierarchy established within the system wherein certain memory locations are accessable for read only, for read and write by only certain systems elements, or for access only under certain specified conditions. The general concept of restricted access to particular information or memory locations is well-known in the data processing art and does not comprise a specific feature of the instant invention. It is sufficient to understand that if a request is made for a memory access by a requestor not permitted to access the requested location, the memory will indicate that a protection violation has occurred and pass an error indicator to the requesting unit. Again, further information concerning protection violations as they relate to ring numbers is set forth in the above-referenced U.S. patent application.

The first 3 bits of the local bus command lines LBCMD are supplied to the local bus by one of the CPU, SIP, or CIP and suppied to channel number decoder 421. Within a central subsystem, the cache/MMU will use a 3-bit (local) channel number related to the corresponding 10-bit (system) channel number. Thus, for example, the CPU could be referred to by local bus channel number 000, SIP by 001, CIP by 010, cache/MMU by 011, and a reference to a unit coupled to the megabus by a common local bus channel number 111. As can be seen, channel number decoder 421 will indicate to instruction decoder 415 that either the cache or the megabus is the destination unit and will also indicate to the control logic 417 that either the cache, megabus, CIP, CPU, or SIP is the destination unit. Channel number decoder 421 also receives the 3 least significant bits of a megabus address, BSAD15:3 from megabus channel number decoder 422 when either a request or response is being transmitted to the cache/MMU by a unit on the megabus.

LBCMD3:6 supplies command code decoder 423 with the command code generated by the CIP, SIP or CPU or a command code supplied by megabus command code drivers 425 (BSAD18:6) to decoder 423. The command code decoder 423 is capable of supplying one of six outputs to control logic 417 indicating the function requested to be performed. The commands include LSDSCR, requesting a load of a segment descriptor assembled by the requesting processor into the segment descriptor table of the cache/MMU, LDSGBR, requesting a load of the segment base register, LDMDER requesting a load of a selected bit of segment descriptor into the cache/MMU's mode register, XLTADR requesting a translation of a virtual address to a physical address, without the performance of a memory access, and the transmission of thetranslated address back to the requestor, IIVCTR requesting the unload of the interrupt vector to the CPU, and LVLCHG requesting a load of the interrupt level register.

A precise understanding of the exact operations performed in response to a decoded function is not required for an understanding of the purpose and operation of the instant invention.

Control logic 417 also receives an input from MMU error logic module 427. In general, the output of module 427 reflects the occurrence of a request for a resource currently unavailable to the data processing system or the occurrence of a memory protect violation. As an example, if the CPU requests a read from the system memory of an address that is not included within the system memory, then that address is said to be unavailable to the CPU and the system memory will indicate this through the signals UARL (left word unavailable) and UARR (right word unavailable). Similarly, if a violation of the priority ring structure has occurred as a result of a prohibited request by a CIP, SIP or CPU, then this will be indicated by the PROV (protection violation) signal.

Control logic unit 417 also receives inputs directly from the FIFO (FIG. 12) reflecting transfers from the megabus to the cache/MMU and directed to elements within the central subsystem. These inputs are shown as outputs of the FIFO as FIMREF, FIBYTE, FIWRIT, FISHBC, FILOCK, FIDBPL, FIDBWD, FIREDR, FIREDL, and FIYELO. The functionalities of some of these signals have not been discussed: it should be noted, however, that the functionality FIBYTE AND FIDBWD correspond to the meanings BYAD and DBLW, respectively, as discussed with relation to the local bus. The signals FIREDR, FIREDL, and FIYELO together define the integrity of data being transferred in that same bus cycle. FIREDL, when true, indicates that the accompanying transferred data is in error. This signal is used by the system memory on a response to a read to indicate an uncorrectable error in the left most word returned (if two words are returned in parallel). If only one word is returned, it is considered to be the left most word. FIREDR, when true, also indicates that the accompanying transferred information is in error. This signal is used by the memory on a response to a read request to indicate an uncorrectable error in the right most word returned (if two words are returned in parallel). An example of an error that would cause FIREDR and FIREDL to be true would be an uncorrectable parity error in the appropriate words of returned data. FIYELO, when true during a second-half bus cycle, indicates that the accompanying transferred information is correct, but that an error correction operation has been performed. It thus designates a soft failure such as a corrected parity error and is taken to mean that maintenance action should be considered before the failure becomes uncorrectable. When an EDAC (error detection and correction) memory is used, then FIYELO, when true, indicates that a single-bit parity error, for example, had been detected and corrected by the memory.

The function of FIDBPL (double pull) will be discussed later and, in general, signifies that instead of two words being transferred in parallel during one bus cycle, two bus cycles must be employed to transfer single words in succession.

The outputs of control logic unit 417 include what are indicated to be cache control signals CACNTRLO:10. These signals are the same status signals as the above-described FICNTRLO:10 signals and comprise CAMREF, CABYTE, CAWRIT, CASHBC, CALOCK, CADBPL, CADBWD, CAREDR, CAREDL, and CAYELO which are transferred by the megabus adapter shown in FIG. 12 to the megabus.

The data-coming-now outputs DCNNCP, DCNNSI, and DCNNCI signify that a response cycle is being directed by the cache/MMU to the CPU, SIP, or CIP, respectively. When received by their respective processors, these signals serve as enables to clock the transferred data, address, and control signals into the appropriate registers in the processor units.

The LBINTEGRITY line shown in FIG. 11 collectively refers to signals LBREDR, LBREDL, LBYELO, LBUARL, LBUARR, and LBPROV transmitted to CIP, SIP, or CPU to indicate the condition of the transferred data.

Signal INPNDG is transmitted solely between the cache and the CPU and indicates to the CPU that an interrupt of higher priority than the current interrupt priority level has been accepted by the cache/MMU. Signals MYCHN1 and MYCHN2 are transmitted from the cache/MMU to the CPU to inform the CPU of the channel number assigned to it. These lines represent, respectively, the 21 and 22 outputs of a HXRTRY siwtch (hexadecimal rotary switch) located in the cache/MMU defining, as mentioned above, the manually assigned channel numbers of the cache/MMU and its associated processors.

The signal LBACKR generated by control logic 417 transmits the well-known ACK and NAK signals between the units on the megabus or the cache/MMU and the CPU, SIP, or CIP. LBACKR is a binary signal having two states wherein one state signifies an ACK and the other state a NAK.

The final signal shown in FIG. 11 is LBLKNC which has significance only during locked memory read request to the system memory. When LBLOCK is true and an addressed memory location is resident in the cache, LBLKNC instructs the system memory not to conduct an actual read operation requested but to set/reset its lock flip and transmit data back from the cache/MMU. Since the system of the instant invention can include different types of memory modules (as will be discussed hereinafter), the exact response of the memory module to a LBLKNC will vary.

Figure 13:
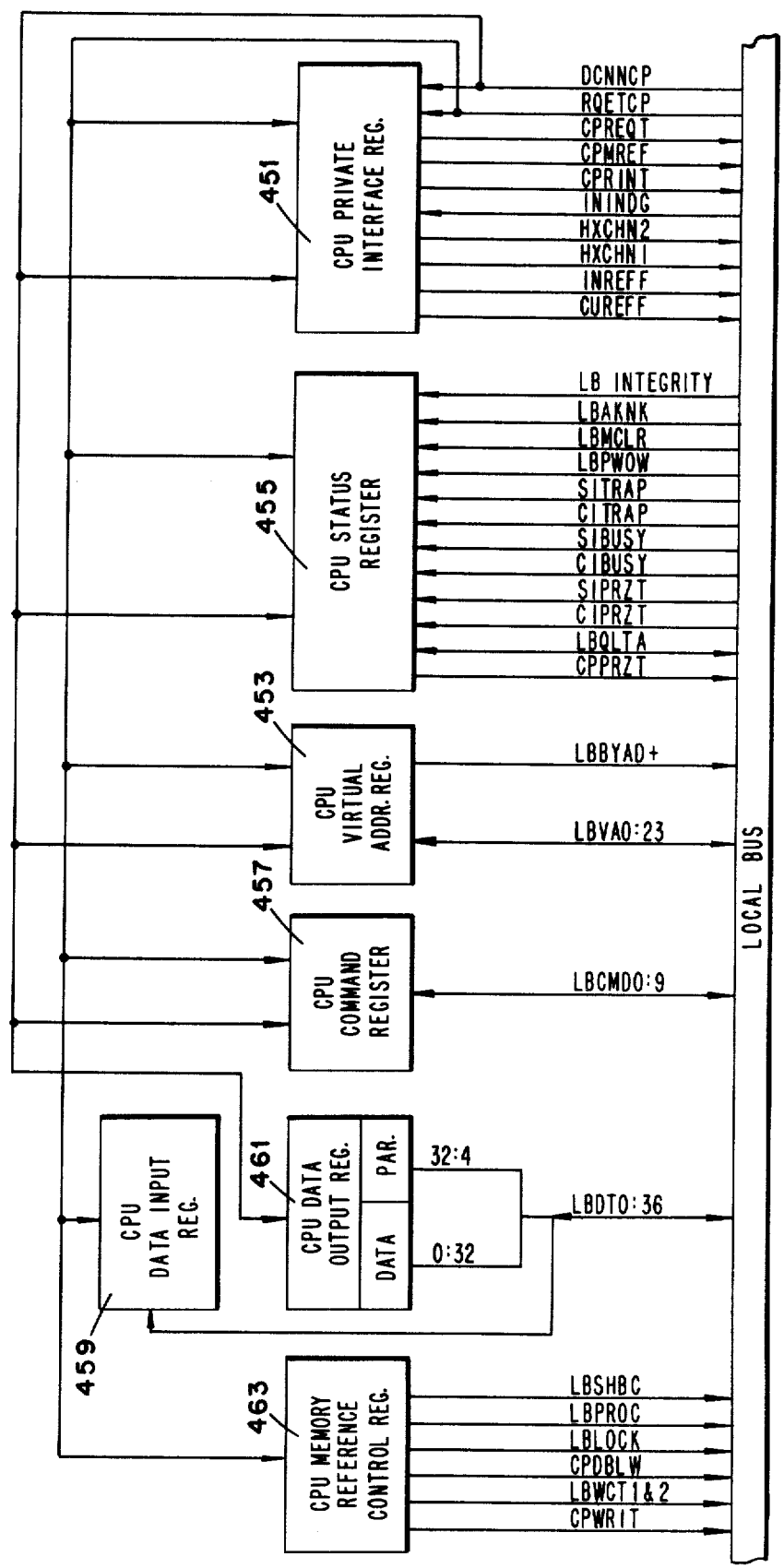
FIG. 13 is a block diagram illustrating the registers in the central processor unit for interfacing with the local bus.
Figure 14:
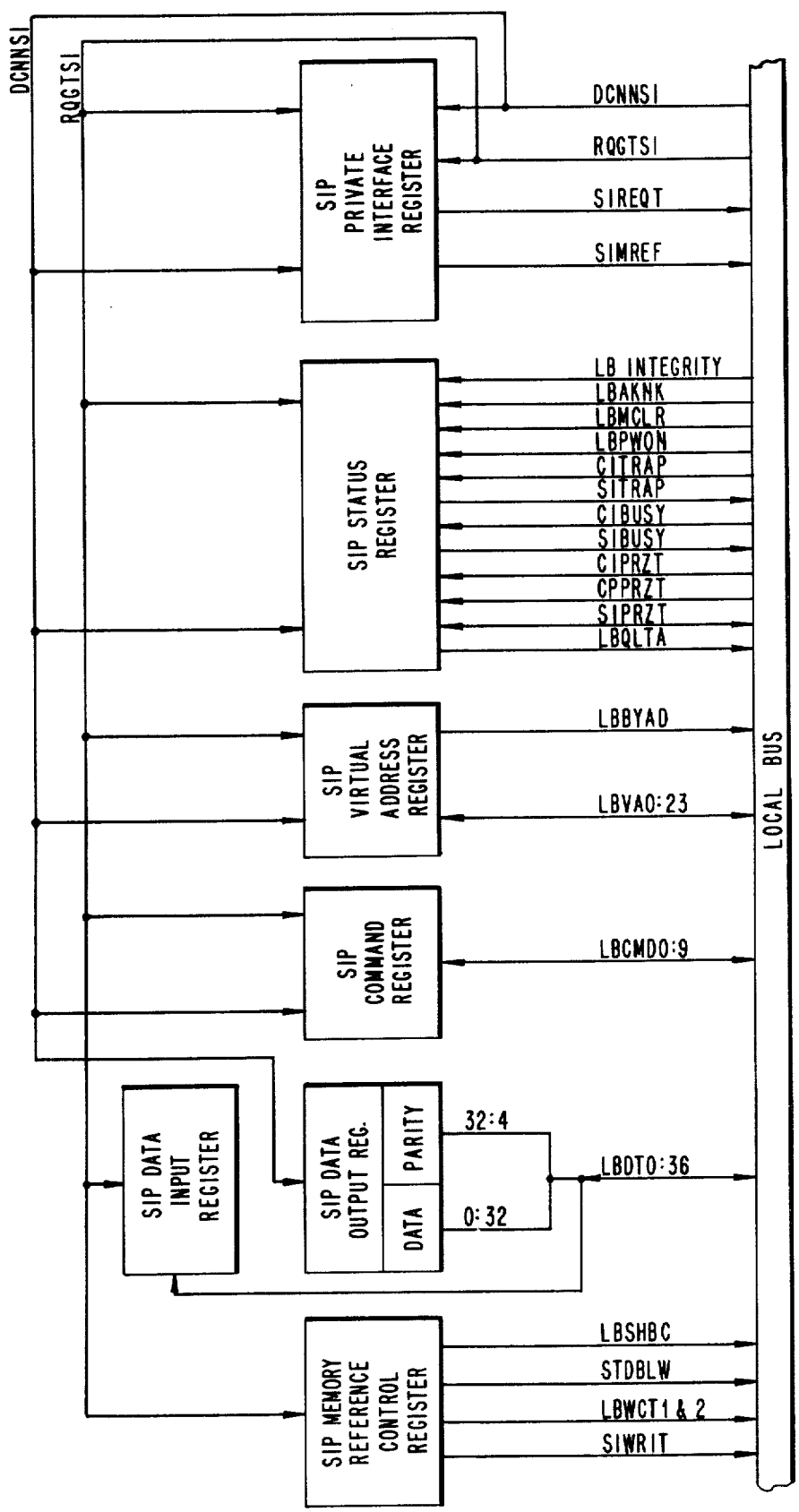
FIG. 14 is a block diagram illustrating the registers in the commercial instruction processor for interfacing with the local bus.
Figure 15:
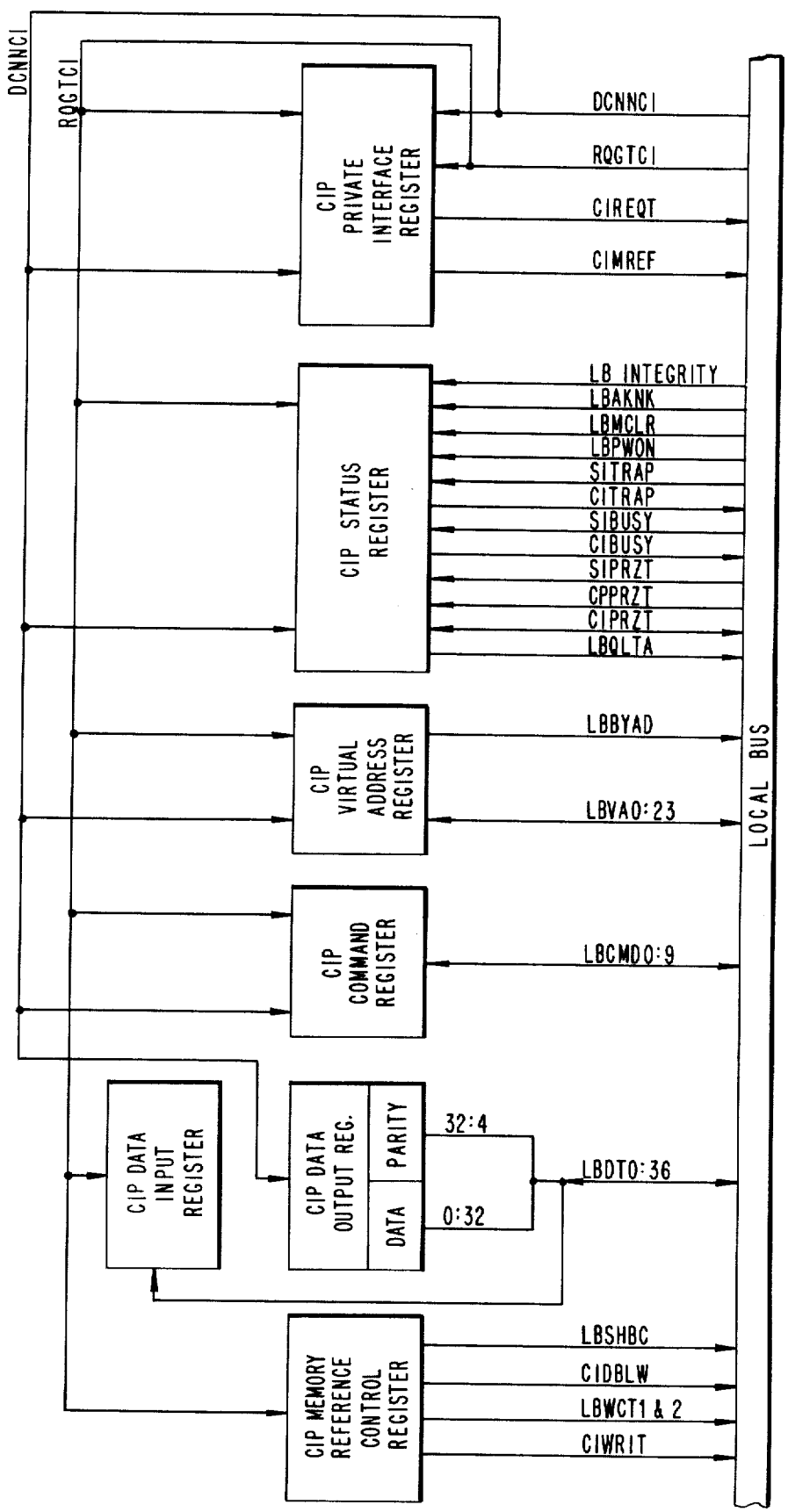
FIG. 15 is a block diagram illustrating the registers in the scientific processor for interfacing with the local bus.

FIGS. 13, 14 and 15 show in block diagram form the interface of the CPU, CIP, and SIP, respectively, to the local bus. An in-depth discussion of the structure of the CPU was set forth in the preceding section 1 of the detailed description of the invention and will not be repeated here. It is sufficient for an understanding of the present invention to consider only the interfacing elements shown in FIGS. 13–15.

Referring to FIG. 13, the CPU interface includes private interface register 451 which receives the signals RQGTCP and DCNNCP transmitted over the local bus to the CPU by the local bus adapter. RQGTCP serves as an enable signal to initiate a transfer of information from the CPU to a destination unit during a particular bus cycle. The signal DCNNCP enables the interface elements in FIG. 13 to receive information over the local bus.

The definitions of the signals received and/or transmitted by the registers shown in FIG. 13 have been previously discussed with the exception of the output of CPU virtual address register 453. The register receives and transmits 23 address bits labelled CPVADR0:23 corresponding to either a virtual address when a memory reference is being initiated by the CPU or a destination channel number when an I/O or other communication to a non-memory unit is being requested. The output CPBYAD is a single-bit signal indicating whether byte 1 or byte 2 of a data word is being referred to.

The CPU status register 452 receives mostly input signals to inform the CPU of the condition of the other elements in the system. The status register reports the presence of an operational CPU in the system by CPPRZT.

CPU command register 457 generates the nine-bit commands including a three-bit local channel number and six bits of command data. Since the CPU can both receive and transmit data, it includes both a CPU data input register 459 and a CPU data output register 461. As illustrated by CPU data output register 461, thirty two bits of data go into a data receiving portion and 4 parity bits are transmitted to a parity bit portion. This same facility, i.e., the four parity bits is duplicated in CPU data input register 459 and, in fact, is included in any element in the system that transmits or receives two data words simultaneously. Finally, CPU memory reference control register 463 generates the information which describes the type of operation being requested by the CPU and defines the bytes within an addressed data word that are to be accessed.

FIGS. 14 and 15 illustrate, in block diagram form, the local bus interfacing portions of the CIP and SIP. Details, beyond these presented in FIGS. 14 and 15, concerning the numerous other elements which are included within the CIP and the SIP are not necessary to an understanding of the purpose, construction, and function of the instant invention and are well understood by one of ordinary skill in the art.

Referring to FIG. 14, the request granted signal to the CIP (RQGTCI) signals that a bus cycle has been granted to the CIP and enables transfer of information over the local bus. The signal DCNNCI informs the CIP that a bus cycle is being directed to it and that the data is being transferred in the bus cycle. Thus, DCNNCI enables the registers in the interfacing portion of the CIP to accept information transferred over the local bus.

FIG. 15 shows in block diagram form the interfacing apparatus within the SIP for receiving and transmitting information to other elements in the system over the local bus. As herein embodied, the signal RQGTSI, as generated by the request granted register and transferred to the SIP over the local bus, enables the SIP to transfer information to the local bus from the registers depicted in FIG. 15. The signal DCNNSI, which accompanies an information transfer to the SIP, enables the illustrated registers to accept the information from the local bus.

FIG. 12 depicts, in block diagram form, the portion of the cache/MMU which interfaces a central subsystem with the megabus. This megabus interfacing portion, the megabus adapter, supplies the above-referenced outputs from the FIFO memory, the 32 bits of data transferred from the megabus, MBDTO:32 and the transferred megabus address FIADO:24. Similarly, the data transferred from the local bus LDTRO:32, the local bus address LBADO:24, and the control signals, e.g., CAMREF, CABYTE, CAWRIT, etc. generated by control logic 417 (FIG. 11) are transferred by means of the apparatus depicted in FIG. 12 to the megabus.

Figure 16:
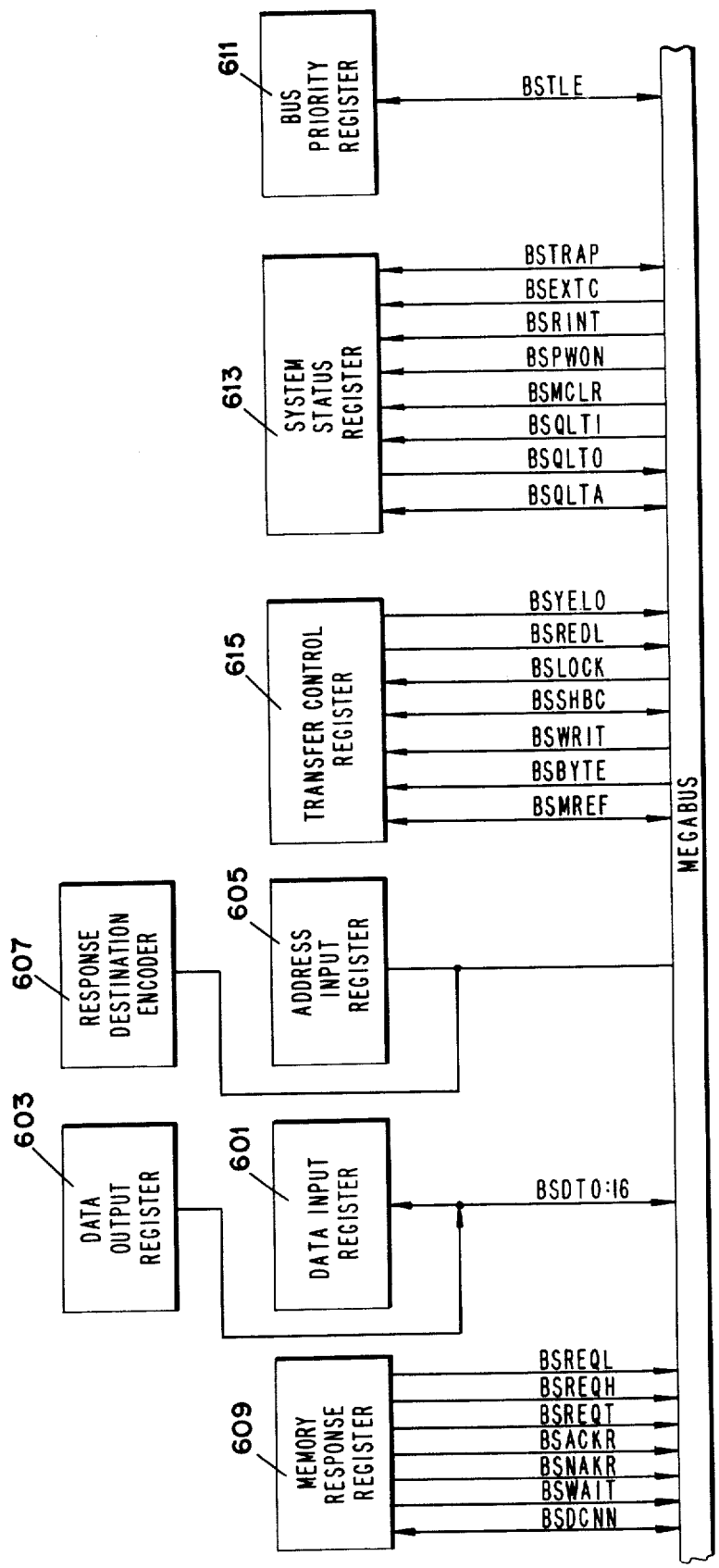
FIG. 16 is a block diagram illustrating the registers within a single-width, single-pull memory module for interfacing with the megabus.
Figure 17:
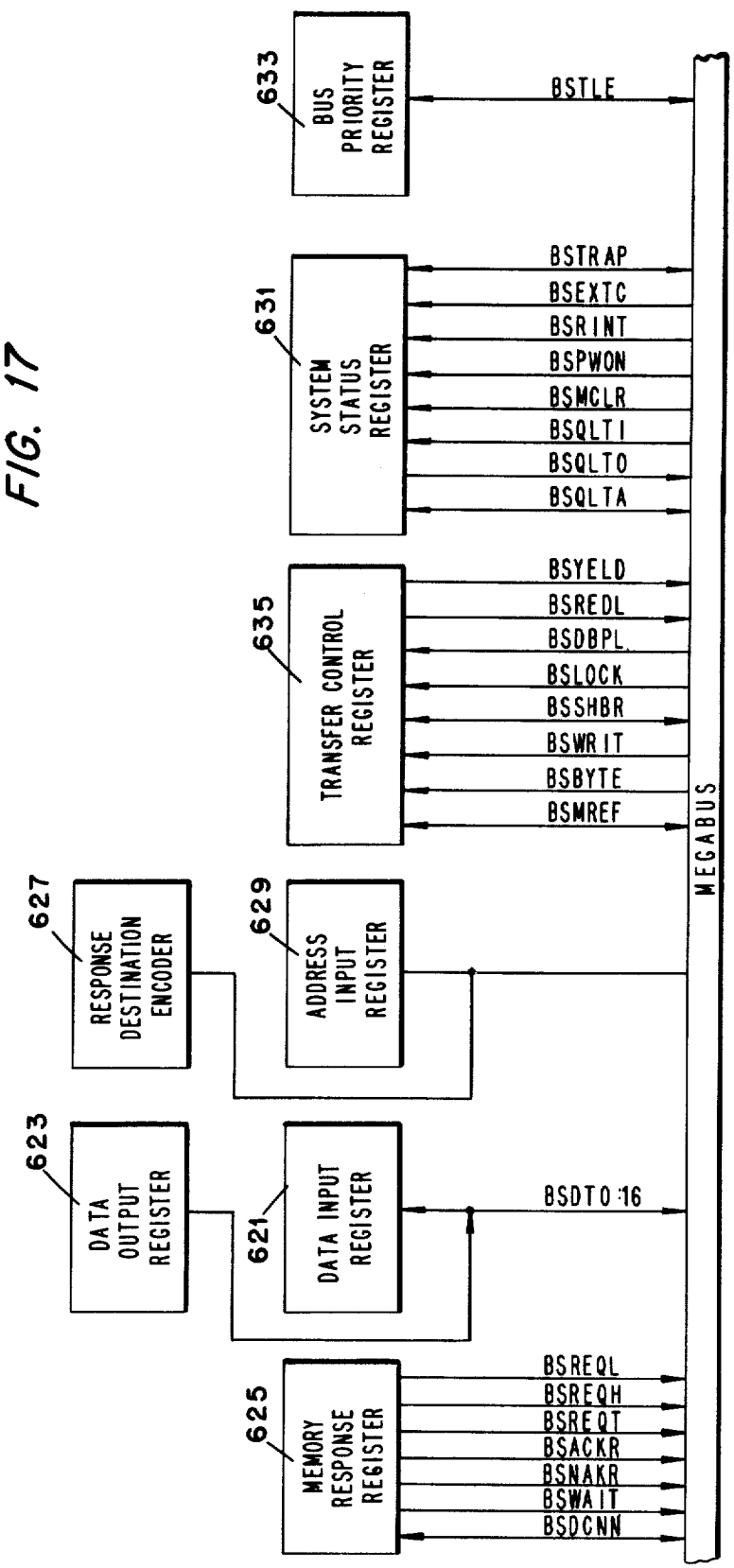
FIG. 17 is a block diagram illustrating the registers within a single-width, double-pull memory for interfacing with the megabus.
Figure 18:
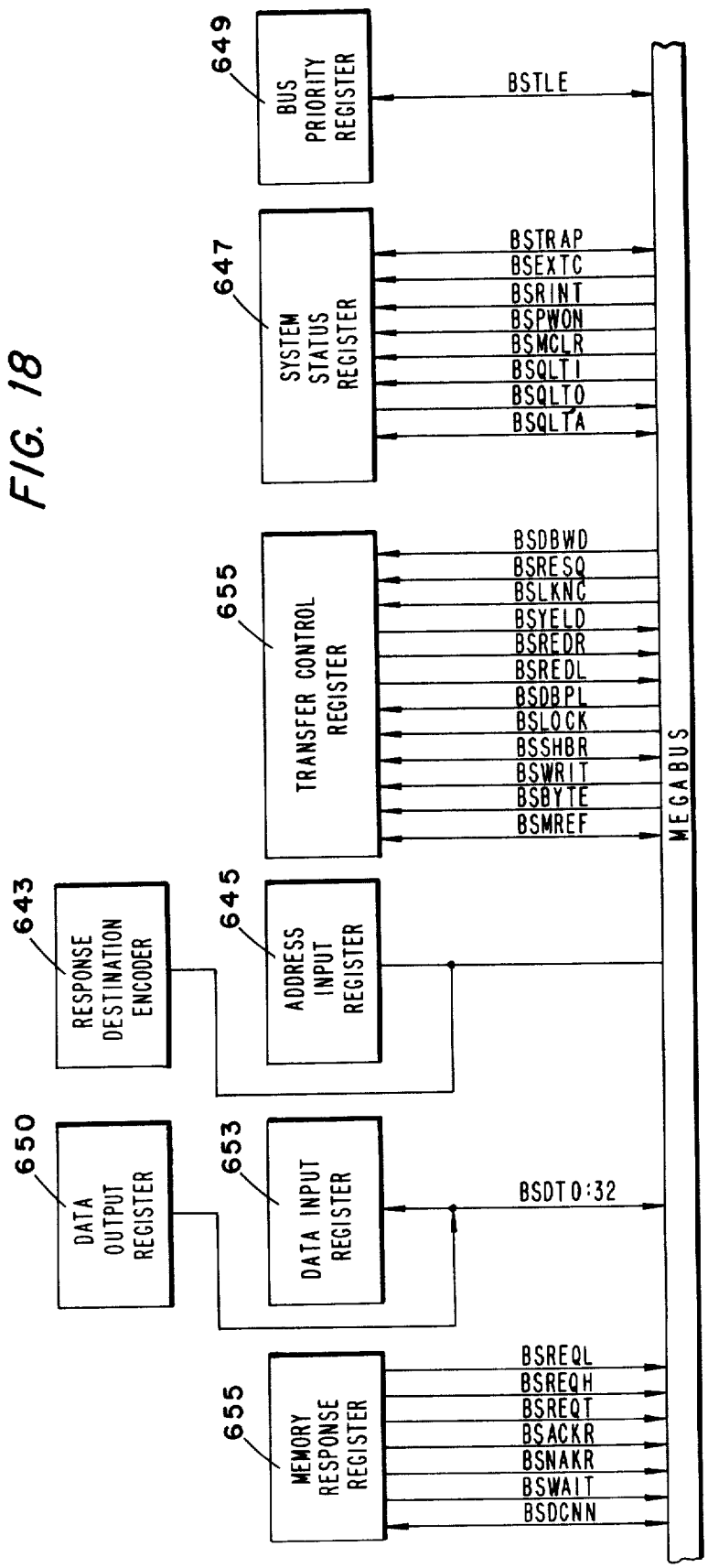
FIG. 18 is a block diagram illustrating the registers within a double-wide memory for interfacing with the megabus.

Before considering the details of FIG. 12, certain portions of FIGS. 16–18 should be considered since these figures depict in block diagram form the interfacing portion of memory modules 106 suitable for use in the instant data processing system. As explained above, the local bus has the capacity of transferring 32 bits of data in parallel within a central subsystem. Similarly, the megabus can bidirectionally transfer 32 parallel bits of data. It is a feature of the system, however, that the megabus can interface with memory modules or other processing units that have the capacity of only transferring 16 data bits in parallel. Thus, if a central subsystem directs 32 bits of data during a bus cycle to the cache/MMU 103 for transfer over the megabus to a memory module 106 and the destination memory module is capable of only receiving 16 bits in parallel, as in FIGS. 16 and 17, the cache/MMU, and particularly the megabus adapter, will generate two bus cycles and transfer 16 bits in each cycle. Similarly, if a 16-bit memory module is responding to a read request of two words or 32 bits, the megabus adapter will issue two megabus cycles to the transferring memory module in order that all 32 data bits requested will be transferred and assembled into a 32-bit parallel data field.

Referring to FIG. 12, the megabus 501 transfers the 32-bit bus of data BSDT (plus 4 parity bits), a 24-bit bus address BSAD (plus 1 parity bit), and numerous control signals to a transceiver network 503. When one of the units on the megabus is transferring information via the megabus to the megabus adapter of a particular central subsystem, the transceivers 503 enable, for example, the transfer of the 32 bits of data BSDT to FIFO 505. When, however the transfer is from the cache/MMU to a megabus unit, the 32 bits of data LDTRO:16 and MYDTO:16 are transmitted by transceivers 503 to the megabus data lines BSDT. As a further example, control signal BSBYTE transferred from a megabus unit over the megabus to the cache/MMU will be transmitted by transceivers 503 to the FIFO. On a central subsystem output, the corresponding signal generated within the central subsystem, i.e., CABYTE, will be coupled to the BSBYTE line of the megabus 501 by the transceivers 503.

Many of the control signals included within the megabus are duplicates of the previously explained local bus control signals and, therefore, an understanding of the meaning of these signals will be immediately apparent from the above discussion. These signals include BSREQT, BSDCNN, BSWAIT, BSLKNC, BSQLTA, BSMCLR, BSPWON, BSRINT, BSTRAP, BSDT, BSAD, BSMREF, BSBYTE, BSWRIT, BSSHBC, BSLOCK, BSDBWD, BSREDR, BSREDL, and BSYELO. The remaining control signals will be discussed in greater detail.

The signal BSREQH indicates a high priority bus request from a high priority unit on the megabus. When true, the signal indicates that one or more units in a high priority group on the megabus have requested a bus cycle. When false, the signal indicates that there are no requests pending from the high priority units. The signal BSREQL when true indicates that one or more units in a low priority group on the megabus have requested a bus cycle. Similarly, when false, the signal indicates that there are no requests pending from a low priority unit.

The concept of the units on the megabus being grouped into a high priority group and a low priority group does not form a part of the instant invention. It is well-known in the art that particular units will be assigned different priority levels according to the design of a data processing system. For instance, a central processing unit will normally be granted a low priority and a memory unit will be granted a high priority. Such a priority scheme insures that whenever the memory unit is capable of transferring data in response to a memory read, a bus cycle will be granted to the memory before a bus cycle will be granted to the central processing unit. The rationale behind such a scheme is that the central processing unit issued the memory read and will be waiting for the requested information.

The data line BSTIE represents a further group of priority signals employed by the megabus adapter to arbitrate among requests for megabus cycles and to determine which unit on the megabus will be granted the next megabus cycle. The group of signals represented by the line BSTIE include BSIUOK, BSHUOK, BSGUOK, etc., which are passed along the megabus on dedicated lines so that each megabus unit can request a megabus cycle or can grant access to itself in an ordered manner. A suitable apparatus and method for performing the tie-breaking routines to enable an ordered system of accessing amongst the megabus units and the cache/MMU is set forth in detail in U.S. Pat. No. 4,050,097 issued to Miu et al on Sept. 27, 1976 and entitled SYNCHRONIZATION TECHNIQUE FOR DATA TRANSFERS OVER AN ASYNCHRONOUS COMMON BUS NETWORK COUPLING DATA PROCESSING APPARATUS. This patent is assigned to the assignee of the instant invention and the disclosure therein is hereby incorporated by reference. Since the precise operation of the tie-breaking apparatus within the cache/MMU and the megabus units is not necessary to a complete understanding of the subject of the instant invention, the disclosure in the Miu et al patent will be relied upon for the details of the timing sequences and operational elements employed within the tie-breaking apparatus and such details will not be further explained herein.

Signals BSACKR and BSNAKR correspond to the previously explained values of the signal LBACKR. Thus, BSACKR indicates that a slave has accepted a transfer from a master and, for example, could be issued by a memory module following a read or write request directed to it by one of the central subsystem processors through the cache/MMU. Similarly, BSNAKR indicates that the slave is refusing the transfer for reasons which may be specific to the particular slave unit. In general, BSNAKR is made software visible so that specific actions to be taken becomes a software decision. Where the signal is used to indicate that the slave unit is busy, the implication is that the busy condition will persist for a relatively long period of time.

In addition to an addressed slave unit issuing a BSACKR, BSWAIT, or BSNAKR, there exists the additional possibility that the slave will not issue any response whatsoever. Thus, if several microseconds lapse from the issuance of a BSDCNN by the megabus adapter indicating that a data transfer is being conducted to the slave unit during a particular bus cycle and no response is forthcoming from the slave, the presumption is that the addressed slave does not exist within the system. Each system will contain at least one dead man timer per bus, i.e., local bus or megabus, which will issue a NAK on behalf of the missing slave. This will clear any hangup which would otherwise result. The provision and operation of a dead man timer is well-known in the data processing art.

As further explanation of a BSWAIT response, a master having received a BSWAIT response will compete for the very next bus cycle via the above-reference tie breaking network. The master with a high positional priority can capture every single bus cycle except for those from higher priority units until a non-WAIT response is received.

Before discussing the functionalities of the remaining megabus signals, the relationship of FIGS. 16, 17, and 18 to FIG. 12 will be discussed.

FIGS. 16-18 show the interfacing portions of three different types of memory modules which may be coupled to the megabus for interfacing with the cache/MMU and the central subsystem. FIG. 16 illustrates, in block diagram form, the registers within a single-width, single-pull memory module. As embodied herein, a single-width, single-pull memory comprises a memory capable of receiving and transmitting 16 data bits in parallel and of issuing only one second-half bus cycle in response to a memory read. The interfacing device shown in FIG. 16 includes a data input register 601, data output register 603, address input register 605, and response destination encoder 607. As described above, when a unit coupled to the megabus, e.g., the central subsystem, requests a memory read of a single-width, single-pull memory, 24 bits of address information, BSADO:24 are transmitted to address input register 605 and the channel number of the requesting unit is transmitted on leads BSDTO:32 to data input register 601. The memory module will attempt to read the designated location and if successful will direct the requestor's channel number into the address field BSADO:24 by means of response destination encoder 607, and will couple 16 bits of data into the data output register 603. The memory module will request a bus cycle by means of the memory response register 609 causing BSREQT to be true and, if the module secures a bus cycle by means of the tie-breaking circuit and signals BSTIE received and transmitted by the bus priority register 611, the data in output register 603 and the destination channel number in response destination encoder 607 will be transferred onto the megabus. The interfacing apparatus for a single-width, single-pull memory as depicted in FIG. 16 further includes system status register 613 and transfer control register 615 for receiving and transmitting, as indicated therein, the various signals for controlling the operation of the memory module vis-a-vis its interface with the megabus. The functionality of BSQLTO, BSQLTI, and BSEXTC will be subsequently discussed.

FIG. 17 illustrates, in block diagram form, the interfacing device for what is called a single-width, double-pull memory which may also be coupled to the megabus. This type of memory module operates in essentially an identical way as the memory module of FIG. 16 in that it receives and transfers 16 bits of data in parallel by means of its data input register 621 and data output register 623. Also, the memory response register 625 is sensitive to the exact same signals as the memory response register 609 of the memory module depicted in FIG. 16. Similarly, the response destination decoder 627, address input register 629, systems status register 631, and bus priority register 633 receive and transmit the same signals as do their counterparts in FIG. 16. The significant difference between the single-width, single-pull memory module of FIG. 16 and the single-width, double-pull memory module of FIG. 17 is found in the transfer control register 635. Besides having all of the inputs and outputs of the transfer control register 615 of the memory module in FIG. 16, the transfer control register 635 of FIG. 17 receives the additional signal BSDBPL which, when true, causes the single-width, double-pull memory module to generate two second-half bus cycles in response to a read request unless the requested addresses straddle a memory module boundary or the second address is not physically present in the system memory. Thus, instead of merely transmitting one 16-bit word in response to a read request, the single-width, double-pull will, when BSDBPL is true, transfer in succession two 16-bit words each associated with a different second-half bus cycle. The advantages of being able to transmit in single-width, double-pull mode will be readily apparent to one of ordinary skill in the art since they decrease the overhead of memory requests by enabling a single memory request to initiate the transfer of two data words.

FIG. 18 illustrates, in block diagram form, an apparatus to be used to interface a third type of memory module with the megabus. This type of memory module is called a double-width memory and is capable of double-width, single-pull operation (the transfer of 32 bits of data in parallel during one bus cycle).

The signals transmitted between the megabus and the memory response register 649, response destination encoder 643, address input register 645, systems status register 647, and bus priority register 649 in the double-wide memory shown in FIG. 18 are identical to corresponding signals in the memory modules depicted in FIGS. 16 and 17. Differences are, however, present in the data output register 651, data input register 653, and transfer control register 655.

First, the data output register 651 and data input register 653 are now capable of handling 32 bits of data in parallel. Also, three additional signals are transmitted between the megabus and the transfer control register 655 then are transmitted in the interfacing device of FIG. 17. These signals are BSLKNC, BSRESQ, and BSDBWD. The functionality of BSLKNC has been previously discussed with reference to the local bus and the signal LBLKNC. The signal BSDBWD when true indicates that the memory request involves 32 bits of data in parallel either to be written into the memory module or to be read from the memory module. The transfer control register 655 of a double-width memory module further receives and transmits the signal BSRESQ which will be driven true by a responding memory module that is capable of 32-bit parallel data transfers in conjunction with BSACKR to indicate to the memory-requesting device that the memory has the capability of accommodating 32-bit wide data transfers.

It is a feature of the present invention that the megabus adapter enables a central subsystem to communicate with any of the three types of memory modules discussed in relation to FIGS. 16, 17, and 18. This facility is accomplished without the CPU, SIP, or CIP having to recognize or account for communication with any particular type of memory module. Thus, if the CPU requests a double-wide read of the system memory, the megabus adapter will respond with the 32 bits of data requested regardless of whether they are stored in a single-width, single-pull memory, a single-width, double-pull memory, or a double-width memory. This is accomplished by the megabus adapter generating and recognizing particular values of the control signals BSDBPL, BSDBWD, and BSRESQ in the following manner along with the other control signals.

If one of the central subsystem processors requests a read of two words in parallel, it will supply the memory word address in bits 0–24 of the local bus address field (LBAD) and its own channel number will be placed in bits 0–9 of the local bus data field (LBDT). Signals CASHBC, CAWRIT, CADBPL, and CADBWD will be set to ONE, CAMREF will be set to ZERO, and CABYTE will be set to either ZERO or ONE. The cache/MMU will, by means of transceiver 503, transfer the signals including the address, data field, and control signals supplied from the local bus to the megabus and issue a bus cycle transferring the data to the addressed memory module.

If the addressed memory location is in a single width, single-pull memory module, the memory response will be to place the requesting channel number in bits 8–17 of the address field BSAD and one word of data (16 bits) in bits 0–15 of the data field BSDT. BSMREF, BSWRIT, BSDBPL, BSDBWD, BSLOCK, and BSLKNC will be set to ONE, BSSHBC will be set to ZERO. The megabus adapter will recognize from the combination of control signals received back from the memory module that only 16 bits of data have been returned and will issue another memory read after incrementing the previously transferred address by ONE in order to obtain the other 16 bits of the requested data.

If the responding memory module is a double-width memory module, the response will differ in that the data field BSDT will include 32 bits of data, BSDBWD will be set to ZERO, and BSDBPL will be set to ONE. The cache/MMU will recognize that the memory request has been completed and will transfer the data to the requesting unit via the local bus.

If the read request was for two 16-bit words to be transferred sequentially, the memory request will be the same as the memory request for the two words in parallel but CADBPL will be set to ONE. A single-width, single pull memory will respond by placing the channel number of the requesting processor into bits 8–17 of the address field BSD and one word of data in bits 0–15 of the data field, BSDT. BSMREF, BSWRIT, BSDBPL, BSDBWD, BSLOCK, and BSLKNC will be set to ONE, BSSHBC will be set to ZERO, and BSRESQ will be ONE because the single-width, single-pull memory module does not receive the BSRESQ signal line. The cache/MMU upon receiving the response from the memory module will again realize that only one word of data has been transferred whereas two words were requested, and will thus increment the previously requested address, request that the data at the new address be supplied, and, once supplied with the remaining 16 bits, will assemble a 32-bit word to be transferred to the requesting processor.

The single-width, double-pull memory will transfer the requesting unit's channel number in bits 8–17 of BSAD, one word of data in bits 0–16 of BSDT and set BSMREF, BSWRIT, BSDBWD, BSLOCK, and BSLKNC to ONE and BSSHBC and BSDBPL to ZERO. The module will then transfer a second-half bus cycle, with the same address field, the next requested word of data in bits 0–15 of BSDT, and the same values for the control signals except that BSDBPL will be set to ONE.

A processor can also request that two words be read either in parallel or sequentially. The processor would set bits 0–22 of the LBAB to the memory word address and place its own channel number in bits 0–9 of the data field, LBDT. CASHBC, CAWRIT, CALOCK, and CALKNC would be set to ZERO and CADBPL, and CADBWD would be set to ONE.

The megabus adapter transfers the request to the megabus and the addressed memory module responds. If the responding memory module is a single-width, single-pull memory module, its response will be to place the requesting channel number in bits 8–17 of BSAD and one word of data in bits 0–15 of BSDT. The control signals would be set to the same values as referred to with regard to the request to read two words in parallel. Again, the megabus adapter recognizes from the returned values of the control signals that only one word of the two words of data requested had been supplied and generates an appropriate read request to the same memory module to obtain the next addressed word of information. Upon receiving both words of information, the megabus adapter would transmit them via the local bus to the requesting unit.

If the responding memory module was a double-width module, it would respond in exactly the same manner as it did for the request to read two words in parallel and would set BSRESQ to ONE.

A single-width, double-pull memory would respond in the same manner as it did to the request for reading two words sequentially.

The instant apparatus is also capable of performing 7 types of non-locking write cycles. In each of the write request bits 0–22 of the bus address field BSAD are set to the memory word address to be written. If a byte of data is to be written into beginning at that address, byte 24 of the address field BSAD is set to 0, bits 0–7 of the data field BSDT is set to the data to be written, BSMREF, BSWRIT, and BSBYTE are set to ZERO and BSSHBC, BSDBPL, BSDBWD, BSLOCK, and BSLKNC are set equal to ONE. All three types of memory modules are capable of performing this write and will either generate a BSACKR or a BSWAIT. BSRESQ will be equal to ZERO.

In the second type of write, the right-hand byte of the word addressed by the memory address in address field BSAD 0–22 is written. BSAD23 is set equal to ONE, bits 8–15 of BSDT contain the data to be written, BSMREF, BSWRIT, and BSBYTE are set equal to ZERO and BSSHBC, BSDBPL, BSDBWD, BSLOCK and BSLKNC are set equal to ONE. Again, all three types of memory modules are capable of performing this write request.

The third type of write is wherein bytes 0 and 1 of an addressed word are to be written into. The value of BSAD23 is not relevant, 16 bits of data are loaded into the data field in bits BSDT00-BSDT15, BSMREF, and BSWRIT are set equal to ZERO, and BSSHBC, BSBYTE, BSDBPL, BSDBWD, BSLOCK, and BSLKNC are set equal to ONE. This type of write is also performed in the same manner by all three types of memory modules.

In the fourth types of writes, the right-hand byte of word n and the left-hand byte of word n+1 are to be written. The address of word n is placed in BSAD0-BSAD22, BSAD23 is set equal to ONE, the data is placed in BSDT8-BSDT23, BSMREF, BSWRIT, BSBYTE, and BSDBWD are set equal to ZERO, and BSSHBC, BSDBPL, BSLOCK, and BSLKNC are set equal to ONE. Only the double-width memories are capable of performing this write operation in a single bus cycle and, if the addressed locations are included in a double-width memory, BSRESQ will be set equal to ZERO. The megabus adapter will recognize that no further action would be required in such a case. If the write had been directed to a single-width, single-pull memory or a single-width, double-pull memory BSRESQ will remain ONE because neither of these memories receives the signal line BSRESQ. In such an instance, the megabus adapter will recognize that only the right-hand byte of word n has been written and will issue another write request to write the left-hand byte of word n+1.

The fifth write request is wherein both bytes of word n and the left-hand byte of word n+1 are written. In this instance, the address of word n is placed in the address field BSAD00-BSAD22, BSAD23 is set to either ZERO or ONE, the data is placed in BSDT0-BSDT23, BSMREF, BSWRIT, and BSDBWD are set equal to ZERO, BSSHBC, BSBYTE, BSDBPL, BSLOCK, and BSLKNC are set equal to ONE. The memory will respond by setting BSRESQ equal to ZERO if it is a double-width memory and the addressed locations are included therein. If the memory is a single-width, single-pull or single-width, double-pull, BSRESQ will be set equal to ONE for the same reasons as in read type four and the megabus adapter will generate a new write request to write the left-hand byte of word n+1.

Write request type six calls for writing the right-hand byte of word n and both bytes of word n+1. The address of word n is placed in BSAD0-BSAD22, BSAD23 is set equal to ONE, the data is placed in BSDT8-BSDT31, BSMREF, BSWRIT, SBYTE, BSDBPL, and BSDBWD are set equal to ZERO, and BSSHBC, BSLOCK, and BSLKNC are set equal to ONE. Again, if the memory written is a double-wide memory, BSRESQ will be set equal to ZERO to indicate that all three bytes of data have been written in one bus cycle. If the writing memory is not a double-width memory, the megabus adapter will issue a second write request to write the two bytes of word n+1.

The final type of write request is for writing two words or 32 bits of data at one time. The address of word n is placed BSAD0-BSAD22, BSAD23 is set to either ZERO or ONE, the data is placed in BSDT0-BSDT31, BSMREF, BSWRIT, BSDBPL, and BSDBWD are set equal to ZERO, BSSHBC, BSBYTE, BSLOCK, and BSLKNC are set equal to ONE. As was the case in write types four-six, if the writing memory is a double-wide memory BSRESQ will be set equal to ZERO when the write is successful. If not, the megabus adapter will recognize from the value of the control signals that only the first 16 bits of data has been written into word n and, thus, it will generate a second write request for writing BSDT16-BSDT31 into word n+1. The need for a second write cycle will be apparent from BSRESQ being equal to ZERO.

Referring now back to FIG. 12, the signal lines BSQLTO and BSQLTI are included as part of the megabus and provide the capability of running internal logic test under certain conditions. A signal BSQLTO is initiated at the physical top of the system and enters the first unit on the bus as BSQLTI where it is logically combined by an AND gate with a signal that indicates that the particular unit has completed its logic test. From that unit, the output of the AND gate is sent to the next unit as BSQLTO where the process is repeated. The signal at the physical bottom of the system, when false, indicates that every unit in the system has completed its logic test successfully. Units which have no resident logic test must connect BSQLTI and BSQLTO together internally. The signal line BSQLTA runs the full length of the megabus and serves to carry the completed continuity and logic test signal from the bottom of the system to the control panel of the CPU wherein it is coupled to a suitable display. BSQLTA is normally false when all is operating correctly in the system but will be set true at the beginning of a logic test. A successful completion of all the quality logic tests in the system will return BSQLTA to false.

The signals BSEXTC and BSTIMR are miscellaneous signals employed in the megabus and do not relate specifically to the instant invention. RSTIMR is supplied by each power supply in the system to the circuit boards within a particular card-cage and provides a positive transition at the respective line frequency (60 Hz or 50 Hz). BSEXTC connects a block of five adjacent cards together and includes the provision to connect an external signal restricted to low frequencies.

The megabus adapter provides to a central subsystem the ability for the included CPU, SIP, and CIP to write and read the system memory as well as to transmit commands to other units on the megabus. The megabus adapter includes two almost indepedent data paths. The first data path allows a central subsystem to send information to the megabus. This is enabled by the inputs on the right side of the transceivers 503 transferring data (LDTR16:16 and MYDT0:16), an address (MYAD0:24), and control signals (CAMREF-CAYELO) to corresponding leads on the megabus. The second data path allows information directed to the central system and generated by units connected to the megabus to pass from the megabus to the local bus. This is accomplished by FIFO storage register having, for example, the capacity to store four 72-bit information records or transfers. FIFO 505 receives the megabus data BSDT00:36, megabus address BSAD00:25, and the megabus control signals BSMREF-BSYELO whenever an information transfer is directed to the central subsystem or a main memory write is performed. The information is written into the FIFO and no other immediate action is taken. This permits the local bus and the megabus to operate almost completely asynchronously which, as will be recognized by one of ordinary skill in the art, greatly increases the efficiency of both of the buses.

The information stored in FIFO 505 can be transferred to the local bus as data MBDT0:32, address FIAD0:24, and control signals FIMREF-FIYELO. As previously explained, cache data input multiplexer 401 (FIG. 11) receives the megabus data MBDT0:36, virtual address input multiplexer 405 receives the megabus address FIAD0:24 as transferred from FIFO 505, and the megabus control signals are transferred to control logic 417 as indicated by the common line FICNTRL0:10.

Write address register 507 records the loading of megabus information into FIFO 505 and read address register 509 records the transfer of information stored in FIFO 505 to the local bus adapter as shown in FIG. 11. Megabus write detector 511 receives the inputs BSWAIT, BSNAKR, BSACKR, BSDCNN, BSWRIT and BSMREF and, upon detecting a certain pattern in the signals, generates a load command to FIFO control 513. If the information last stored in FIFO 505 is to be saved, FIFO control 513 generates write control signals as represented by WRTINC and supplies them to write address register 507 to cause the next information transferred from the megabus 501 through the transceivers 503 to be stored in the next available address in FIFO 505. If, however, it is determined that the previously written information in FIFO 505 is not to be saved, the newly transferred information will be permitted to be written over the last-transferred information.

FIFO control 513 also generates a representative REDINC signal and supplies it to read address register 509 to control the transfer of information from FIFO 505 to the appropriate receiving units in the local bus adapter.

The types of information transfers stored in FIFO 505 are, for example, main memory writes directed to main memory module coupled to the megabus by another processing unit also coupled to the megabus. As stated above, the cache/MMU must be maintained up-to-date whenever such main memory writes are performed and, thus, the data is captured in FIFO 505 whenever megabus write detector 511 detects a main memory write. The captured information trickles down through the FIFO 505 and will initiate a request for a local bus cycle in order to be transferred to the local bus adapter to update, if necessary, the cache memory.

A second type of cycle that is captured by FIFO 505 is a test command originating by a processor unit coupled to the megabus and directed to the SIP or the CIP in the central subsystem. Such a test command when placed on the megabus resembles, in format, an I/O operation and will contain the channel number of the SIP or CIP to which it is directed. If the channel number is determined to be indicative of one located in the central subsystem, the information will be captured in FIFO 505. It will also cause a FIFO request to be sent over to the local bus and the transfer of appropriate information to the addressed CIP or SIP.

A third type of transfer captured in FIFO 505 is a memory response to a read request promulgated by the CPU, SIP, or CIP in a central subsystem. Such responses must be kept in a first-in, first-out order of information flow, and since a memory response takes the form of a second-half bus cycle on the megabus, it must be accepted by FIFO 505 and will cause a FIFO request to be sent to the local bus adapter and hence to the requesting processor and the cache memory.

Another feature of FIFO 505, megabus write detector 511, and FIFO control 513 is that they will operate to force the local bus adapter to transfer information from FIFO 505 to the cache memory or local bus processor in order to insure that the storage capacity of FIFO 505 is not exceeded. This is accomplished by the megabus adapter taking control of the cache memory away from the local bus and generating the commands necessary to do updates in the cache corresponding to previously detected main memory writes by processing units outside of the central subsystem. These cache updates are performed as many times as are necessary to empty the FIFO or detect that the FIFO no longer contains information corresponding to a main memory write. The reason that the FIFO 505 could be overflowed is that the priority of a central subsystem coupled to the megabus may be set low compared to other processing units on the megabus and, thus, the megabus adapter may be attempting to gain access to the megabus for an extended period of time during which numerous megabus information transfers could be stored in FIFO 505. The signal FIFOMT when false indicates that the FIFO is not empty and is supplied to the request arbitration network to cause a local bus cycle to be granted to the FIFO.

As shown in FIG. 12, the data path within the megabus adapter for transferring megabus data to the local bus adapter is divided into two subpaths. Sixteen bits of data (MBDT0:16) are transferred by OR gate 515 and 16 bits of data (MBDT16:16) are transferred by multiplexer 517. The inputs to OR gate 515 are MBIN0:16 from interrupt register 519, MBSH0:16 from second-half bus cycle register 521, and FIDT0:16 from FIFO 505. The inputs to multiplexer 517 are the left and right data words transferred from FIFO 505, i.e., FIDT0:16 and FIDT16:16, respectively.

Interrupt register 519 enables the megabus adapter to temporarily store an interrupt transferred from the megabus to thereby enable the CPU to complete whatever current instruction it may be performing before assuming an interruptable state. This may be several CPU memory cycles away and by providing interrupt register 519, the reception of an interrupt by the megabus adapter can be acknowledged and the interrupt itself can be stored away until the CPU can process it. When the CPU enters an interruptable state, it will send a command via the local bus to the megabus interface. This command is signalled by the line SNDINT supplied to interrupt register 519 to enable the transfer of MBIN0:16 to OR gate 515 and thereby to the local bus adapter.

The second-half bus cycle register 521 accommodates the above-discussed situation wherein although the central subsystem requests a transfer of two words in parallel, the memory module on the megabus transferring the data does not have the ability to transfer a double-wide word. Such a memory would be the above-discussed single-width, double-pull memory which delivers two words serially in adjacent megabus second-half bus cycles or the single-width, single-pull memory that requires a memory cycle for each delivered word. When in fact the requested two words of data are not transferred in parallel, the second-half bus cycle register 521 will store the first transferred word and the second transferred word will be written into FIFO 505. When that word in the FIFO 505 appears at the output, MBSH0:16 will be transferred from second-half bus cycle register 521 to OR gate 515 simultaneously with the transfer of FIDT0:16 to multiplexer 517. This will assemble in the proper sequence the 32 bits of data requested.

If all 32 bits of data were received in a single bus cycle they are transferred into FIFO 505 and upon output from the FIFO will be transmitted to the local bus adapter. FIDT0:16 will be enabled to OR gate 515 and FIDT16:16 will be selected as the input to multiplexer 517.

Multiplexer 517 also receives a third input FIAD0:7 which is selected during certain test mode operations wherein a mode I/O address must be transferred from the megabus to either the CIP or the SIP in the central subsystem. In such an operation, the unit on the megabus will place 16 bits to be interpreted as part of an address on lines MBDT0:16 and eight more bits on BSAD0:7. As these are passed into the FIFO 505 the data bits become FIDT0:16 and the address bits FIAD0:7. The data bits are passed by OR gate 515 to MBDT0:16 and multiplexer 517 selects the 8 address bits to be MBDT16:8 and ZERO fills the rest of the data field. By using the data field for 16 bits and the address field for 8 bits the test mode operation can be implemented by devices capable of only transferring 16 data bits in parallel.

Data is transmitted from the local bus to the megabus over 32 dedicated lines LDTR0:32 (plus 4 parity lines). The data lines are supplied as input to data output multiplexer 523 along with the channel number of the cache/MMU as set by the previously referenced rotary hexadecimal switch and supplied to data output multiplexer 523 over the line MYCHN. The output of data multiplexer 523 comprise the 16 bits of the output data field MYDT0:16. LDTR16:16 are also directly supplied to the megabus data transceiver 503 such that the 32-bit wide output data field DSDT0:32 comprises either LDTR16:16, LDTR0:16, or MYCHN in the left-most 16 bits and LDTR16:16 in the right-most 16 bits. The purpose of data output multiplexer 523 is to enable cache/MMU to either transfer 32 bits in parallel or two 16-bit words sequentially, depending upon the type of destination processing unit on the local bus.

The signal MYCHN is also supplied to channel number decoder 525 along with 9 bits of the address field BSAD11:9. This enables the megabus adapter to determine whether a response is being directed to its associated central subsystem. If it is, the signal ITSAME is driven true and supplied to interrupt control register 527. Level comparator 529 receives the level transmitted with an interrupt request from the megabus in field BSDT10:6 and the level number of the process currently assuming CPU time in LDTR26:6. The output of level comparator 529 is supplied as an input to interrupt control 527 which will drive MYINT true if the level number of the requested interrupt is greater than (of a higher priority) the level currently being processed by the CPU.

ALU address generator 531 is employed by the megabus adapter to cause the proper addresses to be generated depending upon the type of unit on the megabus being addressed. ALU address generator 531 receives the local bus address on LBAD0:23 and has the ability to increment the address by 0 or 1. If the address requested by LBAD0:23 is within a double-wide or a single-width, double-pull memory then there will be no need to increment the output address MYAD0:23 because such memories are capable of transferring the requested 32 bits. If, however, the addressed memory module is a single-width, single-pull memory then initially MYAD0:23 will be transferred to BSAD0:23 by the transceivers 503 and, subsequently, the megabus adapter will generate a new read or write cycle wherein ALU address generator 531 will supply MYAD0:23 +1 to BSAD0:23. This will cause the proper two words in the memory module to be addressed and transferred over the megabus to the megabus adapter.

The megabus adapter further includes megabus slave mode logic 533 for controlling the response of the cache/MMU to both a request by a megabus processing unit and to a response by a megabus processing unit to a previous request by a central subsystem processor.

Similarly, the megabus adapter includes megabus master mode control logic 535 which initiates a megabus transfer in response to control signals from the local bus, i.e., CAWRIT-CABYTE. The megabus master mode control logic 535 and megabus slave mode response logic 533 are conventional in nature and do not comprise a feature of the instant invention. Broadly, these logic units enable the megabus to generate the necessary DCNNs to time data and address transfers going out on the megabus through transceivers 503. The logic also generates the ACKs, NACKS, and WAITs for response going back to the megabus. Such signals are standard in prior art CPU unit, controller, and memory interfaces. The circuitry and operational mode for the megabus slave mode response logic 533 and megabus master mode control logic 535 will be further discussed when the detailed logic circuits are explained.

3. Description of Preferred Embodiment of the Local Bus Adapter

Figures 19, 20A:
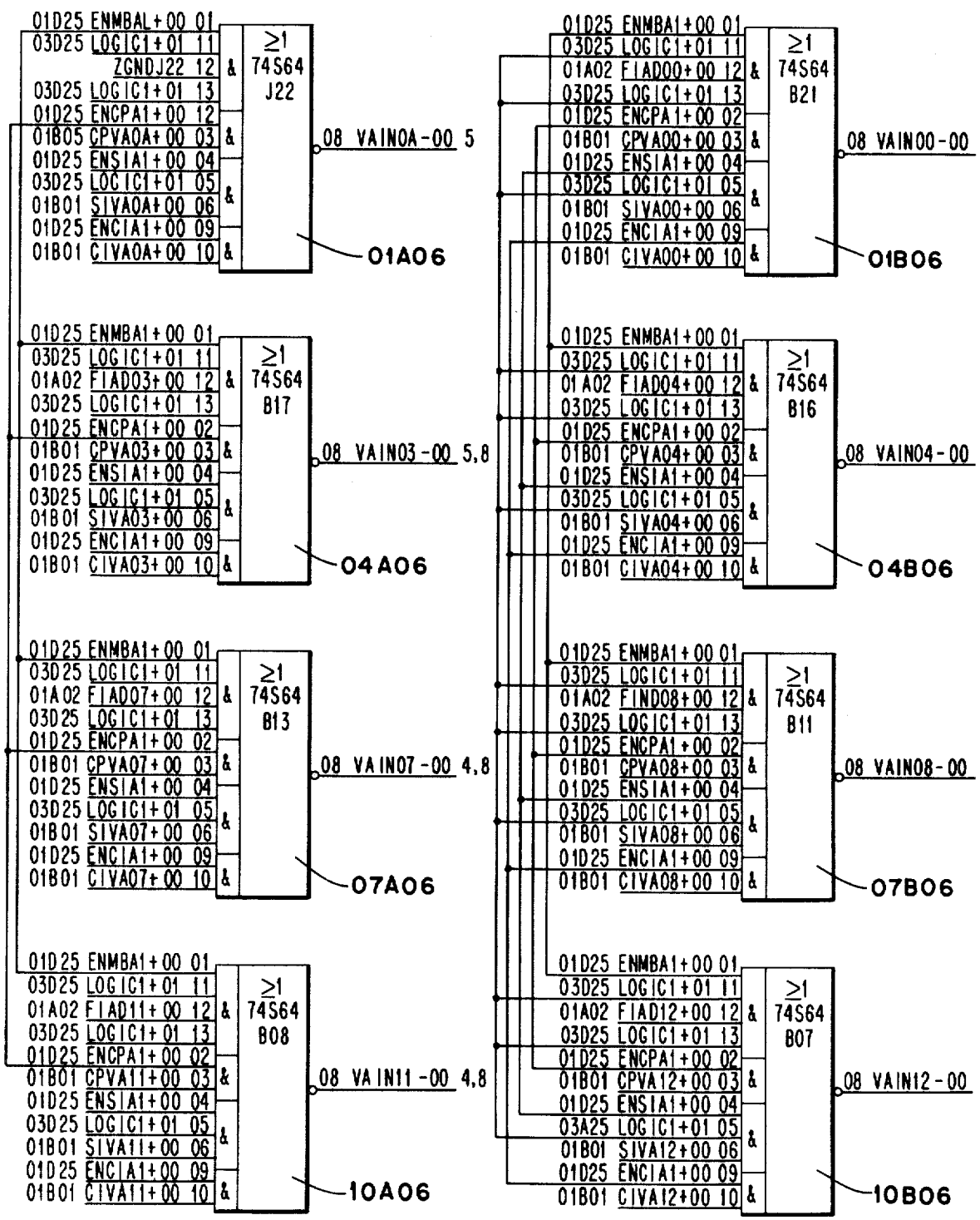
FIG. 19 is a block diagram illustrating the manner in which the A and B portions of FIGS. 20a through 46b relate to each other.
FIGS. 20a–33b are detailed logic block diagrams illustrating a hardware embodiment of the local bus adapter illustrated in FIG. 11.

As stated above, the cache/MMU within a central subsystem includes a local bus adapter for controlling the transfer of information over the local bus between the CIP, SIP, CPU, and cache/MMU. The relevant apparatus within the local bus adapter is shown in the detailed schematic logic block diagrams (LBDs) of FIGS. 20a–32b. To facilitate an understanding of the invention, any of FIGS. 20a–32b having both an a portion and a b portion, such as FIGS. 20a and 20b, should be separated from the remainder of the Figures and joined in a side-by-side orientation as indicated in FIG. 19. In this manner, each of the diagrams with a and b portions can be referred to as an integrated sheet. The basic structure and operation of the local bus adapter of the cache/MMU has been described with reference to FIGS. 11, 13, 14, and 15 but the following discussion will provide additional description of the preferred embodiment of the local bus adapter.

The detailed logic schematics of FIGS. 20a–32b illustrate known, standard integrated circuit logic chips which are available from commercial IC suppliers. An individual part identification code is provided on each element shown. For example, multiplexer 01A06 shown in FIG. 20a is a standard multiplexer circuit chip marketed under the identification 74S64 by Texas Instruments. In fact, any circuit chip having a commercial designation beginning with 74 is manufactured by Texas Instruments and further details of such circuits can be found in "The TTL Data Book for Design Engineers," 2nd Ed., published by Texas Instruments (1976). Such commercial designations will be immediately apparent to one of ordinary skill in the art.

Figure 20B:
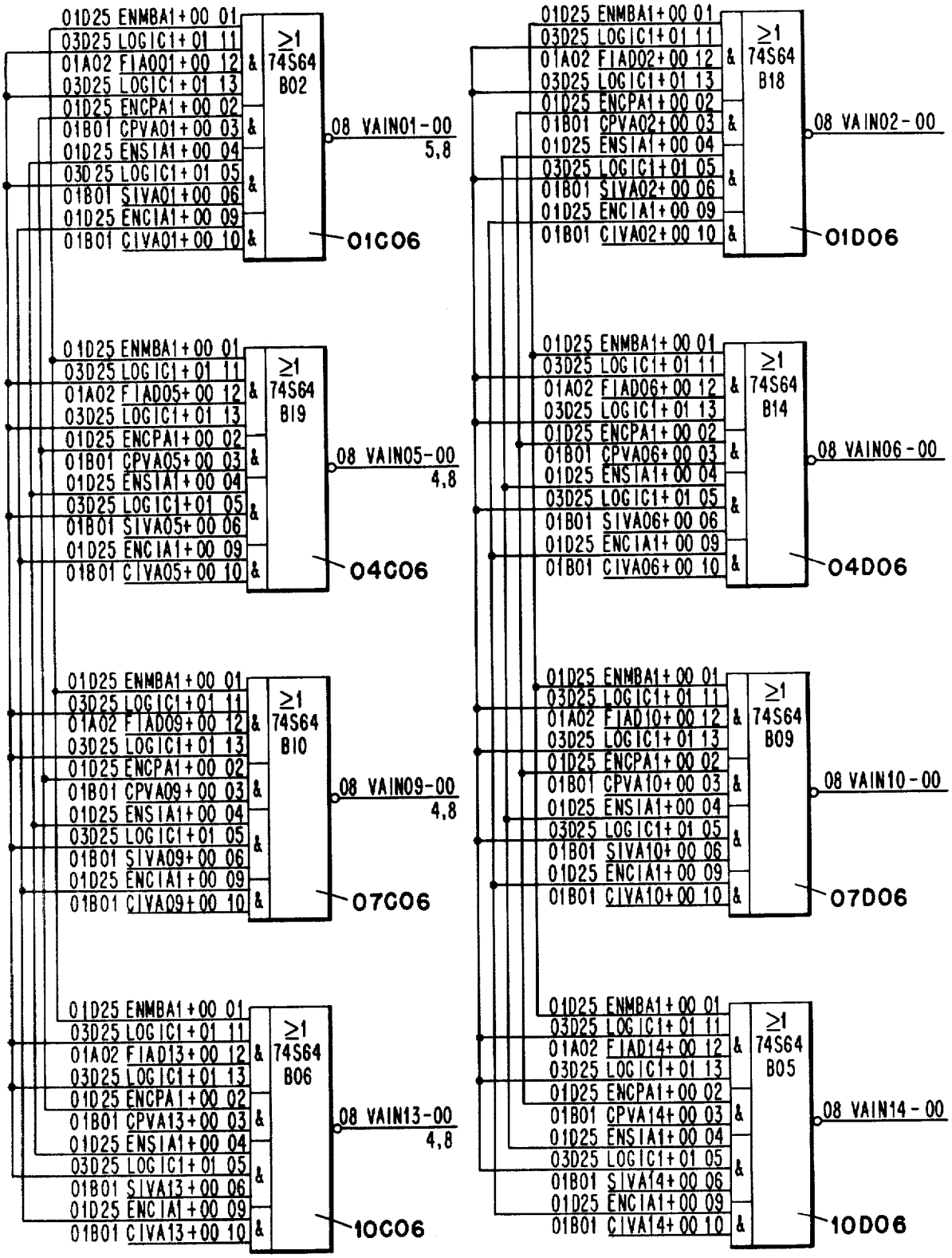
Figure 21:
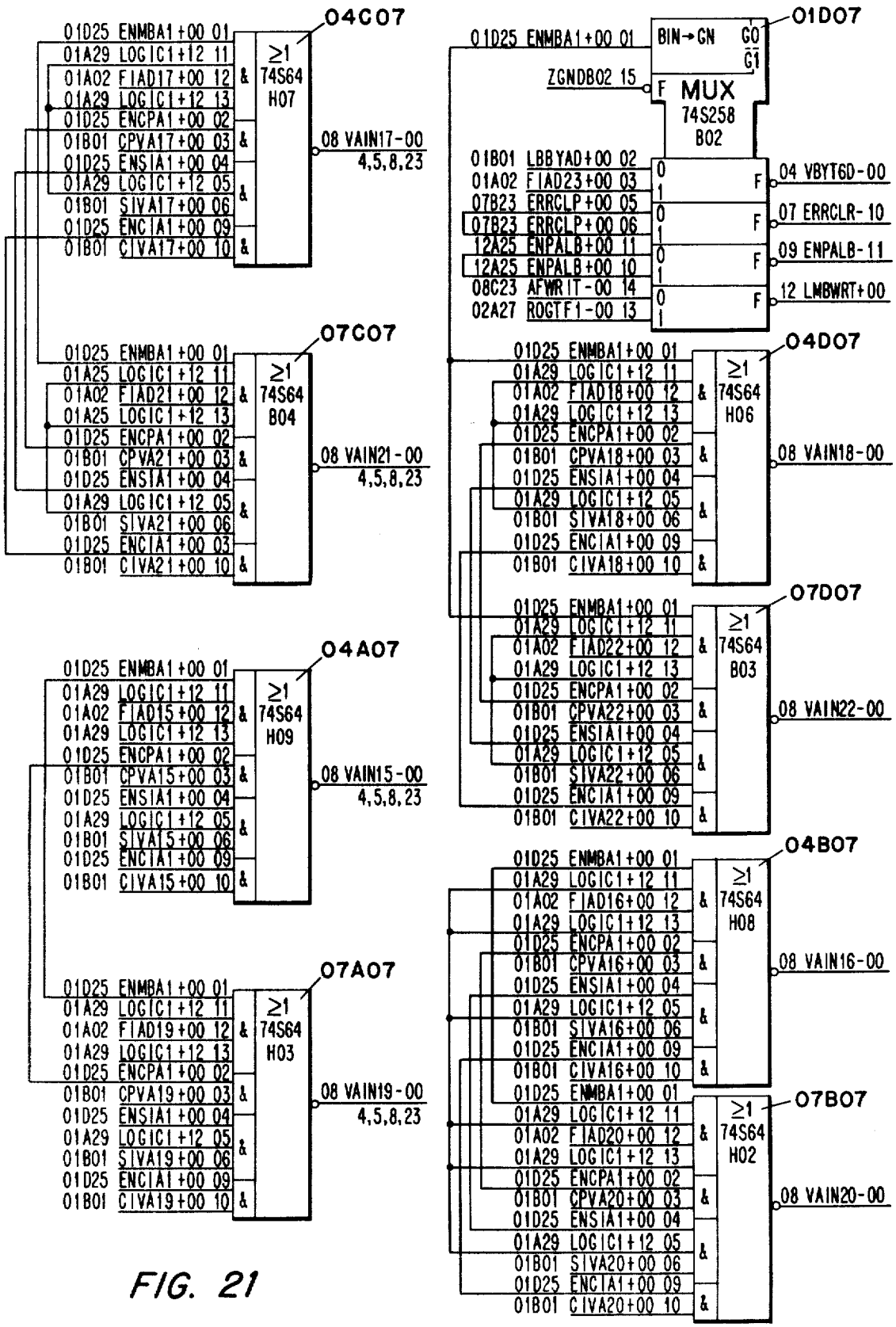

FIGS. 20a, 20b, and 21 show an embodiment of virtual address multiplexer 405 (FIG. 11). Circuit 01B06 of FIG. 20a will be explained as an example. This circuit includes four AND gates having multiple inputs and an OR gate receiving the outputs of the AND gates. Only one AND gate of the four will have all inputs simultaneously equal to ONE to generate the (bit O of the address field) output VAIN00. The first AND gate receives the signals ENMBA1, LOGIC1, FIAD00, and LOGIC1. FIAD00, as previously explained, is supplied from FIFO 505 of the megabus adapter shown in FIG. 12. ENMBA1 and LOGIC1 are enable signals generated by circuitry found in FIG. 27b. The driver 01D25 of FIG. 27b receives the assigned signals from request arbitration network 407 and generates enable signals for a megabus address, SIP address, CIP address, or CPU address. Thus, if the FIFO has been assigned a local bus cycle, ENMBA1 will be one and the other outputs of drivers 01D25 will be false. The signal LOGIC1 is generated by driver 03D25 also shown in FIG. 27b. LOGIC1 is constantly true because its corresponding signal on input ZGNDB19, is false but is inverted as it is applied to driver 03D25. The driver is also enabled by ZGNDB19. Thus, if the FIFO has been assigned a megabus cycle, all inputs to the top AND gate of multiplexer 01B06 (FIG. 20a) will be enabled and VAIN00 will have the value of FIAD00. The remaining three AND gates to multiplexer 01B06 receive the enable outputs of the above-described driver 01D25 and bit 0 of the address as supplied by the CPU, SIP, and CIP. It is evident that the multiplexer 01B06 causes VAIN00 to take the value of the address bit supplied by whichever of the CPU, SIP, CIP, or FIFO is enabled.

The remaining circuits in FIGS. 20a, 20b and 21 operate in the same manner as circuit 01B06 to generate, in combination, bits 0–22 of VAIN0-23 with the exception of multiplexer circuit 01D07 found in FIG. 21. This multiplexer circuit is enabled by the previously defined signal ENMA1 and comprises four 2×1 multiplexers. The first multiplexer corresponds to the BYAD multiplexer 413 shown in FIG. 11. It selects either LBBYAD or FIAD23 according to the value of ENMBA1 and generates the output signal VBYTAD.

VBYTAD is a binary signal which indicates which of two bytes is to be read from memory or written into memory. The signal ERRCLR is supplied as an input to both inputs of the second multiplexer and, thus, the output of the second multiplexer will be ERRCLR regardless of the value ENMBA1. The third multiplexer circuit receives at its two inputs the signal ENPALB signifying that the transfer of a physical address to the local bus is to be enabled and, thus, the output of the third multiplexer circuit is ENPALB. The final multiplexer circuit in multiplexer 01D07 receives as inputs APWRIT and RQGTFI and generates the output LMBWRT. RQGTFI is the output of request granted register 409 and signifies that the FIFO and the megabus adapter have been granted the next local bus cycle. APWRIT, being a WRIT signal, indicates the direction in which a local bus transfer is taking place, i.e., it is a request or write to memory or a response from memory. Thus, LMBWRT is a binary signal indicating whether information is being transferred to the local bus from the megabus adapter or from the local bus to the megabus adapter.

Figure 22A:
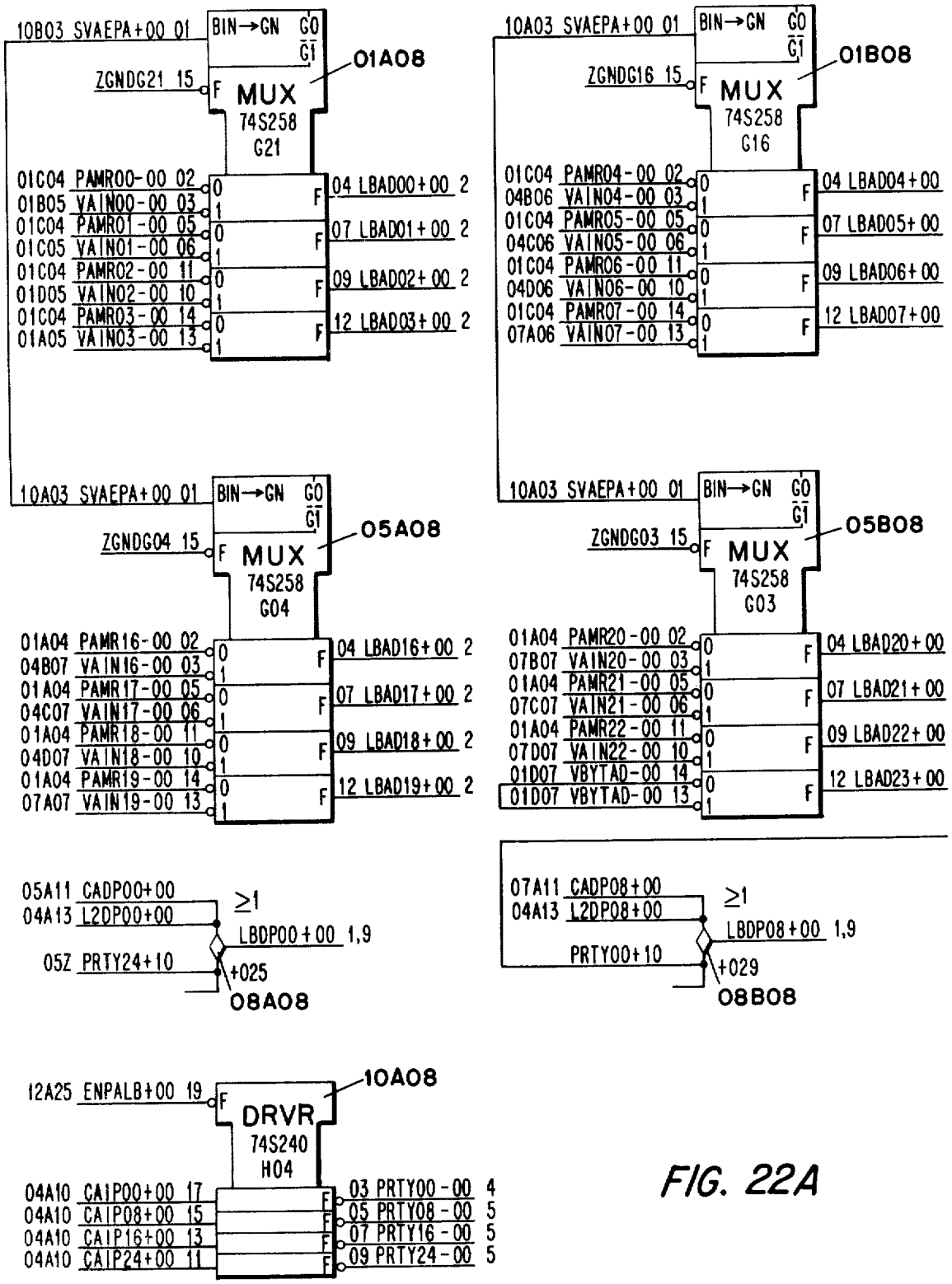
Figure 22B:
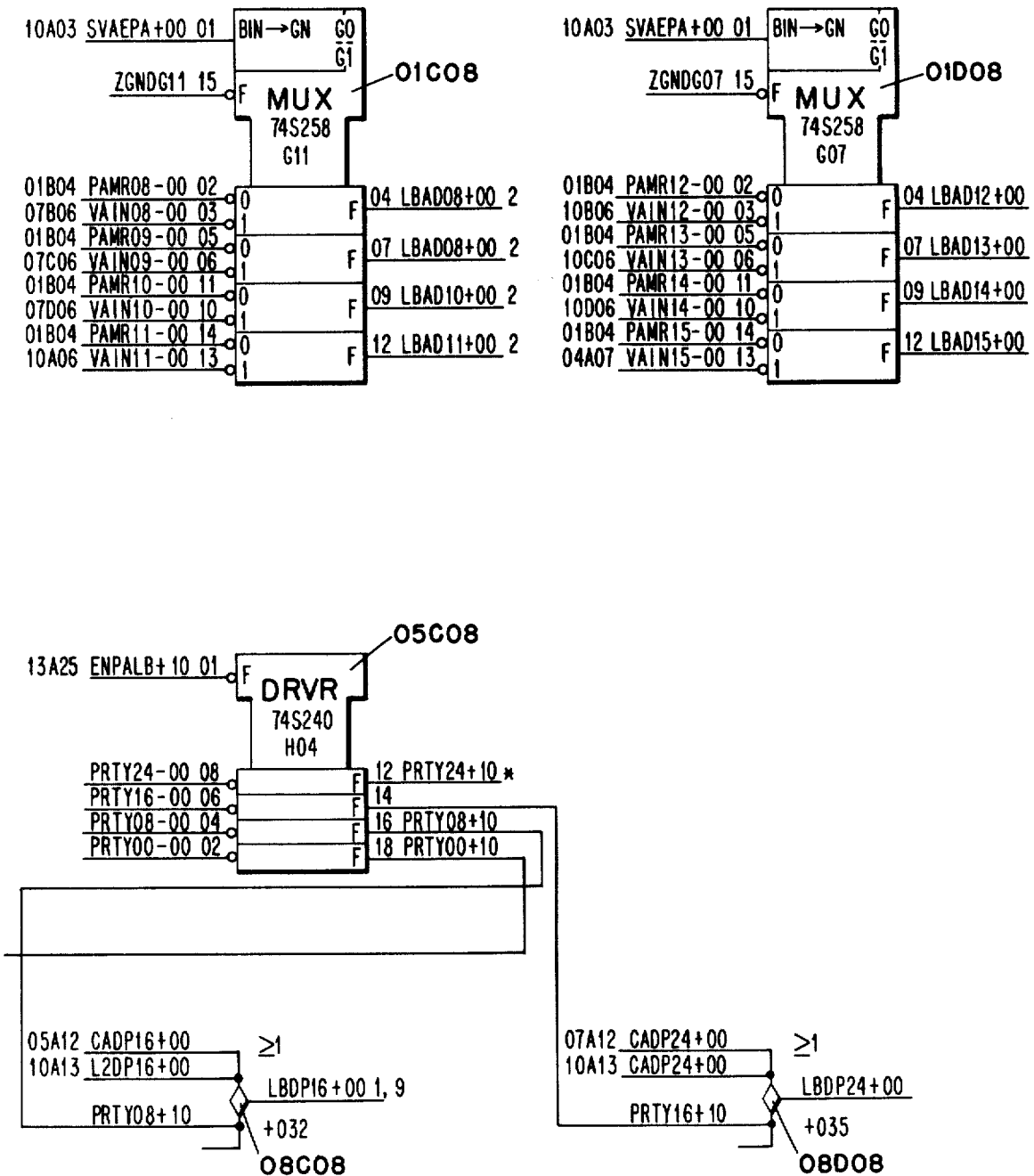

FIGS. 22a and 22b illustrate multiplexer circuits for generating the values of LBAD00-LBAD23. As an example, multiplexer 01A08 comprises four 2×1 multiplexer circuits. The first multiplexer circuit receives as inputs PAMR00 and VAIN00. As previously explained, VAIN00 is the output of circuit 01B06 of FIG. 20a. PAMR00 is a signal generated within the cache/MMU and corresponds to bit zero of an actual physical address is one of the memory modules connected to the megabus. LBAD00 takes on the value of one of its two inputs according to the value of a select virtual address or physical address signal SVAEPA. Thus, if LBAD00 is to take on the value of a physical address, SVAEBA will have a false value whereas if LBAD00 is to reflect a virtual address and SVAEPA00 is to reflect a virtual address, then SVAEBA will be true.

The driver 10A08 and OR gates 08A08 and 08B are employed to generate the parity bit to be transmitted with the address field.

The remaining multiplexer circuits shown in FIGS. 22a and 22b operate in the same manner as the above-described multiplexer circuit 01A08 except that they receive different bits of the address input lines and generate different bits of the address output lines. The details of the operation of these additional multiplexer circuits will be readily apparent to one of ordinary skill in the art.

Figure 23A:
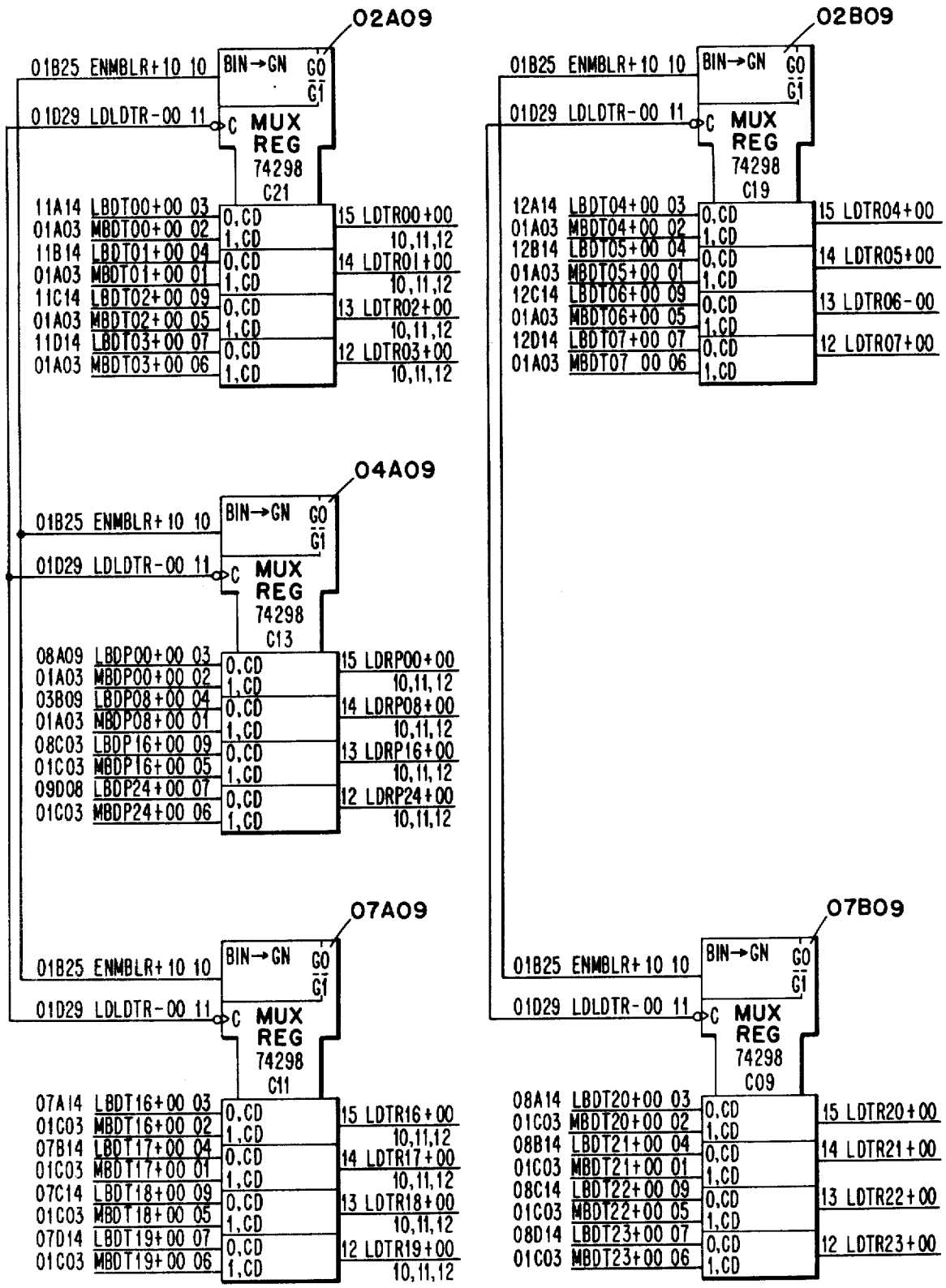
Figure 23B:
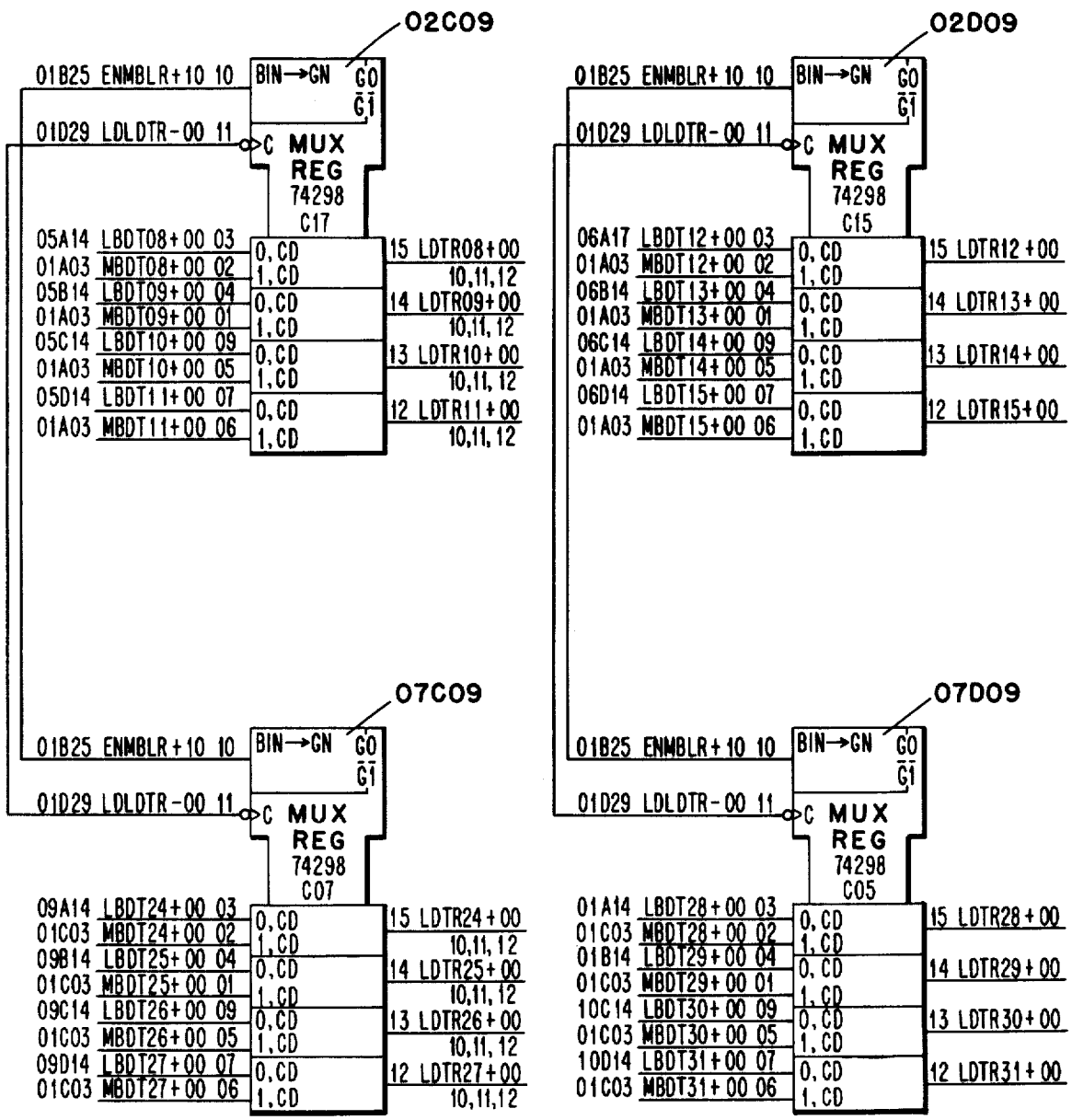
Figure 27A:
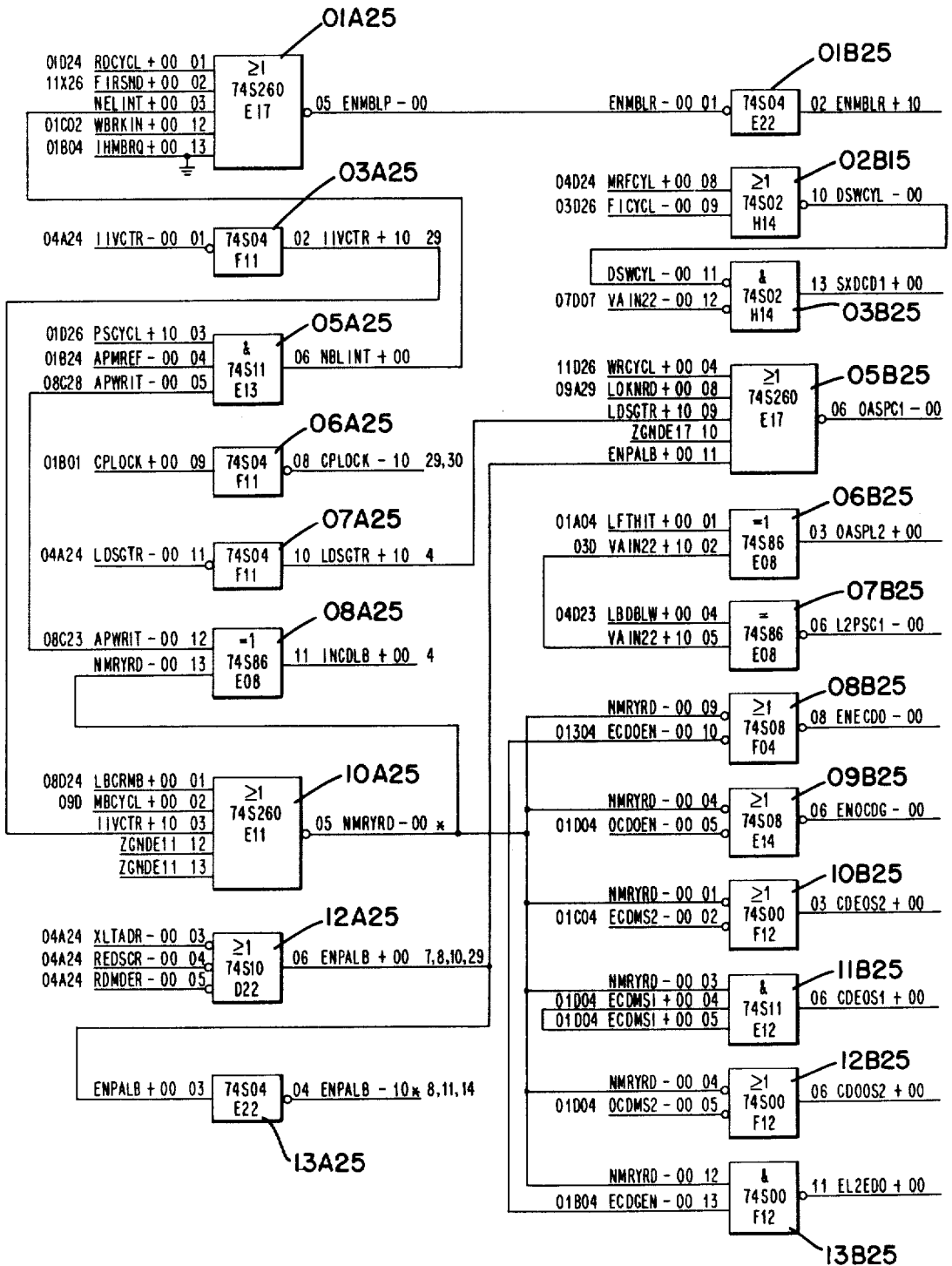
Figure 27B:
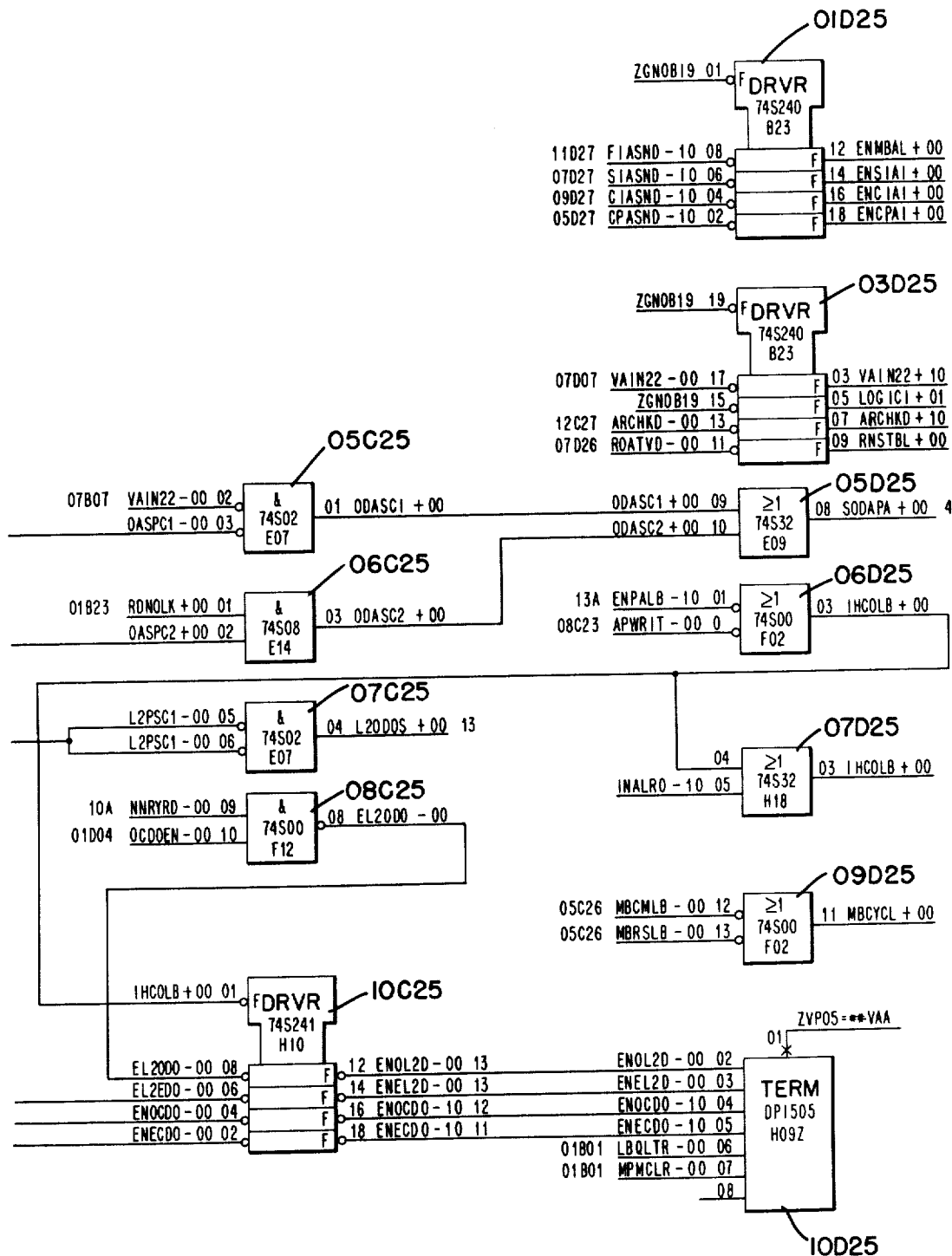

FIGS. 23a and 23b illustrate an embodiment of cache data input multiplexer 401. This embodiment comprises 16 2×1 multiplexers controlled by the signal ENMBLR and enabled by LDLDTR (load data lines LDTR). When ENMBLR is true, megabus data (MBDT) is enabled to the outputs LDTR. When ENMBLR is false, local bus data (LBDT) is enabled to LDTR. ENMBLR is the output of inverter 01B25 and OR gate 01A25 as illustrated in FIG. 27a.

Figure 24A:
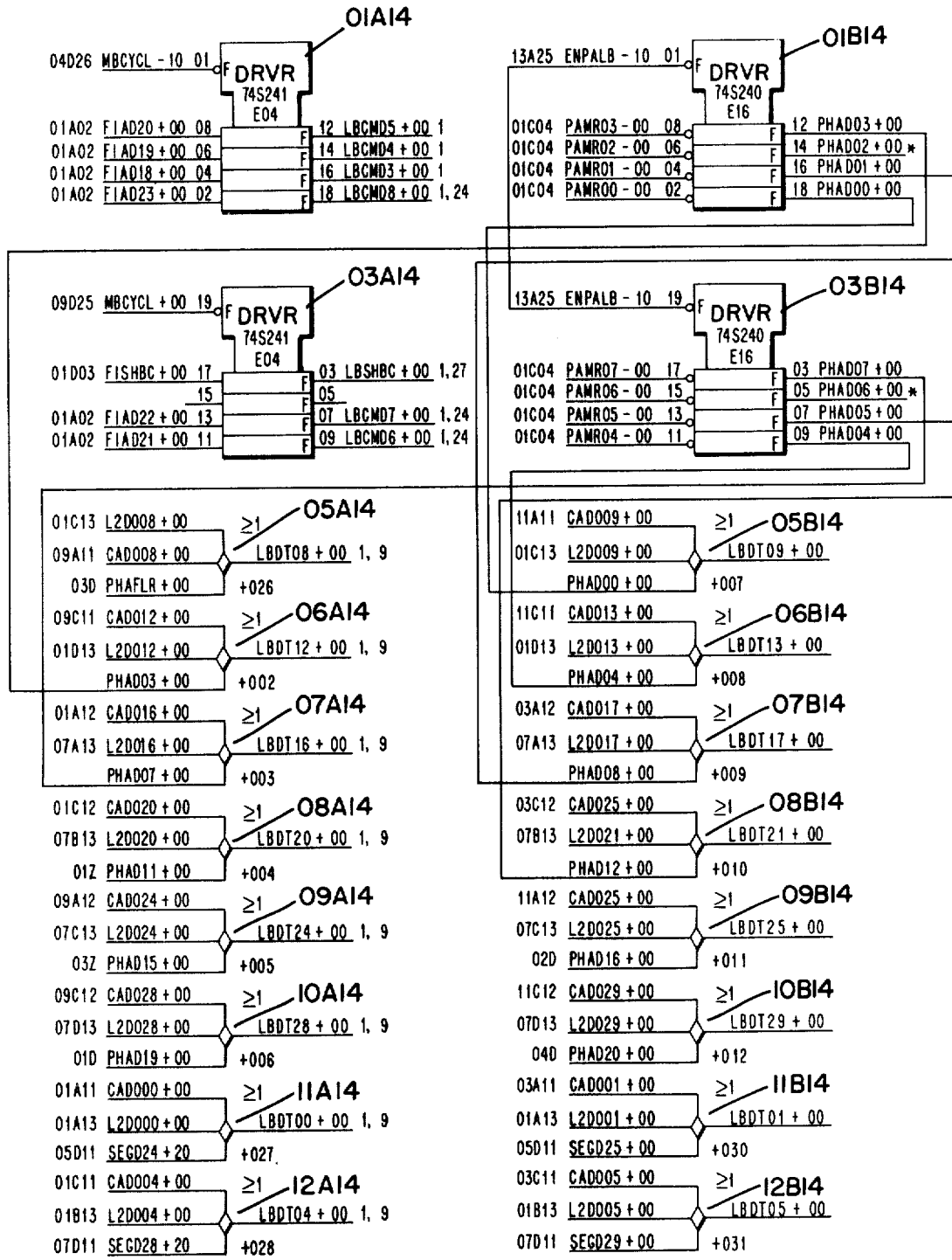
Figure 24B:
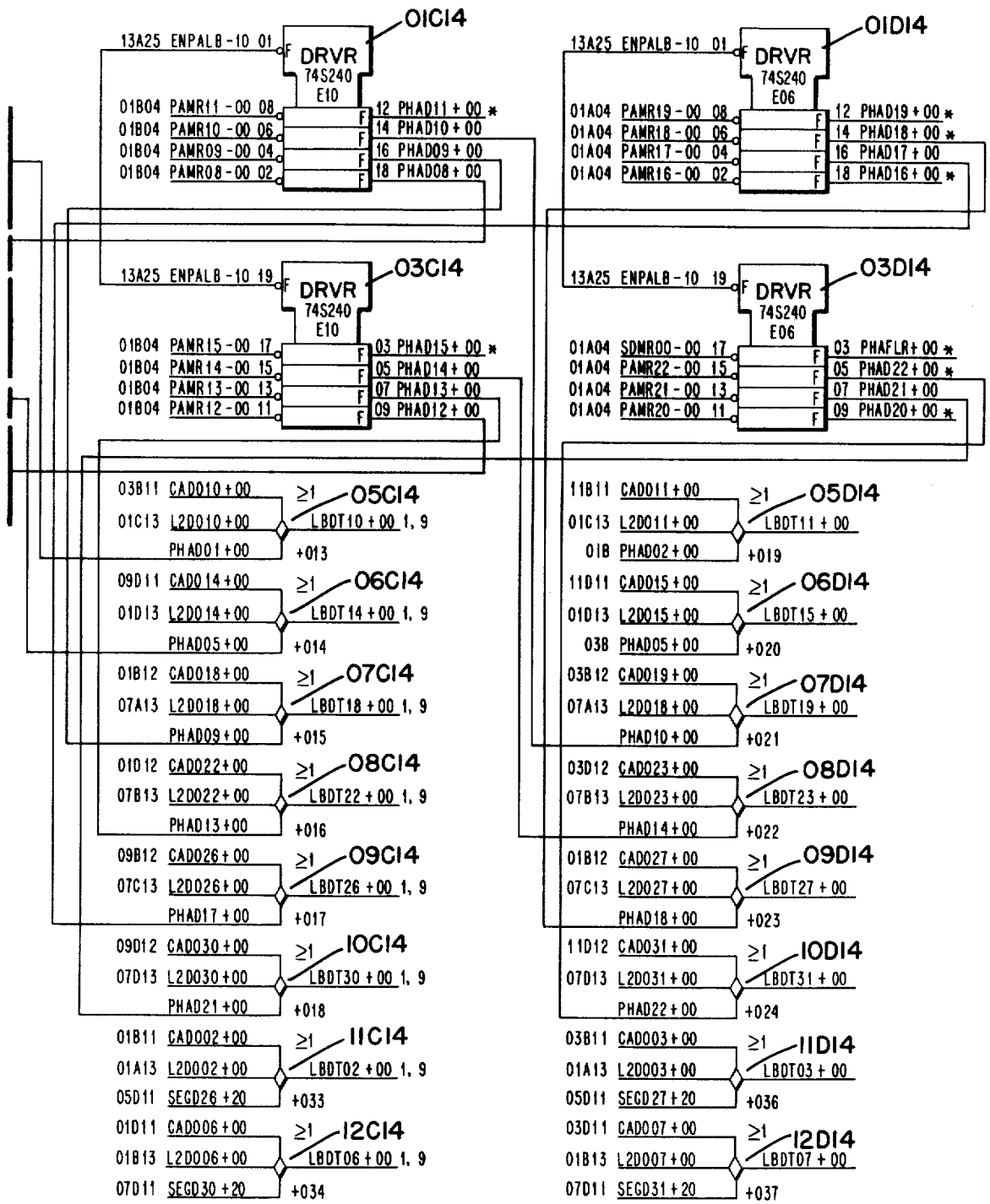

FIGS. 24a and 24b illustrate an embodiment of a portion of cache memory and directory 403 which supplies the output data LBDT0:32 (plus the 4 parity bits). As an example, LBDT00 is generated by OR gate 11A14 (FIG. 24a) from three inputs CAD000, L2DO00, and SEGD24. The input signals to OR gate 11A14 are generated within the cache memory and it is sufficient for an understanding of the present invention to know that if a requested address is resident in the cache, its associated data will be supplied on the CADO data lines. These OR gates illustrate the source of the local bus data signals LBDT00-LBDT32.

Also illustrated in FIG. 24a is a source of the local bus command field LBCMD3:6. These signals are generated by driver circuits 01A14 and 03A14 from the inputs FIAD18-FIAD23, respectively. Similarly, driver circuit 03A14 generates the local bus second-half bus cycle LBSHBC from the FIFO second-half bus cycle FISHBC. The driver 01A14 and 03A14 are enabled by the signal MBCYCL (from inverter 0YD26, FIG. 28 and OR gate 09O25, FIG. 27b) which is generated whenever a local bus cycle has been granted to the megabus adapter to transfer information from the FIFO 505 to the local bus adapter shown in FIG. 11.

Figure 25:
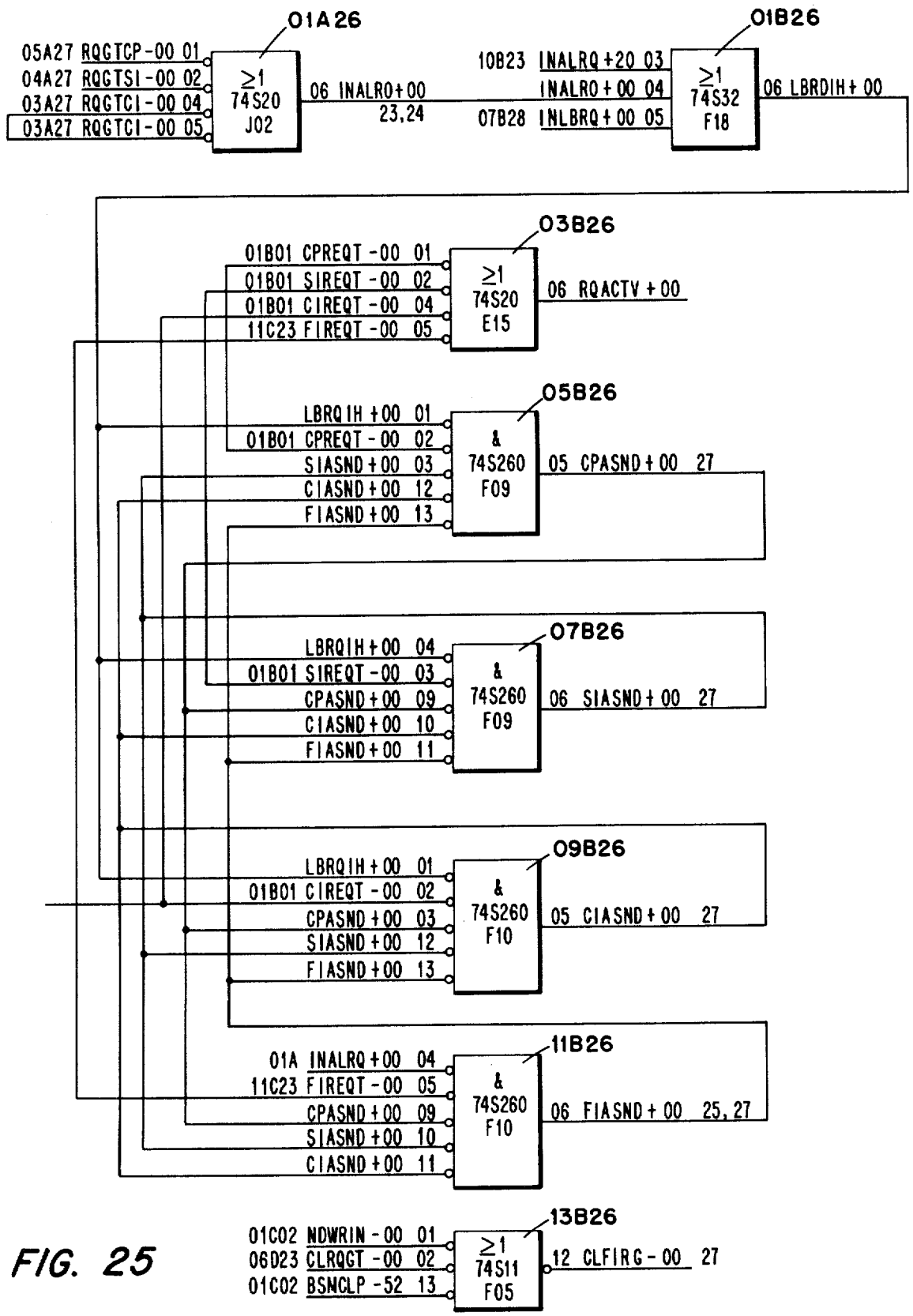

FIG. 25 illustrates an embodiment of request arbitration network 407. As illustrated therein, OR circuit 03B26 receives the requests signals CPREQT, SIREQT, CIREQT, and FIREQT (generated when RIFOMI is not true) and generates a request active signal RQACTV whenever one of the request signals is true. The assigned signals CPASND, SIASND, CIASND, and FIASND, are generated by AND gates 05B26, 07B26, 09B26, and 11B26, respectively. These AND gates each receive the input signal signifying a local bus request inhibit LBRQIH generated from OR gate 01B26. This OR gate, in turn, has an input generated by OR gate 01A26 specifying when equal to ONE, that all requests should be inhibited. The inputs to OR gate 01A26 comprise the outputs of request granted register 409, i.e., RQGTCP, RQGTSI, and RQGTCT. Thus, whenever a request has been granted to one of the local bus processors, its associated request granted line will be equal to ZERO and since it is inverted on input to OR gate 01A26 will cause INALRQ to be equal to one. The other input to OR gate 01B26 inhibits local bus requests IHLBRQ which will be true whenever a local bus cycle has been assigned to the megabus adapter to enable the transfer of information from the FIFO.

The other inputs to AND gates 05B26 are CPREQT, SIASND, CIASND, and FIASND. If all of these inputs are false (equal to one) then the CPU will be assigned the next local bus cycle and CPASND will be set to one.

CPASND is received by AND gates 07B26, 09B26 and 11B26 and, when true (equal to ZERO) will inhibit assigning a local bus cycle to the SIP, CIP, or FIFO. And gate 7B26, 9B26, and 11B26 operate in a similar manner as AND gate 05B26.

Figure 26A:
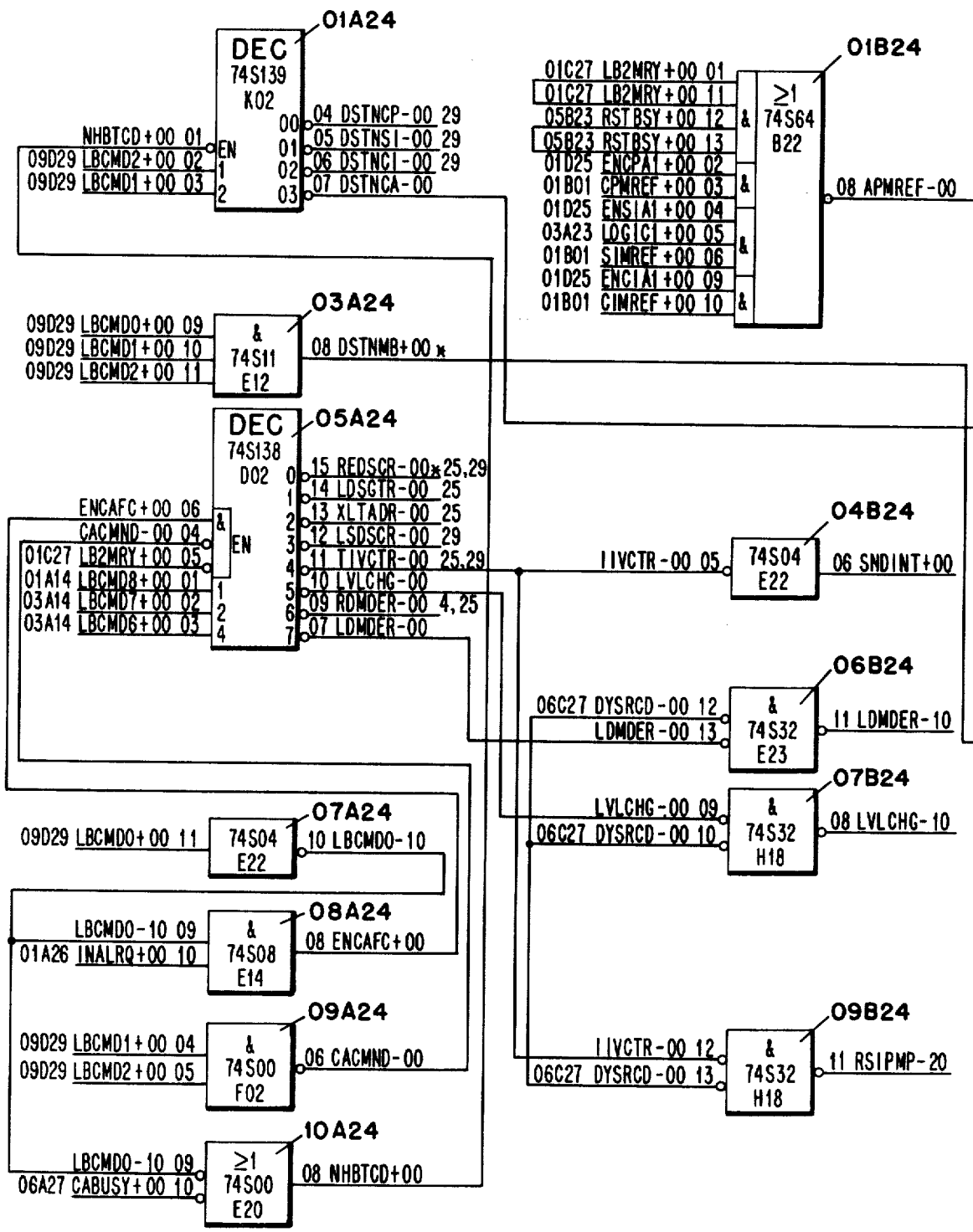
Figure 26B:
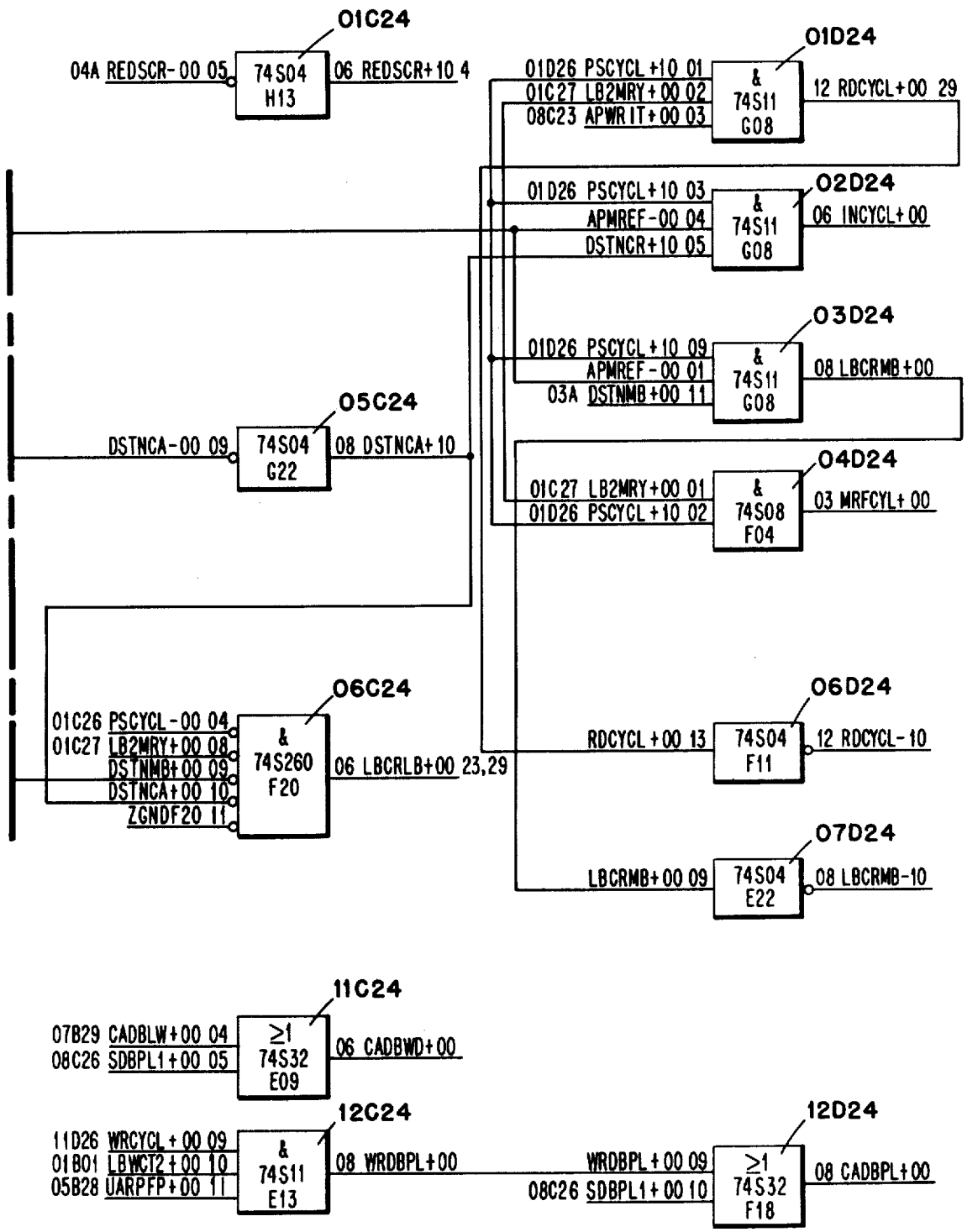
Figure 31A:
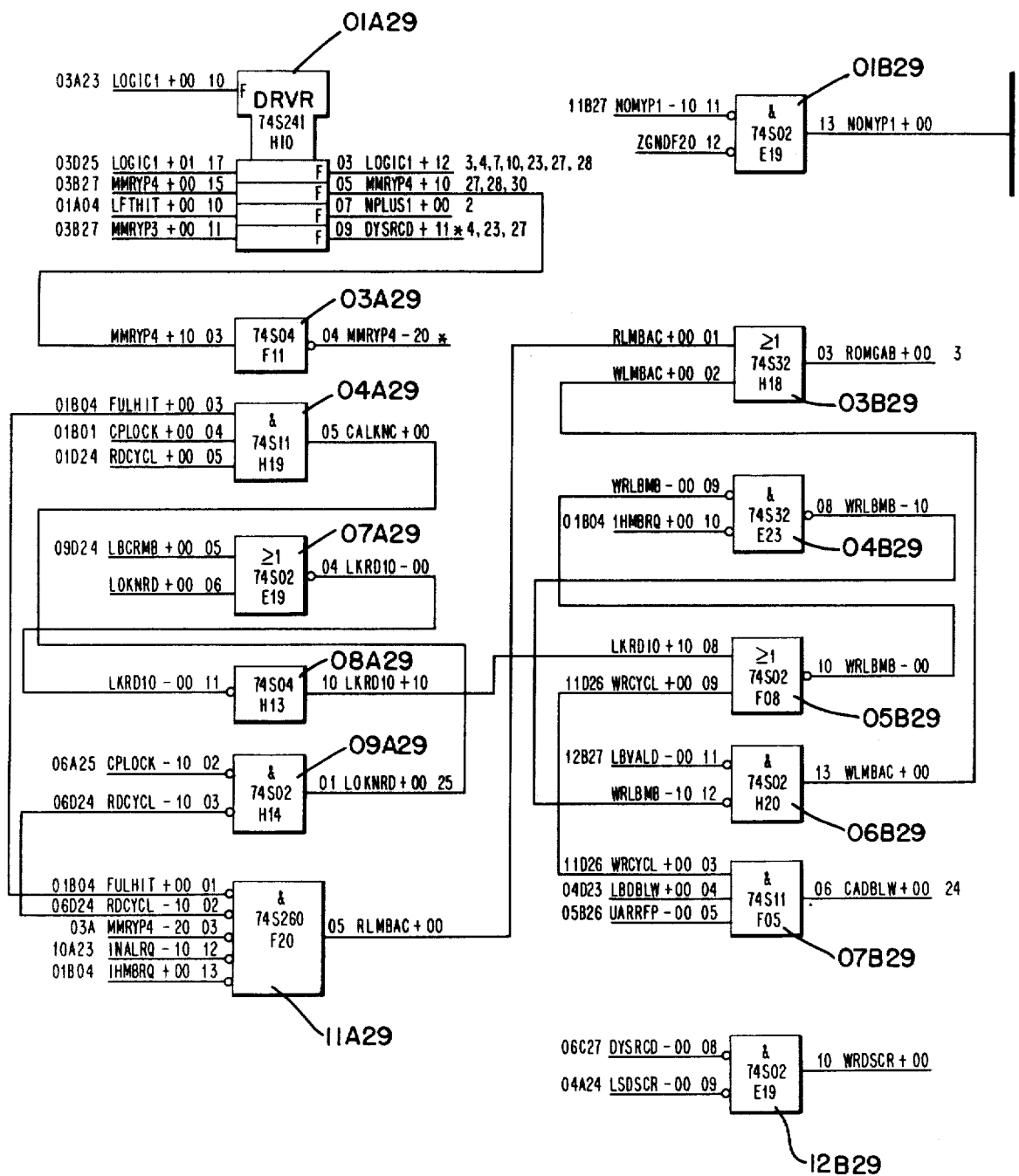
Figure 31B:
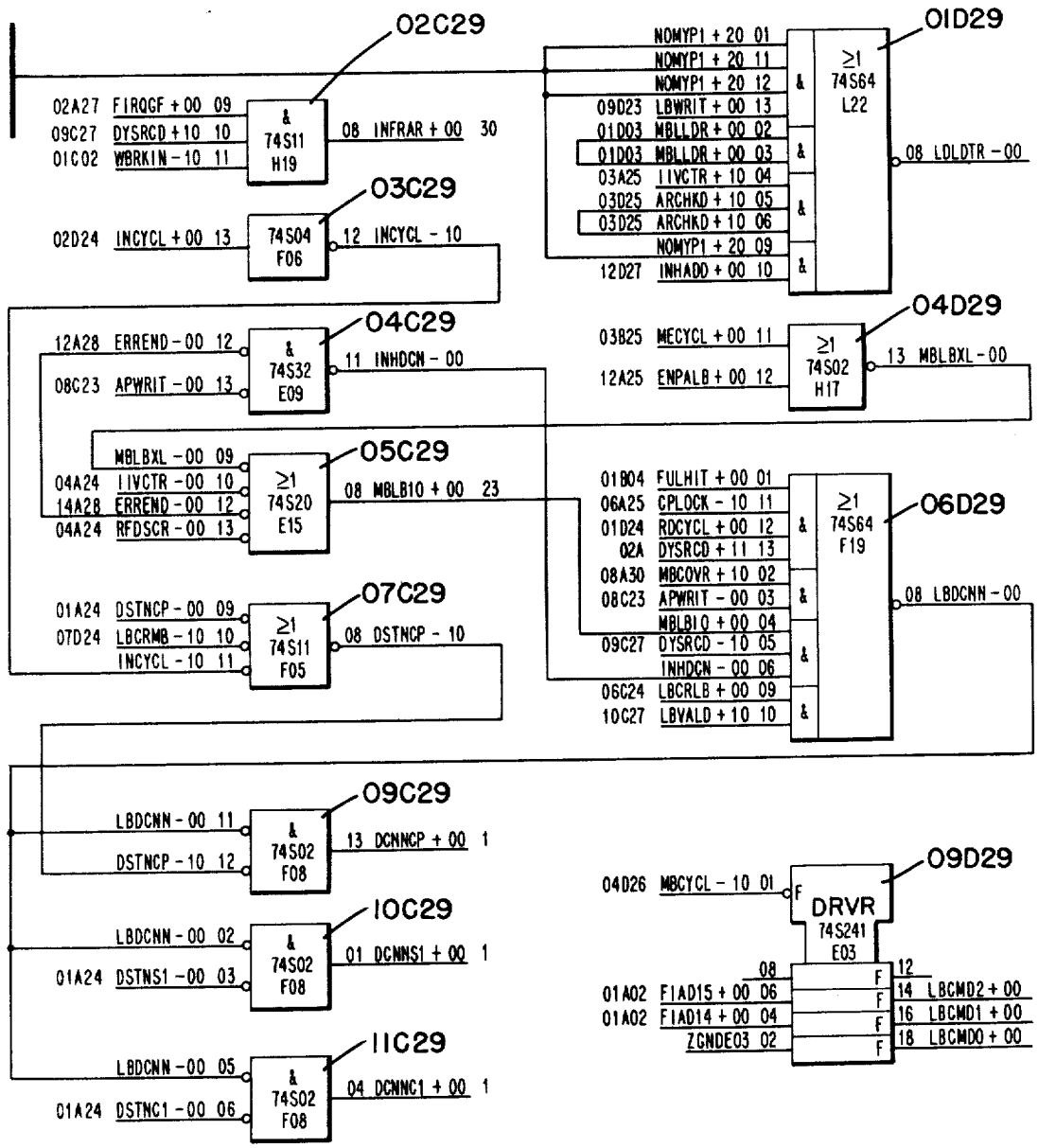

An embodiment of channel number decoder 421 is illustrated in FIGS. 26a and 26b. As herein embodied, decoder 01A24 receives as inputs LBCMD1 and LBCMD2 from the local bus. The enable signal is NHBTCD generated by OR gate 10A24. OR gate 10A24 receives LBCMD0 and CABUSY and, thus, decoder 01A24 will be enabled whenever the cache/MMU is not busy and LBCMD0 is true (equal to ZERO). Decoder 01A24 generates the output signals DSTNCP, DSTNSI, DSTNCI, and DSTNCA for transfer to the instruction decoder 415. The megabus channel number driver is illustrated in FIG. 31b as driver circuit 09D29 to enable, whenever MBCYCL is true (equal to 0), a transfer from the megabus adapter to the local bus adapter. At such time, LBCMD0 is set equal to ground, LBCMD1 is set equal to FIAD14, and LBCMD2 is set equal to FIAD15.

Also illustrated in FIGS. 26a and 26b is function code decoder 423 and megabus function code driver 425. The function code decoder is implemented by decoder 05A24 which is enabled when LB2MRY and CADMND are true (equal to ZERO) and ENCAFC is false (equal to ONE). ENCAFC is the output of AND gate 08A24 which receives as inputs LBCMDO and INALRQ. As previously explained, the source of INALRQ is OR gate 01A26 in FIG. 25.

CACMND is the inverted output of AND gate 09A24 which has as inputs LBCMD1 and LBCMD2. LB2MRY is the inverted value (by means of inverter 01C27) of the output APMREF of circuit 01B24 and will be true (equal to 0) whenever one of the local bus processors has been granted a local bus cycle. Thus, decoder 05A24 is enabled whenever a transfer is being made from the megabus adapter (FIG. 12) to the local bus 9 to decode the values of LBCMD6-LBCMD8 and generate through complementing outputs of the previously defined signals REDSCR, LDSGTR, XLTADR, LSDSCR, IIVCTR, LVLCHG, RDMDER, and LBMDER.

Megabus function code drivers 425 are illustrated as driver circuit 01A14 and 03A14 (FIG. 24a) which set LBCMD3-LBCMD8 to the values of FIAD1-8-FIAD23.

The specific circuit elements embodying instruction decoder 415 and control logic 417 are distributed through FIGS. 26a–b, 27a–b, 28, 29a–b, 30, 31a–b, 32a–b, and 33a–b. A detailed discussion of all of the internal circuit elements and signals employed therein is not required for an understanding of the instant invention, but focus will be made on elements which receive the decoded functions from function decoder 423 and generate decoded instructions transferred from instruction decoder 415 to control logic 417. Also, the source of CACNTRLO:10 will be discussed.

The signals RDCYCL, INCYCL, LBCRMB, MRFCYL, and LBCRLB are generated by AND gates depicted in FIG. 26b. Each of these AND gates receives as one input the signal PSYCYLO which the output of OR gate 01C26 of FIG. 28. PSCYCL will be true (equal to ZERO) when one of CPASND, CIASND, or SIASND has been set are true (equal to ZERO).

AND gate 01D24 which generals RDCYCL as an output also receives LB2MRY and APWRIT as inputs. The relationships of these latter two input signals has been described above. In sum, RDCYCL will be equal to ONE on output of AND gate 01D24 whenever the local bus processor is requesting a memory read.

INCYCL will be set to ONE whenever there is a non-memory reference by a local bus processor and cache destination signal DSTNCA is also equal to ONE after being inverted by inverter 05C24.

LBCRMB will be equal to ONE when there is a non-memory reference initiated by one of the local bus processors and the destination unit is connected to the megabus as indicated by DSTNMB being equal to ONE.

MRFCYL will be equal to one whenever a local bus processor is making a request to memory.

Inverters 06D24 and 07D24 are provided to invert the values of RDCYCL and LBCRMB, respectively.

LBCRLB, as the output of AND gate 06C24, is equal to ONE whenever PSCYCL, LB2MRY, DSTNMB, and DSTNCA are all equal to one.

Figure 28:
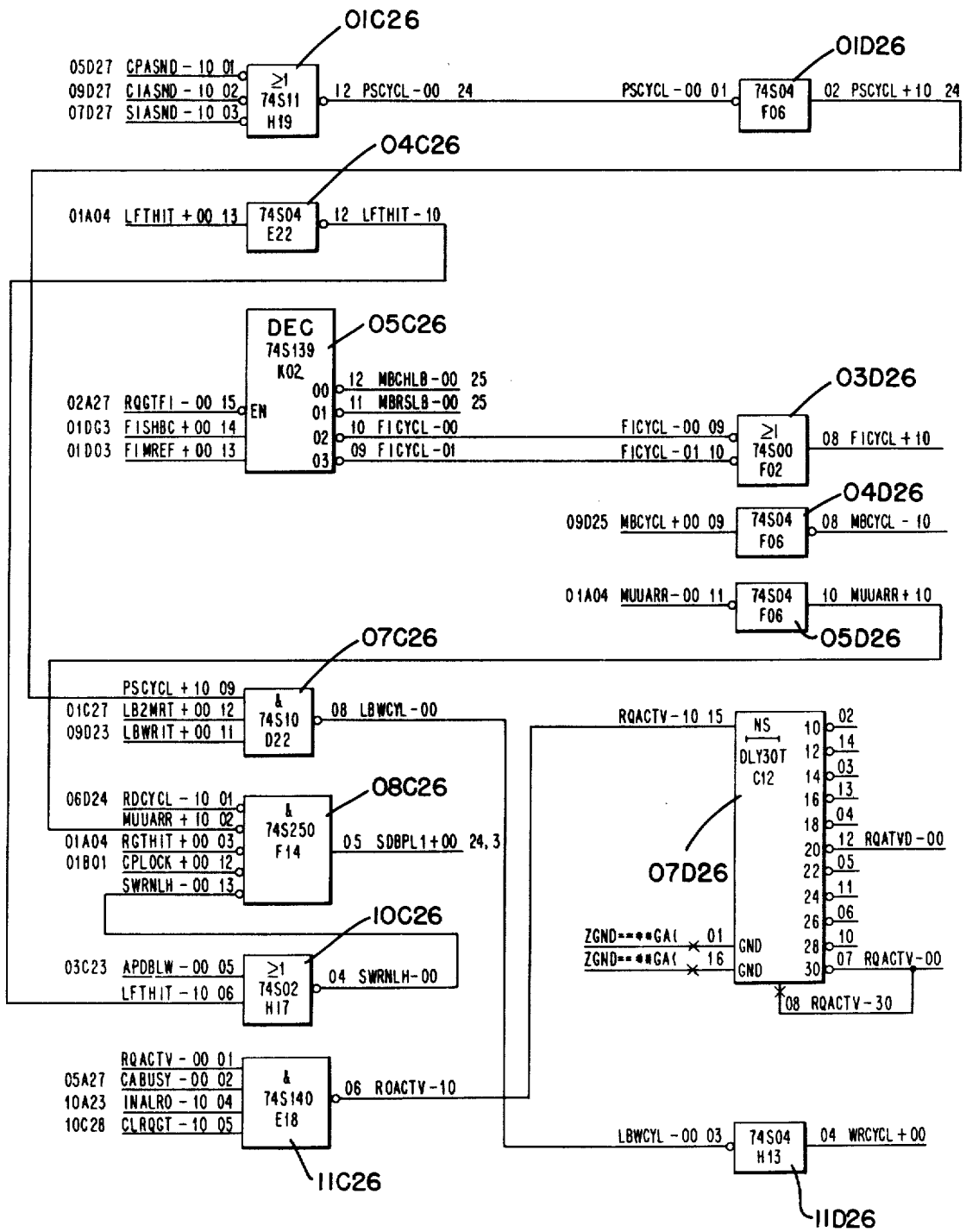

The signals MBCMLB, MBRSLB, and FICYCL transferred from instruction decoder 415 to control logic 417 are generated by decoder circuit 05C26 illustrated in FIG. 28. The inputs to be decoded are FISHBC and FIMREF and the decoding is enabled whenever a request has been granted to the FIFO as indicated by RQGTFI being true (equal to ZERO) as it is presented to the inverted input.

The signal MBCYCL is generated by OR gate 09D25 (FIG. 27b) whenever MBCMLB or MBRSLB is true (equal to ZERO).

The signal WRCYCL is generated by inverter 11D26 (FIG. 28) as the inverse of signal LBWCYL generated by AND gate 07C26. If LBWRIT, LB2MRY and PSCYCL are all true (equal to 0) then WRCYCL as issued by inverter 11D26 will also be true.

Figure 30:
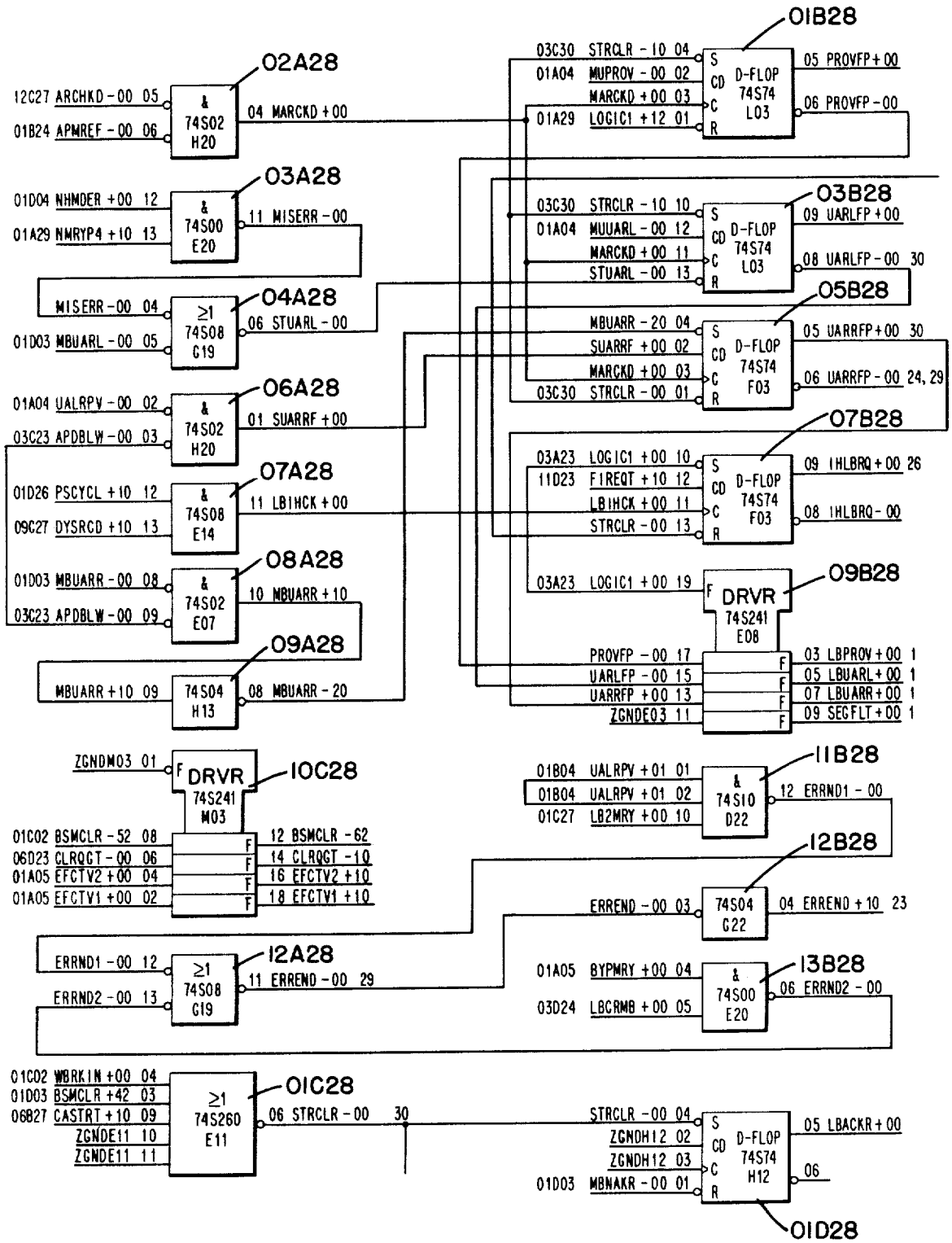

The cache control signals supplied as outputs by control logic 417 are generated as follows. CADBPL is the output of OR gate 12C24 (FIG. 26b). the inputs to OR gate 12C24 are WRDBPL and SDBPL1. WRDBPL is generated by AND gate 12B24 and will be equal to one whenever WRCYCL, LBWCT2 and UARRFP are all equal to one. The source of WRCYCL has been discussed, LBWCT2 (as primarily explained) is an input from one of the local bus processors and UARRFP is the output of D flip-flop 05B28 (FIG. 30). This D flip-flop forms part of the MMU error logic 427 and UARRFP will be one when a requested memory address is within the bounds of the available memory modules. As previously discussed, error logic 427 checks to see whether the address is physically present in the data processing system and that no attempt has been made to access a memory location by a requester that is not permitted to access the location. As previously stated, the function of MMU error logic 427 is not a feature of the instant invention, but the D flip-flops 01B28, 03B28, 05B28, and 07B28 (FIG. 30) comprise the MMU error logic circuit. Driver 09B28 generates three of the LB INTEGRITY signals, LBPROV, LBUARL and LBUARR.

The other input to OR gate 12C24 is SDBPL1 which is the output of AND gate 08C26 (FIG. 28). This AND gate has as inputs RDCYCL, MUUARR, RGTHIT, CPLOCK AND SWRNLH. SWRNLH, in turn, is the inverted output of OR gate 10C26 which receives as inputs APDBLW and LFTHIT. In sum, the output signal CADBPL is generated whenever the requested memory locations are within the system memory limits, two words have been requested, and neither of the addressed words are in the cache memory 403.

Figure 29A:
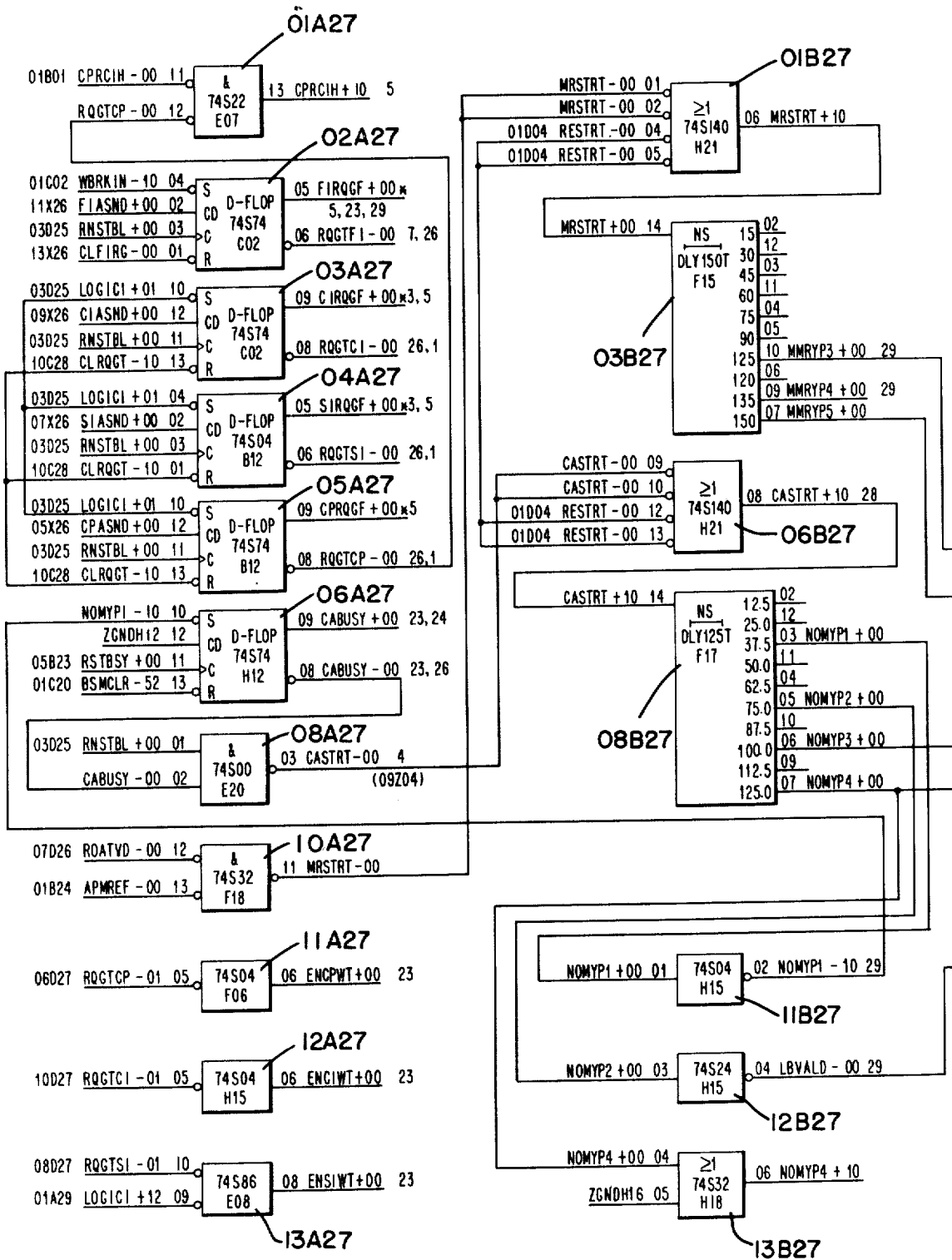
Figure 29B:
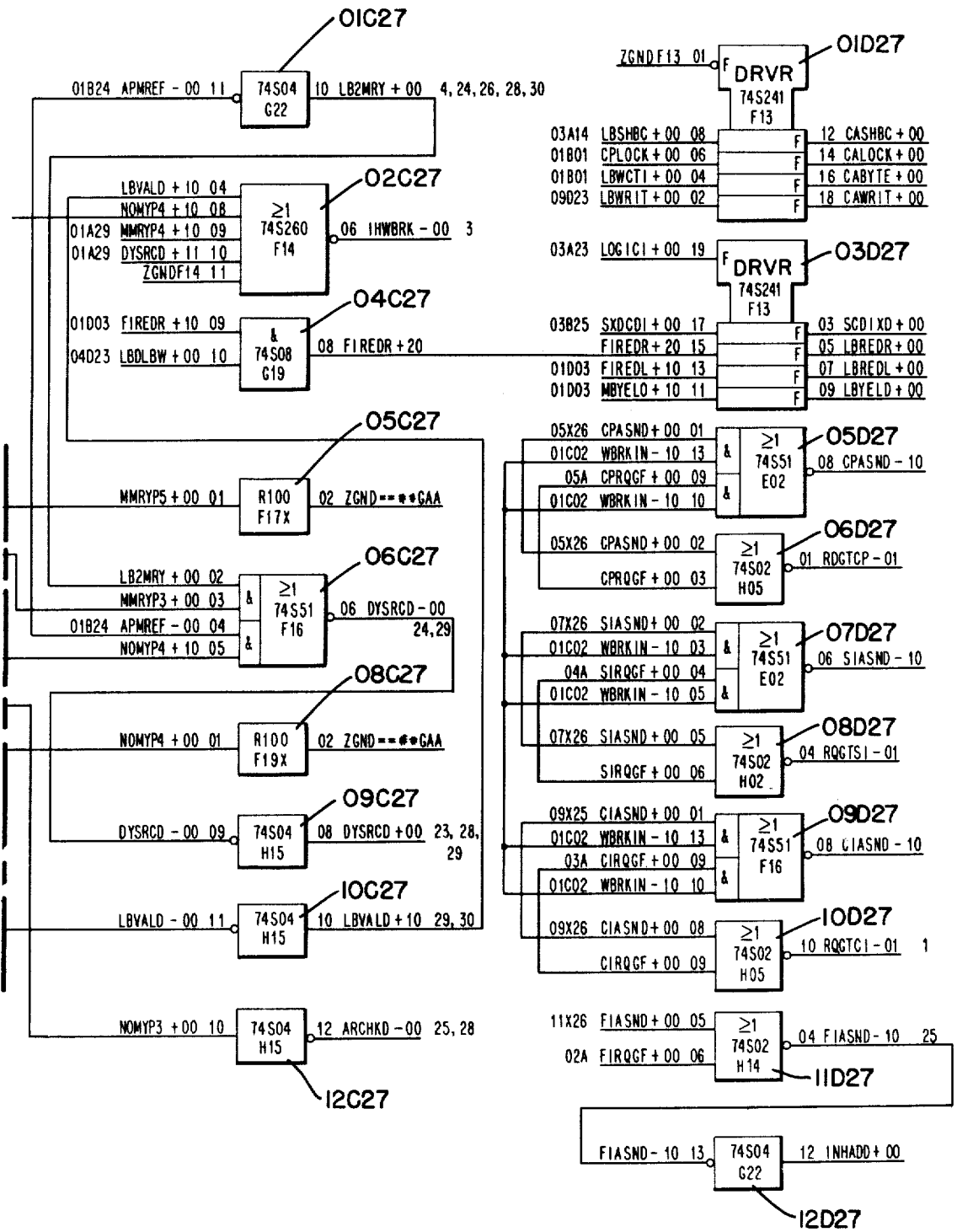

CASHBC, CALOCK, CABYTE and CAWRIT are generated by driver circuit 01D27 (FIG. 29b). The values of CALOCK AND CABYTE reflect the values of CPLOCK and LBWCT1 as received by the cache/MMU. CAWRIT is set to the value of LBWRIT generated by inverter 9D23 (FIG. 33) from the input APWRIT. APWRIT, in turn, is equal to ZERO whenever one of the local bus processors has requested a write to the memory and has been granted a local bus cycle.

The signal CASHBC is set equal to LBSHBC which, in turn, is generated by driver circuit 03A14 (FIG. 24) and reflects the value of FISHBC.

The signals CAYELO and CAMREF are generated by driver circuit 06C30 (FIG. 32b) to be equal to CPYELO and LB2MRY, respectively. As stated above, CPYELO is an output of the CPU and LB2MRY when true indicates a transfer from the local bus to the memory.

A signal CALKNC is generated by AND gate 04A29 (FIG. 31a) whenever FULHIT, CPLOCK and RDCYCL are all equal to one. FULHIT is an output of the cache memory 403 and indicates that all of the data requested in a memory read is already resident in the cache memory. CPLOCK is set equal to ONE at this input whenever a read modify right (RMW) has been requested by the CPU, RDCYCL when equal to ONE at this input indicates that a memory read cycle is being requested.

CADBWD is the output of OR gate 11C24 (FIG. 26) and will be equal to ONE whenever one or both of CADBLW and SDBPL1 is equal to ONE. The manner in which SDBPL1 is generated has been previously discussed and CADBLW is the output of AND gate 07B29 (FIG. 31a) which will be equal to ONE whenever there is a write cycle requested as indicated by WRCYCL, the assigned processor has been requested a double word as indicated by LBDBLW, and there has not been a request for an unavailable resource signified by UARRFP.

As previously stated, control logic 417 also receives the FIFO control signals FIMREF-FIYELO generated as outputs of FIFO 505 by megabus adapter (FIG. 12). FIDBDL, FIBYTE, FIDBWD and FIAD23 are all received as inputs to multiplexer 01A30 (FIG. 32a) wherein either the corresponding local bus signals or themselves are selected according the value of FICYCL. If a FIFO cycle has been granted by the local bus adapter then the FIFO origin signals will be selected whereas if it is a non-FIFO cycle, the local bus origin signals will be selected.

Figure 32A:
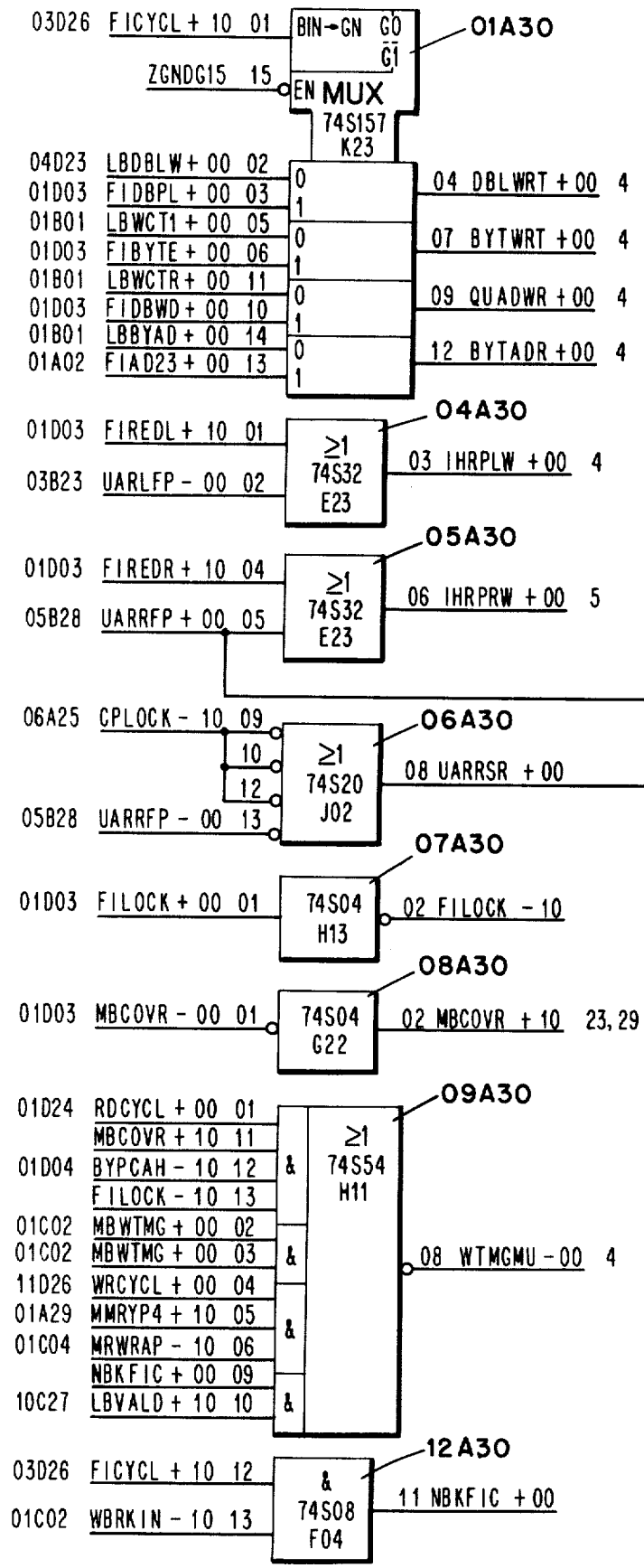
Figure 32B:
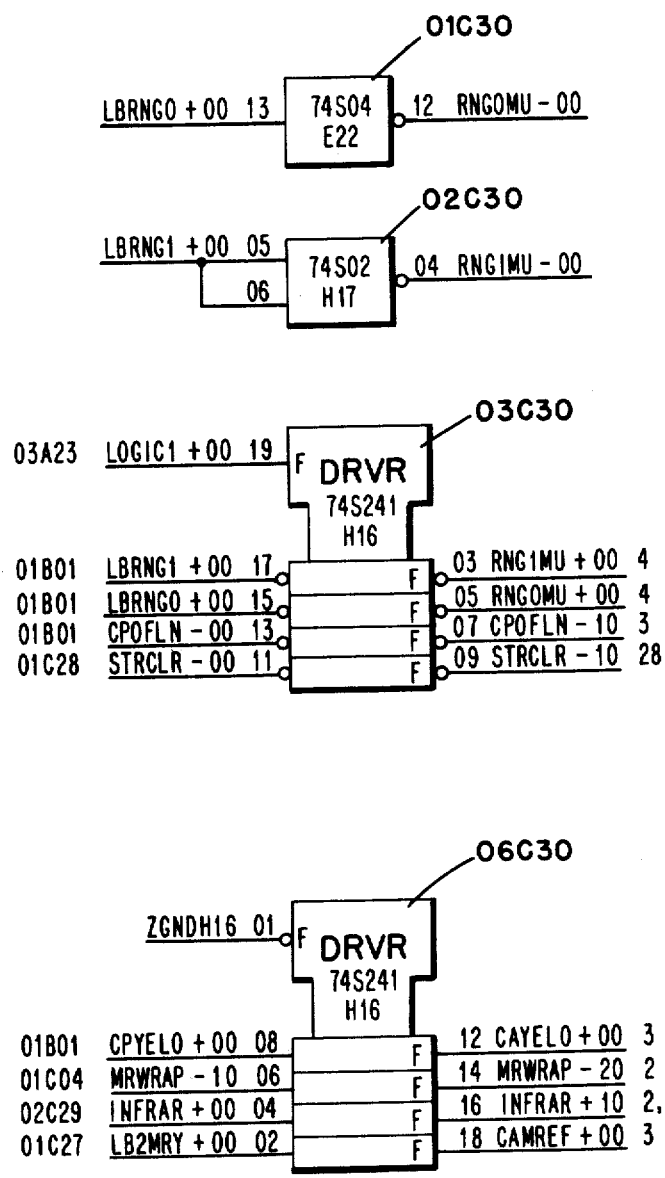
Figure 33A:
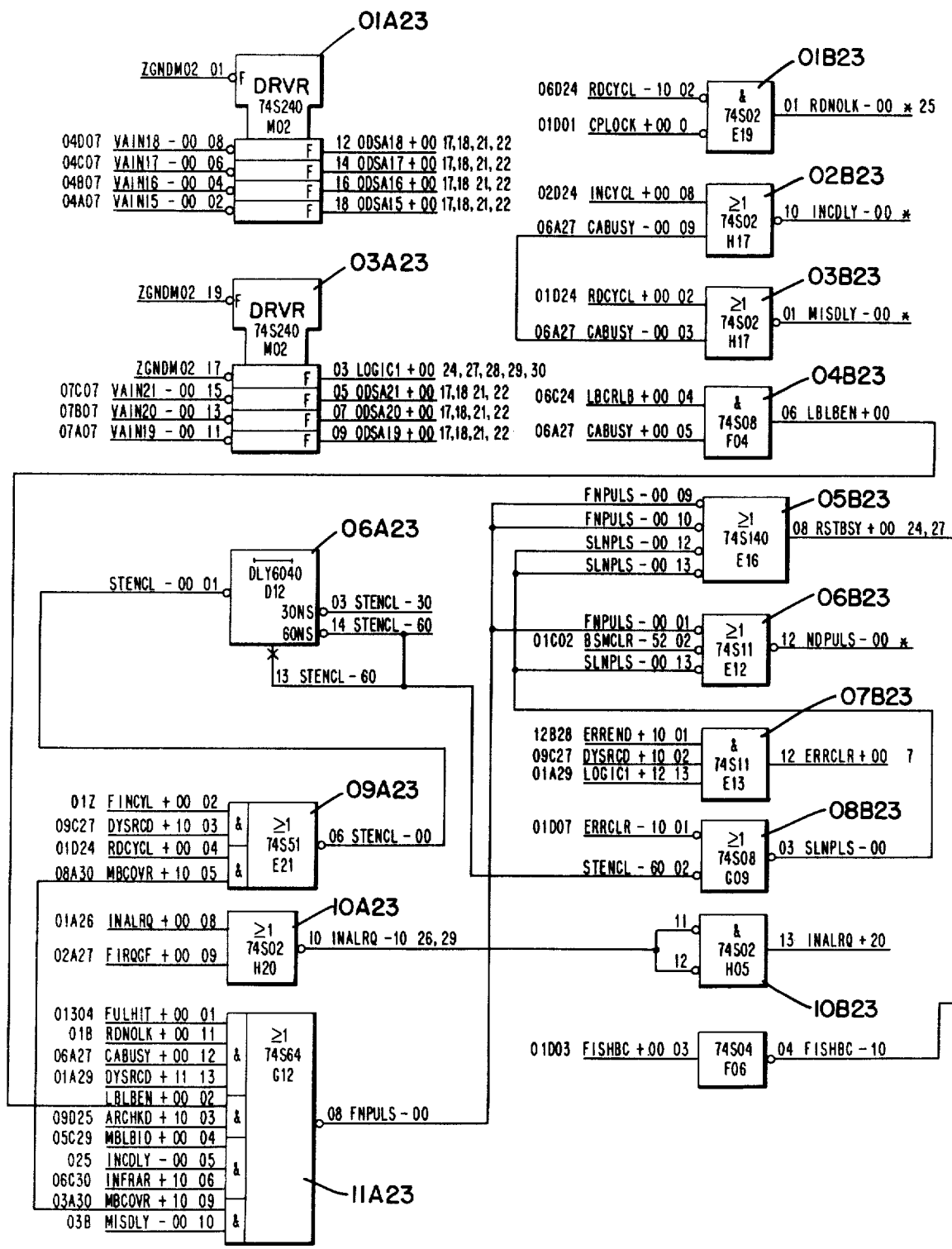
Figure 33B:
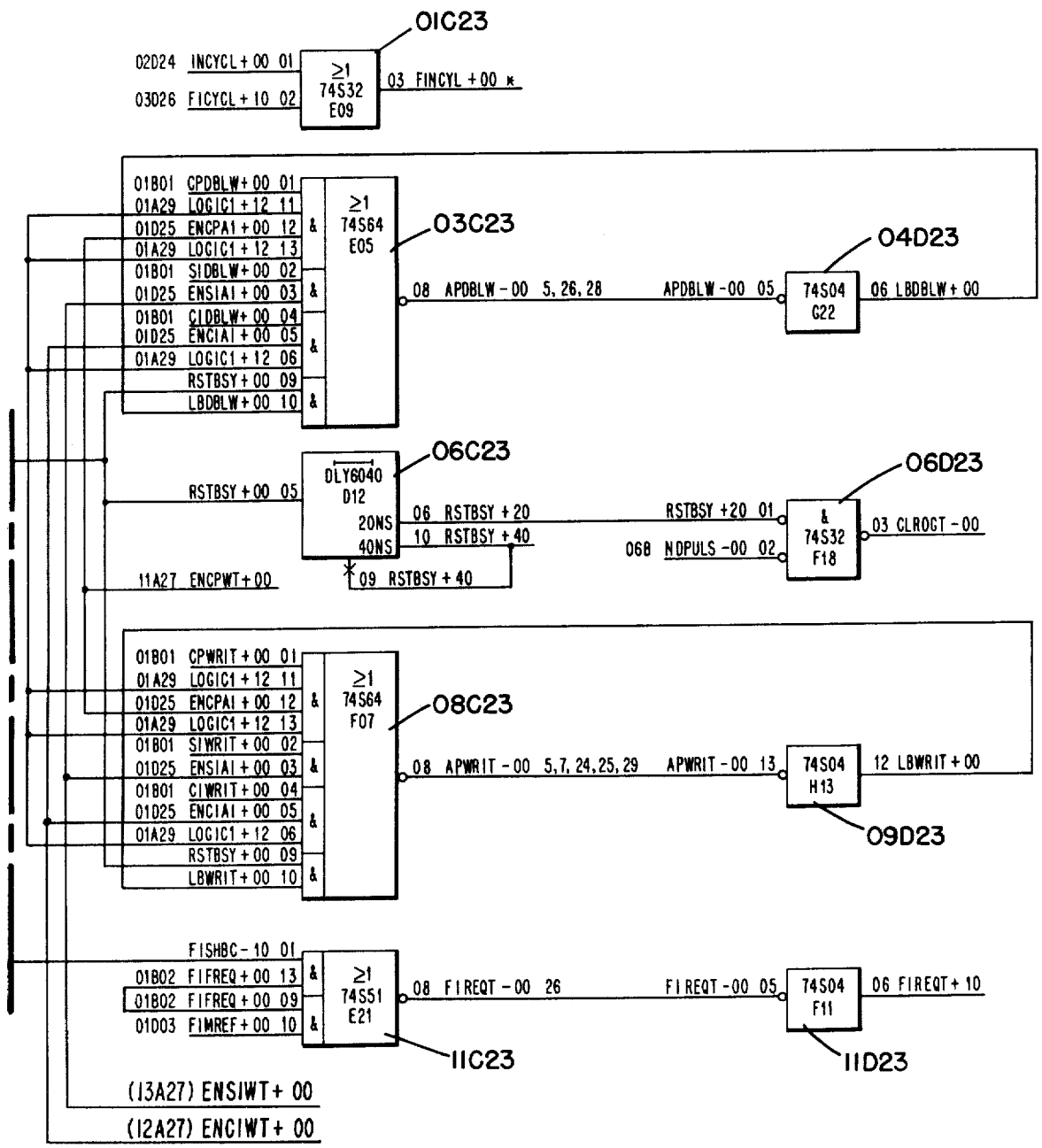

FIREDL and FIREDR are supplied as inputs to OR gate 04A30 and 05A30, respectively (FIG. 32a). The other inputs to these OR gates are UARLFP, and UARRFP, respectively. The purpose of these OR gates is to generate internal signals to be passed along with data transfers to indicate that an uncorrectable error has been discovered in the left or right words of the accompanying data. This error when sensed by the systems memory is indicated by the signals FIREDL and FIREDR. UARLFP and UARRFP indicate a request for an unavailable resource detected by the cache/MMU.

FILOCK is received by inverter 07A30 having an output subsequently provided to circuit element 09A30.

As previously stated, FISHBC is provided as one input to driver circuit 03A14 whereby it is employed to set the value of LBSHBC.

The signal FIMREF is received by circuit 11C23 (FIG. 33b) along with FISHBC. The output of this circuit is FIREQT signifying that the FIFO has requested access to the local bus adapter. As explained above, FIMREF reflects the occurrence of a main memory write by a unit coupled to the megabus, and, thus, it is necessary to access the local bus and the cache memory to ensure that the memory location in the cache is updated.

Timing generator 419 is implemented by delay circuits 03B27 and 08B27 (FIG. 29a). Delay 03B27 is initiated whenever there is a memory reference concurrently with an active request for use of the local bus. Delay 08B27 is initiated whenever there is memory reference and the cache is busy as indicated by CABUSY.

Logic circuit 417 generates the signals DCNNCP, DCNNSI, and DCNNCI equal to ONE whenever a transfer is being directed to the CPU, SIP or CIP, respectively, by the local bus adapter. These signals, as previously explained, enable the receiving processor to accept a local bus transfer. These signals are generated by AND gates 09C29, 10C29, and 11C29 (FIG. 31b). As an example, DCNNCP will be equal to ONE if LBDCNN and DSTNCP supplied as inputs to AND gates 09C29 are both true (equal to ZERO). As previously explained, DSTNCP is an output of channel number decoder 421 and, specifically, of output decoder circuit 01A24 (FIG. 26a). LBCNN is the inverted output of circuit 06D29 (FIG. 31b) and will be true whenever the output of any one of the four AND gates included in the circuit generates a ONE output. One of these AND gates receives the input signals, FULHIT, CPLOCK, RDCYCL, and DYSRCD. The origins of FULHIT, CPLOCK, and RDCYCL have been discussed. DYSRCD (directory searched) is the output of driver circuit 01A29 (FIG. 31a) and it has the value of MMRYP3 which is an output of delay circuit 03B27 (FIG. 29a). Thus, if a read cycle has been requested by a local bus processor, the requested information is stored in the cache memory, the CPU has not locked the cash memory location, and a directory search has been completed, then the four input AND gate generates a ONE and LBDCNN will assume a true value (ZERO).

A second AND gate included in circuit 06D29 receives as inputs MBCOVR and APWRIT. As stated above, APWRIT when true (equal to 0) indicates that a write to memory is being requested by a local bus processor. Thus, if no write has been requested APWRIT will be equal to ONE, MBCOVR is the inverted value of the signal MBCOVR transmitted from the megabus adapter to the local bus adapter. The value of the inverted MBCOVR will be ONE if a transfer is being directed to the local bus and, therefore, LBDCNN will be set to ZERO. LBDCNN will also take on a zero value when MBLBIO, DYISRCD, and INHDCN are all equal to ONE. These three signals are inputs to the third AND gate included in circuit 06D29. MBLBIO is an output of OR 05C29 and will be set to ONE whenever the megabus is directing a command to the local bus. DYSCRD will be set to ONE whenever a cache directory search has been performed, and INHDCN will be set to ONE whenever a DCNN is not to be inhibited. INHDCNN is generated by AND 04C29 which receives as inputs ERREND and APWRIT. ERREND is the output of inverter 12B28 (FIG. 30) which has as an input the signal ERREND generated as the inverted output of OR 12A28. As seen by the circuits in FIG. 30, the value of ERREND presented to the inverting input of AND gate 04C29 will mean that: (1) there is a memory request generated by a local bus processor and the request designates an unavailable resource or violates a protection rule, or (2) there is a local bus transfer to the megabus indicating that the memory is to be bypassed. APWRIT will be set to ONE when presented to the inverting input of AND gate 04C29 if a local bus processor has requested a memory write. In sum, if the generation of a DCNN has not been inhibited and if there is a megabus transfer to the local bus, and the cache directory has been searched, the the output of the 3-input AND gate in the circuit 06D29 will be 1 and LBDCNN will be set to 0.

The final AND gate in circuit 06D29 will generate a ONE output if there is a transfer between two local bus processors as indicated by LBCRLB being set to ONE and a local bus transfer is valid at that time as indicated by LBVALD being set to ONE. LBVALD is the output of inverter 10C27 (FIG. 29b) and is set to the value of NOMYP2 which is output of delay circuit 08B27 (FIG. 29a).

The output INPNDG is generated by control logic circuit 417 by means of an appropriate driver circuit which receives an output from megabus adapter indicating that an interrupt exists in interrupt register 519. The signal is MBIPND as generated by the interrupt register and is transferred to a dedicated line on the local bus for transmission to the CPU.

LBACKR is an output of D flip-flop 01D28 (FIG. 30). LBACKR when equal to ONE indicates an ACK by the megabus unit and when equal to ZERO indicates a NAK. LBACKR will be set to ZERO whenever there is a master clear, a write break-in as indicated by WBRKIN being received with a ONE value from the megabus adapter, or whenever CASTRT isgnal is ONE. If the megabus has issued a NAK, as indicated by MBNAKR being set to ZERO, the D flip-flop 01D28 will be reset and LBACKR will be set to ZERO.

4. Preferred Embodiment of Megabus Adapter

Figure 34A:
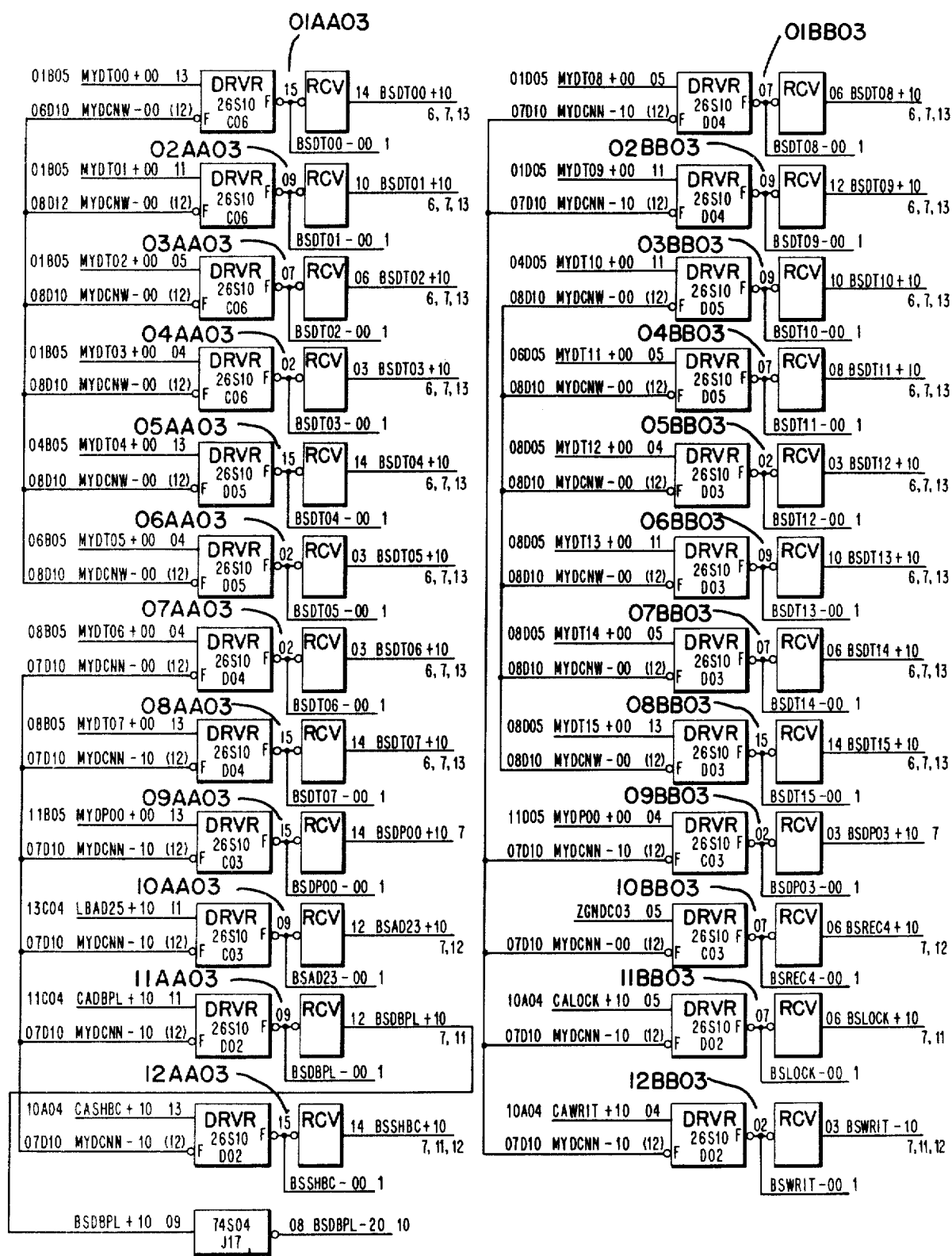
FIGS. 34a–46b are detailed logic block diagrams illustrating a hardware embodiment of the megabus adapter illustrated in FIG. 12.
Figure 34B:
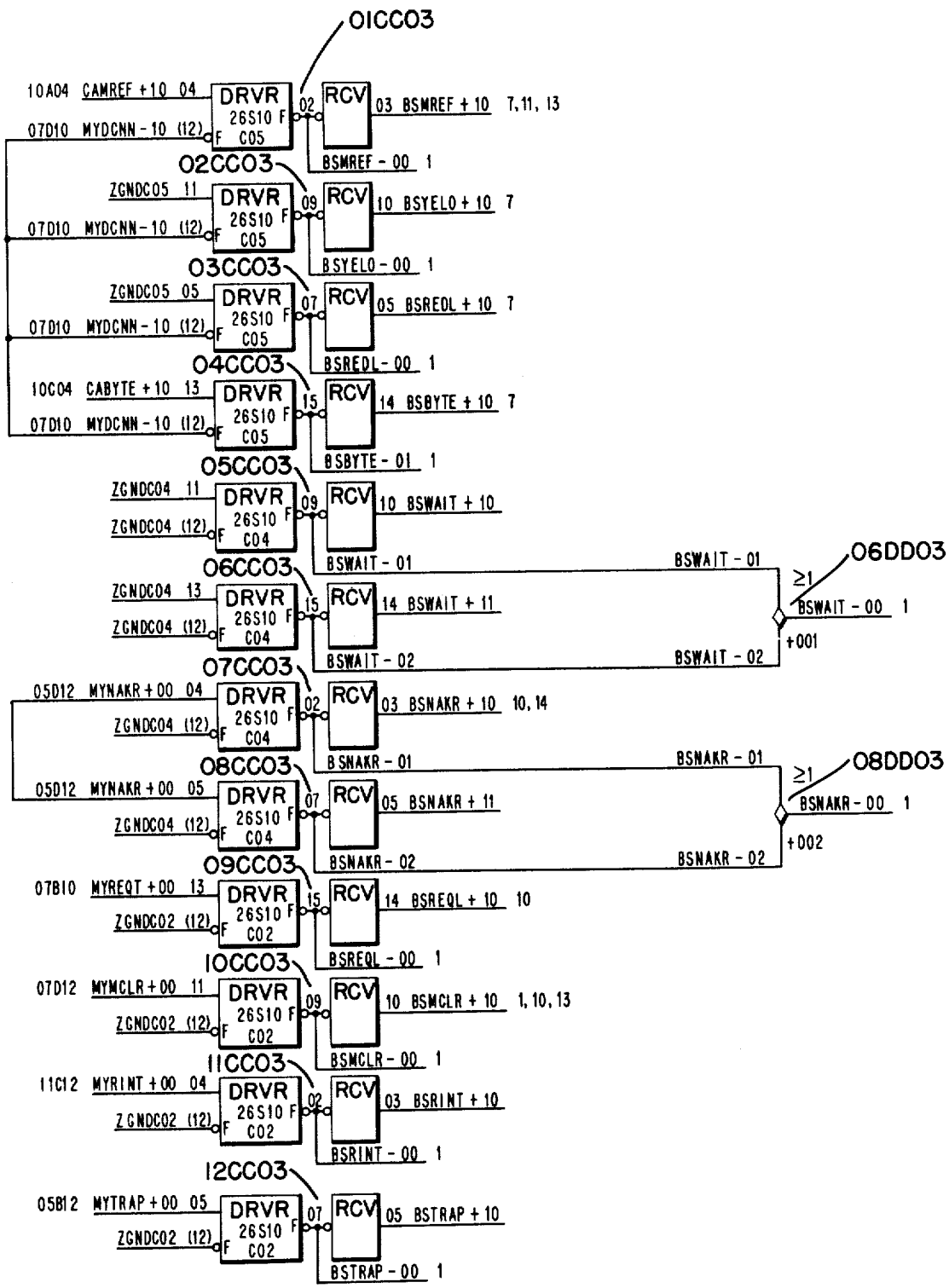
Figure 35A:
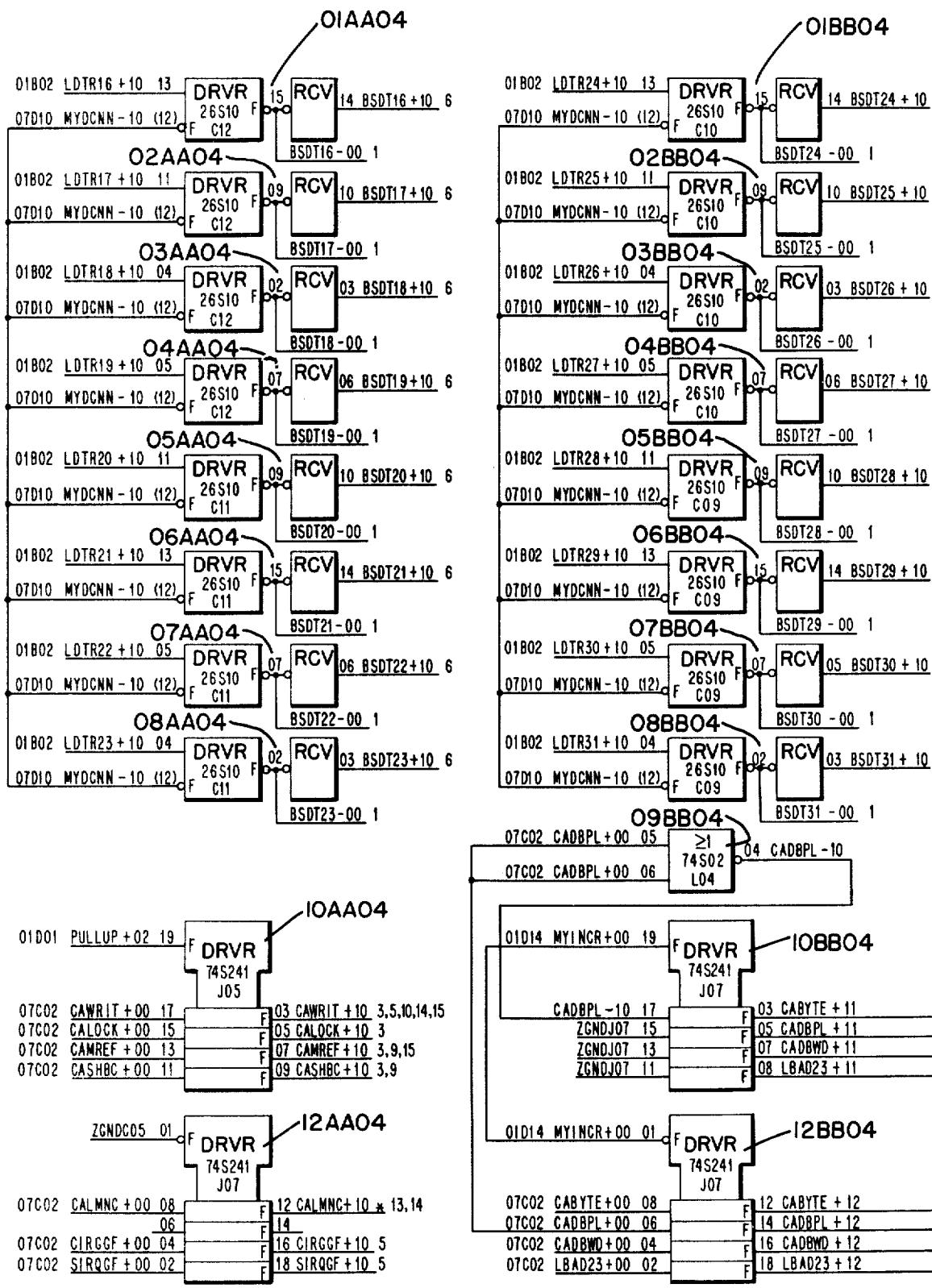

FIGS. 34a–b, 35a–b, and 36a–b illustrate a hardware embodiment of transceivers 503 (FIG. 12). As an example, transceiver 01AA03 receives the megabus data line BSDT00. The receiver portion of the transceiver supplies an inverted value of the received megabus data and an inverted transfer from the megabus adapter to the megabus is performed by the driver circuit portion of the transceiver. The driver circuit receives as an input MYDT00 and will transmit an inverted value of the signal as BSDT00 when the enable signal MYDCNW is true (equal to 0). The signal MYDCNW is generated by AND gate 08DD10 (FIG. 41b). One input of AND gate 08DD10 is an output of JK flip-flop 05DD10 and will be equal to ONE when the megabus adapter has assumed a megabus cycle by the above-referred to bus priority logic. The other input to AND gate 08DD10 is CAWRIT which is an output of driver circuit 10AA04 (FIG. 35a). This signal originates at the local bus adapter and has a value of ONE whenever a system memory write has been requested. Thus, transceiver 01AA03 will transmit the data bit MYDT00 to the megabus line BSDT00 when there has been a request from within the central subsystem for a transfer to the megabus and the megabus adapter has assumed a megabus cycle.

Transceiver circuits 02AA03–08AA03 transmit and receive the megabus data bits BSDT01–BSDT07, respectively, in the manner explained with respect to transceiver circuit 01AA03. Similarly, transceivers 01BB03–08BB03 interface BSDT08–BSDT15, respectively, with the megabus. Data bits BSDT16–BSDT23 are transmitted and received by means of transceivers 01AA04–08AA04 (FIG. 32a) and data bits BSDT24–BSDT31 are transmitted and received by means of transceivers 01BB04–08BB04. The parity bits associated with the data words are received and transmitted by transmitters 09AA03 and 09BB03.

Transceiver 10AA03 receives BSAD23 and transmits LBAD23. Transceiver 11AA03 receives and transmits the double-pull signal DBPL and transceiver 12AA03 receives and transmits the second-half bus cycle as CASHBC when it is being transmitted to the megabus and ISSHBC when it is received from the megabus. Inverter 13AA03 is provided to invert the value of the received double-pull signal BSDBPL. Transceiver 10BB03 receives and transmits the bus request high priority signal BSREQH, transceiver 11BB03 receives and transmits the LOCK signal, and transceiver 12BD03 receives and transmits the WRIT signal.

Referring to FIG. 34b, transceiver 01CC03 receives and transmits the memory reference signal MREF, transceiver 02CC03 receives and transmits the YELO signal, transceiver 03CC03 receives and transmits the REDL signal, and transceiver 04CC03 receives and transmits the BYTE signal.

The WAIT signal is received and transmitted from the megabus adapter to the megabus by transceivers 05CC03 and 06CC03. OR 06DD03 couples the outputs of the WAIT transceivers. The NAKR signal is received and transmitted by a transceivers 07CC03 and 08CC03 and OR 08DD03 couples the signals BSNAKR received from the megabus.

The megabus adapter request in an MYREQT is transmitted to the megabus as BSREQL and received on the megabus as BSREQL by transceiver 09CC03.

Transceivers 10CC03, 11CC03, and 12CC03 receive and transmit the master clear signal (MCLR), the resume interrupting signal (RIMT), and the signal (TRAP), respectively. Referring now to FIG. 35a, the previously referred to transceivers 01AA04–08AA04 and 01BB04–08BB04 transmit LDTR16–LTDR31 as BSDT16–BSDT31. As discussed above, the data signals LDTR are outputs of cache data input multiplexer 401 and correspond to local bus data signals secured by the megabus adapted.

Also included in FIG. 35a are driver circuits 10AA04, 12AA04, 10BB04, and 12BB04; these interface the cache control signals (CACNTRL0:10) as generated by control logic 417 (FIG. 11) with the previously described transceivers.

The signal PULLUP is a constant high value and is used as an enable for various circuit elements in megabus adapter, e.g., driver circuit 10AA04. The signal MYINCR employed to enable drivers 10BB04 and 12BB04 is an output D flip-flop 01DD14 (FIG. 45b) and will be set to ONE to enable the driver circuit.

Figure 35B:
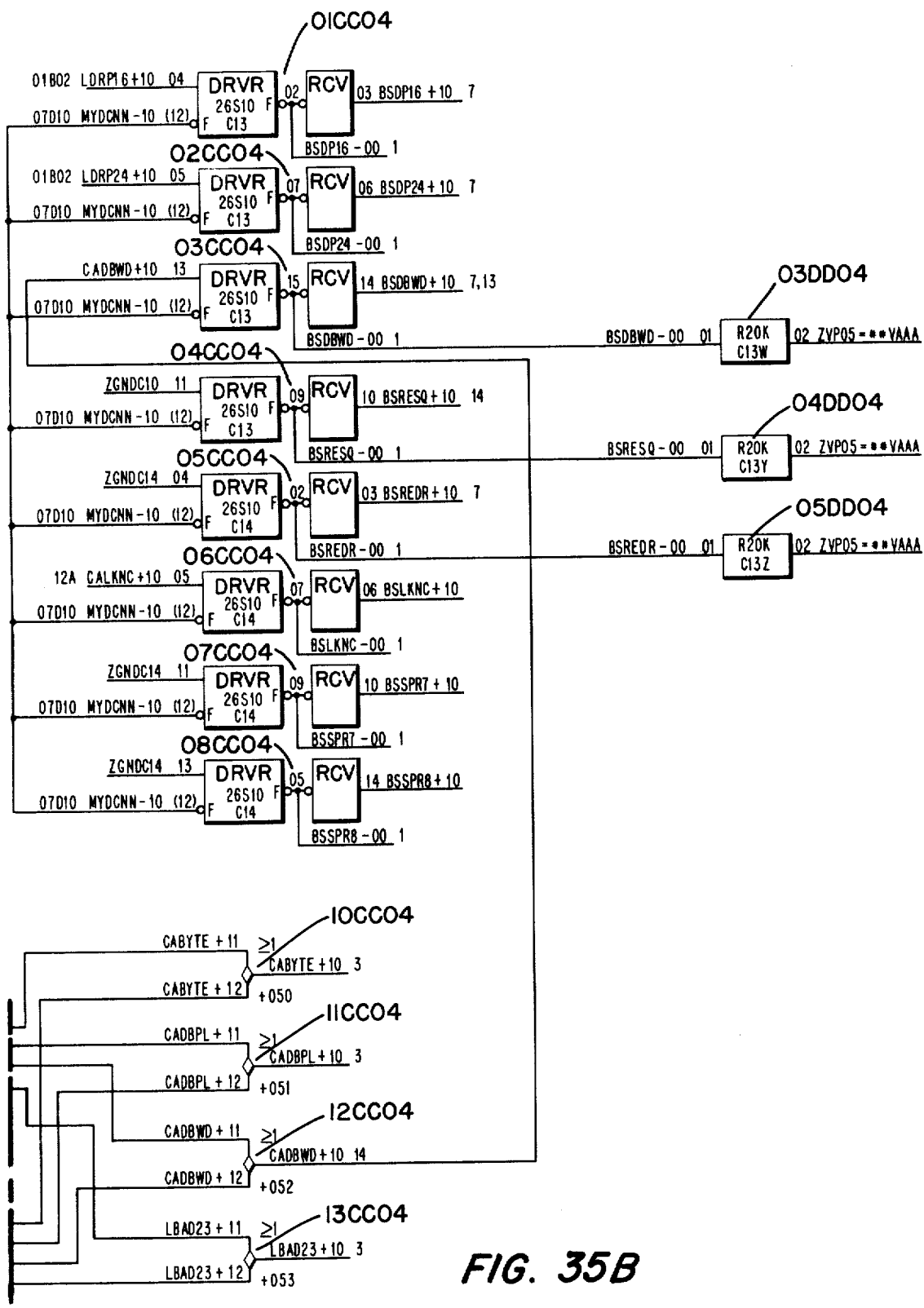

Referring to FIG. 35b, transceiver 01CC04 and 02CC04 receive and transmit the remaining two data parity bits.

Transceiver 03CC04 receives and transmits the double-wide signal DBWD and transceiver 06CC04 receives and transmits the lock, no-cycle signal LKNC. Transceivers 04CC04, 05CC04, 07CC04, and 08CC04, will always transmit at their inverted output a high value, when enabled, since the input to the driver circuits in the transceivers is maintained at ground. These transceivers receive the signals BSRESQ (response qualifier), BSREDR (non-correctable error in the right data word), BSSPR7 (SPARE), and BSSPR8 (SPARE), respectively.

Figure 36A:
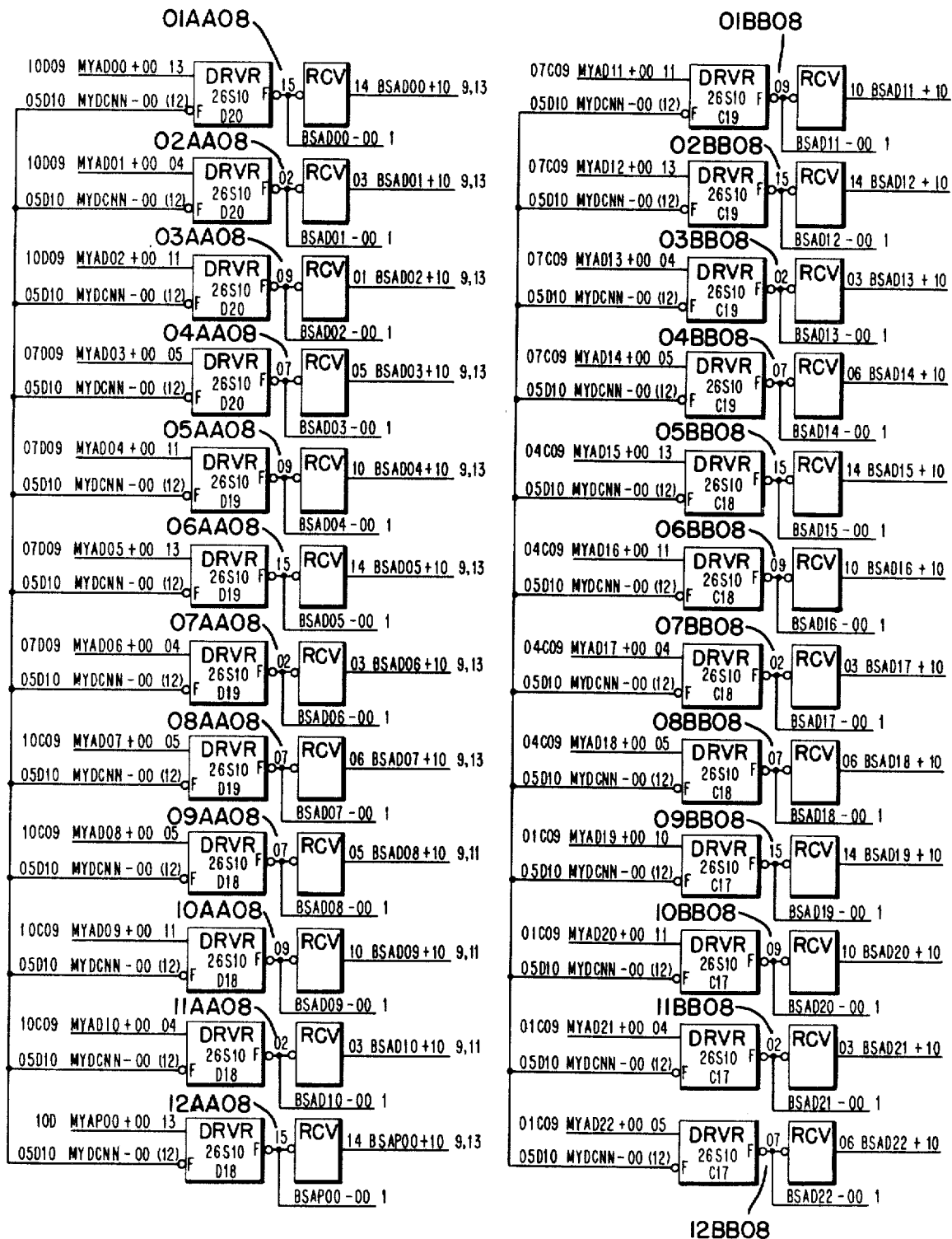

FIG. 36a illustrates a hardware embodiment of transceivers for receiving and transmitting address data. Thus, transceivers 01AA08–12BB08 transmit MYAD0-0–MYAD22 to the megabus from the megabus adapter and receive the signals BSAD00–BSAD22 from the megabus.

FIG. 36b includes parity generator 10DD08 for generating either an even or odd parity bit to be transmitted with the address data.

Also, illustrated in FIG. 36b are transceivers for the DCNN and ACKR signals.

Figure 37A:
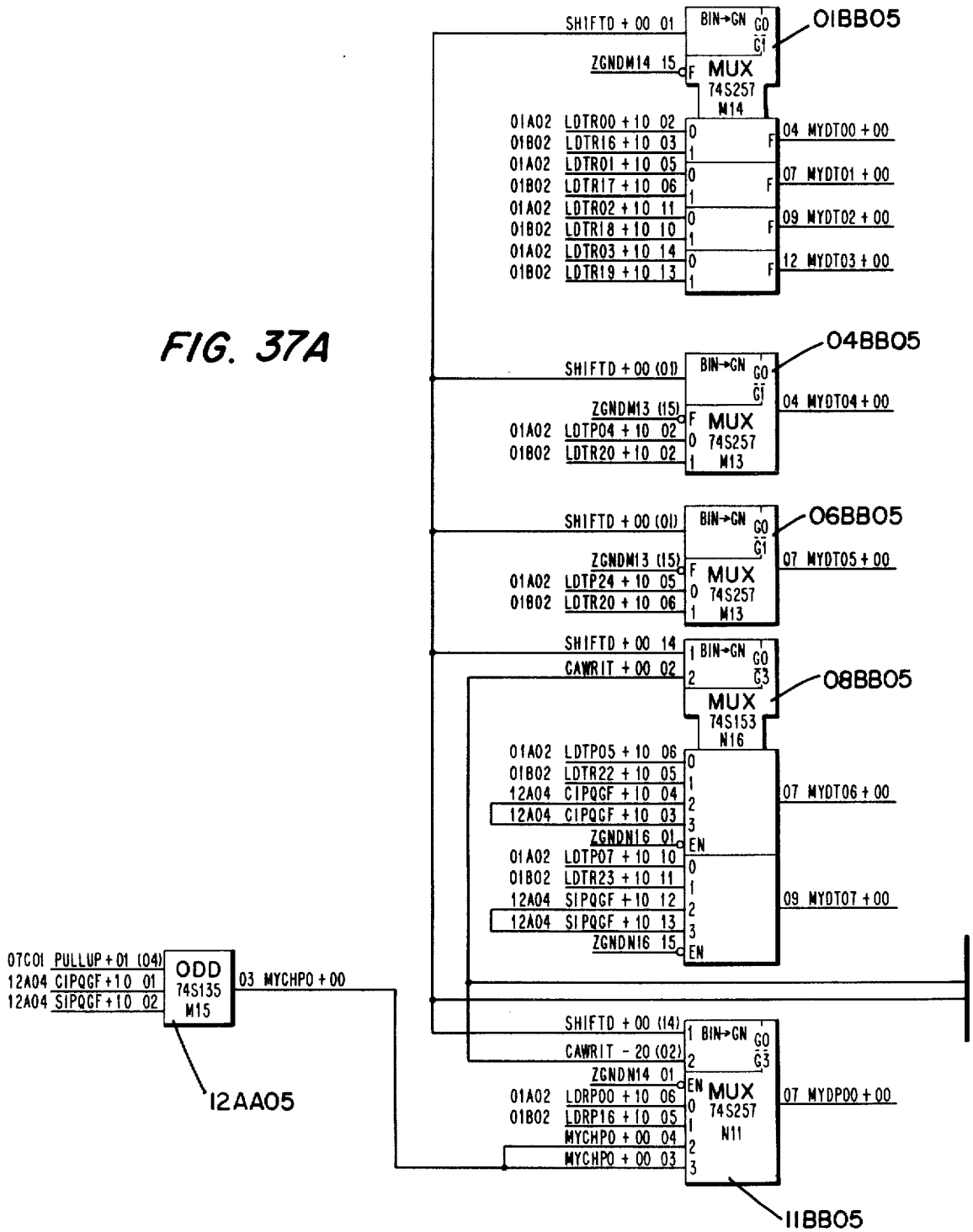
Figure 37B:
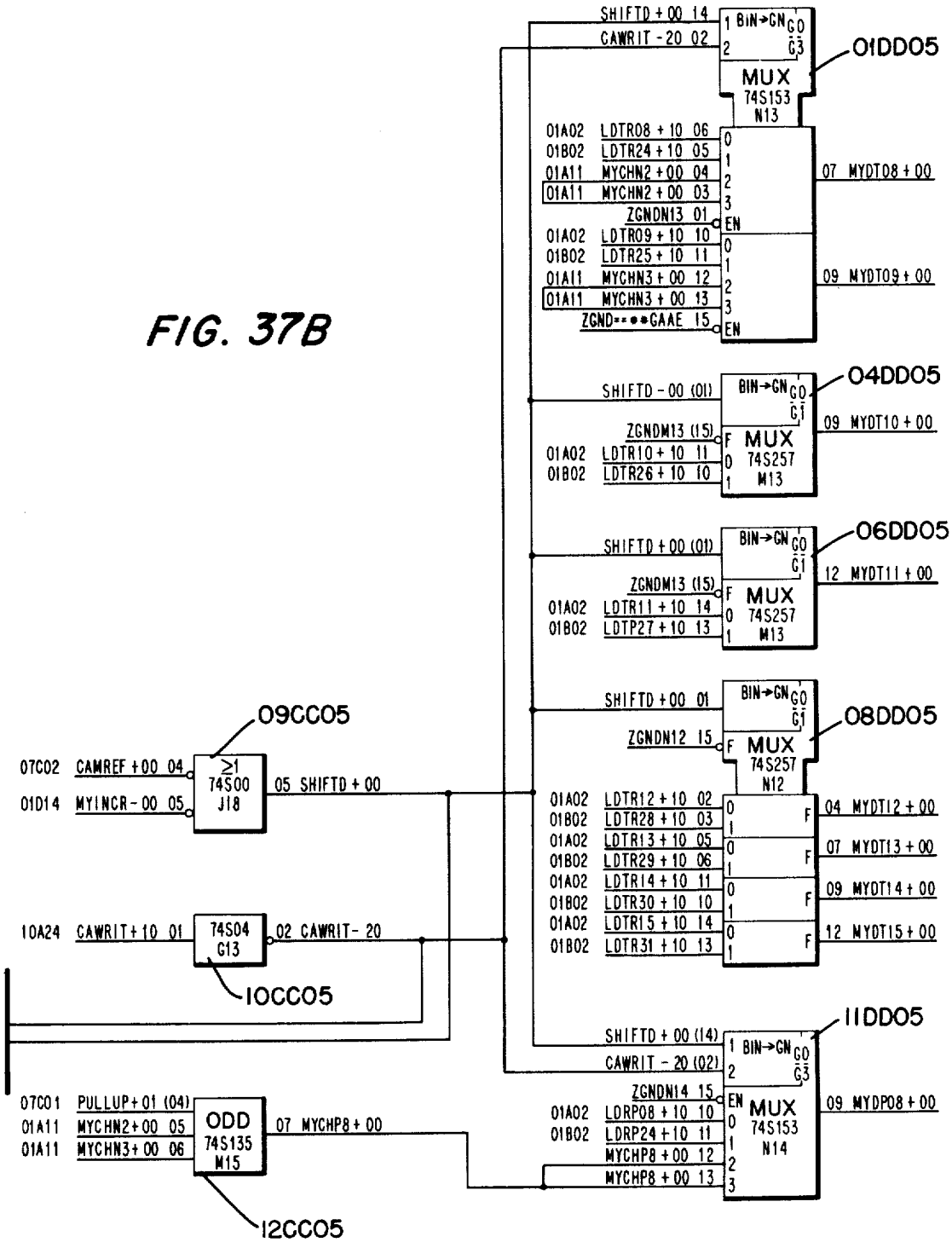

An exemplary embodiment of data output multiplexer 523 is illustrated in FIGS. 37a and 37b. Multiplexers 01BB05, 04BB05, and 06BB05 select from either the six left-hand bits of the first data word (LDTR00–LDTR05) or the six left-hand bits of the second data word (LDTR16–LDTR21) under the control of enable signal SHIFTD to generate MYDT-00–MYDT05. The value of SHIFTD is set by OR 09CC05 to be equal to ONE whenever either CAMREF or MYINCR is true (equal to ZERO). When equal to ONE, SHIFTD causes the left-hand 6 bits of the second data word to be transferred to the megabus adapter data field MYDT 0:5.

Multiplexer 08BB05 generates data bits MYDT06 and MYDT07 under the control of SHIFTD and CAWRIT. If both control bits ZERO, LDTR06 and LTDR07 are transferred to the output, if SHIFTD is ONE and CAWRIT is ZERO, the LDTR22 and LDTR23 are transferred to the outputs, and if CAWRIT is equal to ONE and SHIFTD is equal to ZERO or both control signals are equal to ONE, CIRQGF and SIRQFG (as generated by the local bus adapter) are transferred to MYDT06 and MYDT07, respectively.

Multiplexer 01DD05 (FIG. 37b) is also controlled by the signals SHIFTD and CAWRIT and generates output data signals MYDT08 and MYDT09. MYDT08 is set to either the value of LDTR08, LDTR24, or MYCHN2, the second bit of the megabus adapter channel number as generated by hexadecimal switch 01AA11 (FIG. 42a), depending upon the value of the control signals. Similarly, MYDT09 is set to the value of LDTR09, LDTR25, or MYCHN3 depending upon the values of the control signals.

Multiplexers 04DD05, 06DD05, and 08DD05, select either LDTR10-LDTR15 or LDTR26-LDTR31 to generate outputs MYDT10-MYDT15 under the control SHIFTD.

Parity bits MYDP00 and MYDP08 are generated by multiplexers 11BB05 and 11DD05 depending upon the values of the control signals SHIFTD and CAWRIT.

FIGS. 38a–b, 39a–b, 40a, and 44a–b illustrate a hardware embodiment of FIFO 505, write address register 507, read address register 509, write detector 511, FIFO control 513, OR 515, multiplexer 517, interrupt register 519, and second-half bus cycle register 521.

Figure 38A:
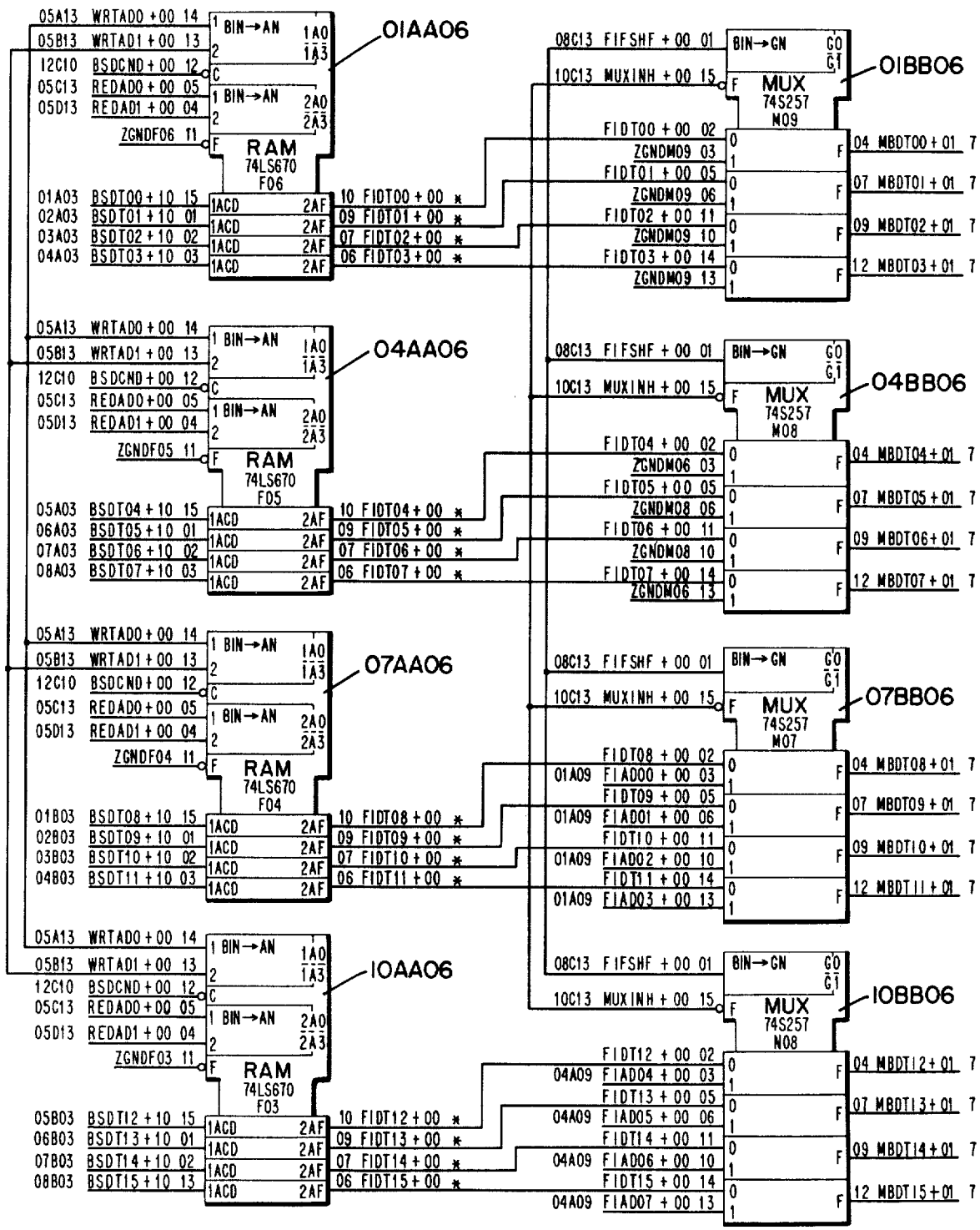
Figure 38B:
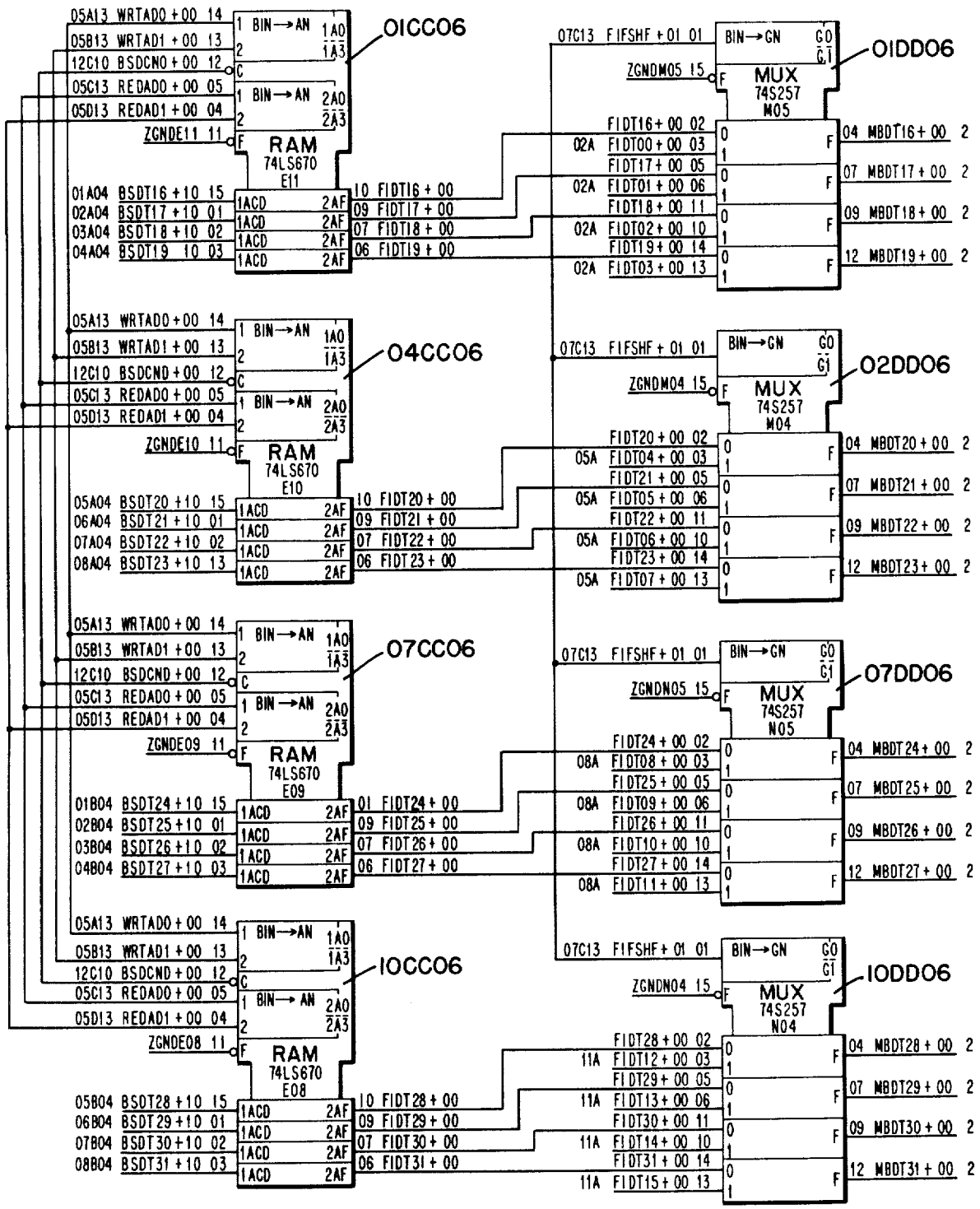
Figure 39A:
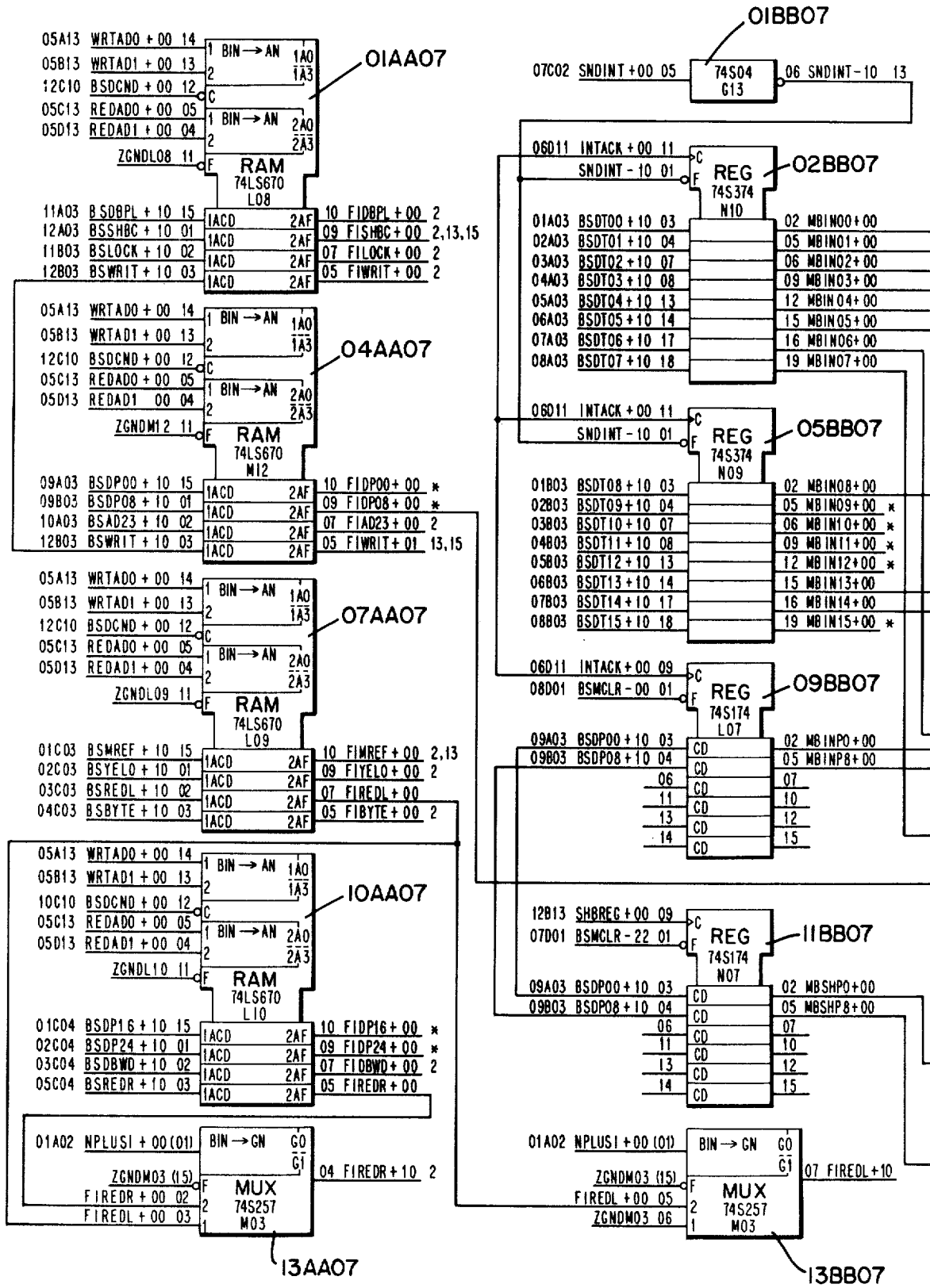
Figure 39B:
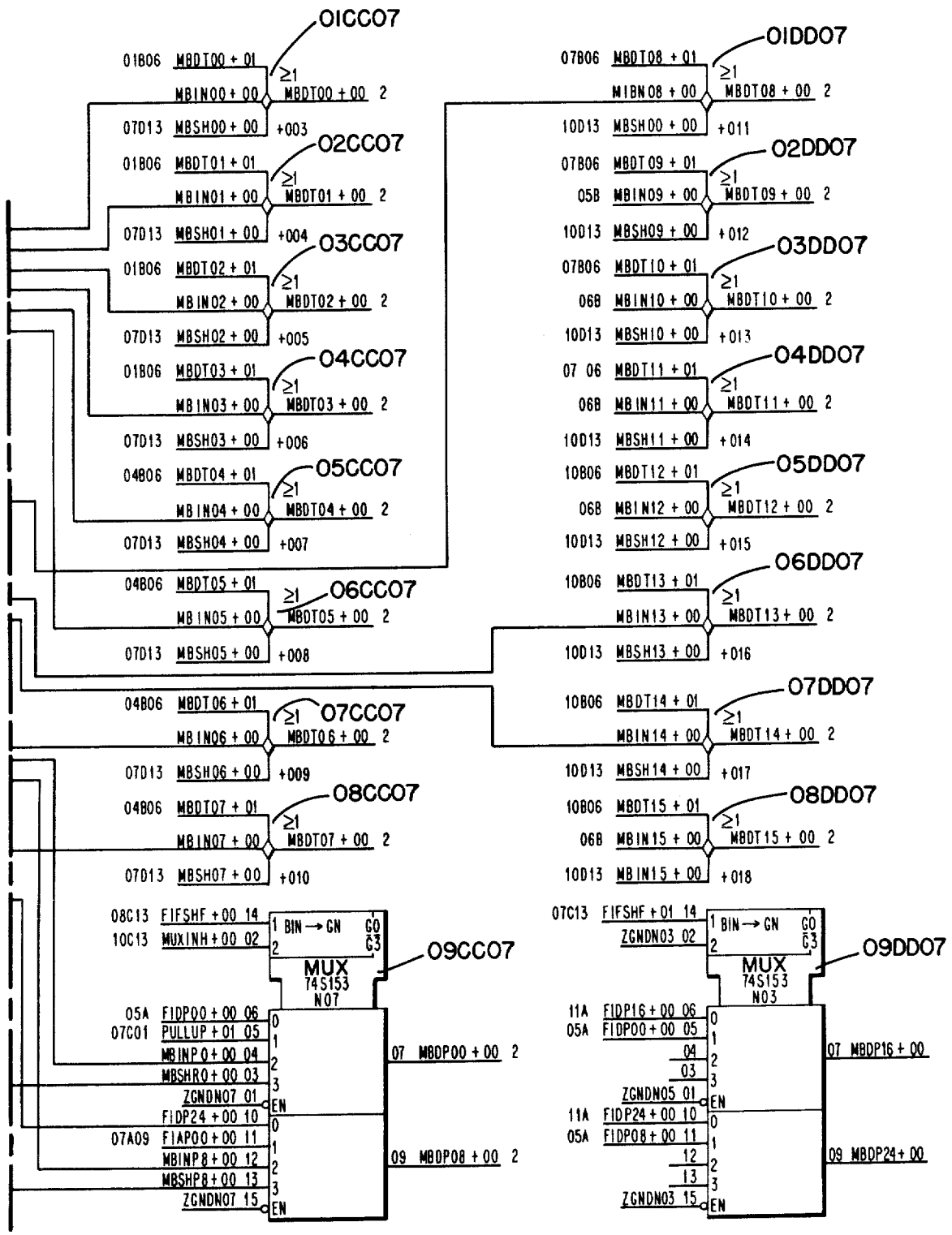
Figure 44A:
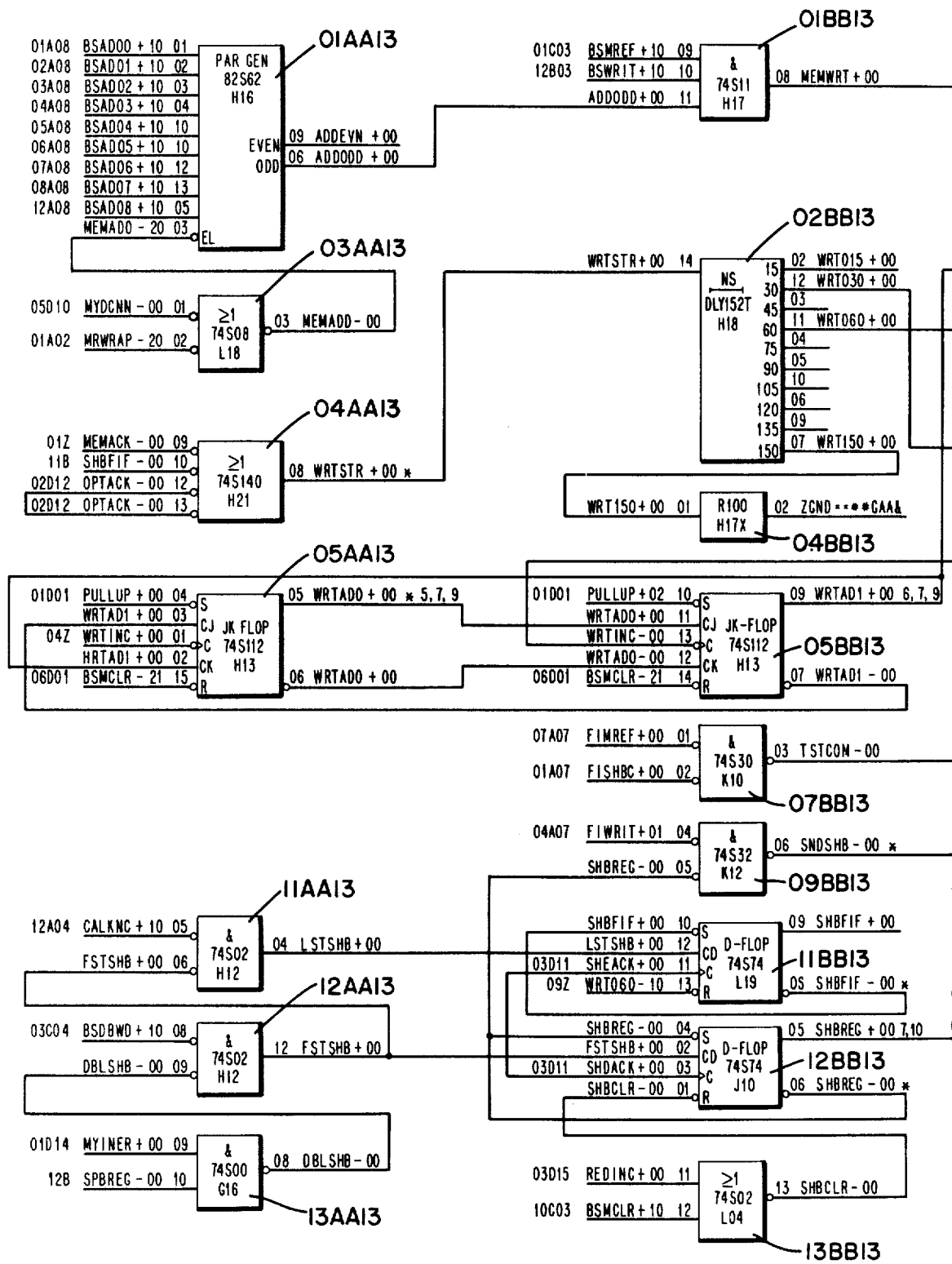
Figure 44B:
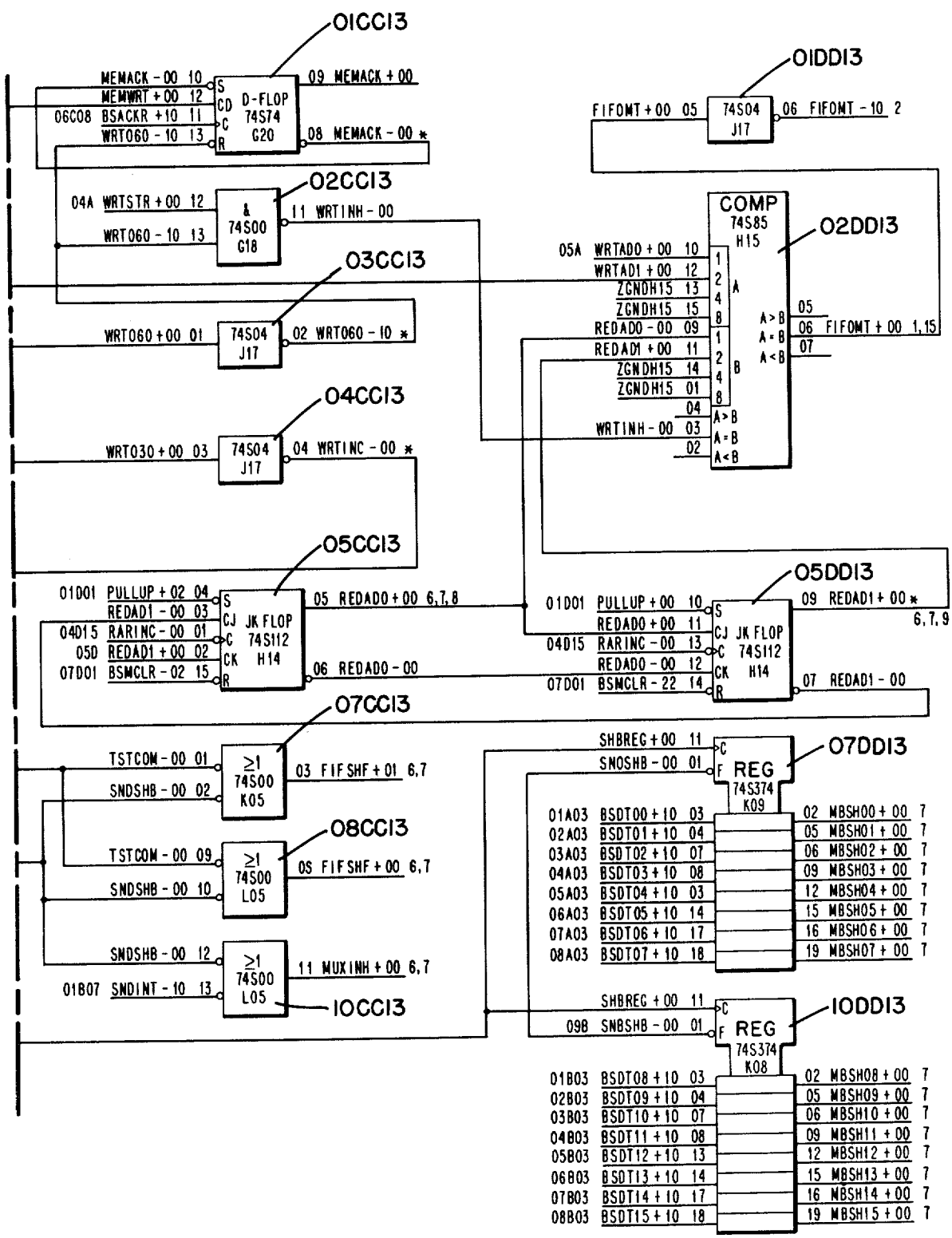

Referring to FIGS. 38a, 38b, and 39a, a set of random access memories (RAMS) and output multiplexers are shown. RAM 01AA06 is a 4×4 memory element receiving as inputs BSDT00-BSDT03 and providing as if outputs FIDT00-FIDT03. The location in RAM 01AA06 wherein data is written is controlled by write control signals WRTAD0 and WRTAD1 such that information can be written into the RAM and can be shifted from input to output. Read address control signals REDAD0 and REDAD1 control the addresses, i.e., 0-3, from which information in the memory is read. WRTAD0 and WRTAD1 are generated by JK flip-flop 05BB13 and 05AA13 (FIG. 44A). These JK flip-flops receive the signal WRTINC with a value of true (equal to 0) whenever the write address in the FIFO is to be incremented. WRTINC is the output of inverter 04CC15 (FIG. 44b) which receives an input WRT030 out of delay circuit 02BB13. The delay is initiated by a write store signal WRTSTR generated from OR 04AA13. The write store signal will be set to ONE whenever the system memory generates an ACK for a memory write (MEMACK equal to ZERO) or a second-half bus cycle is to be stored in the FIFO as indicated by SHBFIF being set true. This will occur when the FIFO is to capture a second data word transferred in a second bus cycle by a single-width, double-pull memory or in response to a second read request of a single-width, single-pull memory.

Specifically, SHBFIF is an output of D flip-flop 11B13. As described above in the discussion of FIG. 12, the first data word transferred in response to a double-pull request DBPL or in response to a double-width read request of a single-width, single-pull memory will be stored in register 07DD13 and 10DD13 under the control of SHBREG generated by D flip-flop 12DD13.

The control of the D flip-flops 11BB13 and 12BB13 is performed by three AND gates 11AA13, 12AA13, and 13AA13. Initially, SHBREG, supplied as one input to AND gate 13AA13, will be equal to ZERO and, thus, the inverted output DBLSHB will be equal to ONE. DBLSHB is inverted by the input of AND gate 12AA13 and is logically combined with the value of BSDWD. This will cause FSTSHB to be equal to ONE and toggle D flip-flop 12BB13 to set SHBREG equal to ONE. This will load BSDT00-BSDT15 into register 07DD13 and 10DD13. Setting SHBREG equal to ONE will cause DBLSHB to equal ONE after it is inverted on the output of AND gate 13AA13. This, in turn, will result in FSTSHB, the output of AND gate 12AA13, being equal to ZERO. AND gate 11AA13 receives FSTSHB and CALKNC as inputs through inverters and will set the last second-half bus cycle signal (LSTSHB) equal to ONE to toggle the flip-flop 11B13 and set SHBFIF to ONE. It is in this manner that the write address of the FIFO is incremented and the 16 bits of megabus data transferred in the next megabus cycle are stored in the FIFO.

The read control signals REDAD1 and REDAD0 are generated by JK flip-flops 05CC13 and 05DD13, respectively. The read address will be incremented under the control of RARINC generated by OR 04DD15 (FIG. 46b). RARINC will be set equal to ZERO whenever a read of the FIFO is generated in response to, for example, a write break-in, and since RARINC is received in the JK flip-flops 05CC13 and 05DD13 by inverting inputs, these flip-flops will be toggled.

Comparator 02DD13 (FIG. 44a) monitors the contents of FIFO 505 by comparing the value of the write address signals WRTAD0 and WRTAD1, with the read address signals REDAD0 and REDAD1. If these two quantities are equal, the FIFOMT will be set equal to ONE to indicate that the FIFO is currently emplty. As indicated in FIG. 11, FIFOMT is the signal supplied to request arbitration network 407 to request the assignment of a local bus cycle to the FIFO memory.

Referring to FIG. 38a, multiplexer circuit 01BB06 and 04BB06 select either FIDT00-FIDT07 or ZERO under the control of FIFSHF. The selected value is transferred to MBDT00-MBDT07. This enables MBDT00-MBDT07 to be zero-filled or to contain the content of FIDT00-FIDT07. Multiplexers 07BB06 and 10BB06 set MBDT08-MBDT15 to the values of either FIDT08-FIDT15 or FIAD00-FIAD07 under the control of FIFSHF. The transfer of the address signals to the megabus data lines is, as explained above, performed whenever a I/O mode operation is directed to the central subsystem.

Multiplexers 01DD06-10DD06 set MBDT16-MBDT31 to the values of FIDT16-FIDT31 or FIDT00-FIDT15 under the control of FIFSHF. Thus, if the data stored in the FIFO was not stored in response to a second second-half bus cycle, the FIDT-16-FIDT31 will be enabled to the outputs of the multiplexer. Conversely, if the FIFO data was stored during a second second-half bus cycle or a second read of a single-width, single-pull memory, then FIDT-00-FIDT15 will be enabled to the multiplexer outputs.

FIG. 39a illustrates the random access memories 01AA07-10AA07 employed to store the megabus control signals and the megabus data parity signals. These signals are allowed trickle through the RAMS under the control of the write and read address signals along with their associated data and addresses.

Registers 02BB07 and 05BB07 store 16 bits of bus data (BSDT00-BSDT15) under the control of the interrupt ACK signal INTACK. These same 16 bits of data are transferred as MBIN00-MBIN15 under the control of the send interrupt signal SNDINT.

Figure 42A:
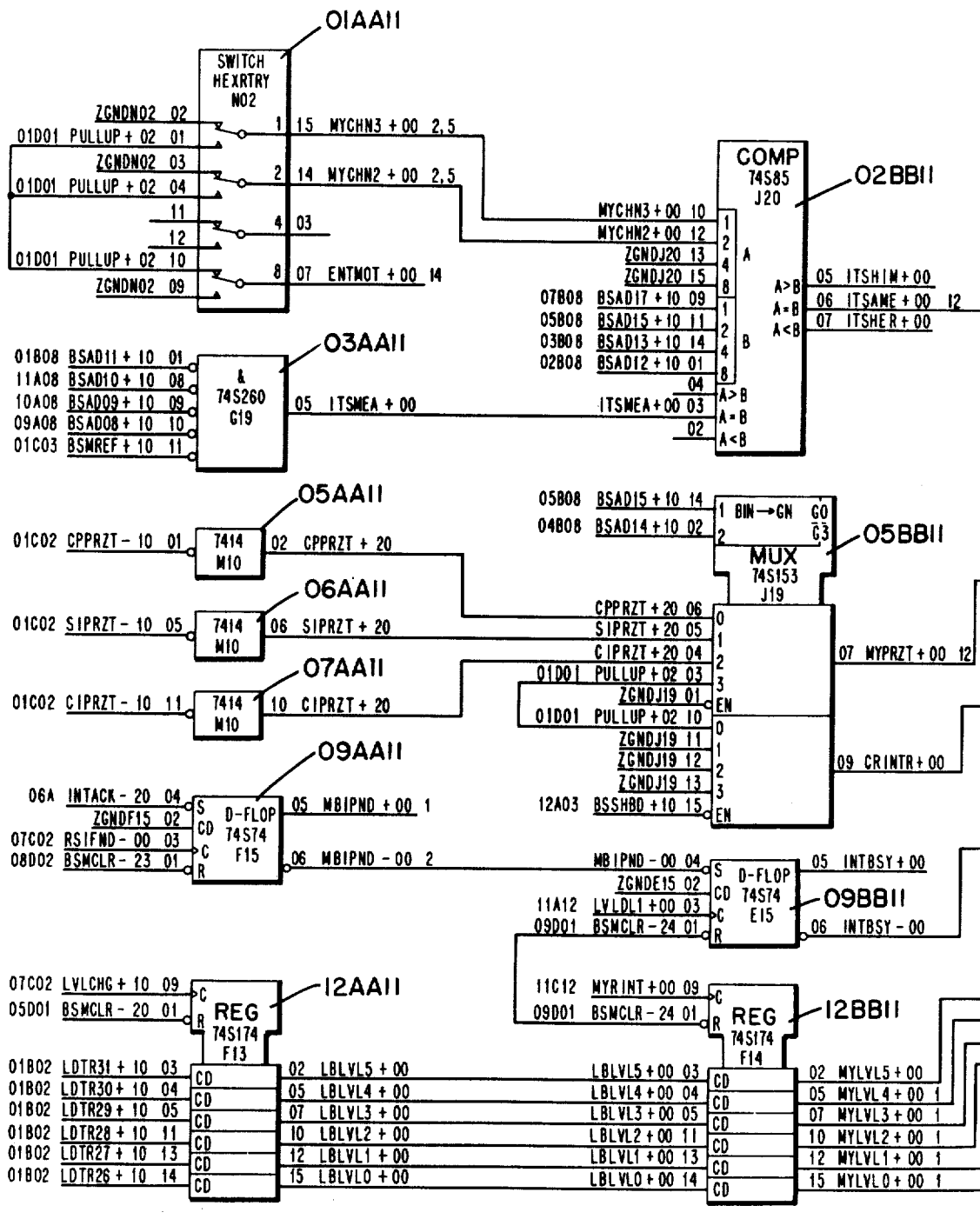
Figure 42B:
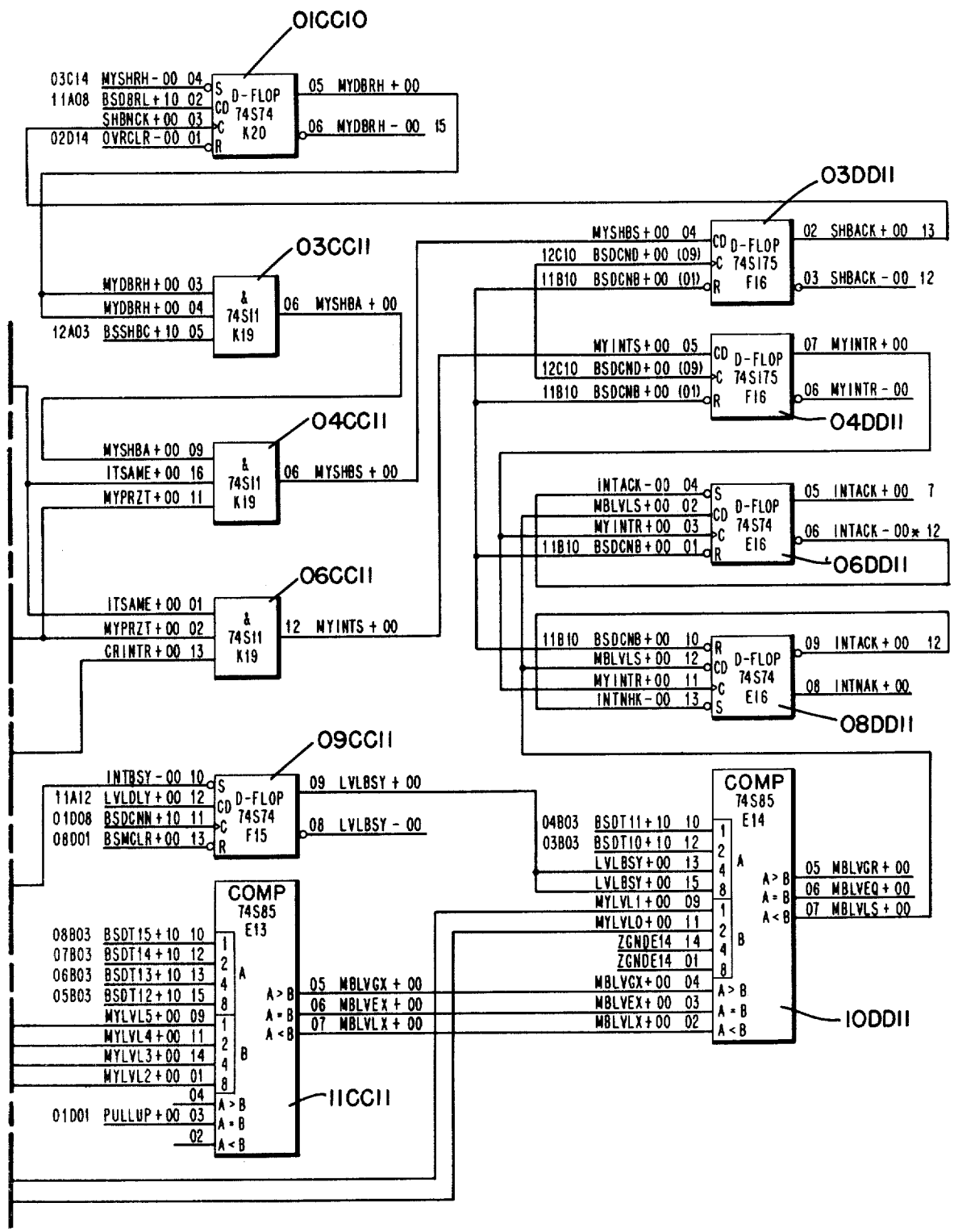

SNDINT is an output of control logic 417 and INTACK is generated by D flip-flop 06DD11 (FIG. 42b). INTACK will be true when the megabus adapter recognizes that a megabus processing unit is directing an interrupt request to the central subsystem. Logic for recognizing such an interrupt request is illustrated in FIGS. 42a and 42b and involves comparator 02BB11 comparing the channel number transmitted with the interrupt request to the channel number of the central subsystem. If they are equal, ITSAME will be set to ONE and supplied AND gate 06CC11. This AND gate also receives signal MYPRZT and CPINTR from multiplexer 05BB11. MYPRZT selects one of the input signals CPPRZT, SIPRZT or CIPRZT supplied from the local bus adapter under the control of BSAD15 and BSAD14. These control signals contain the 2-bit channel number of a local bus processor. CPINTR will be set to ONE if both BSAD15 and BSAD14 equal ZERO. Thus, when (1) the interrupt is directed to the CPU and the central subsystem, (2) the CPU is present in the subsystem at the time of the interrupt, and (3) BSAD16-17 equal MYCHN3 and MYCHN2 and BSAD12-13 are equal to ZERO then AND gate 06CC11 will set MYINTS equal to ONE which will toggle D flip-flop 04DD11 and set MYINTR equal to ONE. This in turn will set INTACK equal to ONE. When INTACK equals ONE BSDT00-BSDT15 are loaded into registers 02BB07 and 05BB07.

OR gates 01CC07-08CC07 and 01DD07-08DD07 (FIG. 39b) comprise OR 515 shown in FIG. 12. They pass either the first 16 bits of FIFO data, the 16 interrupt register data bits, or the 16 second-half bus cycle bits to data line MBDT0:16 for transfer to the local bus adapter. The appropriate parity bits are supplied by multiplexers 09CC07 and 09DD07.

Figure 40A:
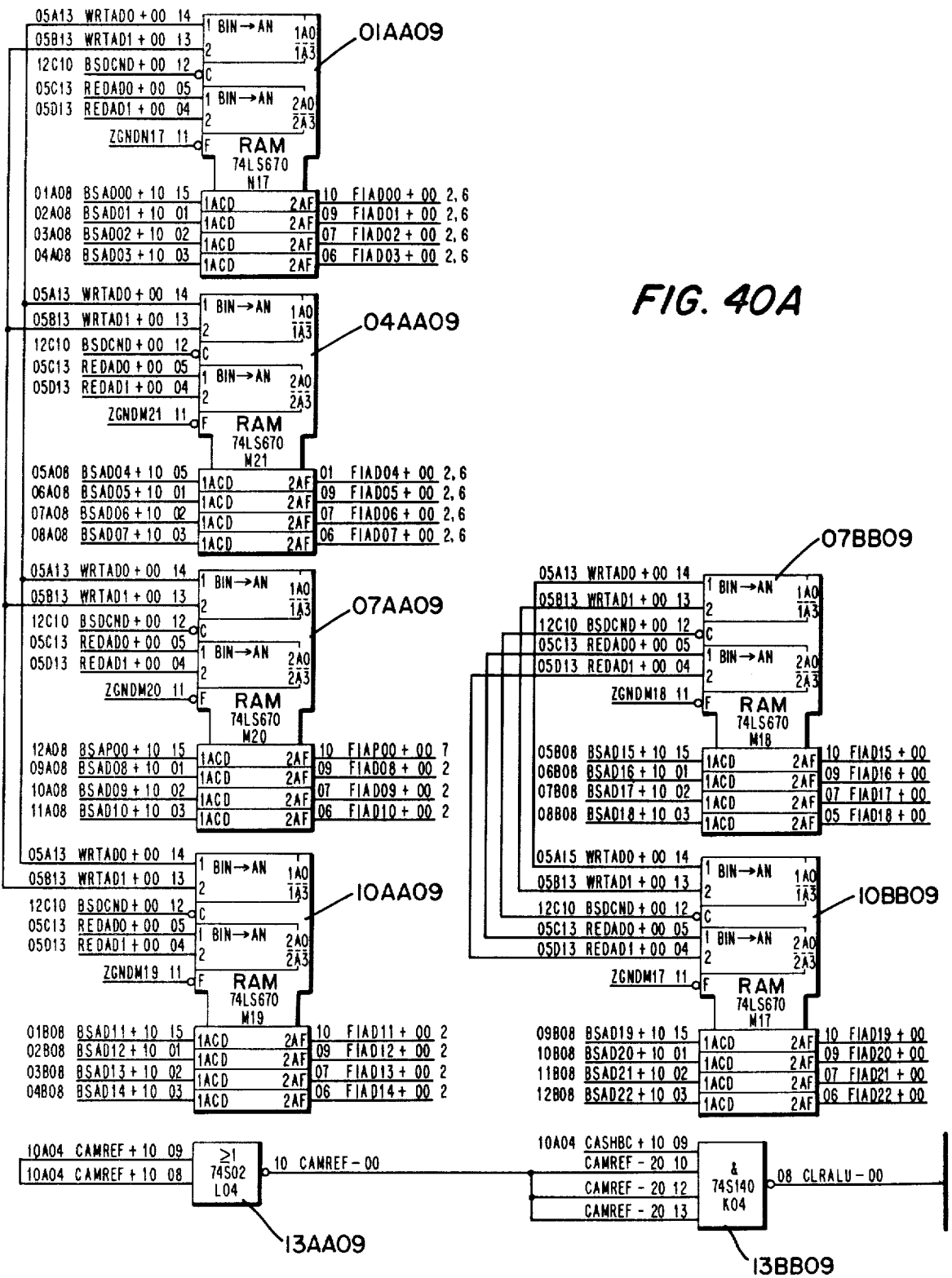

FIG. 40a illustrates a hardware embodiment of a FIFO memory location for storing four sets of megabus addresses. These RAMS are also controlled by the signals WRTAD0, WRTAD1, REDAD0, and REDAD1.

FIGS. 42a and 42b illustrate a hardware embodiment of level comparator 529. Register 12AA11 receives inputs corresponding to the level number of the processing unit currently controlling the local bus. These are received on inputs LDTR26-LDTR-31 under the control of the signal LVLCHG. The outputs of register 12AA11, LBLVL0-5 are stored in register 12BB11 under the control of MYRINT. Comparator 11CC11 compares the megabus level contained in BSDT12-15 to the four most significant bits of the level stored in register 12BB11 and generates the outputs MBLVGX, MBLVEX, and MBLVLX accordingly. Comparator 10DD11 receives the outputs of comparator 11CC11 and will generate an output MBLVLS if the megabus level is less than the level currently being processed by the local bus. If this is so, D flip-flop 06DD11 will ACK the megabus interrupt.

Figure 40B:
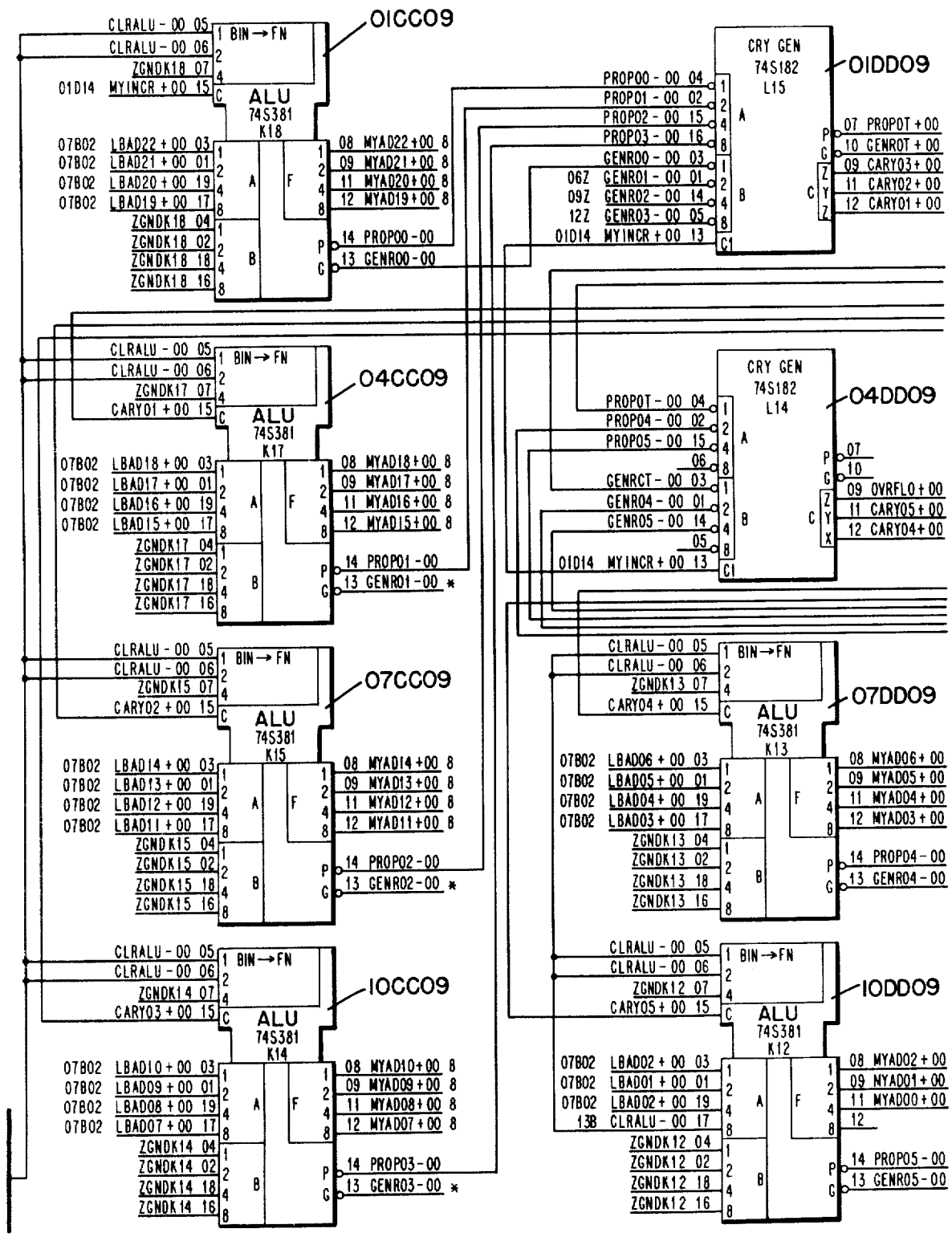

An embodiment of ALU address generator 531 is illustrated in FIG. 40b. As discussed with reference to FIG. 12, the ALU address generator is employed whenever a double-width memory request is issued by a local bus processor and the memory module storing the requested address is a single-width, single-pull memory. In such a case, MYINCR will be set equal to ONE and provided as an input to ALU 01CC09. This ALU also receives the four least significant bits of a local bus address, LBAD19-LBAD22. If MYINCR is equal to ONE then the value of the four input bits is incremented by one and provided as outputs MYAD19-MYAD22. If a carry is generated then PROP00 will be set true (equal to 0). Carry generator 01DD09 receives the signal PROP00 and will set CARY01 equal to ONE. CARY01 is supplied as an input to ALU04CC09 and will be added to the value of LBAD15-LBAD18 to generate MYAD15-MYAD18 plus a carry bit PROP01. PROP01 is also supplied as an input to carry generator 01DD09 and controls the value of CARY02.

With the preceding explanation, it will be apparent to one of ordinary skill in the art that ALUs 07CC09, 10CC09, 07DD09, and 10DD09 cooperate with carry generator 01DD09 and 04DD09 to increment LBAD00-LBAD22 by one and supply the incremented address to lines MYAD00-MYAD22 for transfer to the megabus address lines.

Figure 41A:
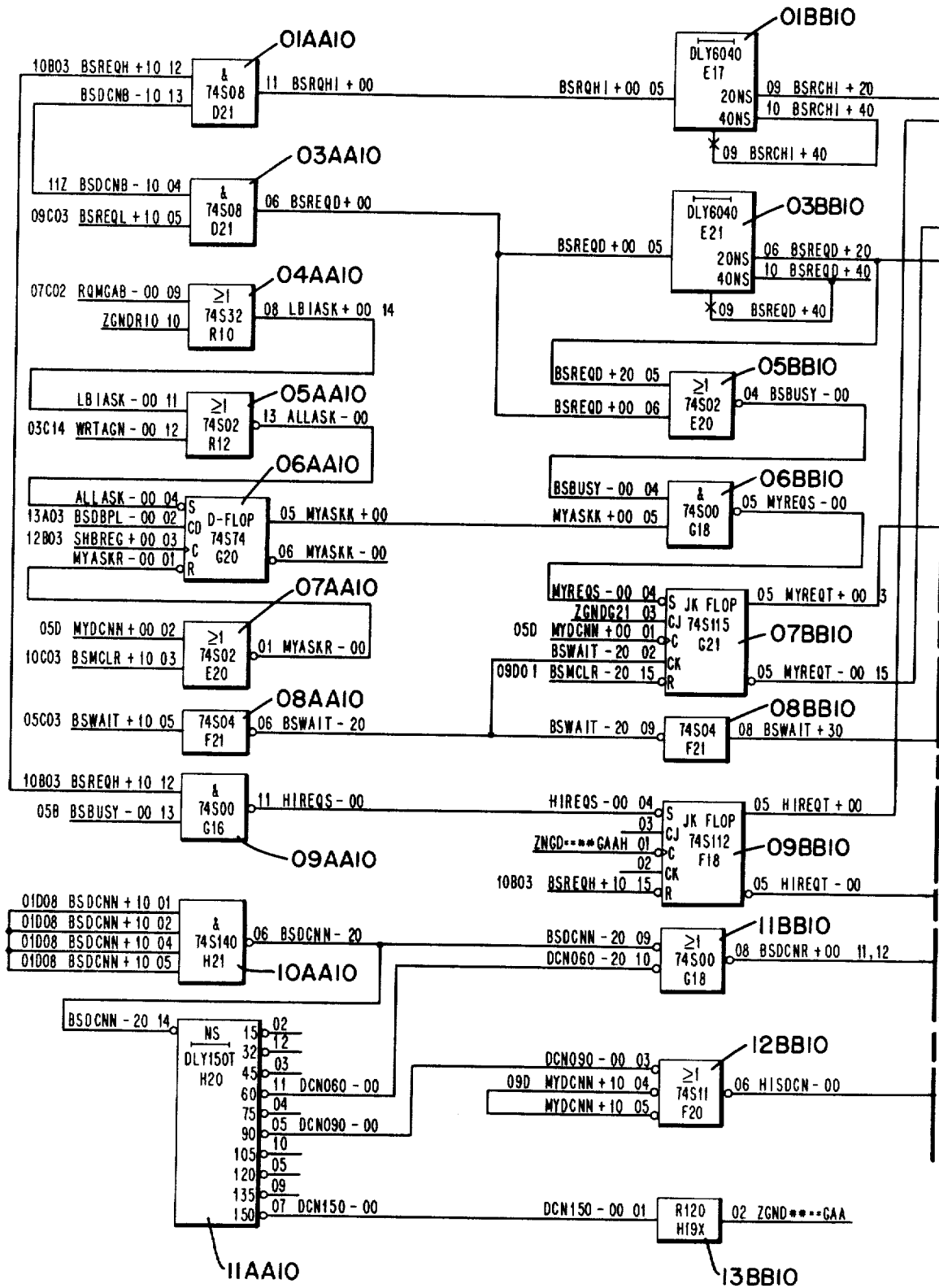
Figure 41B:
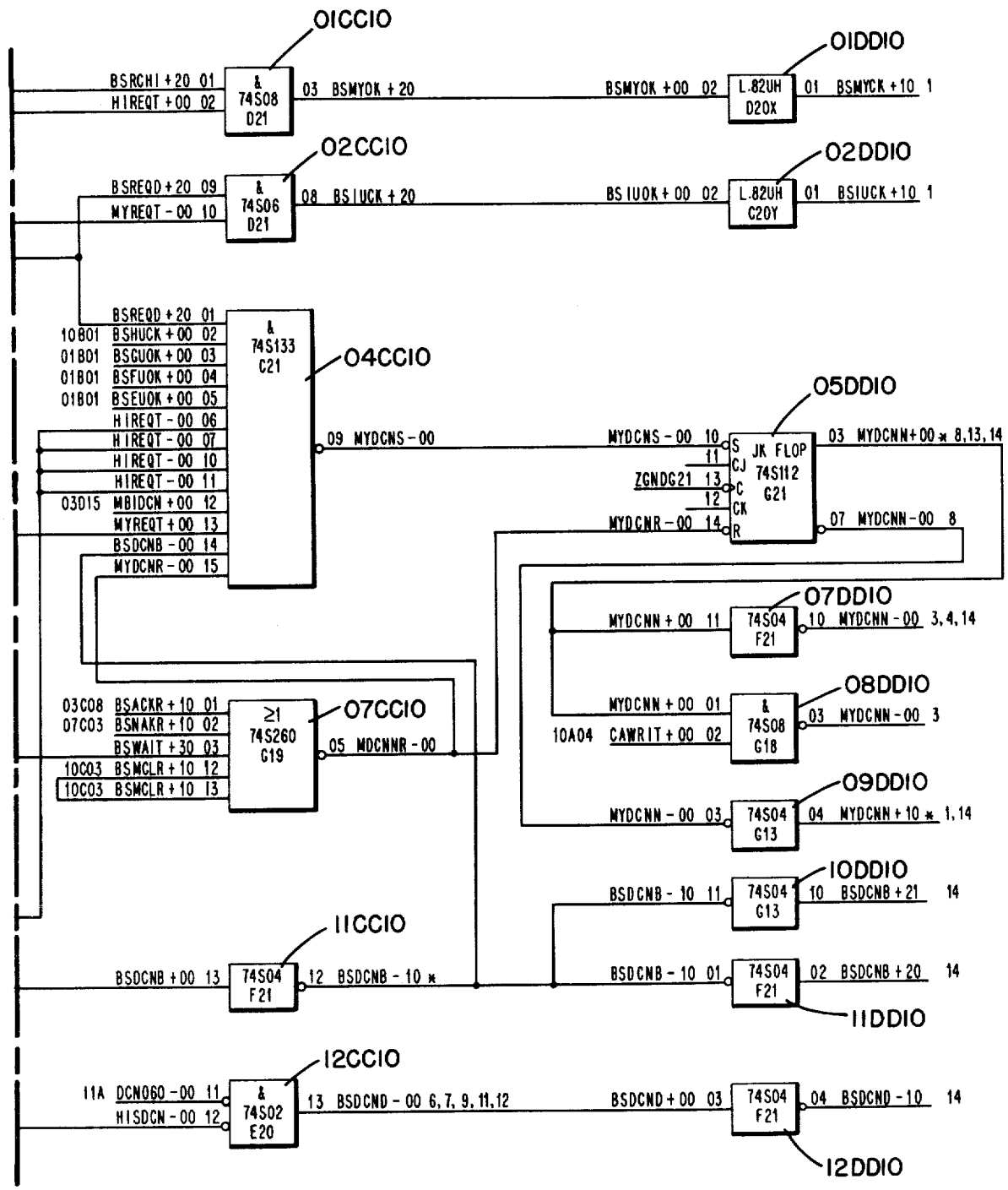

FIGS. 41a and 41b illustrate an embodiment of megabus master mode control logic 535 whereby megabus adapter requests a megabus cycle and initiates a transfer of information from the local bus to the megabus. As discussed with relation to the transceiver circuits, a transfer of local bus data to the megabus is enabled by the signal MYDCNN. MYDCNN will only be generated if all the inputs to AND gate 04CC10 are ONE. The inputs BSHUOK, BSGUOK, BSFUOK and BSEUOK comprise BSTIE signals employed by the tie-breaking circuit present in each megabus processing unit including the megabus adapter. The signal HIREQT is controlled by JK flip-flops 09BB10 and signal MYREQT is controlled by JK flip-flop 07BB10. BSDCNB is the output of inverter 11CC10 which has as its input BSDCNB generated by inverted input OR 11BB10. One input to OR 11BB10 is BSDCNN which is the inverted output of AND gate 10AA10. The inputs to AND gate 10AA10 are common and comprise BSDCNN as generated by OR gate 02DD08 (FIG. 37b). The other input to OR 11BB10 is DCN060 which is the output of AND gate 10AA10 delayed 60 nanosecond by delay circuit 11AA10.

MYDCNR is also supplied as an input to AND gate 04CC10 and it is generated by inverting-output OR gate 07CC10. This OR gate receives as inputs BSACKR, BSNAKR, and BSMCLR as received from the megabus through the transceiver circuit 503. The other input is BSWAIT which has the value of BSWAIT as received from the megabus. If all the inputs to OR gate 07CC10 are equal to ZERO then MYDCNR will be equal to ONE.

The input MBIDCN to AND gate 04CC10 is generated by AND gate 08DD15 (FIG. 46b). MBIDCN will be equal to ONE if the FIFO is empty and there is no write break-in currently being processed. The final input to AND gate 04CC10 is BSREQD which is the output of AND gate 03AA10 delayed by 20 nanoseconds. BSREQD will be equal to ONE if the previously described signal BSDCNB is equal to ONE and BSREQL as received from the megabus is also equal to ONE.

Figure 43A:
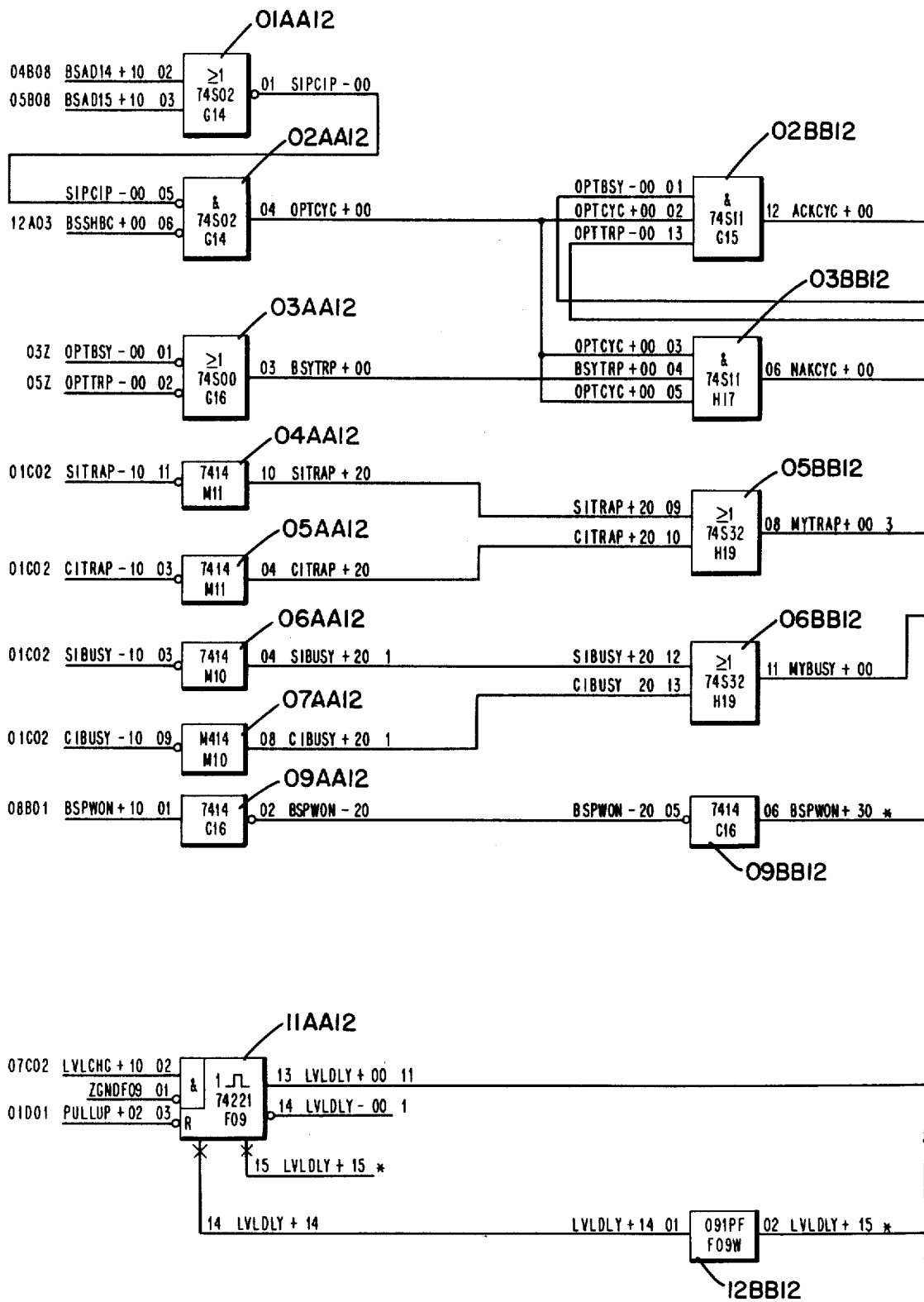
Figure 43B:
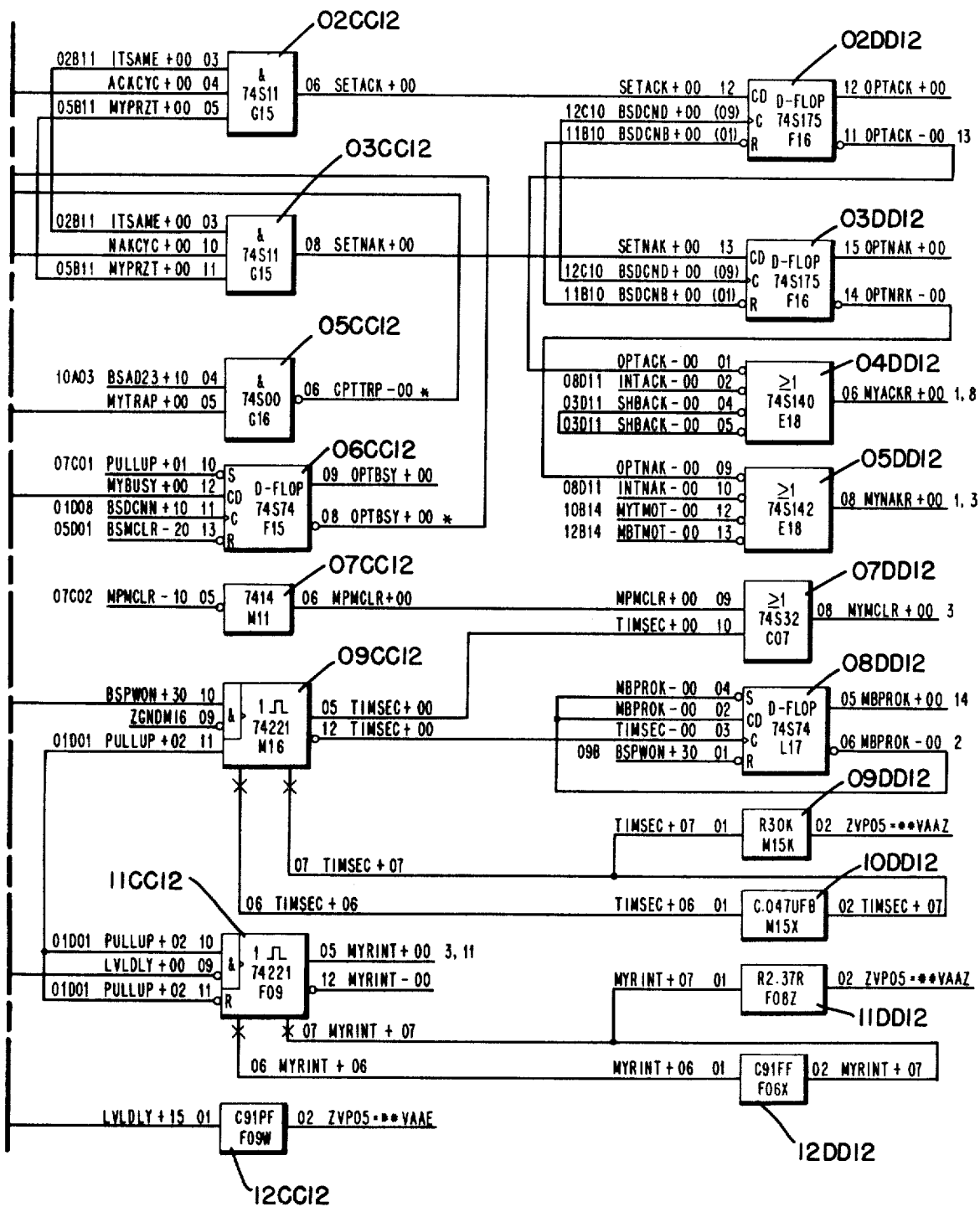

FIGS. 43a and 43b illustrate a hardware implementation of megabus slave mode response logic 533. AND gate 02AA12 and OR gate 01AA12 determine whether a local bus processor is the destination unit from the values of BSAD14 and BSAD15. OR gate 05BB12 and AND gate 05CC12 determine whether the SIP or the CIP is in a trapped state. Similarly, OR gate 06BB12 and D flip-flop 06CC12 determine whether either the SIP or the CIP is busy. If (1) the SIP and CIP are not in a trapped state, (2) neither the SIP or CIP is busy, and (3) either the SIP or the CIP are indicated as the destination unit, then AND gate 02BB12 will set ACKCYC equal to ONE and AND gate 02CC12 will trigger D flip-flop 02DD12 to provide an input to OR gate 04DD12 to generate MYACKR which is a megabus adapter ACK transmitted to the megabus by transceivers 503. If, however, the SIP or the CIP is in a trapped state, and is also the destination unit of a megabus cycle, AND gates 03BB12 and 03CC12 will trigger D flip-flop 03DD12 to generate an output to set MYNAKR true by OR gate 05DD12.

The other circuit of importance is 11CC12 wherein MYRINT is generated in response to LVLCHG being equal to ONE to indicate to the megabus units through MBRINT that interrupts of the CPU may again be initiated.

Figure 45A:
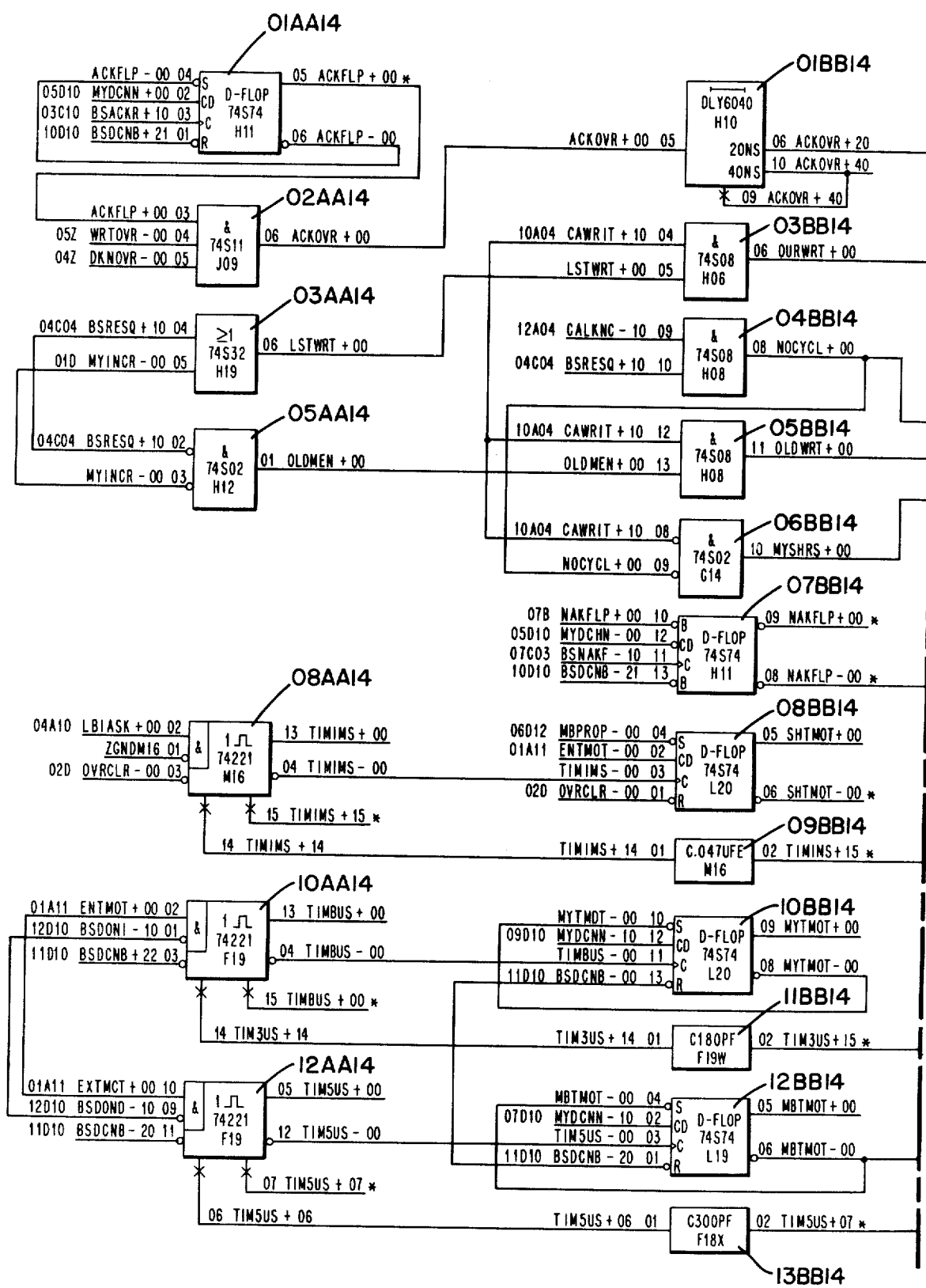
Figure 45B:
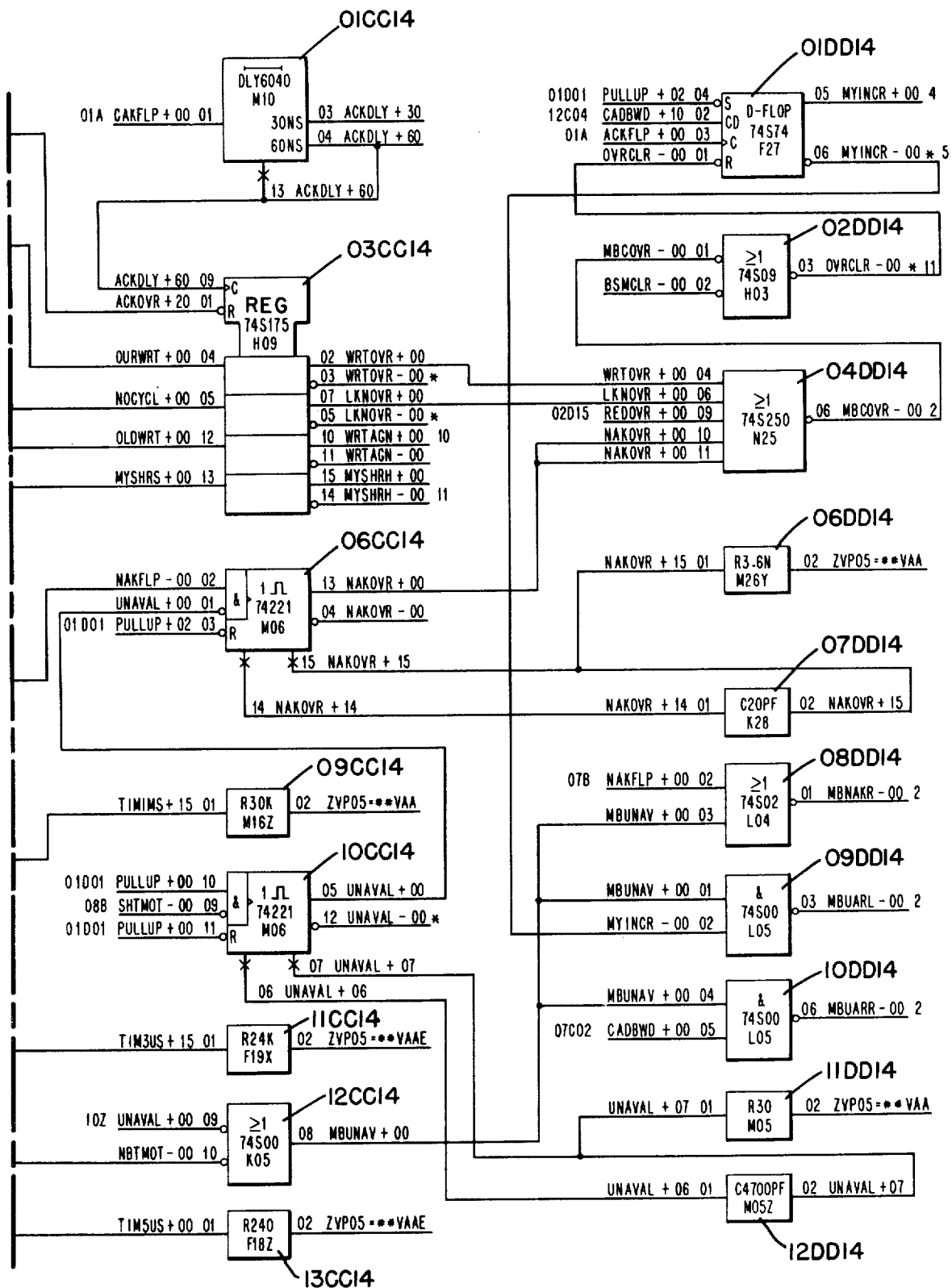

FIGS. 45a and 45b set forth embodiments of circuitry for generating megabus adapter end of cycle control signals. Of particular importance is D flip-flop 01DD14 for generating MYINCR whenever CADBWD is set equal to ONE to indicate a request for a double-wide word. This circuitry also checks for timeouts on the megabus and will generate the memory management unit signals MBUARL and MBUARR if a requested memory location is not physically available present in the system.

Figure 46A:
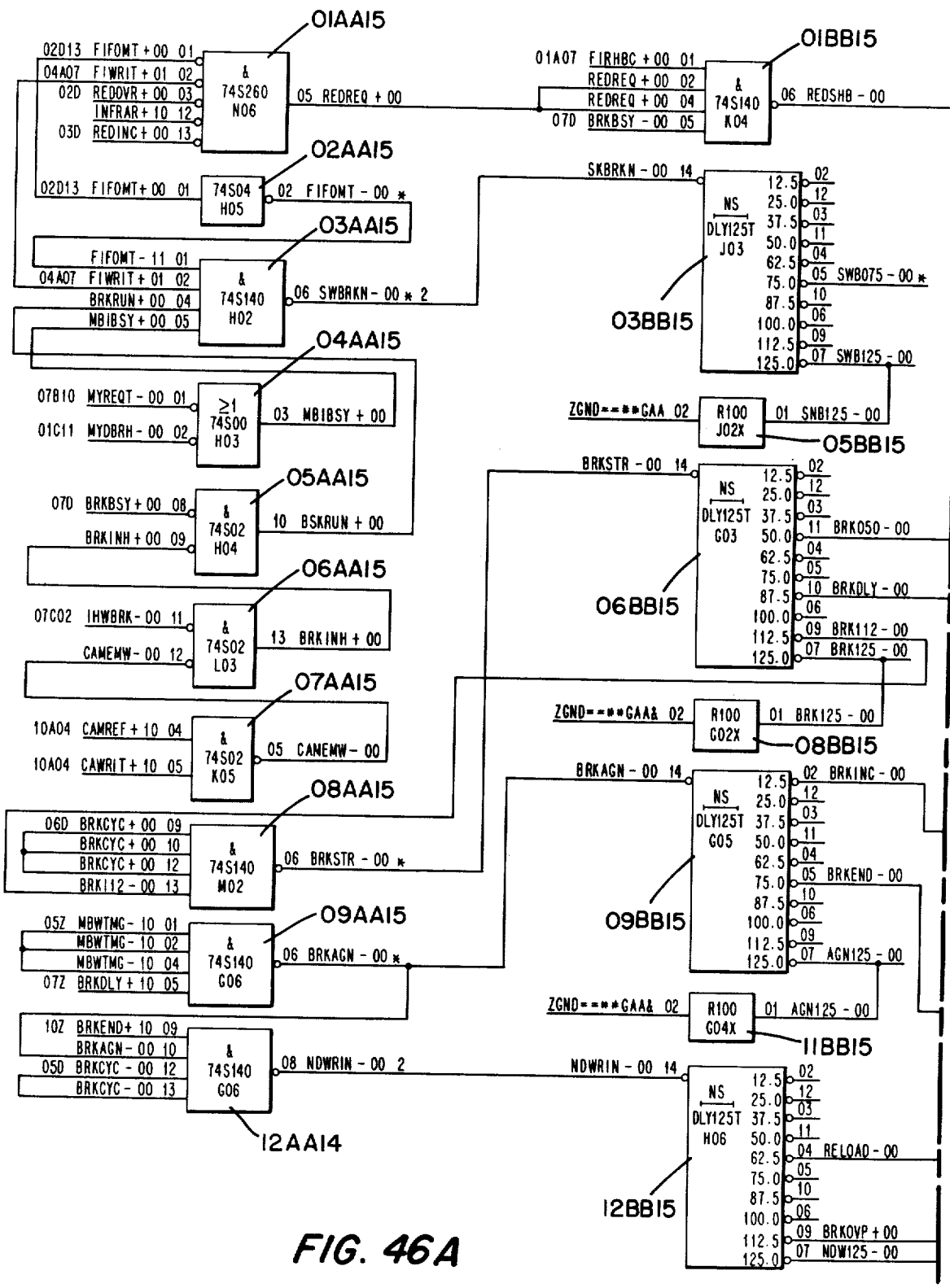
Figure 46B:
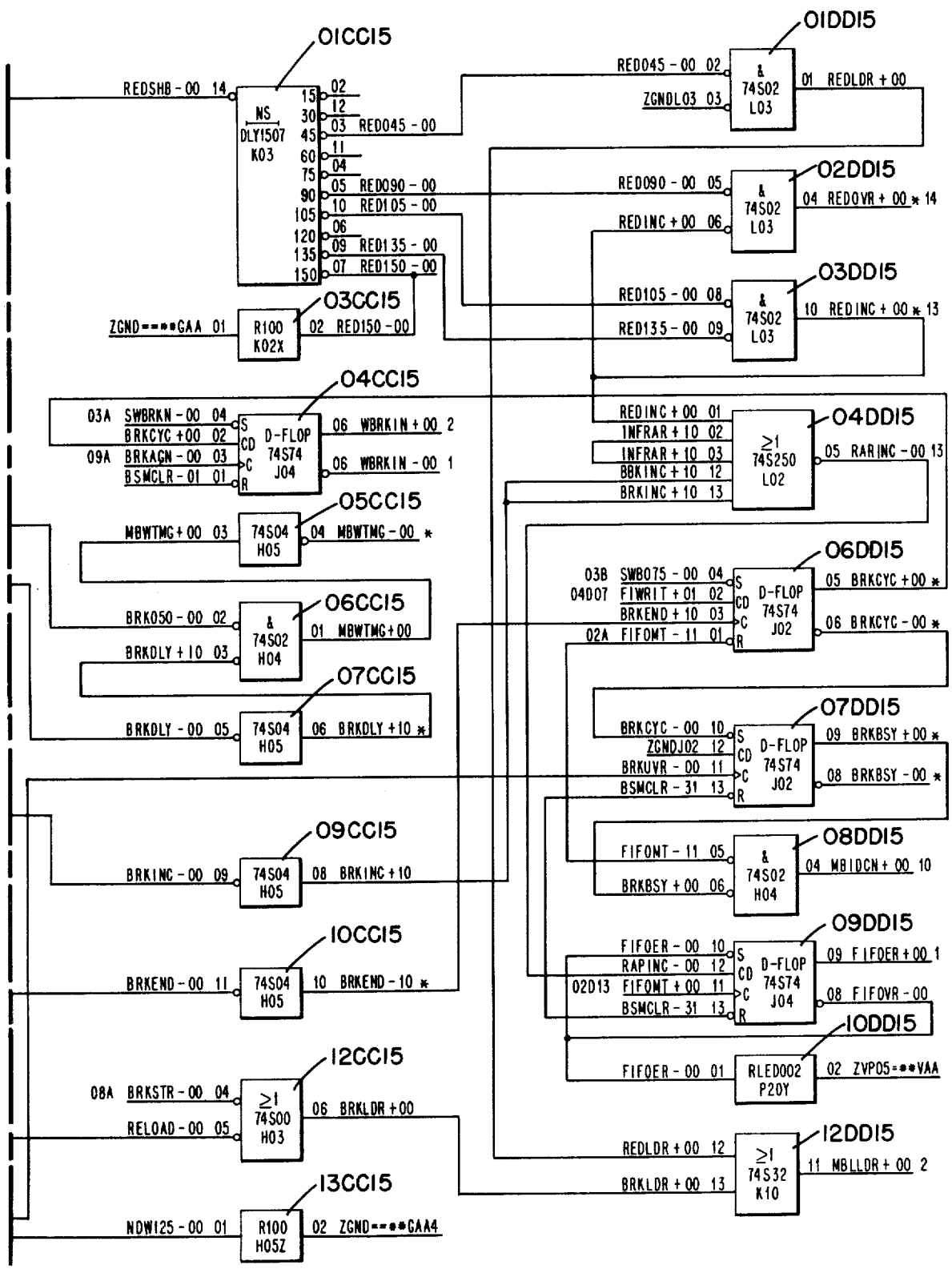

FIGS. 46a and 46b illustrate circuitry for performing a write break-in in response to the accummulation of megabus cycles involving memory writes in FIFO 505. The write break-in indicating signal is generated by D flip-flop 04CC15 under the control of the input signals SWBRKN, BRKCYC, and BRKAGN. SWBRKN is the output of AND gate 03AA15 and will be equal to ZERO (since the output of AND gate is inverted) when FIFOMT, FIWRIT, BRKRUN, and MBIBSY are all equal to ONE. FIFOMT, as supplied to AND gate 03AA15, will be equal to ONE when there are no current entries in the FIFO. FIWRIT has the value transferred from the output of RAM 04AA07. BRKRUN will be equal to ONE when a write break-in is not inhibited because of an on-going cache memory reference or cache write and a currently active break-in cycle. MBIBSY is equal to ONE when the megabus adapter is requesting a megabus cycle and the previously explained MYDBRH signal is equal to ZERO as provided by the inverting output of D flip-flop 01CC11 (FIG. 42b). The signal BRKCYC is an output of D flip-flop 06DD15 having its set input controlled by SWB075 which is SWBRKN delayed 75 nanoseconds by delay circuit 03BB15. The CD input is FIWRIT and the C input is BRKEND generated as the inverse of BRKAGN delayed 75 nanoseconds by delay circuit 09BB15. Since the input to delay circuit 09BB15 is inverted, BRKEND will be ONE at its output from inverted circuit 10CC15 only if another write break-in has not been requested by AND gate 09AA15 within 75 nanoseconds. The reset input to flip-flop 06DD15 is the inverse of FIFOMT.

In sum, the circuitry shown in FIGS. 46a and 46b will force the local bus adapter to grant to the FIFO memory local bus cycles in order to empty the FIFO.

5. Operation of Central Subsystem

Initially, the CPU, CIP, or SIP transmits a request for a local bus cycle to the cache/MMU. If the cache has not been assigned, on a first come first served basis, a cache arbitration cycle takes place and the cache is assigned to the highest priority requestor by the request granted register 409. If the cache has been assigned, then subsequent requestors must wait for an available local bus cycle.

Once the cache has been assigned a request granted signal is transmitted to the assigned processor and that processor's virtual address and BYAD are selected by virtual address multiplexer 405 and BYAD multiplexer 413. All integrity and timing indicators are reset. Next, the selected processor's memory reference line MREF is checked to see if it is active. If it is not, then the processor is directing a reference to a non-memory unit. If the memory reference line is active, then a memory request is indicated.

The first step performed during a memory request is to check the access rights of the requesting processor with respect to the addressed memory location. If the processor does not have access rights, LBACKR is set to ZERO and LBPROV, (one of the LBINTEGRITY signals) is set to ONE. If this is a read request as indicated by LBWRIT being equal to ZERO, the assigned processor is transmitted a DCNN when the information requested becomes available and its request granted line is set to ZERO. If it was a write request, there is no need to transmit a DCNN to the assigned processor.

If the request passes the access rights check, the requested address is checked to see if it is available within the system memory. If it is not LBACKR is set to ZERO, and LBUARL, also one of the LBINTEGRITY signals, is set to ONE. If it was a double-word request as indicated by DBLW, LBUARR is also set to ONE. Again, if it was a read request, a DCNN is transmitted to the assigned processor at the appropriate time following DCNN, whether it was a read or write request, the assigned processor's request granted line will be set to ZERO.

If the first requested word was available, the request is checked to see if it is a double-word request, and, if so, a check is made to see if the address one greater than the requested address is also available. If not, LBUARR is set equal to ONE. Next, the WRIT line of the assigned processor is checked to see if it equal to ONE and if it is a memory write is processed.

If the WRIT line of the assigned processor is equal to ZERO then a memory read request is processed. First, the directory of entries in the cache memory 403 is searched to see if the requested address is resident in the cache. If so, and the DBLW line of the assigned processor is equal to ONE the directory 403 is further searched to see if the second word is also resident in the cache. If all requested words are currently stored in the cache then there is no need to issue a system memory read. If one or more of the requested words are not resident in the cache, then a system memory read must be issued. The requested address is enabled to LBAD0:24 by the cache memory directory 403 and CADBPL is set equal to ZERO or ONE by control logic 417 depending upon whether one or two words are requested.

The system memory read involves enabling the requested address and necessary control signals to the megabus under the control of MYDCNN.

The address memory unit then performs a read and responds in the above-described manner according to whether it is a signal-width, single-pull; single-width, double-pull; or double-width memory.

The megabus adapter receives the response of the memory and if BSRESQ is equal to ZERO then all 32 data bits and the appropriate control bits are stored into FIFO 505. If BSRESQ is equal to ONE but BSDBPL is equal to ZERO, then BSDT0:16 is enabled into the second-half bus cycle register 521 and the megabus adapter waits for a second second-half bus cycle signal to be issued by the transferring memory. When the second second-half bus cycle signal is received; BSDT0:16 is enabled into FIAD0:16 along with the appropriate control signals being stored in the FIFO control signal locations. When these entries are transmitted out of FIFO 505, the multiplexer 517 will select as inputs FIDT0:16 and the second-half bus cycle register 521 will transfer MBSH0:16 to OR gate 515 to enable all 32 bits of data to be transferred in parallel to the local bus.

Finally, if the responding memory is a single-width, single-pull memory, the 16 bits transferred in response to the first read request will be stored in second-half bus cycle register 521 and ALU address generator 531 will be enabled to increment LBAD by one and a second read request will be issued to the memory. If the memory responds with a requested word, it will be loaded into FIFO 505 along with the appropriate control signals. Again, when this particular entry is transferred from the FIFO, a simultaneous transfer of the 16 bits stored in the second-half bus cycle register will be enabled to OR gate 515 which, together with multiplexer 517, will transfer all 32 requested bits.

The transfer of data on the megabus adapter to the local bus adapter in response to a read request initiated by local bus processor will result in the requested data being written into the cache and being transferred over the local bus data lines to the requesting processor along with an enable signal on the DCNN line of the requesting processor. After the DCNN is issued, the requesting processor's RQGT line is set equal to ZERO and the cache is enabled to be reassigned.

If the local bus processor had requested a memory write instead of a memory read, a directory research is conducted of the cache memory and directory 403 to determine whether the two referenced memory locations are resident therein. Also, an access rights check is performed and the addresses are checked to see if they are available within the system memory. If these tests are passed, the CADBPL and CADBWD are set equal to ONE if a two-word write is requested, the addresses enabled to LBAD0:24 by cache memory and directory 403, and LBDT0:32 plus 4 parity bits are enabled to LDTR0:32 (plus 4 parity bits). Further, if the memory locations to be written are resident in the cache, the cache is updated in parallel with the write into memory. Similarly, control logic 417 sets the appropriate values for CABYTE, CAWRIT, CAMREF, and LBAD23 to control which bits within the addressed memory locations are to be written. The signal MYDCNN enables the transfer of the 32 data bits, the address, and control signals to the megabus and, the addressed memory unit will perform its memory write.

If the memory unit is capable of transferring 32 bits in parallel, and a double-wide write request has been made, the memory unit will respond with a BSACKR and BSRESQ equal to ZERO. If CADBPL is equal to ONE then data output multiplexer 523 will initially transfer LDTR0:16 to MYDT0:16 and an initial write will be conducted. Next, LDTR16:16 will be enabled to MYDT0:16 by data output multiplexer 523 and a second second-half bus cycle will be issued.

Finally, if the addressed memory is a single-width, single-pull memory it will respond with a BSACKR and a combination of control signals as explained above in connection with write types 1-3. If DBWD was equal to ONE, the megabus adapter will recognize that another write to memory will be required, ALU address generator 331 will increment the address, and data output multiplexer will enable LDTR16:16 to MYDT0:16. A second write request will be issued.

If a non-memory reference cycle has been requested, the MREF line of the assigned processor will be equal to ZERO and a destination channel number will be stored in bits LBCMDO:3. The local bus adapter will check the three bits of the channel number and if they match the channel number of a local bus processor, it will issue a DCNN to that addressed processor to transfer the data and control signals thereto.

If the channel number of a local bus processor or of the cache/MMU is not specified, the data paths are set up for a nn-memory reference megabus cycle. LBDT0:32 is enabled to LDTR0:32 by cache data input multiplexer 401. Similarly, VADR0:23 of the assigned processor will be enabled to LBAD0:23 by the cache memory and directory 403. The control logic 417 will enable the appropriate outputs to cache control signals CACNTRL and the megabus adapter will enable the transfer of the information to the megabus after it has acquired a megabus cycle.

If a processing unit on the megabus issues an I/O mode command to a central subsystem, it will be recognized by the megabus adapter when BSDCNN is equal to ZERO, BSMREF, BSSHBC, and BSLOCK are equal to ONE, and the address field BSAD8:10 contains the channel number of either the CPU, SIP, CIP or cache/MMU of the central subsystem. If the channel number is equal to the CPU channel number, the megabus adapter checks to see if the CPU is present. If CPPRZT is equal to ZERO, no response is issued to the megabus. If, however, BSSHBC is not equal to ZERO, the function code calls for an interrupt, and the interrupt level is less than the CPU's current level, and there is not an interrupt currently pending, BSDT0:16 will be enabled into the interrupt register 519 and the interrupt pending flag INPNDG will be set equal to ONE. BSACKR will then be set equal to ONE and the transferring unit on the megabus will receive an ACK.

If the cache is not, however, currently waiting for a second-half bus cycle in response to a read request, a request for a local bus cycle is initiated by the megabus adapter and, once assigned, the data paths are set up to transfer a megabus command to the local bus by initializing the integrity and timing lines of the local bus and enabling MBDT0:32 to LBDT0:32. The function code is checked to see whether it is an initialize command and, if it is not, the DCNN line of the addressed processor is set equal to ONE and LBSHBC is set equal to ZERO to transfer the megabus information to the processor addressed by the megabus.

If the function code specified an initialize command and the addressed processor was busy then a NAK is issued to the megabus. If the processor was not busy but was in a trapped state and an input function code was not specified, then, a NAK will be issued to the megabus. If the processor was not trapped, or an input function code was specified, then the addressed processors DCNN will be set to ONE, LBSHBC will be set equal to ZERO, and an ACK will be issued to the megabus. After the issue of an ACK or a NAK to the megabus, the cache is available to be reassigned.

As stated above, the megabus adapter will capture any main memory writes initiated by megabus processing unit in order to maintain the integrity of the cache memory in the central subsystem. If these writes were not captured and processed by the subsystem and if the effected memory locations having duplicates currently stored in the cache of the central subsystem, then the central subsystem would not be processing the most current data.

Megabus write detector 511 recognizes a main memory write by BSDCNN, BSWRIT, and BSMREF being equal to ONE as transferred from the megabus into the transceivers 503. Upon recognizing this state of events, the megabus cycle is stored in the FIFO and FIFO control 513 increments the content of write address register 507. Subsequently, FIFOMT is set equal to ONE because the contents of the write address register and read address register will not be equal, thereby indicating that the FIFO is no longer empty. FIFOMT equal to ONE signifies a FIFO access request of the cache which will be considered by request arbitration network 407. When the cache is assigned to the FIFO, the data paths are set up for the transfer of the FIFO data, address, and control signals to the local bus adapter. This means that FIAD0:23 will be supplied to virtual address input multiplexer 405 and MBDT0:32 will be supplied to cache data input multiplexer 401. Similarly, FICNTRL0:10 will be supplied to control logic 417. An update of the cache memory will then be initiated if the memory location addressed is currently resident in the cache and the FIFO read address register will be incremented by ONE by FIFO control 513.

Since write address register 507 and read address register 509 are simply counters reset in response to a master clear, the contents of the counters will be compared and if equal FIFOMT will be equal to ZERO, the FIFO request granted signal will be set to ZERO and the local bus adapter will be free to grant an access request to another unit.

If, the word addressed by FIAD0:23 is not resident in the cache, there will of course be no update performed. If the addressed word is resident in the cache, the appropriate bytes will be written according to the values of FIBYTE, LBWCT1, LBWCT2, and FIAD23.

If FIFOMT is not equal to zero then the cache will be reassigned to the FIFO and any writes in the FIFO will be processed until FIFOMT is equal to zero.

It will be apparent, to those skilled in the art, that modifications and variations can be made in the preferred embodiment disclosed herein without departing from the scope or the spirit of the invention. Thus, it is intended that the present invention include these modifications and variations which come within the scope of the appended claims and their equivalents.

5. The QLT System

The foregoing detailed description of the computer system including the CPU, local bus adapter, megabus adapter, system memory, and cache/MMU sets forth the environment in which the Quality Logic Test (QLT) system of the instant invention functions. The QLT system is invoked at system CLEAR time, i.e., power-on or operator demand, to provide a quick confidence check of the hardware in the system and to initiate a software load or restart as appropriate. The hardware to perform the QLT is distributed among the functional units within the computer system. Each of the CIP, CPU, and SIP include QLT elements that initially perform separate tests of their associated processors. After these initial tests, the CPU QLT the subject of the instant invention, assumes control of the entire computer system and sequences itself and the CIP and SIP through the remainder of the system tests.

Included within the QLT system are programmable read-only memories (PROMs) for storing both software and firmware instructions performed by the CPU during the QLT operation. As will be hereinafter explained, some instructions are executed entirely within the CPU while other instructions are initiated by the CPU but require a main memory transaction, the activation of an input or output controller, or processing by the CIP or SIP. The software instructions are performed by the CPU fetching and executing corresponding firmware instructions stored in the control store 80.

The QLT system control firmware is distributed throughout the CPU control store 80 among the functional firmware, i.e., those firmware sequences that interpret software instructions when the CPU is operating in a normal environment. Distributing the QLT firmware throughout the upper and lower banks of the control store 80 results in an integrity check of the entire control store 80 during operation of the QLT system because QLT firmware instructions will be accessed in all banks of control store 80.

The CPU QLT control firmware activates hardware in the CPU to (1) light a one-digit hexadecimal indicator which shows the current CPU phase of the QLT; (2) test the CPU's ability to communicate correctly with the local bus, the CIP, and the SIP; (3) permit the CPU to communicate with either main memory or QLT software memory; (4) activate the CIP and the SIP to perform the different phases of their QLT procedures; (5) enable the CPU to communicate directly with the cache/MMU in a non-functional mode; and (6) enable the CPU to transmit data to itself over the local bus without requesting a local bus cycle.

The QLT control software activates hardware in the CPU and in the main memory modules to change (swap) main memory physical addresses in order to isolate faulty memory locations. It also enables the QLT system to test the error detection and correction hardware and parity generation of the memory modules. If a memory error is detected by the QLT system, an indicator light will be enabled to identify the memory modules wherein the error occurred.

Additionally, there are QLT firmware sequences in the CIP control store and the SIP control store. These sequences are also distributed throughout the control store PROMs to produce an inherent integrity check of the PROM storage locations. The functioning of the CIP and SIP QLT systems are controlled by the CPU QLT control firmware.

Both the CIP and the SIP have QLT hardware to enable them to test their ability to communicate with the local bus, the cache/MMU, and the systems memory. Additionally, the CIP and SIP include one-digit hexadecimal indicators to display the current firmware test phase. The functioning of the CIP and SIP QLT systems are similar in many respects to the CPU QLT system operation, but for the purposes of describing the present invention, the functioning of the CIP and SIP QLT systems will be, for the most part, described in terms of their response to operations performed by the CPU QLT system.

Figure 2:
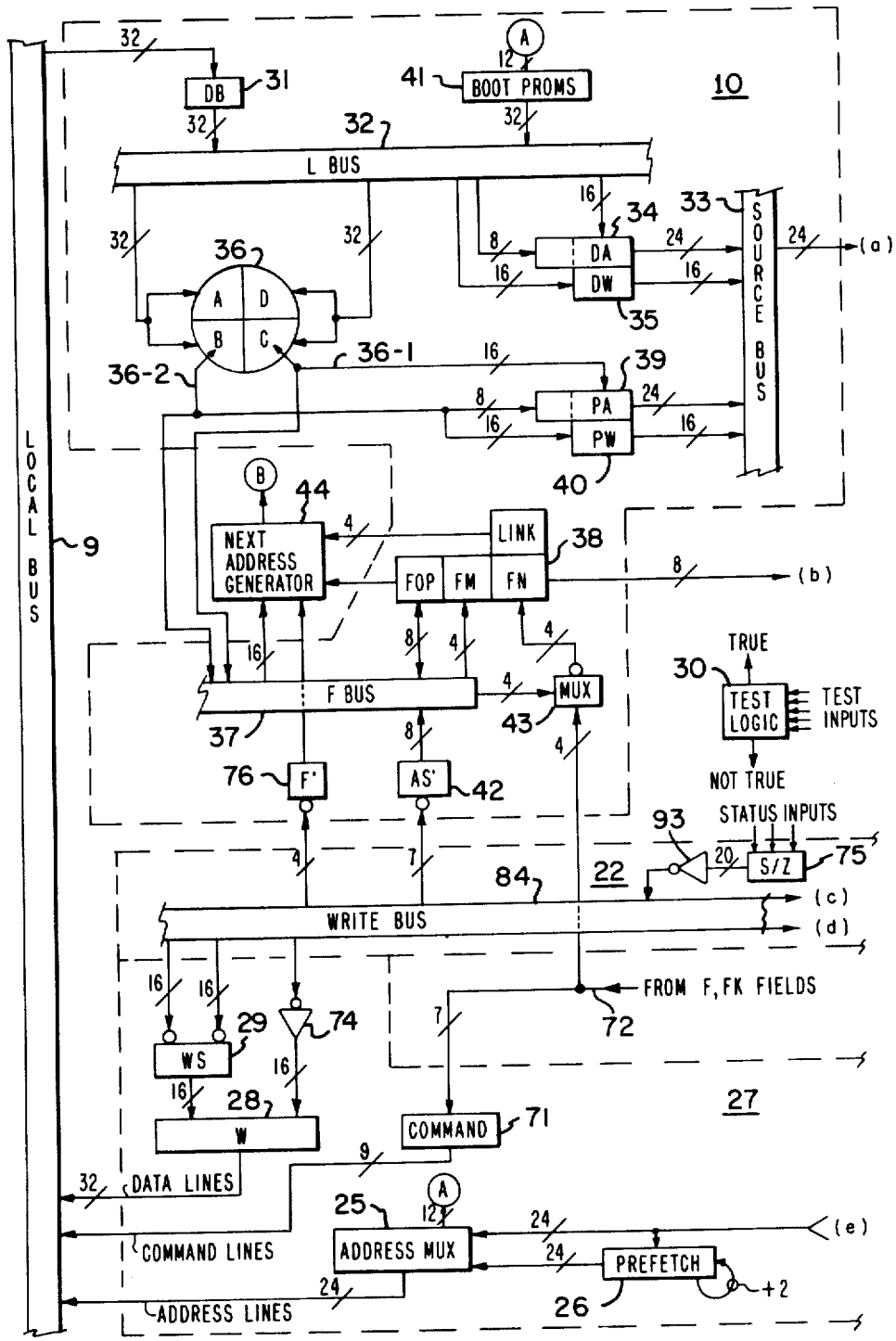
FIG. 2 is a detailed block diagram of the central processing unit of the present invention.
Figure 2:
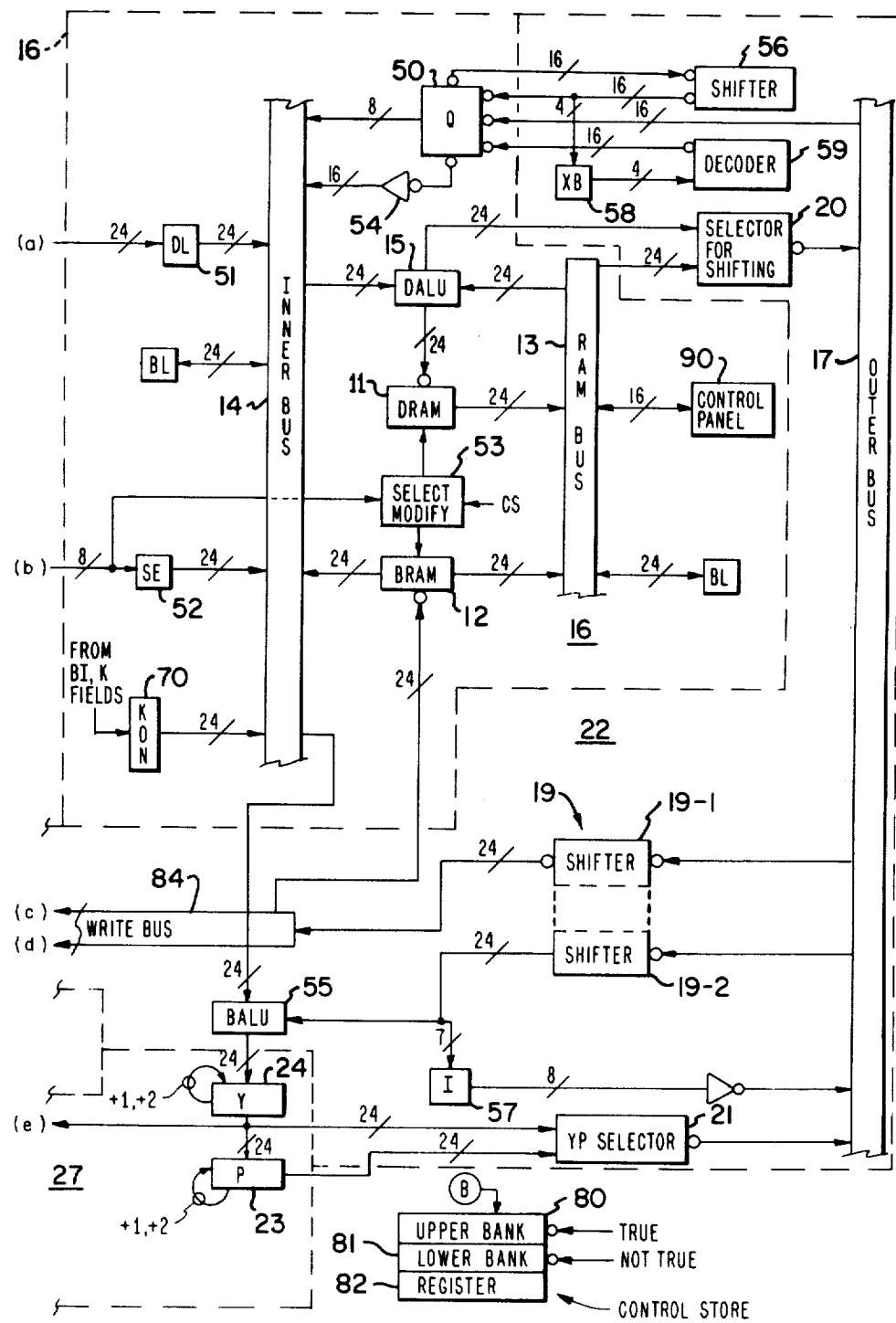

Referring to sheet 1 of FIG. 2, the next address generator 44 receives the inputs CLEAR, LOAD, and EXECUTE subject to the operator activating the CLEAR, LOAD, and EXECUTE buttons on the control panel of the CP4. In response to activation of the CLEAR button, the next address generator forces a jump to a firmware location in control store 80 wherein the CLEAR and INITIALIZE routines are stored. Similarly, depression of the LOAD and EXECUTE buttons causes the next address generator 44 to produce an address in the control store 80 wherein the firmware instructions related to the LOAD and EXECUTE functionalities are stored.

The registers which comprise the BRAM 12 and DRAM 11 of the CPU are illustrated in FIG. 47. The DRAM 11 comprises four sets of registers with eight registers included in each set. These sets are D0–D7, K0–K7, E0–E7, and L0–L7. The BRAM 12 contains registers B0–B7 and A0–A7. Select/modify register 53 controls the selective accessing of the registers in the BRAM and DRAM.

FIG. 48 illustrates the private interfaces of the CPU with the SIP and the CPU with the CIP. In the interface 801, a logic PROM 803 receives signal lines from the CIP indicating the logical condition in the CIP following the execution of an instruction, i.e., the CIP indicators. For example, one of the signal lines corresponds to an overflow indicator which when true indicates that an overflow has occurred in the CIP as a result of the execution of the last instruction. Further definition of the other indicator signals is set forth in the discussion which follows concerning the testing of the CIP indicators.

The logic PROM 803 also receives, via signal lines, a branch true/branch false signal from the SIP as well as signal lines transmitting the contents of the SIP accumulator. The branch true/branch false lines are provided to logic PROM 807 by the SIP in lieu of the indicators provided by the CIP since the SIP will determine whether the status of the particular indicators should cause the true or false branches of a conditional instruction to be taken. Logic PROM 807 also receives inputs from BOOT PROMs 401 and, as will hereinafter be explained, generates branch true or branch false signals supplied to the next address generator (NAG) 44 over appropriate signal lines. The values of the branch true and branch false signal outputs generated by logic PROM 807 are employed by the CPU when the status of either the CIP or the SIP determines which branch path is to be taken.

There are additional dedicated signal lines connecting the CPU to the SIP and the CPU to the CIP. These are outputs of the CPU SIP/CIP interface circuit 809 which receives as inputs the output of the CPU command register 71 and the sixteen bits of the F register 38, i.e., FREG0:16. The dedicated lines from the CPU to the CIP are CIFCTN and CIPGO and the dedicated lines connecting the CPU to the SIP are SIFCTN, SIPGO, and FREG0:16. The signal lines CIFCTN and SIFCTN enable the CPU to transmit a function code directly to the CIP and SIP, respectively. The signal lines CIPGO and SIPGO are employed by the CPU to initiate processing in the CIP and the SIP, respectively, during the operation of the CPU QLT system. Finally, the signal lines FREG0:16 enable the simultaneous transfer of an instruction to the SIP from the F bus 37 as it is transferred from the F bus to the F register 38 in the CPU.

The functioning of the CPU SIP/CIP interface circuit 805 during the non-QLT operation of the CPU is not a feature of the instant invention but the interface circuit 805 will be discussed in connection with the operation of the QLT system to test the interface.

FIG. 49 illustrates an embodiment of the indicating means employed by the QLT system to display which stage or phase in the sequence of QLT procedure that the CPU QLT system is currently operating. The indicating means comprises a phase driver 807 coupled via signal lines to the write (W) bus 84 and by an output signal line to a hexadecimal bar display 809. The operations of the phase driver 807 and display 809 are such that the values supplied to phase driver 807 via the signal lines from the write bus 84 control the physical display of the numbers 0–9 and letters A–F. As will be hereinafter explained, the CPU periodically transmits signals via the write bus 84 to the phase driver 807 to cause the display 809 to display hexadecimal characters. The display of certain characters are associated with certain procedures included in the QLT system and, therefore, the particular character display serves as a guide in determining the phase in the sequence of the QLT system operation an error was detected. If the QLT system in the CPU performs to completion without detecting an error then the number 8 will be displayed by display 809.

The CIP and SIP include similar phase drivers and hexadecimal decimal displays such that a three-character combination will be available to an operator or field engineer trying to determine where, within the sequence of QLT procedures in the three processors, an error was detected. Again, if no errors were detected by QLT procedures in the CIP, SIP, and CPU the hexadecimal displays will all display the number 8.

The operation of the QLT will be explained in detail by reference to the block diagrams of FIGS. 50–61 and to the firmware and software listings attached as appendices to this application and incorporated herein as part of the instant specification. The line numbers in the firmware and software listings associated with the logical blocks illustrated in FIGS. 50–61 are indicated next to the corresponding blocks. A line number in the firmware listing include the prefix FW and line numbers in the software listing include the prefix SW.

Figure 50:
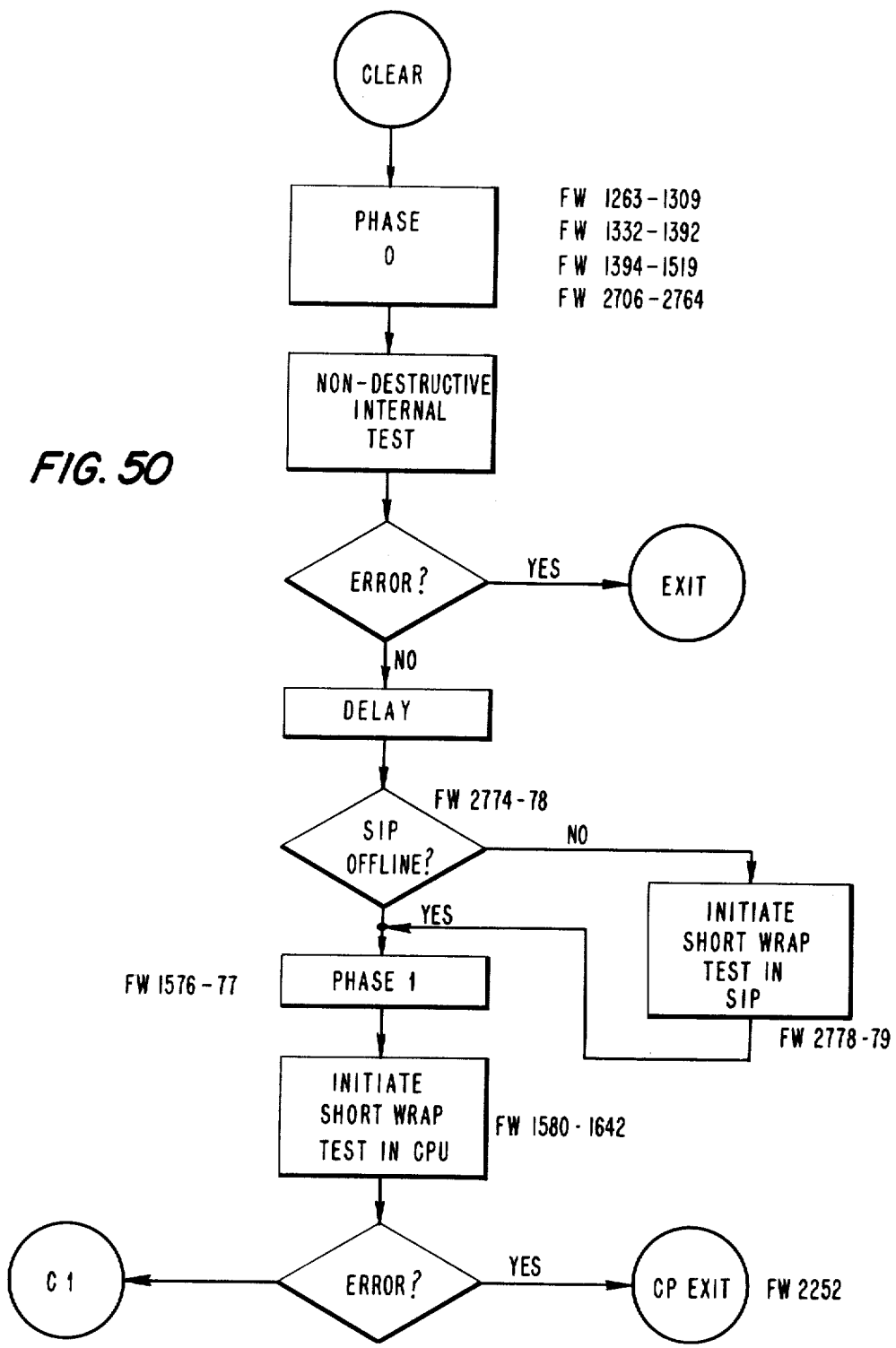
FIGS. 50–61 illustrate, in flow diagram form, the operation of the QLT system of the present invention.
Figure 51:
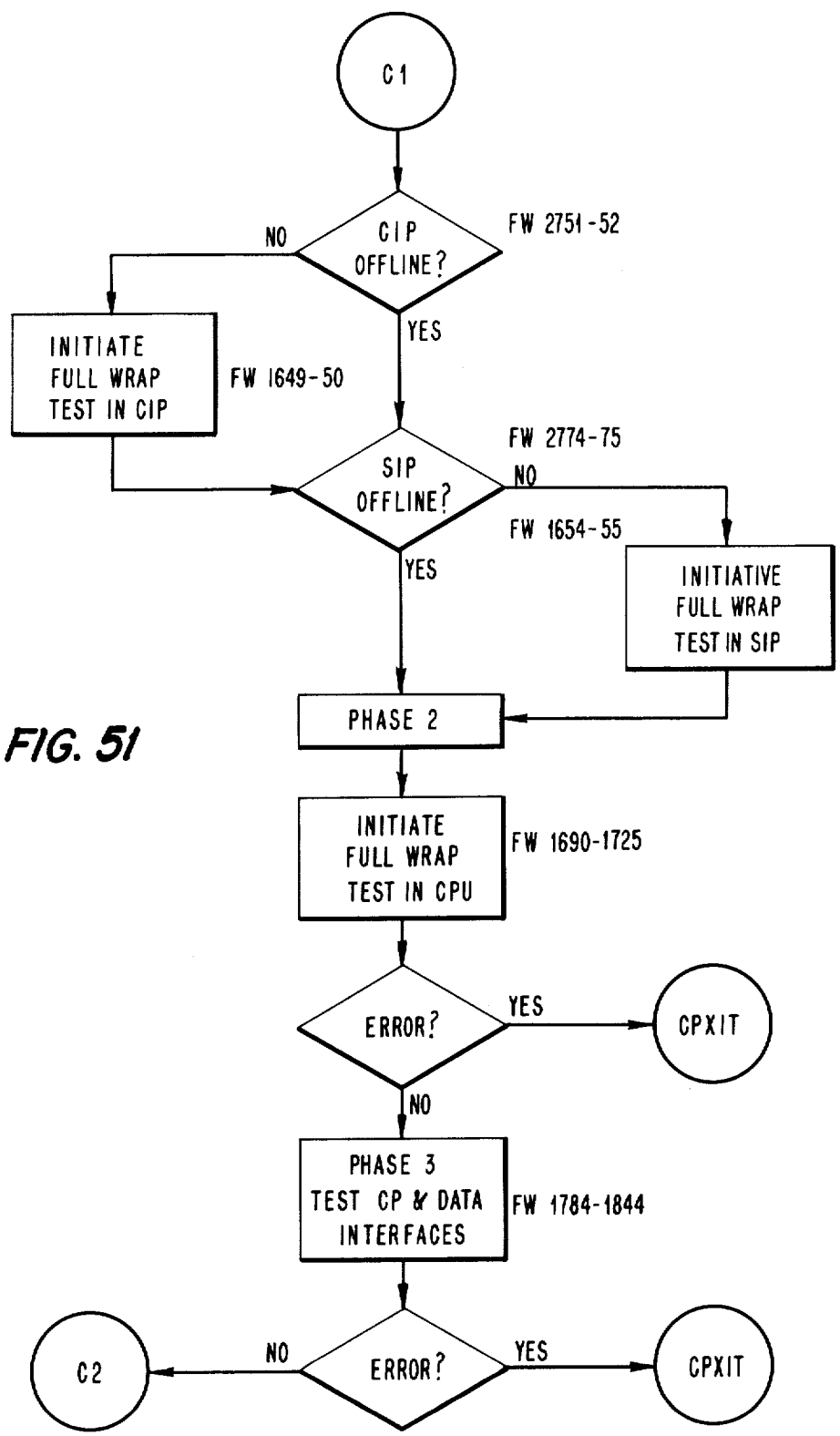

Referring to FIG. 50, the next address generator 44 will cause a forced jump to QLT firmware location "QLT" in control store 80 in response to the CLEAR signal being TRUE, i.e., the depression of the clear button on the CPU main control panel. At the firmware routine "QLT" the hexadecimal constant zero is transferred from the DALU 15 and stored in the D0 and A7 registers, as well as the phase register, which stores (and drives the hexadecimal display with) a value corresponding to the current phase of the QLT system operation. If an error is determined during a QLT test, the firmware will exit the QLT system and return to a normal functional "IDLE" state leaving the latest test phase displayed in the hex indicator.

The first series of tests performed by the QLT system and the CPU comprise a series of "non-destructive" internal tests, i.e., tests which do not affect the status of the CPU hardware elements. These tests are directed to the functioning of the select modify circuit 53 and the link portion of the F register 38 and are designed to verify the basic sequencing and branching capability of the CPU. A hexadecimal F is transferred into the select modify (SEL) index register 53 and to the link portion of F register 38. The contents of the SEL index register are decremented to test the integrity of the indexing mechanism.

When the contents of the SEL index register 53 are zero then the function of the link field in the F register 38 is tested by having its low order 4 bits set equal to ONE to test the address generated by the next address generator 44. Next, the link field of the F register 38 is set equal to ZERO and a test is made to determine whether the next address generated by the next address generator 44 has its low ordered 4 bits equal to ZERO. If an error was detected in either of the addresses generated with the different values of the link field or in the decrementing of the SEL index register an error will be identified and the QLT procedure will be exited.

If no errors were detected then a series of data path tests within the CPU are tested. One data path test is initiated by transferring data from the A0 register to the R bus 13 and from the R bus 13 to the DALU 15. From the DALU 15 it is stored in the D0 register and transferred via the R bus 13 and the W bus 84 to the A1 register. Also, the F register 38 is loaded with the constant 0001. The previously stored data in the A1 register is enabled to the R bus 13 from the R bus 13 to the DALU 15 and from the DALU 15 it is stored in the E0 register. Next, the contents of the E0 register are enabled to the R bus 13, from the R bus 13 to the W bus 84, and from the W bus 84 to the A2 register. The contents of the A2 register are then enabled to the I bus 14, from the I bus 14 to the BALU 55 and from the BALU 55 into the Y register 24.

The next part of the data path test is performed by sign extending the contents of the D0 and K0 register and enabling them to the I bus 14. The contents of the A0 register are enabled to the R bus 13. The DALU performs a logical OR of the R bus 13 and the inverse of the I bus 14 and stores the result in the A0 register. Next, the contents of the A0 register are enabled to the I bus 14 and the contents of the E5 register are enabled to the R bus 13. The R bus 13 and I bus 14 are added together by the DALU 15 and the result is stored in the E5 register which is used throughout the data path tests to accumulate test results. The contents of the Y register 24 are incremented by one and transferred to the P register 23 and the A5 register. Next, the contents of the A5 register are enabled to the R bus 13 and decremented by one by the DALU 15. The result is stored in the K0 register and the Y register 24 is incremented by two. At this point the contents of the A0 and K0 registers should be equal if the data paths within the CPU are functioning correctly. If they are equal the contents of the Y register 24 are transferred to the A2 register and the contents of the A2 and E5 registers are added together and stored in the E5 register.

Next in the data path test, the contents of the P register 23 are enabled to the W bus 84 and stored in the A2 register. The contents of the A2 register are enabled to the I bus 14 and the contents of the E5 register are enabled to the R bus 13. The DALU 15 performs an add of the R bus 13 and the I bus 14 and stores the result in the E5 register.

The CPU now performs tests of the shift data paths including shift registers 19 and 56 and shift selector 20 (FIG. 2). First, the Q shifters 56 are tested by transferring the contents of the register A1 to the I bus 14, the I bus 14 to the DALU 15 and the DALU 15 to the K0 register. Also from the DALU they are transferred to the Q register 50 and to the W bus 84 through shift selector 20, 0 bus 17, and shifters 19. The firmware subroutine routine $QLT-SHFTL controls the CPU to perform the left circular shift of 8 bits. After accumulating the results of this test, the data path is next tested for the successful completion of a right circular shift of 8 bits through execution of the firmware subroutine $QLT-SHFTR.

Open left and right shifts of 8 bits are then performed by controlling the DALU 15, shifter selectors 20, Q shifters 56, and shifters 19 by means of the firmware subroutines $QLT-SHFTL and $QLT-SHFTR.

A test of the arithmetic right shift capability of the CPU is now performed by loading the contents of the A1 register onto the R bus 13 and then performing a 24 bit arithmetic shift. The results are added to register E5 after each shift test.

The next data path test is to determine whether the KWOS logic PROM is functioning properly. KWOS logic PROM (not shown) is coupled to the F' register 76 and outputs a four bit value indicating the size, i.e, half word, full word, double word, or quad word of the current operand. This test is accomplished by enabling the contents of the E5 register to the R bus 13, the contents of the R bus 13 to the W bus 84 and the contents of the W bus 84 to the F' register 76. The transfer to the F' 76 register also supplies the inputs to the KWOS PROM which has its outputs connected to the I bus 14. The size of the operand, as determined by the KWOS logical PROM, is transferred to the I bus 14 and the content of the E5 register is transferred to the R bus 13. The values on the R bus 13 and the I bus 14 are added together by DALU 15 and stored in the accumulator register E5.

Meanwhile, the BALU 55 is set equal to all high values and transferred to the Y register 24. The contents of the Y register 24 are then transferred to the P register 23 and an increment is made of the Y register 24. The contents of the Q register 50 are enabled to the I bus 14 and the contents of the accumulator register E5 are enabled to the R bus 13. An add of the values on the R bus 13 and the I bus 14 is performed by the DALU 15 and the results are stored in the accumulator register E5. The contents of the Y register 24 are transferred to the A2 register via the W bus 84 and the contents of the accumulator register are incremented by the constant 00FF55. Finally, the contents of the A0 register are enabled to the R bus 13, added to itself by the DALU 15 and stored back into the A0 register. If the most significant bit of the result of the addition is equal to one, then the firmware routine $QLT-DPTHCK will be executed. If not, the above-described data path test loop is iteratively performed as a loop. There should be 16 passes through that data path test loop before the $QLT-DPTHCK firmware is executed.

In the above-described data path test loop the E5 register was employed as an accumulator and after 16 iterations of the loop the register should contain the hexadecimal quantity 061F46. The firmware instructions in the $QLT-DPTHCK procedure check the contents of the E5 register for this value and if the contents of the E5 register are not equal to the hexadecimal quantity 061F46 an error is determined to have occurred in the tested data paths. A branch will then be made to the $XL:QLTER1 firmware routine which will exit the QLT firmware to a functional "IDLW" state leaving the phase driver 807 and the display 809 set to display the latest test phase, in this case phase $\phi$. Thus, the value displayed correlates with the extent of processing performed by the QLT system prior to encountering the malfunction.

If the QLT system within the CPU determines that the data paths within this CPU, the select-modify register 53, and the link field of the F register 38 are all functioning correctly, then the testing the CPU is extended to check its communication with the local bus. This procedure is called a short wrap test and comprises transferring information from the data output register 28 the data input buffer 31 over the local bus 9 without requesting a local bus cycle.

First, the QLT sets the phase register to display phase 1. Since the QLT system within the CPU functions as the master with regard to the CIP and SIP QLT systems the CPU QLT system checks to see whether the SIP is offline, i.e., not operatively connected within the central subsystem. This test is accomplished by checking the status of the previously discussed data line SIPRZT in the local bus. If SIPRZT is true, then the CPU QLT system initiates a short wrap test to be performed by the SIP QLT system. The CPU QLT system will delay further operation to provide the SIP sufficient time to perform its short wrap test and to clear the local bus. When the delay period is over the CPU QLT system initiates a short wrap test within the CPU.

This is accomplished by first transferring to the phase register the hexidecimal constant by means of the I bus 14, DALU 15, and W bus 84. This stores the phase number for the CPU short wrap test performed under the control of the CPU QLT system. In the short wrap test, the CPU will transfer 32 data bits from its write register 28 to its data buffer register 31 over the local bus 9. Definite data patterns are transferred and these comprise the hexadecimal constants FFFE000, 000FFFE, FFFD0002, 0002FFFD, . . . BFFF4000, 4000BFFF, 7FFF8000, and 80007FFF. These data patterns are related in pairs such as data pattern 1 and data pattern 2. Data pattern 2 is the inverse of data pattern 1. Similarly, data pattern 3 is the inverse of data pattern 4, etc.

The functioning of the short wrap test will be explained with reference to data patterns 1 and 2. First, the right half of the write register 28, i.e., bits 16–31 are loaded with the constant 0001 by transferring the constant from D0 to DALU 15. From the DALU the value is transferred to write register 28 by means of the write bus 84. Next, the contents of register D0 are enabled to the R bus and are complemented by the DALU 15. From the DALU 15 they are transferred to the left hand 16 bits of the write data register 28. The contents of the write data register 28 are enabled as local bus data, i.e., LBDT0:32 to the data buffer 31. The left hand 16 bits received by data buffer 31 are enabled to the I bus 14 and the contents of the register D0 are enabled to the R bus 13. An EXCLUSIVE NOR is performed between the R bus 13 and the I bus 14 by the DALU 15 and the result is checked for ZERO. If the result is not ZERO then an error has occurred and a branch will be made to the firmware routine $XL: QLT-XIT which terminates this section of QLT leaving phase 1 displayed. If the test condition was ZERO then the left hand 16 bits received by the data buffer 31 will be transferred through L bus 32, data address register 34, and source bus 33 to the I bus 14. The contents of the D0 register will be enabled to the R bus 13 and the DALU 15 will perform an EXCLUSIVE OR between the R bus 13 and the I bus 14 and emit the result to the W bus 84. Again, if the result if not ZERO, then an error has occurred and a branch is made to the $QXL:QLT-XIT firmware routine. If the result is ZERO, then the data pattern in register D0 is inverted and the short wrap test is performed again with the next data pattern. After testing this inverted pattern, the first pattern is shifted left one bit. If the pattern is then all ZEROS, the test is finished. If not, this shifted pattern is used in the test.

If no errors are detected then the CPT QLT system will initiate full wrap tests in the CIP, SIP, and CPU to test the interface logic in each of the processors with the local bus control logic contained in the local bus adapter of the cache/MMU. Thus, the full wrap test procedure tests the functional elements previously described with reference to FIG. 11 for accepting requests for local bus cycles, granting local bus cycles, and transferring data over the local bus between source and destination units. This test is performed by all three processors, CPU, CIP, and SIP, in parallel in order to test local bus cycle management. In the full wrap test performed by the CPU the data is again transferred from the data write register 28 over the local bus 9 to the data buffer 31 of the CPU but all under the control of the local bus adapter.

First, the hexadecimal constant 42 is stored in the D0 register and a 2 is loaded into the phase register and displayed. Next, the write register 28 is loaded with the hexadecimal constant 00666666. A local bus write request is performed specifying the CPU as the destination unit and 0 as the function code. When granted by the signal CPRQGT being set TRUE, the data is transferred to the local bus and is also stored in the A0 register. The data as received by the data buffer 31 is enabled through DA register 34 to the source bus 33 and from the source bus 33 to the I bus 14. The contents of the A0 register are enabled to the R bus 13 and an EXCLUSIVE OR is performed by the DALU 15 with the R bus 13 and the I bus 14. If the result of the EXCLUSIVE OR is not equal to 0, then an error has occurred in the transfer of the data in the full wrap test and an exit will be made to the $XL:QLT-XIT firmware routine.

If, however, the result is equal to 0, then the write register 28 is reloaded with 00999999 and the test is repeated using F as the function code. This loop is performed 66 times and upon successful completion of the full wrap test a new phase of the QLT system will be entered.

This new phase is to test the data and procedure interface as referenced by portion 10 in FIG. 2. This interface includes the boot prom 41, L bus 32, DA DW registers 34 and 35, PA and PW registers 39 and 40, and the round robin store 36. This test comprises reading 16 memory locations in the boot prom 41 beginning an address 40 and proceeding through address 4F. These boot prom addresses store 16 data and procedure word sequences comprising a 1 bit shifted from the least significant bit to the most significant bit. The 16 "word" patterns are also interpreted as 8 procedure and data address sequences. The first entry comprises the hexadecimal values 010002. The other 7 address sequences are formed by shifting the first address value left 2, 4, 6, 8, 10, 12 and 14 bits, respectively. Each value read is accumulated in E5.

The DA registers are tested by first storing the starting address (40) in the A0 register and loading SEL with 7. Next, the hexadecimal integer 3 is stored in the phase register and displayed. A read of two words from the boot proms 41 into the data address register is performed, and the Y register 24 is incremented by two. The contents of the DA register 34 resulting from the read are enabled to the I bus 14 from the source bus 33 and the contents of the E5 register are enabled to the R bus 13. The DALU 15 performs an add of the R bus 13 and the I bus 14 and stores the result in E5, thus accumulating DA.

This data address register test loop is performed eight times, accumulating the 8 test patterns described above in E5.

When the data address test loop has been executed 8 times, the QLT system of the CPU enters a data word register test loop to test the data word register 35. The beginning address (40) in the boot proms 41 is loaded into the address register Y 24 and a read is performed specifying that the results are to be entered into the data word register 35. The data word register is enabled to the source bus and is added to register E5 as in the DA test.

After 16 iterations of the data word register test loop the CPU QLT system enters the procedure address test loop and the 8 procedure addresses will be read from the boot prom and accumulated in the E5 register.

The next test loop performed is the procedure word test loop wherein the 16 procedure words stored in the boot proms are read and their contents accumulated in the E5 register. If the total accumulated in the E5 register does not equal a predetermined amount after the performance of the lists of the DA, DW, PA and PW registers, an exit is made to the QLT exit routine leaving the current phase number 3 displayed. During the testing of these 4 registers, the expected accumulation value was formed in register A2 for comparison at the end of the test.

Figure 52:
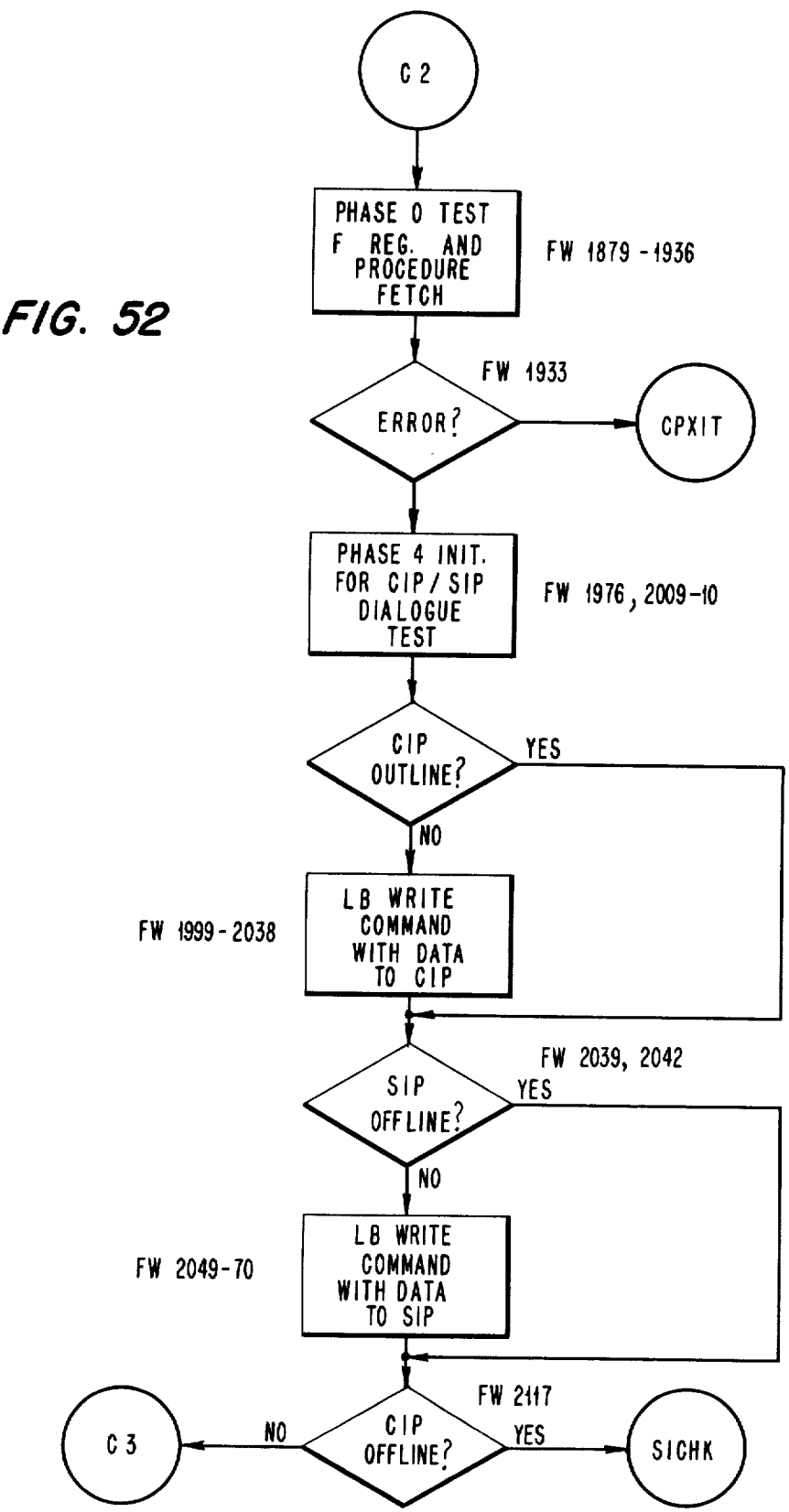
Figure 53:
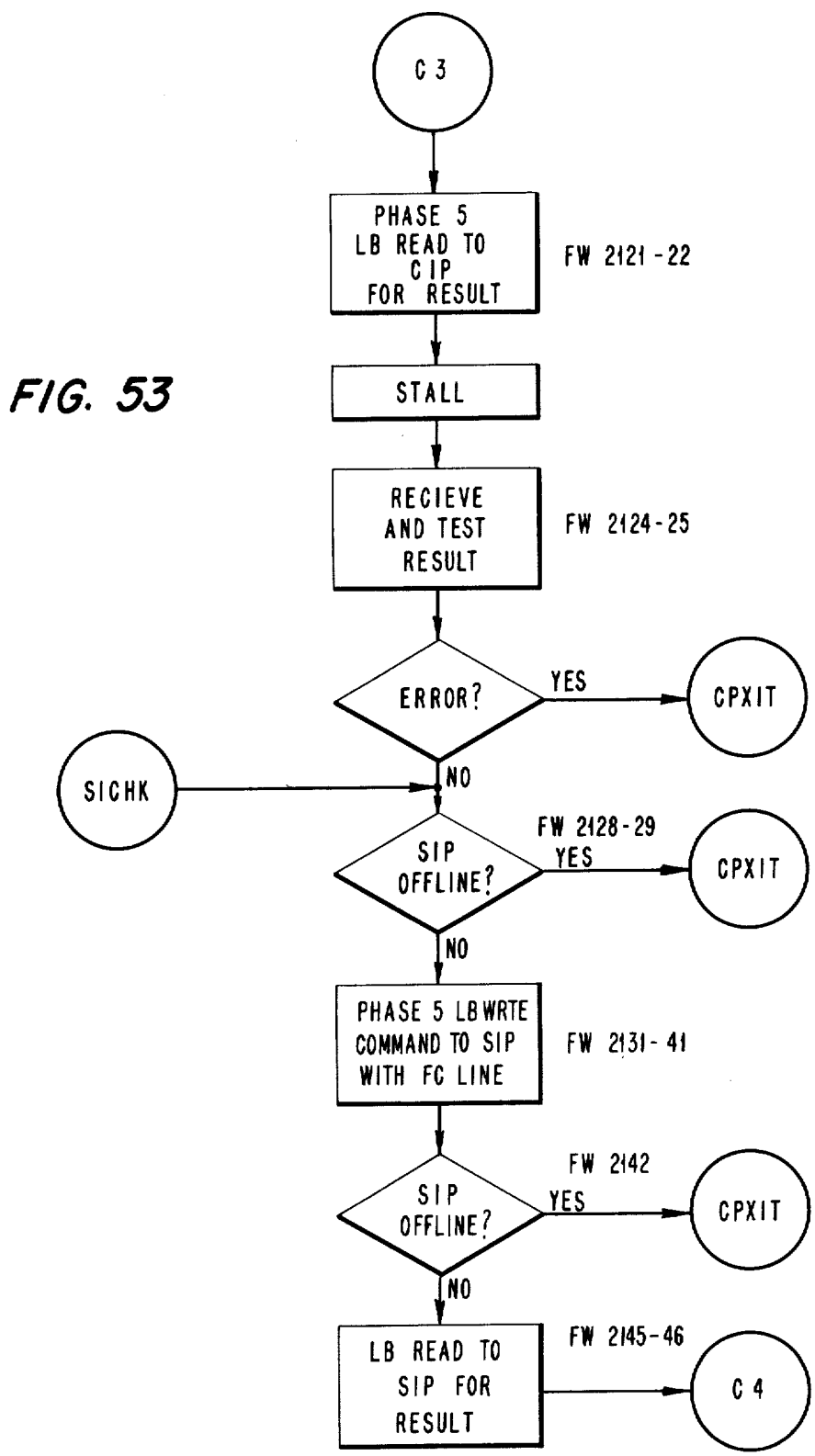
Figure 54:
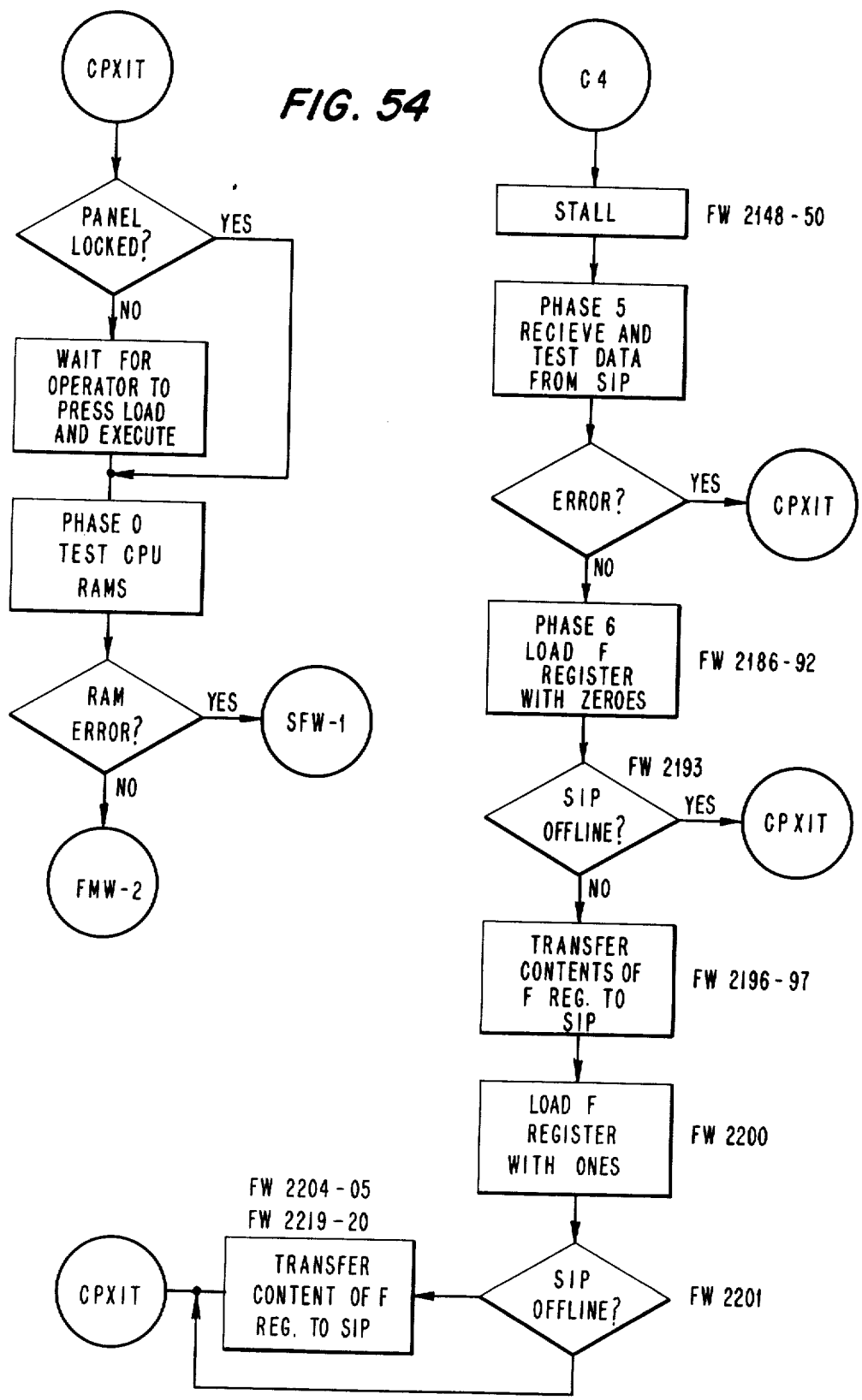
Figure 55:
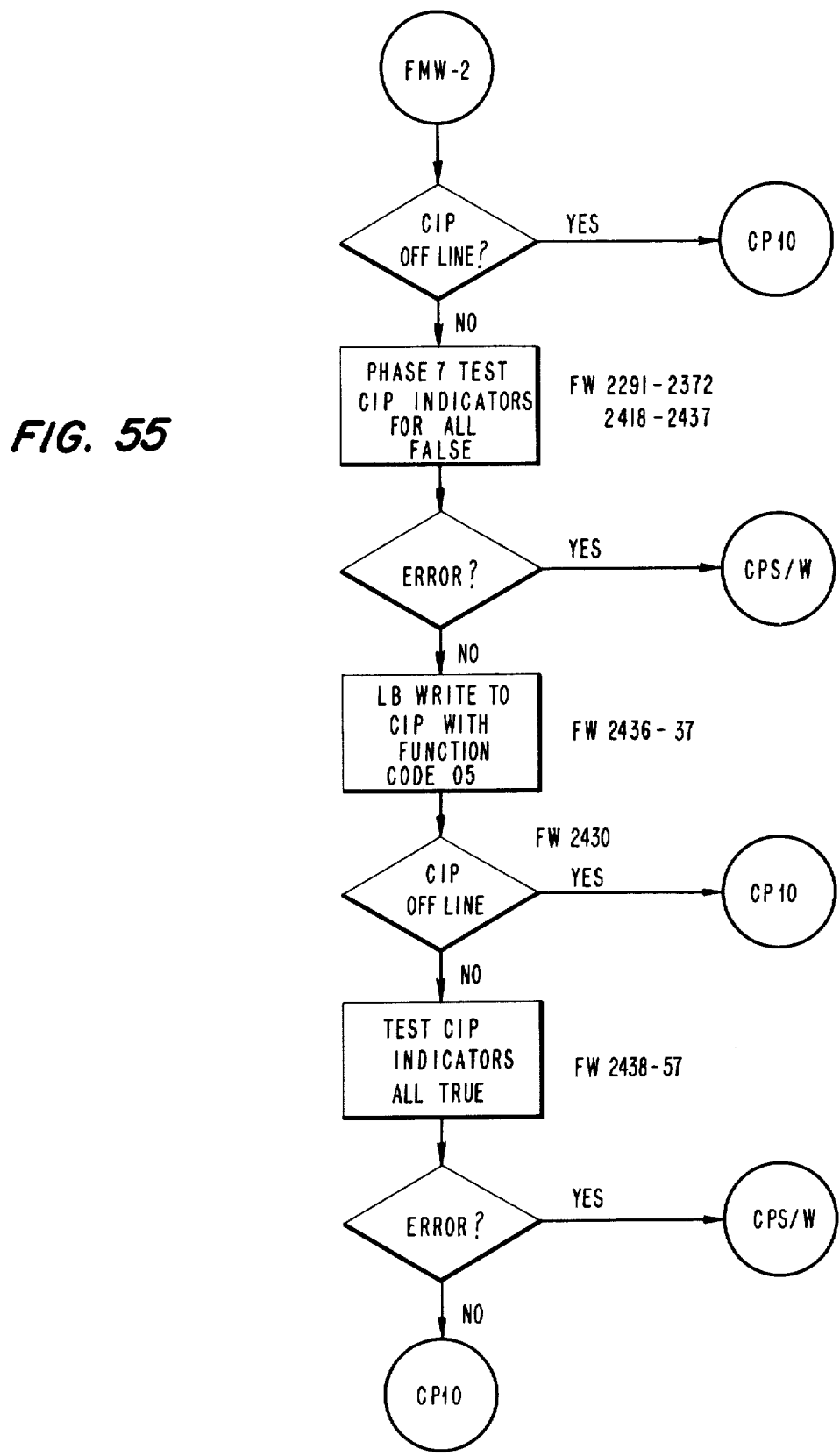
Figure 56:
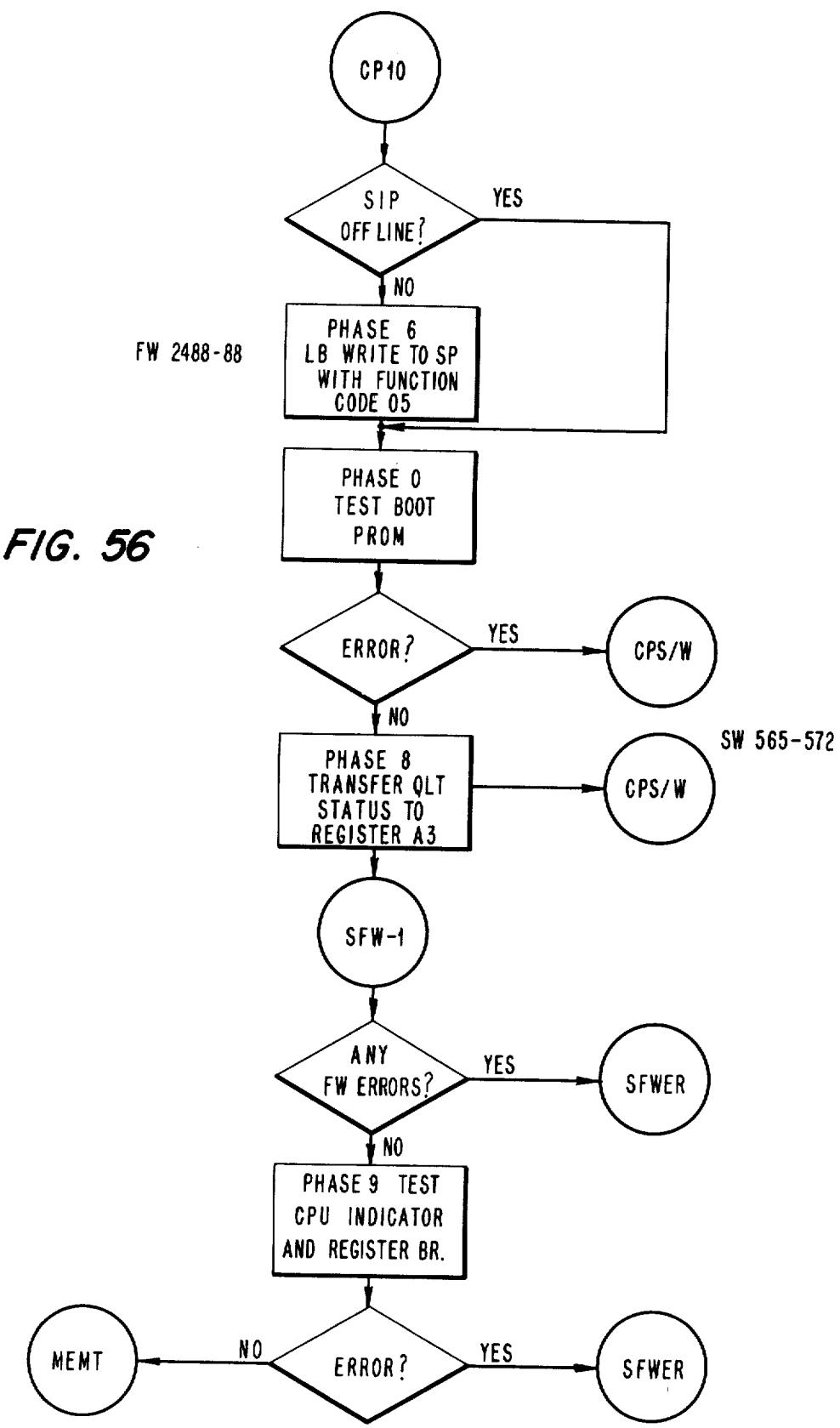
Figure 57:
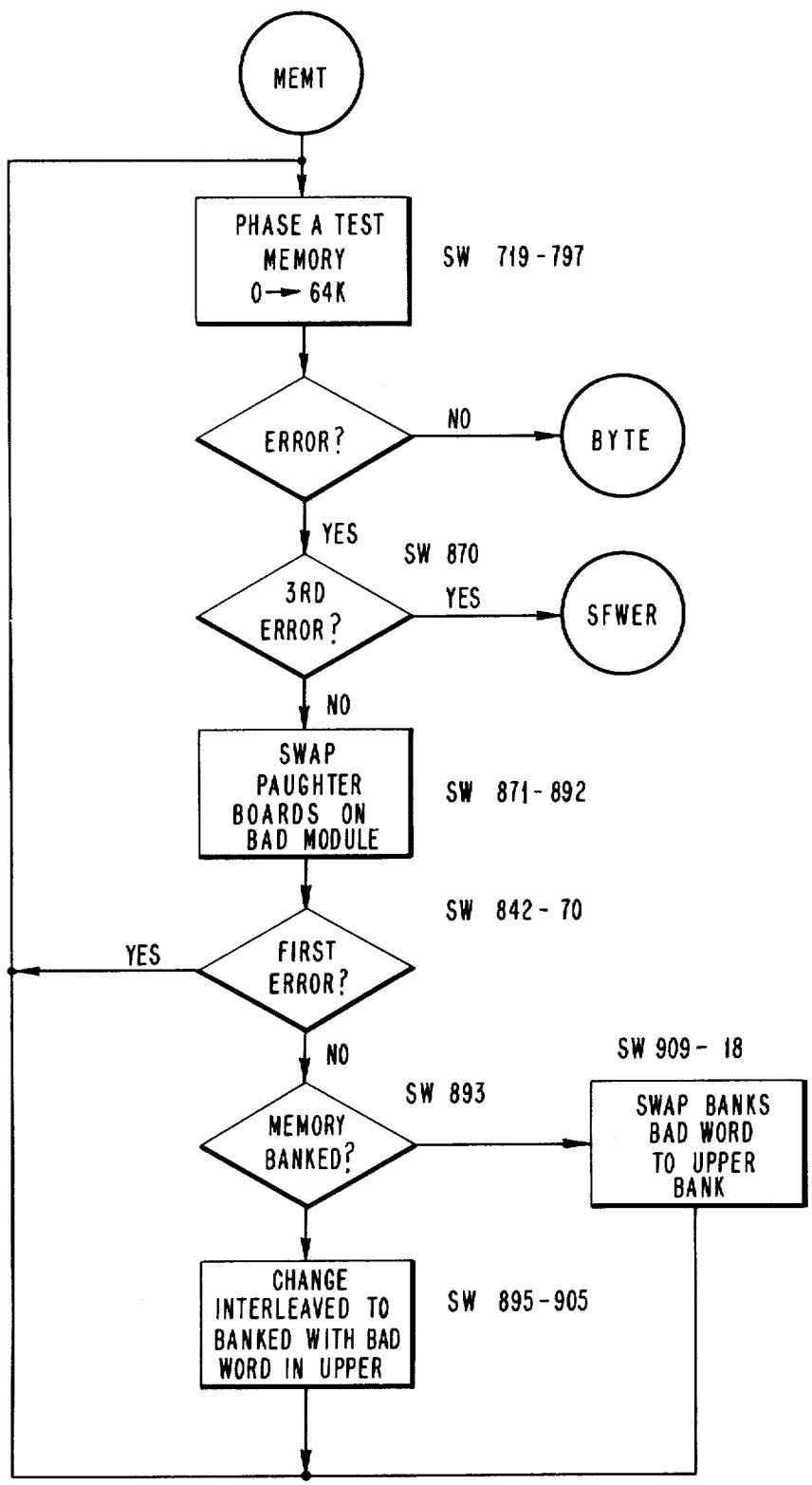
Figure 58:
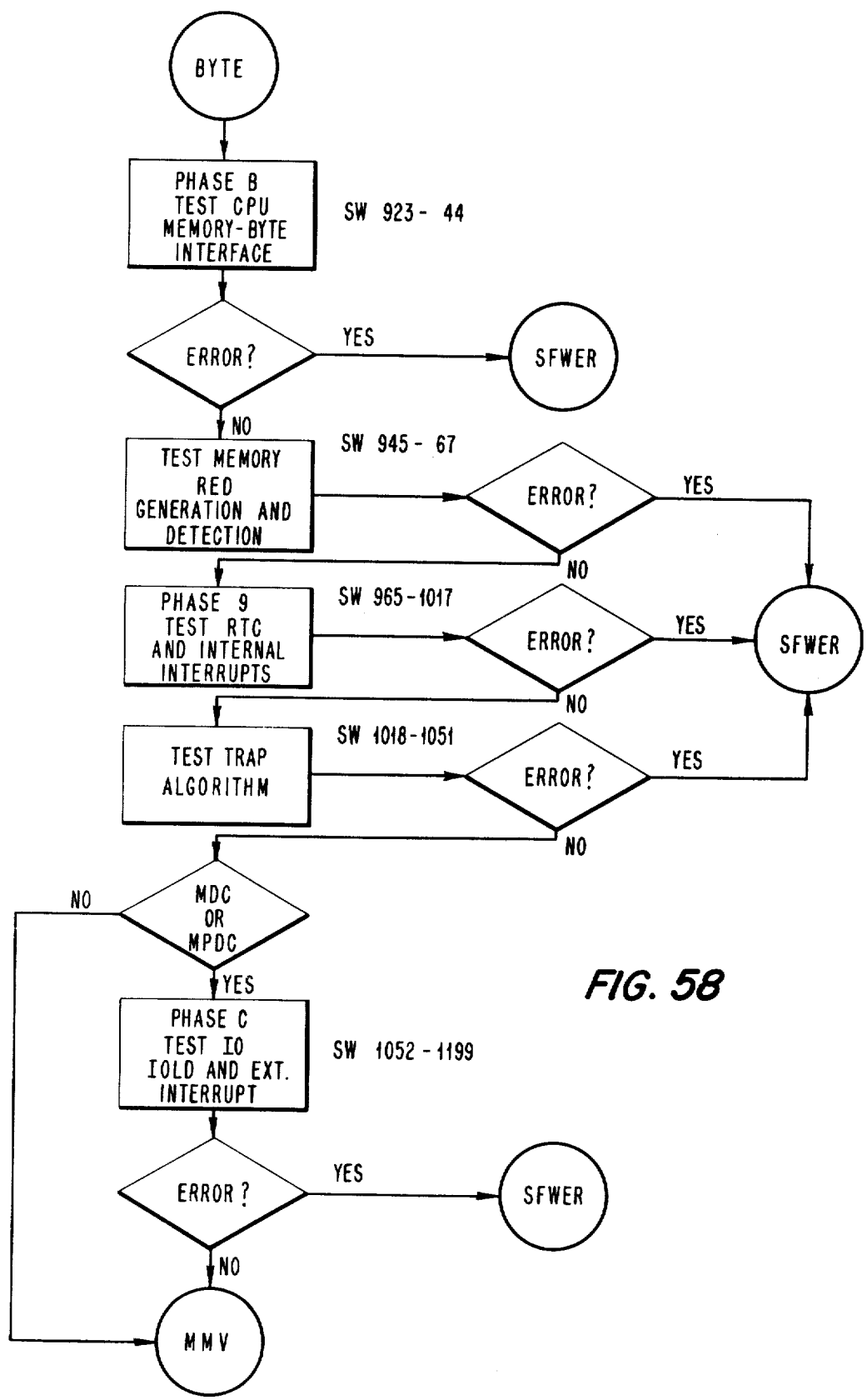
Figure 59:
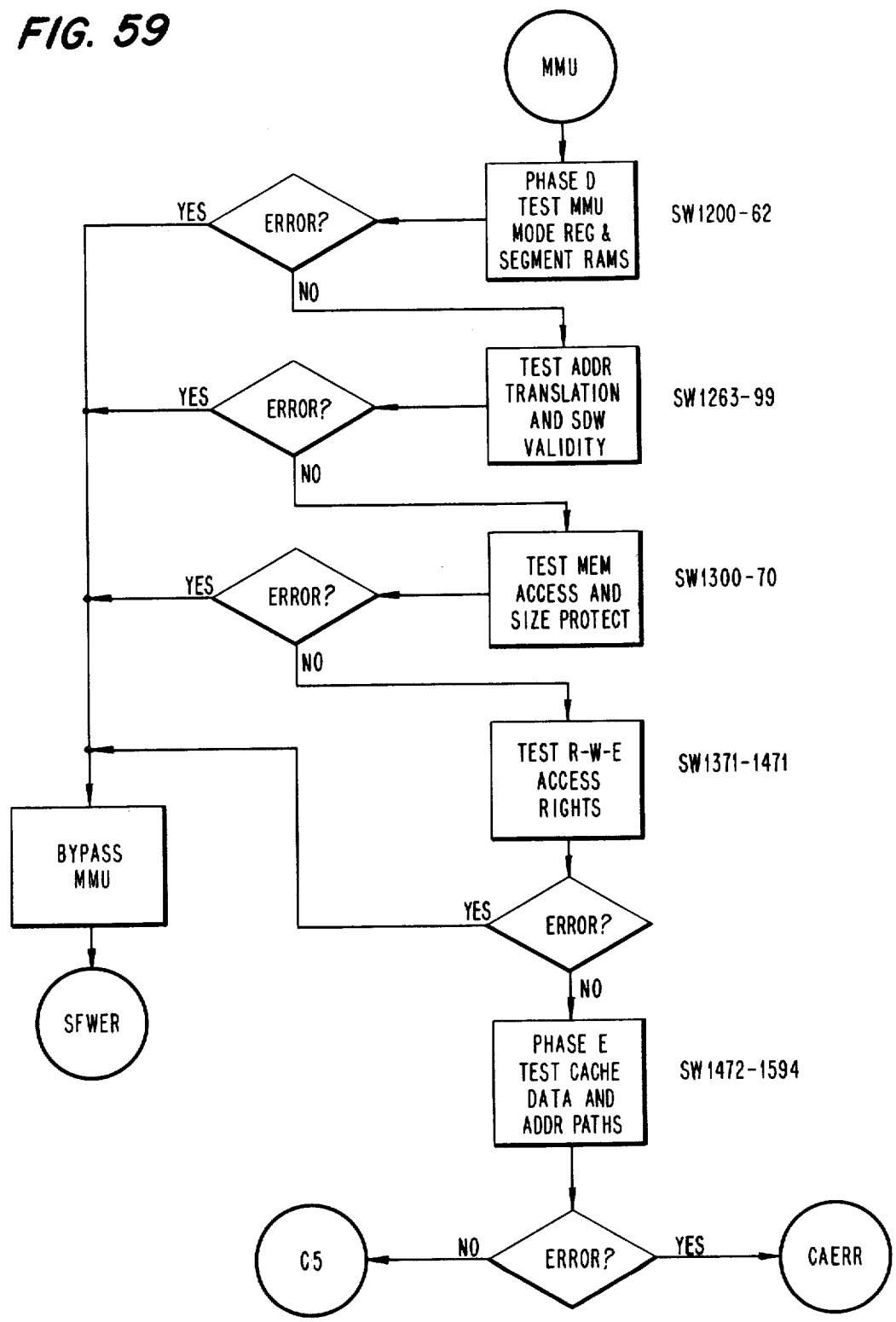
Figure 60:
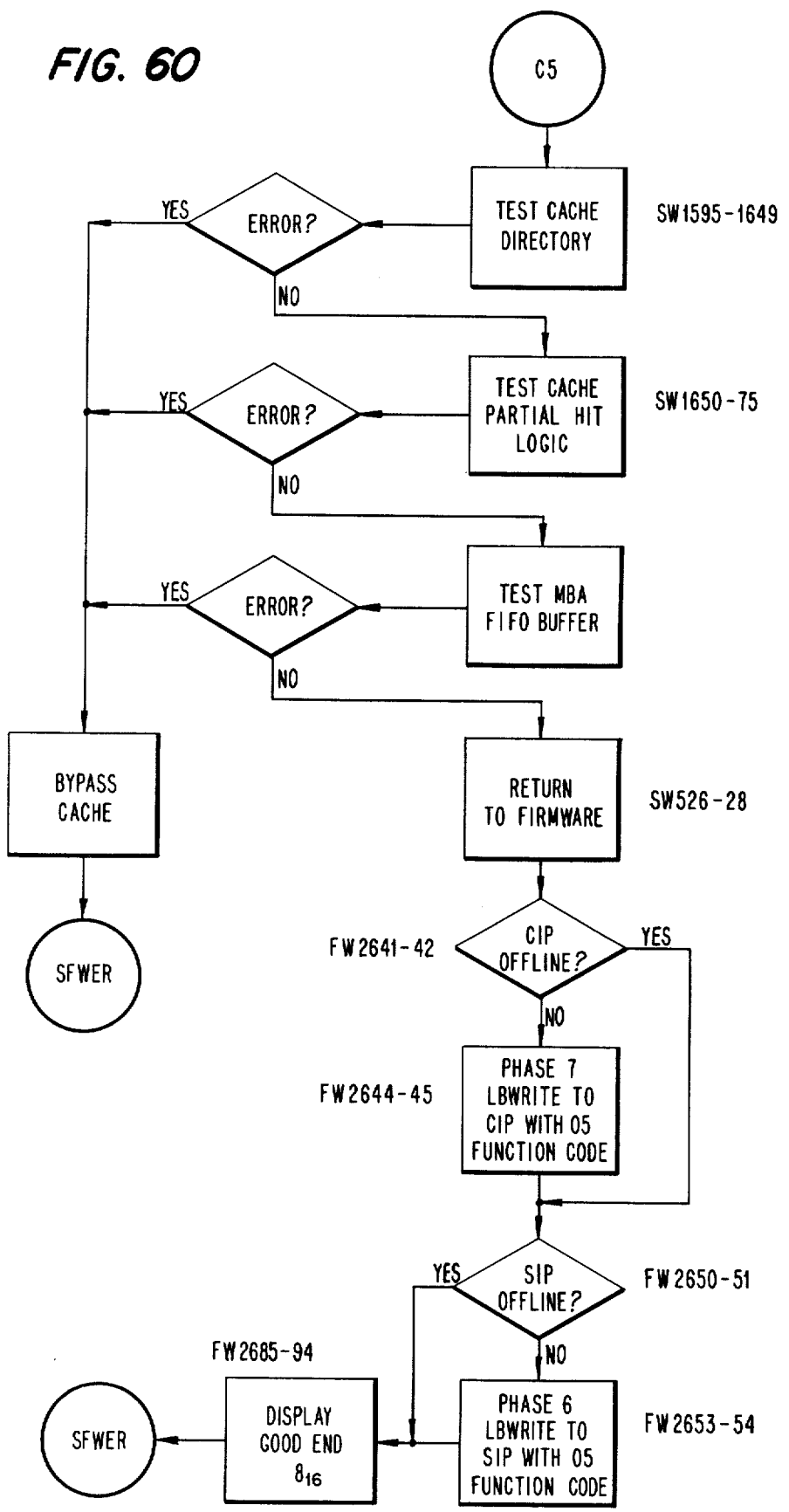
Figure 61:
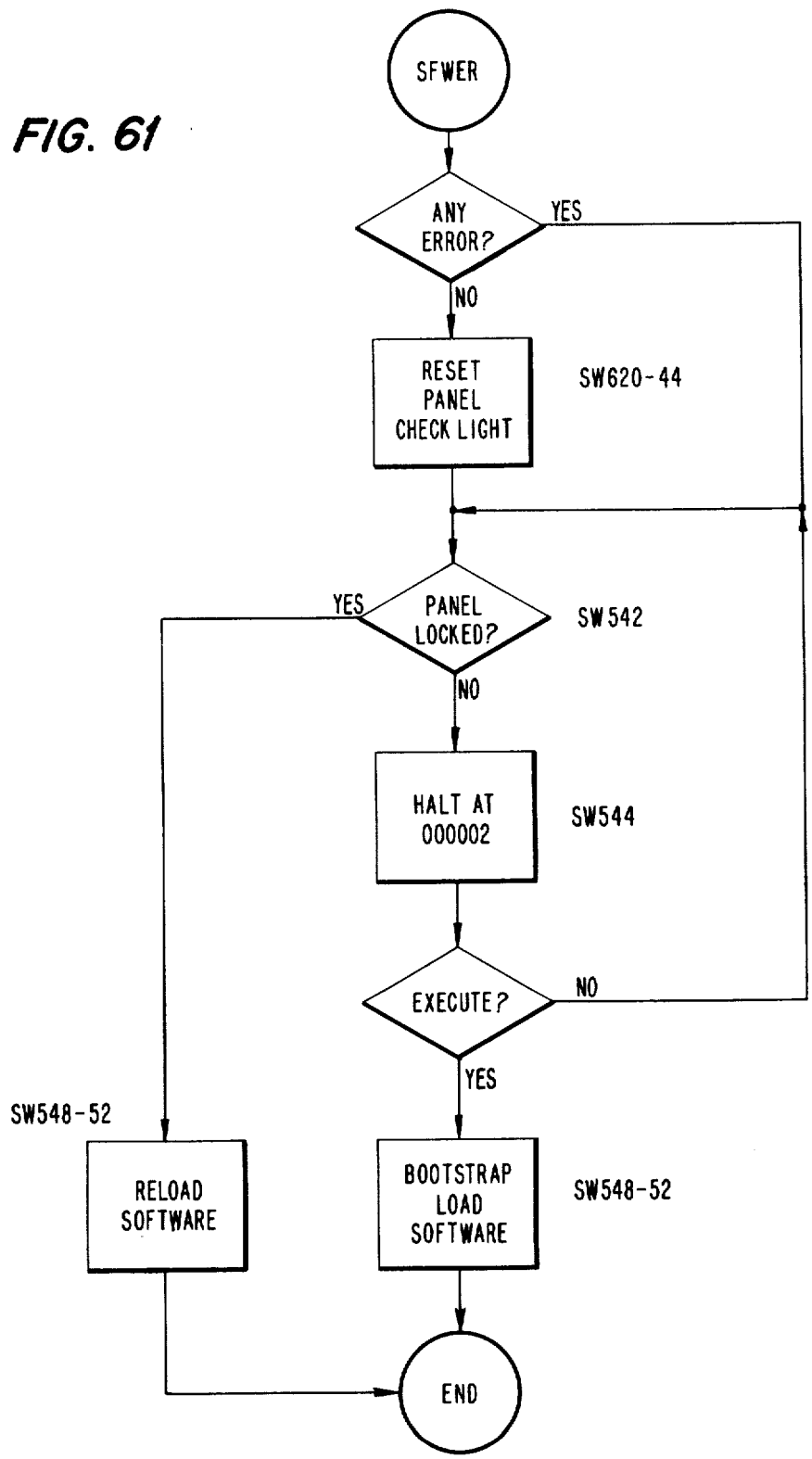

Referring to FIG. 52, the next CPU element to be tested by the QLT system is the F register 38. The firmware routine $QLT-FREG constitutes the first of a sequence of firmware routines executed in a loop manner to control the CPU and to test the bit positions 8-15 in the F register 38. The data patterns used in the test are 01, 02, 04, 08, 10, 20, 40, and 80, hexadecimal. Register E5 is used as the accumulator for test results and the A0 register contains the address of the first test pattern. The phase register and display are set to $\phi$ for this test.

Initially, the contents of the A0 register are copied into the address register Y 24. A prefetch of nonprocedure data is initiated and the phase register and display are set equal to 0. The actual test loop for the F register 38 corresponds to the $QLT-FRLP routine and it includes placing the test pattern into the right half of the F register. Next, the seven bit displacement portion of the F register 38 as transferred sign extended through the I bus 14 to the DALU 15 is transferred to the W bus 84. The contents of the E5 register are enabled to the I bus 14 and the DALU performs an add of the W bus 84 and the I bus 14, storing the results in the E5 register to accumulate values of the displacement portion of the F register 38. Next, the eight bit value portion of the F register 38 is transferred sign extended to the I bus 14 and from the I bus 14 to the DALU 15. From the DALU 15, it is enabled to the W bus 84. The contents of the E5 register are enabled to the R bus 13 and the DALU 15 adds the R bus 13 and the I bus 14 and stores the results in the accumulator register E5.

After 8 iterations of these two tests, the accumulator should total the hexadecimal constant FFFFE. The contents of the E5 register are compared to that hexadecimal value and if they are not equal then a branch is made to the $XL:QLT-XIT firmware routine leaving the displayed phase equal to $\phi$.

If they are equal then the QLT test of the F register 38 is complete and the fourth phase of the CPU QLT system will be entered wherein the CIP and SIP interface with the CPU will be tested with particular function codes. This testing begins with the firmware routine $QLT-FILOG. Upon entry in this firmware code, the K0 register is equal to 50 and the phase register is set equal to 04 to indicate that the QLT system is in the fourth phase of the CPU QLT procedure. In this test of the CIP-CPU and SIP-CPU interfaces, the CIP will be sent the sequence of function codes 07, 05, 09, 0B, 0D, and 1F with associated data equal to the function codes. The SIP will be sent function codes 01, 03, 05, 09, and 011 also with associated data equal to the function codes. The K0 register is used as an index for splattering into the different firmware routines for transmitting the above function codes to the CIP and the SIP. The CPU tests to see whether the CIP is offline by means of the CIPRZT signal and, if it is offline, then no dialogue test of the CIP will be performed. If, however, the CIP is not offline than the QLT system will splatter to a firmware routine for transmitting one of the six function codes referenced above the CIP. These six firmware routines are identified as $XL:QLT-CX5-$XL:QLT-CX0. In each of these routines, a local bus write is performed specifying both the CIP as the destination unit and the function code associated with the firmware routine.

Next, the CPU QLT system tests to see whether the SIP is offline by testing the status of te SIPRZT line. If the SIP is not offline, then the firmware splatters to the firmware routines for transferring the above-referenced SIP function codes and data. These routines are $XL:QLT-SX4-$XL:QLT-SX0.

The QLT system in the CPU next issues reads to the CIP and the SIP to obtain the results of the processing performed by the CIP and the SIP responsive to the function codes transmitted from the CPU. The phase register and display are set to 5 for this test. The procedures performed in this testing are set forth in FIGS. 51-54 and, generally, the A0 register is set equal to the data expected to be returned from the SIP or the CIP and the contents of the A0 register are compared to the returned data address or data word and if they are not equal an error is determined to have occurred in the dialogue functionality between the CPU and SIP or the CPU and the CIP.

If the dialogue tests are successfully performed then phase six of the CPU QLT system is entered wherein the interface between the SIP and the F register 38 of the CPU is tested. As shown in FIG. 48, and explained above, the SIP receives whatever information is transferred into the F register 38 of the CPW. The purpose of this section of the CPU QLT system is to determine whether the SIP is correctly receiving the contents of the F register 38.

First, the phase register is set equal to 6. Address 50 in the boot proms 41 is stored in the address register Y 24 and the register A0. Next, a non-procedure word of zeros is fetched from the boot proms 41 in accordance with the address stored in the Y register 24 and the non-procedure data word is transferred from round robin store 36 to the F register 38. The interface line SIPGO is set TRUE and the D0 register is set equal to the hexadecimal constant 04. The firmware routine $QLT-SIPGO is performed wherein the presence of the SIP in the system is tested and if it is present, the CPU will delay. Meanwhile, the SIP will test the received F register data and will exit to a SIP error routine if the data received from the CPU F register 38 is not equal to 0. After waiting for the SIP to complete its test, the CPU will then load the F register 38 with all ONES and cause the data line SIPGO to be set TRUE. Again, the SIP will check the received contents of the F register for all 1's and will either indicate the existence or non-existence of an error.

After sending the F register contents equal to 1, the CPU QLT system has successfully performed the first portion of the QLT system without error and, therefore, the phase register and display 809 will be set equal to 8 and an exit will be made to the routine $XL:QLT-XIT.

The CPU QLT system will then conduct an internal test to determine whether the load and execute buttons on the CPU control panel have been depressed. If they have, then a forced branch is made to the QLT-MCL firmware routine to perform additional CPU internal tests including tests of the BRAM and DRAM registers.

Generally, the tests of the BRAM and DRAM registers include cycling a 1 through all 24 storage positions of each of the registers. A cumulative total is stored in the Q register 50 to test the results of the cycling and the current data test pattern is stored in the Y register 24.

Initially, the Q and Y registers are loaded with the content 1. The SEL register 53 is used to index through the BRAM and DRAM in sets of eight. A zero is stored in the phase register and the contents of the Y register 24, i.e., the initial test pattern, is saved in the P register 23. Next, the firmware routine $QLT-RAMW1-$QLT-RAMW7 are employed to load registers A7 through A0 with the contents of the Y register plus 0, registers B7-B0 with the contents of the Y register plus 2, registers D7-D0 with the contents of the Y register minus 1, the registers K7-K0 with the contents of the Y register plus 1, the registers E7-E0 with the contents of the Y register plus 4, and the registers L7- with the contents of the Y register plus 3. Next, the contents of each of the registers are read back and a total of the values is accumulated in the Q register, again using the SEL register 53 for indexing. This is performed in the firmware routine $QLT-RAMRD-$QLT-RAMR9. After the DRAM and BRAM have been accumulated, the test pattern is shifted left 1 bit and the write-read-accumulate sequence is repeated. After 24 test patterns have been used, the accumulation in the Q register is compared to a constant. If they are not equal, the QLT exits via the $XL:QLT-SFW firmware routine, leaving phase ZERO displayed.

If the BRAM and DRAM are operating correctly, then phase seven of the CPU QLT system is entered wherein the CIP internal test indicators are tested.

It was stated with reference to FIG. 48, that the logic PROM 807 interfaces the CPU with the CIP indicators and it is a function of the $QLT-CINT firmware to test whether they are operating correctly. This is accomplished by loading the F register 38 with six CIP branch which are located in boot prom 51 storage locations 52-57. The phase register and display are set to 7. The initial boot prom address is stored in register A0 and in the Y register 24. The branch instruction stored in the boot prom 41 at that initial location is transferred to the F register 38. The CIP indicators are left equal to $\phi$ by the CIP internal test. The CPU now loads the 6 CIP branch instructions, one at a time, and tests that the appropriate branch signal becomes true for each instruction. If an error is detected in the branch signal, the QLT exists to $XL:QLT:SFW leaving phase 7 displayed. If there was no error, the CPU will signal the CIP to reload the CIP indicators with ones. The CPU performs this via a local bus write to the CIP with a function code 05 and data equal to 8000 which will cause the CIP to execute the remainder of its internal QLT routines and load its indicator register with all ones. The CIP indicators are received by the logic prom 807, and the CPU QLT system tests to make sure that they are received correctly. Next, the above procedure is performed with the same six CIP branch instructions and the initial Y address. This time, the CPU will test for the appropriate branch signals to be false.

The next phase of the CPU QLT system is phase 6 and consists of the CPU directing the SIP to finish its internal testing. This comprises transferring the function code 05 with data equal to 8000 by a local bus write to the SIP to signal to the SIP that the SIP QLT system should complete all of its internal tests.

The CPU QLT system next performs certain firmware routines to prepare for entry into the QLT system software. First, the phase register and display are set to $\phi$. These routines include setting the B1 register to the size of memory +1, and certain bits of the D3 register. Bit 12 of the D3 register will be set to 1 if there is a main memory PROM for storing a user-generated boot load software program, bit 13 will be set equal to 1 if the main memory is volatile, i.e., information stored therein evaporates upon a loss of power, and bit 15 will be set equal to 1 if the CPU panel is locked indicating a restart after power failure rather than operator pressing the CLEAR button on the maintenance panel. The locking of the panel is a convention whereby the loading of new software will be done only if the CPU is master and the memory is volatile, i.e loses its integrity with loss of power. Bits 0 and 1 of the D4 register will be set equal to the CPU number, bits 8-11 of the A3 register will be set to the current QLT phase, bits 12 and 13 of the A3 register will also be set equal to the CPU number, bit 15 of the A3 register will correspond to the QLT status of all units on the megabus. All other bits of the A3 register will be set to 0.

These routines will also set register B2 equal to ZEROES by bypass the cache and MMU for the software testing, and verify the boot prom contents. Also, boot prom locations 60 will be indicated as the start location for the software program. Finally, an exit will be made to QLT software control by the firmware routine now $QLT-XA.

The CPU QLT system software will perform tests of the CPU branch hardware and if the memory is non-volatile a restart of the system will be performed. If the memory is volatile and the CPU is the master CPU then the QLT system performs a number of memory tests and tests the cache/MMU. Next, a break will be made back to CPU QLT systems firmware to test the CIP/SIP memory interface, and thereafter a return will be made to the CPI QLT system software. If the CPU panel is locked then a boot load will be conducted using a boot load routine as stored in the boot proms 41 or a user-provided load routine as stored in an optional main memory prom. If the panel is not locked, then the CPU processing will halt until the EXECUTE button on the CPU panel is depressed at which time a boot load will be conducted.

The QLT system software testing is done by calling a series of subtests, each of which is a subroutine. The first two subtests are executed before determining whether the associated CPU is the master CPU. The subtests verify the CPU branching capability and basic operation of the CPU. After the last subtest, a return is made to the firmware portion of the QLT system by executing a "BRK" instruction. When control returns to the QLT system software, QLT processing is completed.

The software routines are set forth in the attached software instruction listings and reference can be made to the "Series 6 (level 6) Model 6/43 Programmer's Reference Card" published by Honeywell Information Systems, Incorporated (1977), for interpretation of the mnemonics and format of the instructions. The calls to the referenced subtests are set forth in line numbers 461-530.

The first subtest is to test the indicator branches in the CPU. The phase register and display are set to 9 for these tests. The I register is set equal to all 1's and tests are conducted for indicator conditions overflow, carry false condition, bit false, I/O indicator false, less than or equal, greater than equal, and signs unlike. If a branch is taken to the location QLT12, then it is an indication that the branch test indicators are not functioning correctly. If, however, a branch is taken to QLT13, the I register is set equal to all 0's and tests of the branch conditions overflow, carry true, bit test indicator true, I/O indicator true, greater than, less then, and sign equal are conducted. If the indicators are set properly, a branch will be taken to QLT50 and a return will be made to the calling portion of the QLT software routines.

The QLT system software next tests the functioning of the register branches in the code from lines 675-697. The R1 register is selectively set to different values and the different conditional branches relating to the registers are tested to see if they are executed properly.

Next, a subtest routine determines whether the CPU is a master or slave. If it is a master, and the memory is volatile, then no restart will be initiated and the calls to the subtests set forth at lines number 501-522 will be performed.

Initially, a memory test is performed by the routine beginning at line 719. The phase register and display are set to A for these tests. This routine tests a maximum of 64K words memory and is entered with the contents of register B1 equalling the total memory size, register B2 containing the low address, i.e., 0 of the memory, register B3 containing the high address plus 1, and register B7 containing the return address. Register R3 contains the QLT system status flags, and register R4 is used as an error counter having three states. First, the memory is loaded from the bottom to the top with a pre-determined data pattern, these are initiated by local bus writes directed to the systems memory. Next, the systems memory is read from top to bottom and, at the same time, the complement of the first data pattern is written into the memory. Next, the memory is read back and tested to make sure it equals the complement of the data pattern and, if it does, the memory is cleared.

It a memory error is detected during the test, or a red condition is determined to exist in the memory, the QLt system software will turn on a fault indicator on the bad module and try to reconfigure the memory. Reconfigurable memories are well known in the art and comprise memories wherein the addresses of memory locations can be changed without physically removing or changing memory hardware. The systems memory is comprised of a plurality of memory modules and each memory module is comprised of a plurality of memory boards. The object of a reconfigurable memory is to change the addresses of malfunctioning memory locations so that they will reside in the high order memory address locations. As an example, if the systems memory includes two memory modules wherein the first memory module includes the actual physical low order memory locations as well as a low order virtual, i.e., changeable memory locations, and the second memory module includes the high order physical and virtual memory locations, then a reconfiguration of that memory upon the detection of an error in the low order memory locations would be to equate the high order physical locations with the low order virtual locations and the low order physical locations with the high order virtual locations. This results in effectively causing the memory error to be located in the high order locations of the systems memory. This reconfiguration is performed by the instructions set forth in lines 866-922 after reconfiguring memory, the memory test is retired. If there is still an error, the memory is reconfigured again and the memory is tested a third time.

The QLT system software also controls the CPU to recognize indications of the RED and YELO memory conditions within error detecting and correcting (EDAC) memory. The routine for routine for performing this test is set forth at lines numbers 945-967. The phase register and display are set to B for these tests.

The real time clock and timing interrupts are tested by the CPU QLT system by controlling the CPU elements with the software routine set forth at lines 968-1017. The phase register and display are set to 9 for these tests. This routine tests the interrupts of level "N+1" by the real time clock operating at level "N" with N equal to 0, 1, 2, 4, 8, 16, and 32 and ensures that the functionality within the CPU for changing processing levels is performing correctly.

The ability of the CPU to identify and execute a trap algorithm in response to a request to perform an illegal operand code is tested by the QLT system executing the software routine set forth at lines 1018-1051.

The QLT system software routines for testing the operation of the memory management unit of the cache/MMU are set forth at lines 1200-1522. The phase register and display are set to D for these tests. By means of these routines, the CPU will be controlled by the QLt system software to test the ability of the MMU to perform address translation, access rights processing, memory segment descriptor processing, and segment size protection. If errors occur, the instructions beginning at lines 1781 are performed to bypass the MMU and to set a status indicator and exit. This will prevent the CPU from using the memory management unit of the central subsystem.

The address path to the cache memory, the cache directory, and the ability of the cache to recognize partial hits, i.e., less than the entire amount of data requested being resident within the cache memory, are tested by the CPU QLT system executing the software routines set forth in lines numbers 1872-2041. The phase register and display are set to E for these tests. The cache is first tested by face-loading it with specific data patterns, without accessing main memory. Once the cache data stores and bit logic has been tested in this mode, then the cache is tested by initializing a portion of the main memory and loading the initialized portion with a predetermined data pattern. A comparison is then performed between the contents of the cache and the corresponding contents of the systems memory. An error in the cache will be determined if the cache contents do not equal the systems memory values. If a cache error is detected, it will be bypassed and a status bit set and the software test exited.

After the subtests have been performed within the QLT system software, an exit is made back to the QLt system firmware by means of the BRK instructions provided at line 528. Upon return of the firmware, if there has been no error, the phase register is loaded with 6 to indicate through the display that phase 6 of the CPU QLT system has been entered. The CPU checks the status of the CIPRZT signal to determine whether the CIP is currently off-line. If it is on-line, local bus write is performed to the CIP with a 05 function code and with data E000 which results in the CIP testing its interfaces with the systems memory and cache/MMU. After this test the CIP returns to normal functional readiness. The CPU then sets the phase register and display to 6 and repeats the same procedure for the SIP. Next the QLT system and the CPU controls the transfer of the constant 08 via the I bus 14, the DALU 15, and the W bus 84 to the phase register and display 809. An exit is then made to the QLT system software in order to finally exit the QLT processing.

The software exit routine is set forth in lines 531-552. A jump is performed to the routine at line 620 to test the QLT status register A3 which indicate the results of the QLT processing. If the panel is unlocked, the QLT exits to a boot prom HALT to await operator action. Otherwise, a test is made of the main memory PROM indicator. If there is a main memory PROM, it is accessed to load the software. If not, a boot prom routine is performed to load the software.

The above description sets forth in detail a quality logic test system for use with the described computer system to diagnose the existance of errors in the processing units of the computer system whenever a CLEAR, LOAD, and EXECUTE sequence is initiated by the CPU main panel buttons. The CPU QLT system initially assumes that no hardware units within the computer system are functioning properly. Thus, a set of integrity tests are conducted to determine that the processing elements comprising the CPU are functioning properly. The units tested include the data paths within the CPU, the registers within DRAM 11 and BRAM 12, the shifting mechanisms in the CPU, the data output register 28 and data buffer 31, the boot proms 41, DA, DW, PA, PW registers, F register 38, next address generator 44, and the SEL, Y, and P registers 53, 24, and 23, respectively. These tests of the processing elements within the CPU are performed prior to testing the ability of the CPU to interface with other processing units in the central subsystem and with the system memory.

Upon determining that all of the elements in the CPU are functioning correctly, interface of the CPU with the local bus 9 is tested without requesting a local bus cycle. If the CPU is properly interfacing with the local bus 9, then tests are performed of the interface between the CPU and the SIP and CIP through the local bus adapter. Subsequently, the CPU will test the functioning of the systems memory, at least the low order 64K words and will reconfigure the systems memory if a malfunction occurs therein. The CPU also tests its interface with the cache/MMU and upon determining that it is interfacing correctly with the cache/MMU, the CPU will initiate tests of the cache and the memory management unit. As each of these tests are performed by the QLT system, a phae display register is updated to store a value associated with the test currently being executed. Upon the detection of an error, the QLT system will halt further QLT processing and the phase display to indicate the test which discovered the malfunction. This will enable a field engineer to determine more accurately which circuit board or boards within the entire computer system are malfunctioning since every phase in the QLT system can be specifically associated with the testing of one or more circuit boards.

The CIP and SIP include QLT systems and other QLT systems of the CIP, SIP, and CPU perform some operations in parallel. Other operations are performed under the direction of the CPU QLT system.

It will be apparent, to those skilled in the art, that modifications and variations can be made in the preferred embodiment disclosed herein without departing from the scope or spirit of the invention. Thus, it is intended that the present invention includes these modifications and variations which come within the scope of the appended claims and their equivalents.

What is claimed is:

1. A self-diagnosing system for detecting malfunctions in a data processing system comprising:
   a central processor unit having a plurality of subprocessing units.
   a control store for addressably storing a plurality of sequences of control data;
   means for selectively accessing said control date stored in said control store;
   means for controlling said subprocessing units in response to said accessed control data to perform self-diagnosing error detecting operations in accordance with the most recently accessed control data to determine whether a said subprocessing unit is malfunctioning;
   means for generating a signal if a said subprocessing unit is malfunctioning;
   means for storing an indication of the most recently accessed sequence of control data; and
   means, responsive to said signal, for displaying a visual representation of said indication stored in said storing means whenever a said malfunction is detected in a said subprocessing unit.

2. A self-diagnosing system according to claim 1 wherein said central processor unit interfaces with a system memory, a cache memory, and a memory management unit, and wherein said self-diagnosing system further includes:
   memory means for addressably storing instruction sequences;
   means for accessing said instruction sequences stored in said memory means; and
   means receiving said accessed instruction sequences for controlling said control data accessing means to access selected sequences of control data in response to an accessed instruction sequence to control said subprocessing units to perform self-diagnosing error detecting operations on the interfaces between said central processor unit and said system memory, cache memory, and memory management unit.

3. A self-diagnosing system according to claim 1 wherein said data processing system further includes data paths for controllably transferring information between said subprocessing units and said control store for addressably storing a plurality of sequences of control data for controlling said controlling means to perform error-diagnosing tests of said data paths.

4. A self-diagnosing system according to claim 1 wherein said subprocessing units include:
   a first random access memory;
   a second random access memory;
   means for accessing said first random access memory and said second random access memory;

a first arithmetic logical unit coupled to said first random access memory;

a second arithmetic logical unit connected to said second random access memory;

a first data bus coupled to said second random access memory and said first arithmetic logic unit;

a second data bus coupled to said first random access memory, said second random access memory, and said first arithmetic logical unit;

a plurality of data shifters;

means for transferring data from said second data bus to said plurality of data shifters;

a data output register; and a fourth data bus coupling said shifting means to said data output register.

5. A self-diagnosing system according to claim 2 wherein said memory means stores instruction sequences accessed by said accessing means for testing said system memory, and wherein said receiving means receives said accessed system memory test instruction sequences to control said control data accessing means to access selected sequences of control data to control said subprocessing units to perform error detecting tests of said system memory.

6. A self-diagnosing system according to claim 1 wherein said indications stored in said storing means are hexadecismal values and wherein said displaying means includes a display unit capable of displaying said hexadecismal values and display driving means for actuating said display unit according to said stored hexadecismal value.

7. A self-diagnosing system according to claim 1 wherein said sub-processing units include an information output register, an information input register, and a bus coupling said information output register to said information input register for information transfers therebetween and wherein said control store stores a sequence of control data for controlling said information output register to initiate an information transfer between said information input register and said information output register over said bus to thereby determine whether said information output register, said information input register, and said bus are operating correctly.

8. A self-diagnosing system according to claim 1 wherein said control store comprises a plurality of banks of storage locations for storing said control data and wherein said control data comprises sequences of self-diagnosing system control instructions stored in storage locations distributed throughout each of said banks of storage locations in said control store whereby the accessing of said sequences of self-diagnosing system control instructions by said accessing means tests the integrity of said plurality of banks of storage locations in said control store.

9. In a data processing system including a plurality of basic subprocessing units each of which operates independently of the operation of any other basic subprocessing unit and a plurality of macroprocessing units, the operation of each of which is dependent upon the operation of one or basic subprocessing units, a method for diagnosing and indicating malfunctions in said data processing system comprising the steps of:

providing a separate self-diagnosing procedure to test the operation of each of said basic subprocessing units and each of said macroprocessing units;

performing each of said self-diagnosing procedures to determines whether a malfunction exists in a said basic subprocessing unit or in a said macroprocessing unit; and visually displaying upon the determination of a malfunction an indication of the self-diagnosing routine which determined the existence of said malfunction.

10. A malfunction diagnosing and indication method according to claim 9 wherein said displaying step includes the steps of generating a hexadecimal value for each self-diagnosing procedure performed and activating a hexadecimal display to store said generated hexadecimal value.

* * * * *